US006374538B1

(12) United States Patent
Morris et al.

(10) Patent No.: US 6,374,538 B1
(45) Date of Patent: Apr. 23, 2002

(54) VINEYARD APPARATUS, SYSTEM, AND METHOD FOR VINEYARD MECHANIZATION

(75) Inventors: Justin R. Morris, Springdale; Tommy L. Oldridge, Lowell, both of AR (US)

(73) Assignee: University of Arkansas, Little Rock, AR (US)

( * ) Notice: Subject to any disclaimer, the term of this patent is extended or adjusted under 35 U.S.C. 154(b) by 0 days.

(21) Appl. No.: 08/950,301

(22) Filed: Oct. 14, 1997

Related U.S. Application Data

(60) Provisional application No. 60/035,216, filed on Jan. 7, 1997, and provisional application No. 60/049,285, filed on Jun. 10, 1997.

(51) Int. Cl.⁷ .............................................. A01G 17/02
(52) U.S. Cl. ..................................... 47/58.1; 47/1.01 R
(58) Field of Search .............................. 47/1.01 R, 58.1

(56) References Cited

U.S. PATENT DOCUMENTS

| | | |
|---|---|---|
| 1,555,398 A | 9/1925 | Brundert |
| 3,426,517 A | 2/1969 | Duncan ........................ 56/330 |
| 3,439,482 A | 4/1969 | Orton ........................... 56/330 |
| 3,469,383 A | 9/1969 | Manfre ......................... 56/327 |
| 3,473,311 A | 10/1969 | Fox .............................. 56/330 |
| 3,474,895 A | 10/1969 | Dauenhauer ................ 198/135 |
| 3,507,101 A | 4/1970 | Bernshausen .................... 56/1 |
| 3,527,304 A | 9/1970 | Wilde et al. ................... 171/28 |
| 3,559,386 A | 2/1971 | Popov et al. .................. 56/331 |
| 3,563,016 A | 2/1971 | Tolochko et al. .............. 56/331 |
| 3,601,964 A | 8/1971 | Fisher et al. .................. 56/330 |
| 3,613,343 A | 10/1971 | Sagouspe et al. ............. 56/330 |
| 3,715,876 A | 2/1973 | McCord ....................... 56/330 |
| 3,727,388 A | 4/1973 | Smith .......................... 56/330 |
| 3,760,574 A | 9/1973 | Tassone ....................... 56/330 |
| 3,766,724 A | 10/1973 | Paillou ........................ 56/331 |
| 3,775,953 A | 12/1973 | Poutsma ...................... 56/126 |
| 3,783,595 A | 1/1974 | Tolochko et al. .............. 56/331 |
| 3,866,401 A | 2/1975 | Claxton et al. ............... 56/330 |
| 3,889,454 A | 6/1975 | Bruel .......................... 56/330 |
| 3,890,774 A | 6/1975 | Bruel .......................... 56/330 |

(List continued on next page.)

OTHER PUBLICATIONS

Hansen, Melissa. Mechanized vineyard is becoming a reality. 1997. found at www.goodfruit.com/archive/Feb1–99/feture4.html.*

Morris, Justin R. Vineyard mechanization & grape processing program. date unknown. Institute of Food Science and Engineering, Division of Agriculture, University of Arkansas.*

*Primary Examiner*—Peter M. Poon
*Assistant Examiner*—Jeffrey L. Gellner
(74) *Attorney, Agent, or Firm*—Head, Johnson & Kachigian

(57) ABSTRACT

For more than thirty-two years, extensive research studies involving various concepts of total vineyard mechanization have been carried out at the Arkansas Agricultural Experiment Station under the direction of Justin R. Morris (22). Tommy Oldridge was one of the first growers in the region to commercially test, implement and improve upon the findings of these research studies. These studies at the University of Arkansas have involved the evaluation of trellising and training systems suitable for total vineyard mechanization, mechanical shoot positioning, mechanical pruning, mechanical thinning, mechanical harvesting, and the post-harvest handling and utilization of mechanically harvested grapes (2, 22, 23, 24, 25, 26, 27, 35). The success of this approach to vineyard mechanization has been the fact that it has concentrated on minimizing or eliminating all limiting factors impacting the system while maintaining, or in some cases improving, fruit quality. Also, the researchers have constantly developed, modified and evaluated new equipment for the mechanization of each viticultural operation requiring hand labor. A major effort has been placed on accomplishing these objectives without any loss in fruit quality.

20 Claims, 98 Drawing Sheets

U.S. PATENT DOCUMENTS

| | | | |
|---|---|---|---|
| 3,890,775 A | 6/1975 | Bruel | |
| 3,901,006 A | 8/1975 | Lewis et al. | 56/330 |
| 3,939,629 A | 2/1976 | Bruel | 56/330 |
| 3,996,730 A | 12/1976 | Dorfer | 56/330 |
| 4,015,366 A * | 4/1977 | Hall, III | 47/1.001 R |
| 4,016,711 A | 4/1977 | Claxton | 56/330 |
| 4,022,001 A | 5/1977 | Burton | 56/330 |
| 4,085,572 A | 4/1978 | Bruel | 56/330 |
| 4,112,657 A | 9/1978 | Benac et al. | 56/330 |
| 4,207,727 A | 6/1980 | Poytress | 56/330 |
| 4,241,569 A | 12/1980 | Bobard et al. | 56/330 |
| 4,251,983 A | 2/1981 | Burton | 56/330 |
| 4,282,705 A | 8/1981 | Fontan | 56/330 |
| 4,291,526 A | 9/1981 | Hiyama et al. | 56/330 |
| 4,299,081 A | 11/1981 | Harris et al. | 56/330 |
| 4,321,786 A | 3/1982 | Burton | 56/330 |
| 4,333,266 A | 6/1982 | Babo | 47/58 |
| 4,370,847 A | 2/1983 | Arnaud | 56/330 |
| 4,391,085 A | 7/1983 | Harris et al. | 56/330 |
| 4,601,129 A | 7/1986 | Peev et al. | 47/6 |
| 4,638,705 A | 1/1987 | Michel | 83/701 |
| 4,777,787 A | 10/1988 | Warren | 56/235 |
| 5,101,618 A | 4/1992 | Oldridge | 56/330 |
| 5,339,612 A | 8/1994 | Scott | 56/330 |
| 5,355,667 A | 10/1994 | Scott | 56/330 |
| 5,423,166 A | 6/1995 | Scott | 56/330 |
| 5,544,444 A | 8/1996 | Oldridge | 47/4 |
| 5,970,689 A | 10/1999 | Hoffman et al. | 56/6 |

* cited by examiner

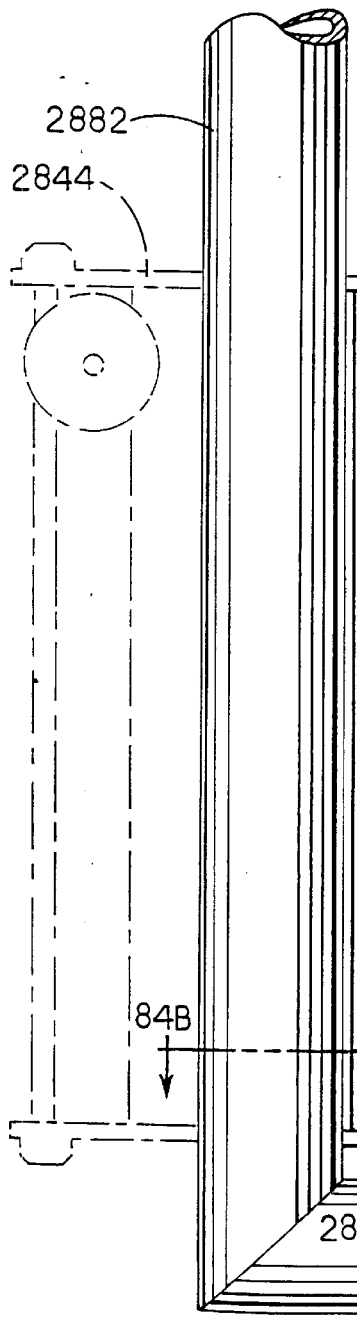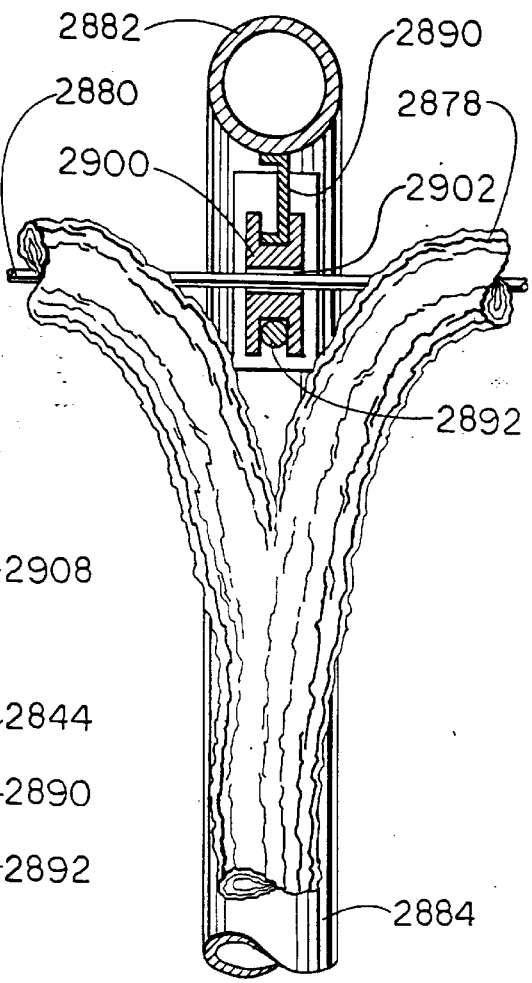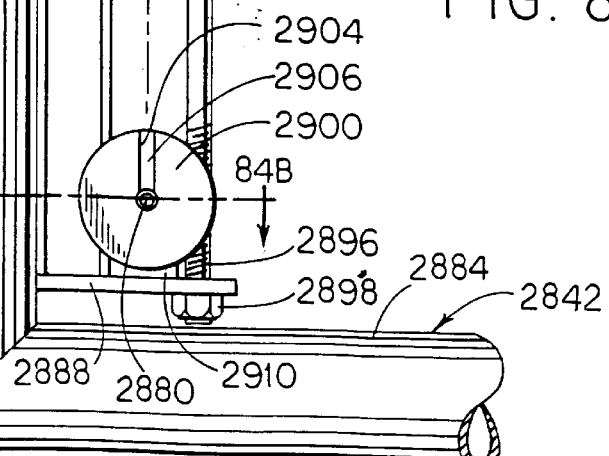

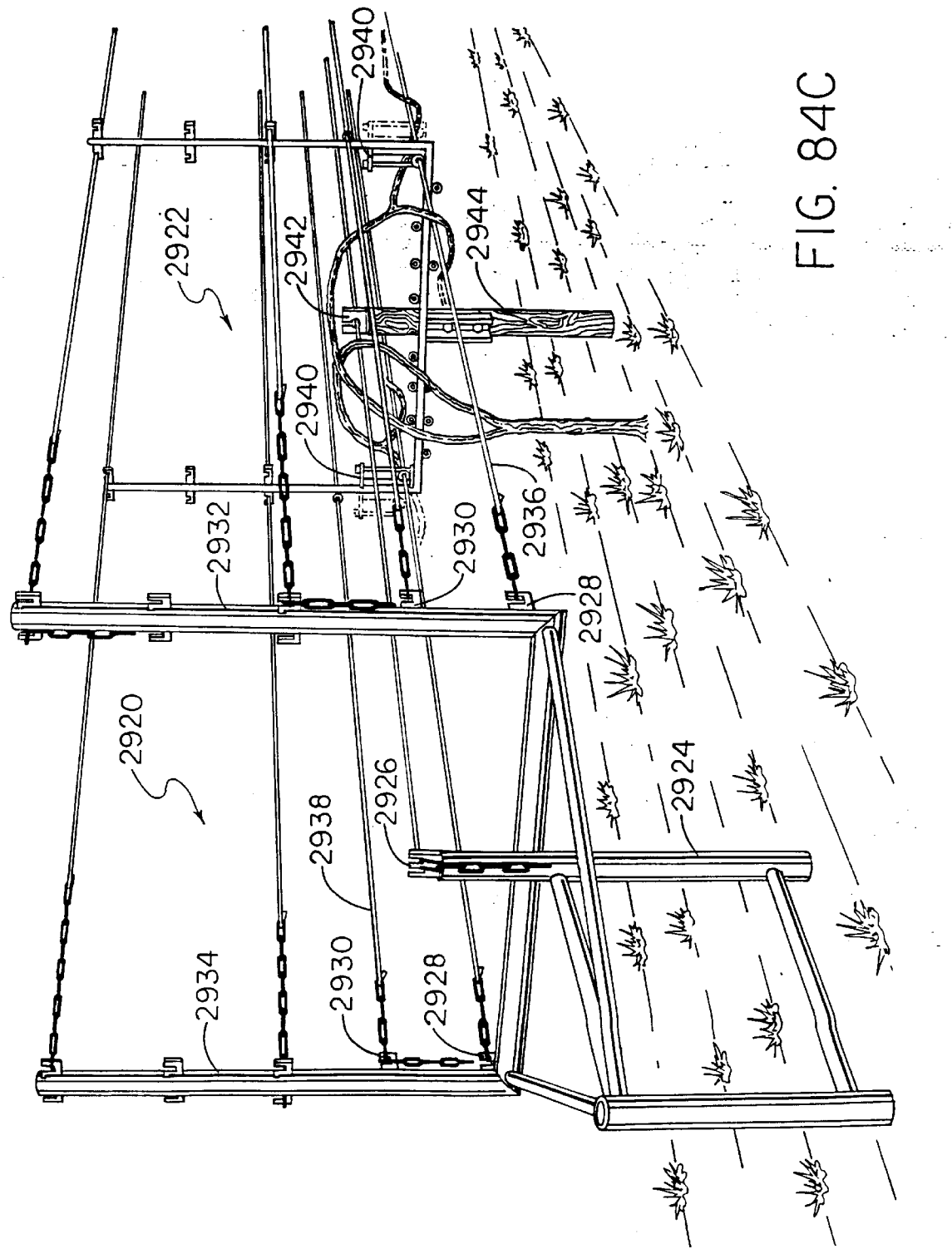

VINEYARD APPARATUS, SYSTEM, AND METHOD FOR VINEYARD MECHANIZATION

CROSS-REFERENCE TO RELATED APPLICATIONS

This application is a continuation-in-part of provisional application Serial No. 60/035,216 filed Jan. 7, 1997, and is also a continuation-in-part of provisional application, Serial No. 60/049,285 filed Jun. 10, 1997. Each of these provisional applications is hereby incorporated by reference.

STATEMENT REGARDING FEDERALLY SPONSORED RESEARCH OR DEVELOPMENT

Not Applicable.

REFERENCE TO A MICROFICHE APPENDIX

Not applicable.

BACKGROUND OF THE INVENTION

The present invention is directed to vineyard apparatus, systems, and methods, and, more particularly concerns, machinery, devices, systems, and methods for completely or partially mechanizing grape growing and harvesting while maintaining or improving vineyard consistency and fruit quality. The present invention applies to both wine and juice grape types, is adapted to a substantial number of different trellis types and training systems, and is especially useful in established vineyards, for example having been trained for about three or more years.

Grapes are consumed in a larger quantity and in more different product types than any other fruit crop on a global basis. The major uses for grapes are for wine, raisins, fresh market, juice (and concentrate), and in canned products (such as fruit cocktail). Table 1 shows the important grape producing countries of the world.

Chapter XX, "Grape Growing", by Justin R. Morris, in the text "Modern Fruit Science" by Norman F. Childers, Justin R. Morris, and G. Steven Sibbet, published by Horticultural Publications, Gainsville, Fla., 1995, is hereby incorporated by reference. More particularly, as described on pages 478–482 including Table III and FIGS. 24–27, mechanical pruning equipment has reduced the man hours required for grape pruning. Page 484 describes mechanical harvesting, and page 485 describes the economics of vineyard mechanization. As described on pages 491–494 and as shown in FIGS. 38 and 40, vinifera grapes for processing are mechanically harvested and power pruned using tractor powered, hand-held pneumatic power shears in an effort to reduce labor costs.

Although mechanical harvesters, mechanical shoot positioners, and mechanical pruning devices have been known for some time, heretofore, a commercially viable and effective system and apparatus for complete mechanization of the growing and harvesting of wine and juice grape cultivars has not been developed. Although attempts have been made at vineyard mechanization, they have fallen short in that they either require excessive follow-up hand operations or other manual labor, do not provide for mechanization of both upright and drooping growth habit grape cultivars, are not adjustable, adaptable, or versatile enough to be used with a multitude of trellis types or training systems, are not cost effective, do not maintain fruit quality, and the like.

For example, U.S. Pat. Nos. 3,426,517; 3,439,482; 3,473,311; 3,563,016; 3,559,386; 3,601,964; 3,613,343; 3,715,876; 3,727,388; 3,760,574; 3,766,724; 3,783,595; 3,866,401; 3,889,454; 3,890,774; 3,890,775; 3,939,629; 3,996,730; 4,016,711; 4,022,001; 4,035,572; 4,112,657; 4,207,7274,112,657; 4,207,727; 4,241,569; 4,251,983; 4,282,705; 4,291,526; 4,299,081; 4,321,786; 4,370,847; 4,391,085; 5,339,612; 5,355,667; and 5,423,166 are directed to or disclose grape harvesting or grape harvester equipment or machinery.

U.S. Pat. No. 5,101,618, issued to Tommy L. Oldridge on Apr. 7, 1992, discloses an improved grapevine comber (shoot positioning) machine or device including a pivoting counterforce brush for use with an underslung grapevine comber for cleaning and positioning shoots of the grapevine overhanging the guide wires of a divided canopy, and is hereby incorporated by reference.

U.S. Pat. No. 5,544,444, issued to Tommy L. Oldridge on Aug. 13, 1996, discloses a single curtain wine and juice grape vine cane pruner and is hereby incorporated by reference.

Other patents of general interest include U.S. Pat. No. 3,901,006 directed to a vine combing (shoot positioning) machine, U.S. Pat. No. 4,333,266 directed to a viticultural process and vine-dressing machine, and U.S. Pat. No. 4,638,705 directed to a machine for trimming and disbudding vine shoots for subsequent use as graft supports.

Hence, there exists a need throughout the viticultural world for an improved vineyard apparatus, system and method for partial or complete vineyard mechanization and to modify, trellis, and train grapevines so that expensive hand operations can be economically mechanized without any substantial loss of yield while maintaining or improving vineyard consistency and fruit quality.

BRIEF SUMMARY OF THE INVENTION

In accordance with the present invention, a vineyard apparatus, method and system for complete or partial mechanization of grape growing and harvesting or viticulture is provided which addresses the shortcomings of the prior art and makes provision for viticulture mechanization without a substantial decrease in yield and while maintaining or improving vineyard consistency and fruit quality, especially in established vineyards.

For more than thirty-two years, extensive research studies involving various concepts of vineyard mechanization have been carried out at the Arkansas Agricultural Experiment Station under the direction of Justin R. Morris (22). Tommy Oldridge was one of the first growers in the region to commercially test, implement, and improve upon the findings of these research studies.

These studies at the University of Arkansas have involved the evaluation of trellising and training systems suitable for complete vineyard mechanization, mechanical shoot positioning, mechanical pruning, mechanical thinning, mechanical harvesting, and the post-harvest handling and utilization of mechanically harvested grapes (2, 22, 23, 24, 25, 26, 27, 35). The success of this approach to vineyard mechanization has been the fact that it has concentrated on minimizing or eliminating all limiting factors impacting the system while maintaining, or in some cases improving, fruit quality. Also, new equipment has been developed, modified and evaluated for the mechanization of each viticultural operation requiring hand labor. A major effort has been placed on accomplishing these objectives without any substantial loss in fruit quality.

A principal object of the present invention is the provision of an improved system, apparatus and method for vineyard mechanization.

Another object of the present invention is the provision of a shoot and fruit thinner for mechanical fruit and shoot thinning, a full row GDC harvester, a modified half-row and modified full row GDC floating, shaking, rotating head harvester, a modified slapper, a modified "U" trellis, and/or a modified cordon wire support assembly, a guide wire anchoring support unit for facilitating mechanization.

Still another object of the present invention is the provision of respective complete and partial mechanization systems, apparatus, and methods for mechanization of *Vitis labruscana, Vitis vinifera*, French-American hybrids, American hybrids, as well as other grape species and cultivars.

Still yet another object of the present invention is the provision of a Morris-Oldridge vineyard mechanization system, apparatus and method adapted for use with a single curtain trellis, Geneva Double Curtain (GDC) trellis, California T-trellis, high wire bilateral cordon, standard vertical movable catch wire, Lyre or "U", other divided canopy trellises, vertical shoot position (VSP), minimal pruning (MP or MPCT in Australia), Smart-Dyson ballerina trellis, modified forms of such trellises or training systems, or the like.

Another and more particular object of the present invention is a vineyard system, apparatus and method for mechanization of *Vitis labruscana* grapes on a single curtain trellis, minimal pruned *Vitis labruscana* grapes on a GDC trellis system, minimal pruned *Vitis labruscana* grapes on single curtain trellis system, *Vitis vinifera* and French-American hybrid grapes on standard California T-trellis, high wire bilateral cordon and standard vertical movable catch wires, minimal pruned *Vitis vinifera* and French-American hybrid grapes on high wire single curtain trellising system, and *Vitis vinifera* and French-American hybrid grapes on GDC, Lyre or "U", a modified "U", other divided canopy trellises, and the like.

Other objects and further scope of the applicability of the present invention will become apparent from the detailed description to follow, taken in conjunction with the accompanying drawings wherein like parts are designated by like reference numerals.

BRIEF DESCRIPTION OF THE SEVERAL VIEWS OF THE DRAWING

FIG. 25 is a schematic representation of a shoot and fruit thinner 452 having a brush unit mounted almost vertically on one arm and a rotary circular striker mounted on the end of the other arm thereof, for use on double curtain trellising systems.

FIG. 26 is a schematic illustration of a shoot and fruit thinner 454 having a brush unit mounted substantially horizontally at the end of one arm and a circular rotary striker mounted on the end of the other arm thereof, for use on double curtain trellising systems.

FIG. 27 is a schematic representation of a shoot and fruit thinner embodiment 456 having an oval rotary striker assembly mounted on the base of one arm, a circular rotary striker assembly mounted on the base of the other arm and with the strikers or fingers of the oval and circular units overlapping one another near a cordon.

FIG. 28 is a schematic illustration of a shoot and fruit thinner 458 having an oval rotary striker assembly mounted on the base of each arm thereof with the strikers or fingers overlapping one another near the cordon.

FIG. 29 is a schematic illustration of a shoot and fruit thinner 460 having a rotary circular striker assembly mounted at the base of each of two elongate arms and adapted for use with a modified Lyre or "U" trellis.

FIG. 30 is a schematic illustration of a shoot and fruit thinner 462 similar to that of FIG. 8 adapted for use with a standard vertical movable catch wire system.

FIG. 31 is a schematic illustration of a shoot and fruit thinner 462 adapted for use with a California-T trellis.

FIG. 32 is a schematic representation of a shoot and fruit thinner 466 similar to that shown in FIGS. 2–7 of the drawings and adapted for use with a single curtain high bilateral cordon system.

FIG. 33 is a schematic illustration of a shoot and fruit thinner arrangement having a rotary oval striker arrangement mounted on the base of one arm and a rotary circular striker assembly mounted at the base of the other arm and adapted for use with a standard or modified Lyre or "U" trellis.

FIGS. 38A–38D relate to the adjustable bars or grate elements for the fan units of FIGS. 36–38. More particularly, FIG. 38A is a bottom view illustration of one of the adjustable bars.

FIG. 38B is a cross-section representation of the bar of FIG. 38A taken along line 38B—38B.

FIG. 38C is a cross-section illustration of an alternative adjustable bar having a semicircular rather than a rectangular cross-section of the adjustable bar of FIGS. 38A and 38B.

FIG. 38D is a cross-section illustration of an alternative adjustable bar having a triangular rather than a rectangular cross-section of the adjustable bar of FIGS. 38A and 38B.

More particularly, FIG. 44 is a front view illustration of the pruner of U.S. Pat. No. 5,544,444.

FIG. 45 is a side view representation of the pruner of FIG. 44.

FIG. 46 is an enlarged top plan view of a vertical cane pruner of the single curtain grapevine pruner of FIGS. 44 and 45.

FIG. 47 is a front elevation view representation of horizontal cane pruners of the single curtain grapevine pruner of FIGS. 44 and 45.

FIG. 72 is a front perspective view representation of a single bar horizontal cutter adapted for summer skirting and the like.

FIG. 84A is an enlarged front view illustration of the moveable cordon wire roller assembly of FIGS. 84 and 85.

FIG. 84B is a cross-section illustration of the moveable cordon wire roller assembly taken along line 84B—84B in FIG. 84A.

FIG. 84C is a perspective view representation of a modified Lyre or "U" trellis having movable cordon wire roller assemblies, and releasable catch and guide wires, and a modified wire anchor adapted for use with the modified mechanical harvesters of FIGS. 84 and 85.

FIG. 86 is a seasonal chart showing vineyard mechanization activities for *Vitis labruscana* and other grapes with drooping growth habits on single curtain trellis systems.

FIG. 87 is a seasonal chart for vineyard mechanization of *Vitis labruscana* and other grapes with drooping growth habits on GDC trellis and GDC-like canopy systems.

FIG. 88 is a seasonal chart for vineyard mechanization activities on minimal pruned *Vitis labruscana* and other grapes with drooping growth habits on single curtain trellis systems.

FIG. 89 is a seasonal chart for vineyard mechanization activities on minimal pruned *Vitis labruscana* and other grapes with drooping growth habits on GDC trellis systems.

FIG. 90 is a seasonal chart for vineyard mechanization activities of *Vitis vinifera* and French-American hybrid grapes produced on high wire bilateral cordon systems.

FIG. 91 is a seasonal chart for vineyard mechanization activities of *Vitis vinifera* and other French-American hybrid grapes produced on GDC and other divided canopy trellises.

FIG. 92 is a seasonal chart for vineyard mechanization activities on minimal pruned *Vitis vinifera* and French-American hybrid grapes trained on high wire single curtain trellising systems.

FIG. 93 is a seasonal chart for vineyard mechanization activities on minimal pruned *Vitis vinifera* and French-American hybrid grapes on GDC trellis systems.

FIG. 94 is a seasonal chart for vineyard mechanization activities of *Vitis vinifera* and French-American hybrid grapes produced on standard California T-trellises.

FIG. 95 is a seasonal chart for vineyard mechanization activities of *Vitis vinifera* and French-American hybrid grapes produced on standard vertical movable catch wires.

FIG. 96 is a seasonal chart for vineyard mechanization activities of *Vitis vinifera* and French-American hybrid grapes produced on Lyre or "U" and other divided canopy trellises.

FIG. 97 is a seasonal chart for vineyard mechanization activities of *Vitis vinifera* and French-American hybrid grapes produced on Smart-Dyson ballerina trellising systems.

DETAILED DESCRIPTION OF THE INVENTION

Brief History of Vineyard Mechanization and Concerns

Figure 1:
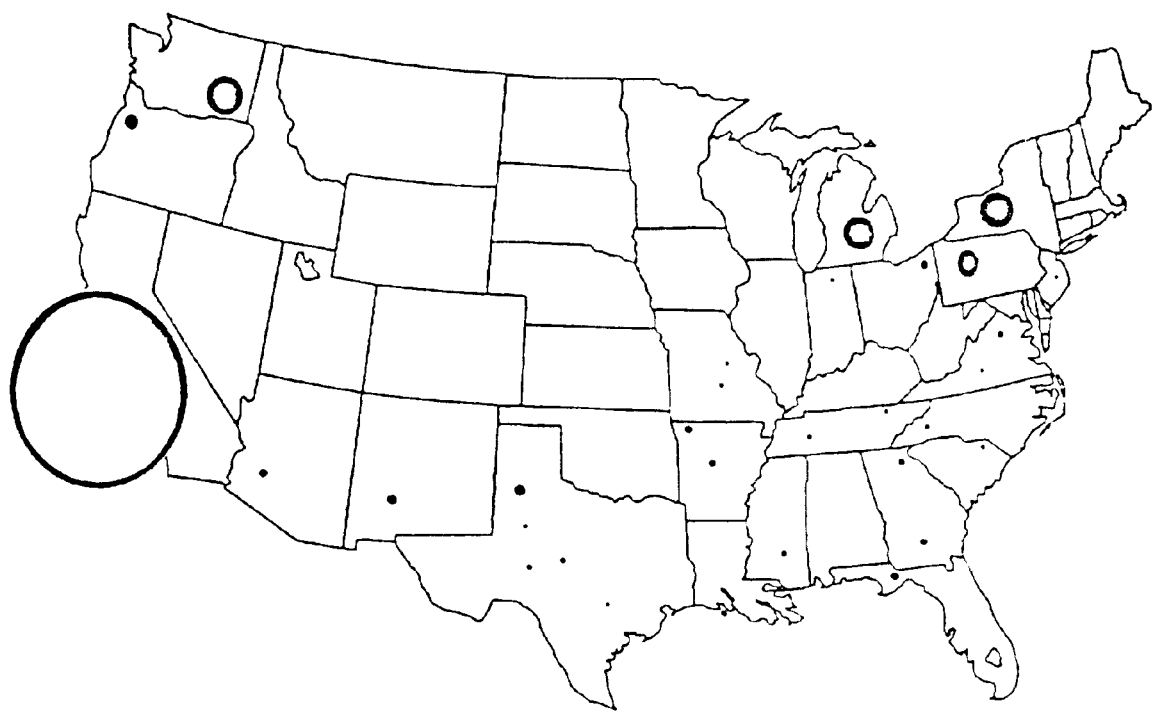
FIG. 1 is a graphical representation of the United States indicating the major grape producing regions.

FIG. 1 of the drawings provides a schematic representation of grape production across the United States with black dots representing the areas or regions of production and the size of the dots indicating the relative quantities of production. As shown in FIG. 1, California is the largest grape producer followed by New York, Washington, Michigan, Pennsylvania, Ohio, Arizona, and Arkansas.

California produces almost entirely the European-type grape *Vitis vinifera*. The American-type, *V. labruscana*, or its hybrids with *viniferas* are grown mainly in the central and northeastern states. Muscadine, *Vitis rotundifolia* is grown mainly in the gulf and southern Atlantic states.

The following are the leading cultivars in California in approximate order by acreage: 'Thompson Seedless' (RT); 'French Colombard' (wW); 'Chardonnay' (wW); 'Zinfandel' (rW); 'Cabernet Sauvignon' (rW); 'Flame Seedless' (T); 'Flame Tokay' (T); 'Merlot' (rW); 'Sauvignon blanc' (wW); 'Emperor' (T); 'Grenache' (rW); 'Carignane' (rW); 'Barbera' (rW); 'Perlette' (T); 'Pinot Noir' (rW); 'Ruby Cabernet' (rW); 'White Riesling' (wW); 'Muscat of Alexandria' (wW); 'Petite Sirah' (rW); 'Rubired' (rW); 'Chenin blanc' (wW); 'Pinot blanc' (wW); 'Semillon' (wW); 'Ribier' (T); 'Gewurztraminer' (wW); 'Napa Gamay' (rW); 'Nebbiolo' (rW); and 'Malvasia Bianca' (wW). The largest acreage of 'Thompson Seedless' is explained by the fact that this cultivar is popular for raisins, table grapes, wine, juice, and canning and therefore constitutes the majority of California's grape acreage (R-raisin; T-table; W-wine; w-white; r-red).

To use machines successfully for mechanical shoot positioning, mechanical pruning, mechanical thinning, mechanical shoot removal, mechanical leaf removal, mechanical harvesting, and other grape production operations, trellis systems should be devised and shoots positioned to accommodate precise mechanical movement. These operations should occur without excessive damage to the vines and at no reduction in fruit yield and/or quality.

One training system that addresses these objectives is the Geneva Double Curtain training system (GDC), developed by Shaulis et al. (38) in New York. The GDC trellising system (FIG. 75) doubles the length of cordon per vine, over the 5½ to 6 ft. (165 cm–170 cm) Single Curtain, Bilateral Cordon (BC) which is also easy to totally mechanize when the fruiting canes are selected from the lower 180° of the cordon for cultivars with drooping growth habit. The proper use of a mechanical shoot positioner increases the number of mature, productive shoots on vigorous vines that have their basal nodes adequately exposed to sunlight. Most vigorous vines of large-leafed *Vitis labruscana* L., *Vitis aestivalis*, some American hybrids, French-American hybrids and a few *Vitis vinifera* cultivars with a drooping-shoot growth habit and annual cane prunings of 1.35 kg or more at spacings of 240 cm in-the-row spacing may be expected to give excellent response to the GDC system (17). Less vigorous vines need to be spaced closer in the row or be grown on the BC high wire system.

Figure 75:
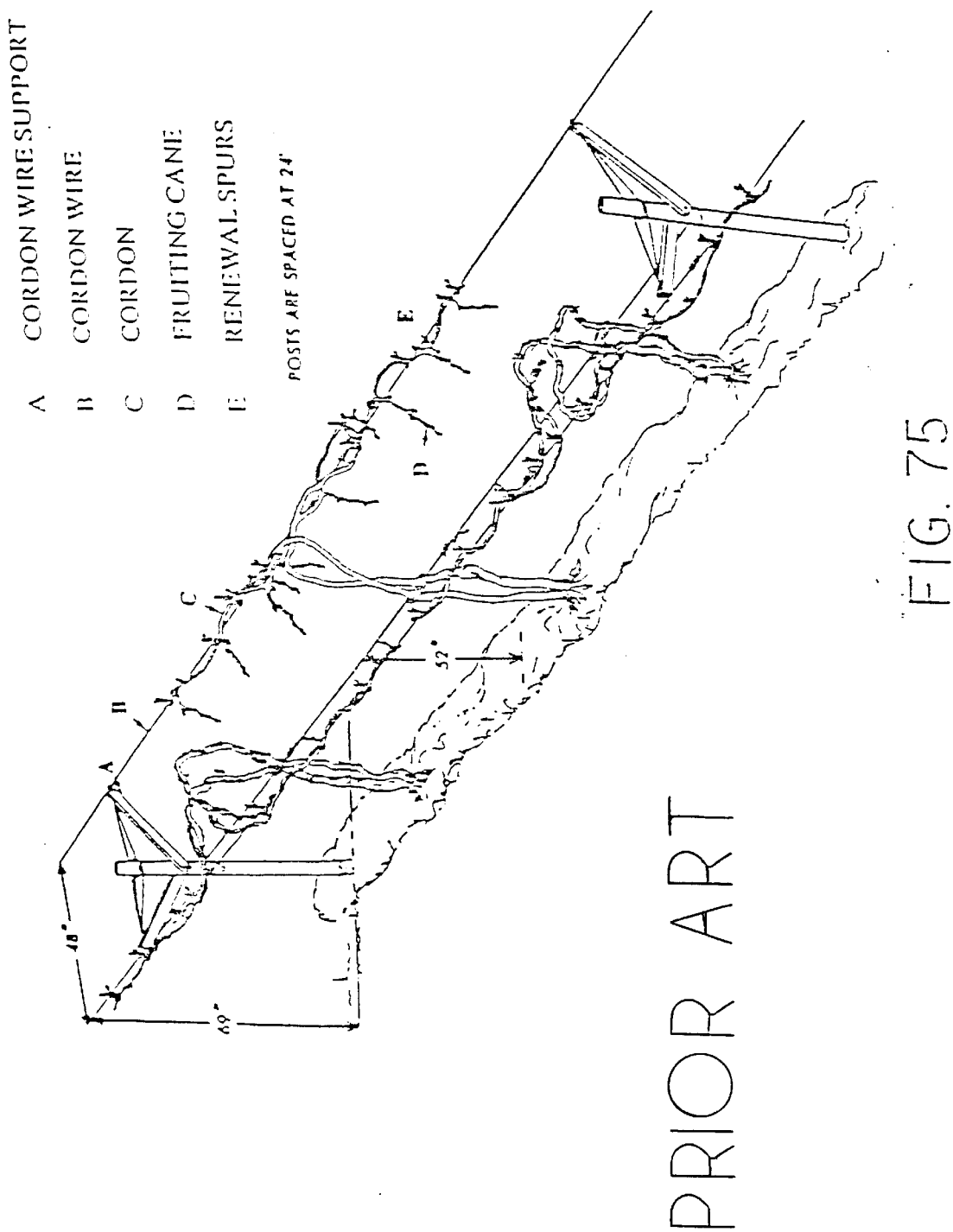
FIG. 75 is a schematic perspective representation of a conventional GDC trellising system designed by Dr. Nelson Shaulis, N.Y. Agr. Exp. Sta., Geneva, 14456.

The GDC trellising system requires a 3-wire trellis with two horizontal cordon-support wires and a single trunk-support wire. The cordon support wires should be 180 cm above the ground and 120 cm apart. The vines are cordon trained and short cane pruned (i.e., 4 to 6 nodes) for most *Vitis labruscana* species. The cordon wires are attached to flexible cross arms that allow for efficient and total mechanization (FIG. 75). In contrast to *Vitis vinifera* L., the fruiting canes of *Vitis labruscana*, cordon-trained vines are selected from nodes of very short vertical arms originating within the lower 180° of the horizontal cordon. The cordon must be in continuous contact with the support wire in order to obtain maximum efficiency from mechanical operations.

Bilateral cordon (BC) trained *Vitis labruscana* vines (FIGS. 2 and 3) also can be effectively shoot positioned, pruned, thinned, and harvested by machine (2, 23, 24, 25). Research in Arkansas (2, 24) compared the three major trellising systems used for *Vitis labruscana* grapes in the Eastern United States, and the results have shown the BC system to be as productive and to produce comparable fruit quality to the Umbrella Kniffin system, the predominate trellising system that was used at the time of the study. However, the GDC system proved to be even more productive than either of the other two systems, with no reduction in fruit quality. The GDC system has proven to be superior to the BC system with vigorous cultivars that have sufficient growth to fill the trellis of the GDC system. However, there is no advantage to the GDC system in low vigor vineyards without the utilization of close in-row spacing. The BC and GDC system can be completely mechanized; hence, these systems as well as the modified systems of FIGS. 76–82 and the like are the recommended or preferred systems for most cultivars and vineyards that are to be partially or totally mechanized.

Figure 30:
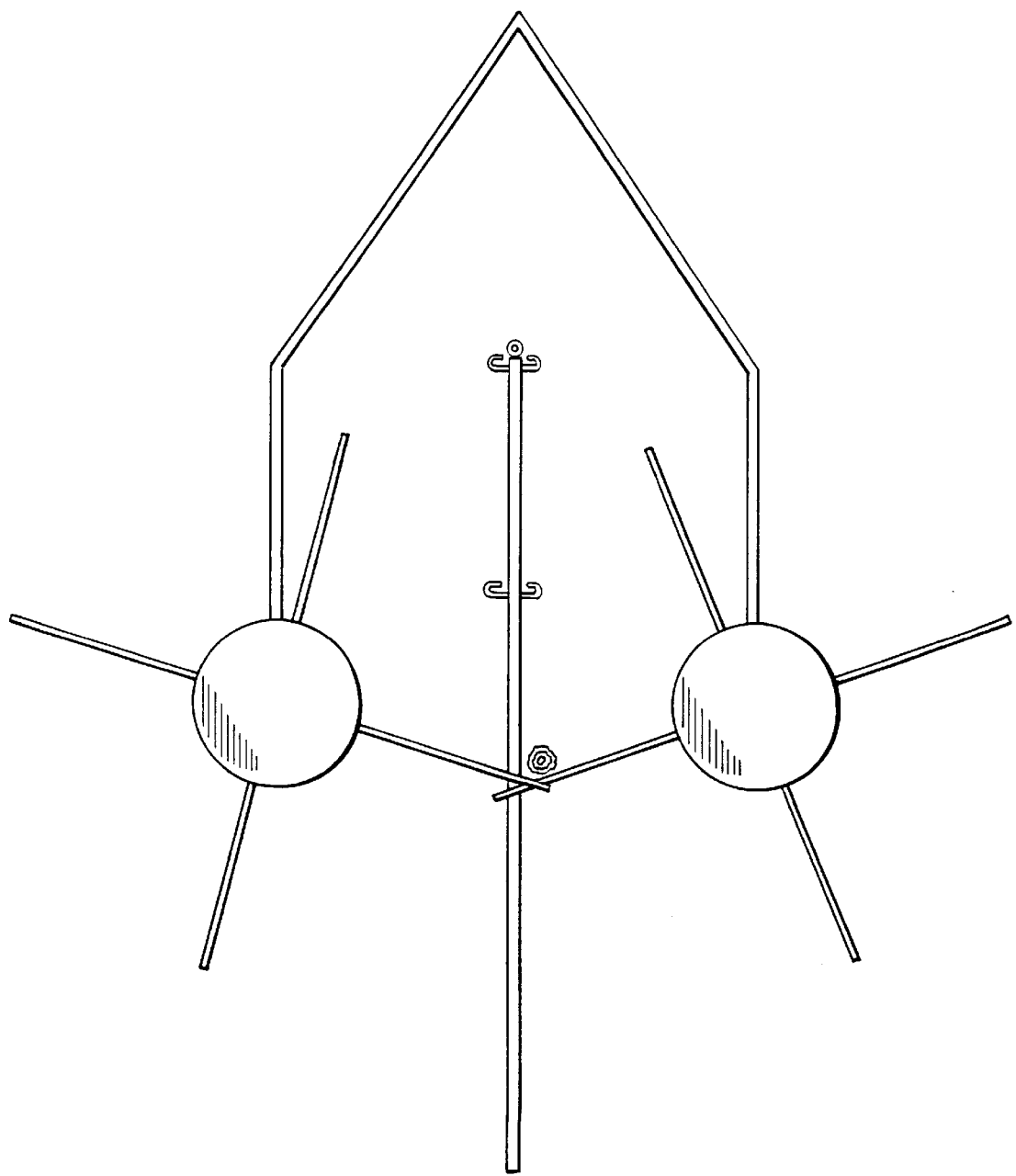
Figure 31:
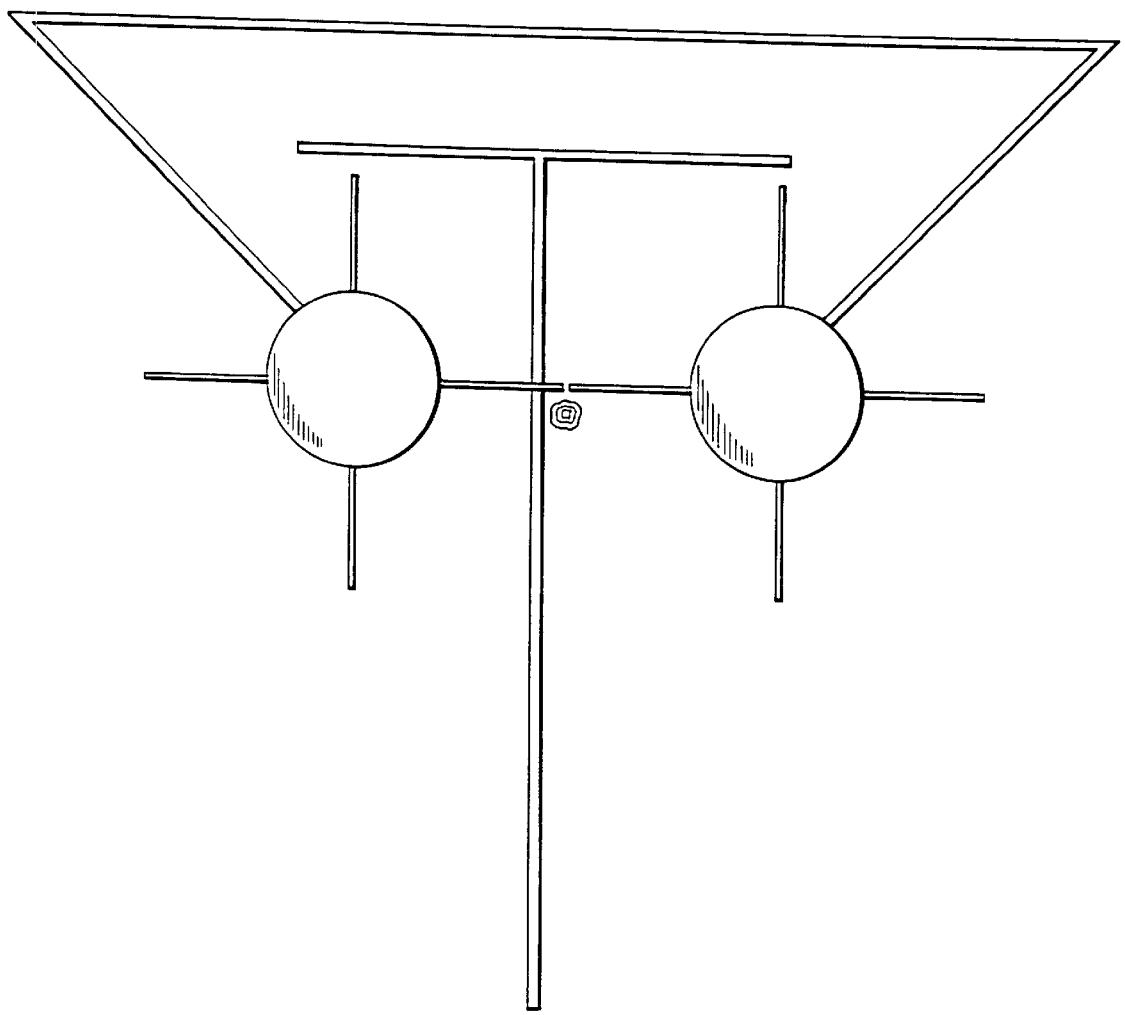
Figure 32:
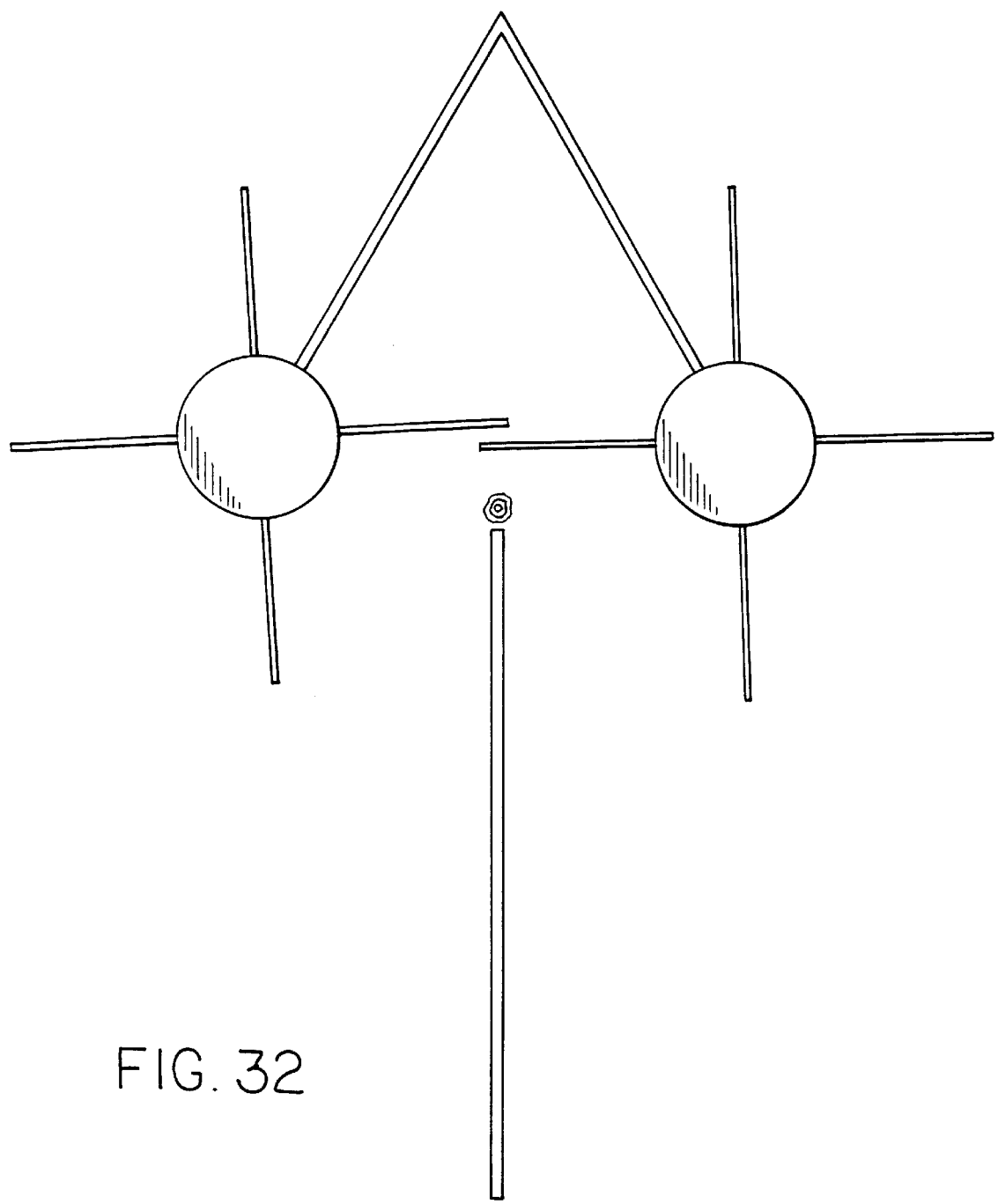
Figure 33:
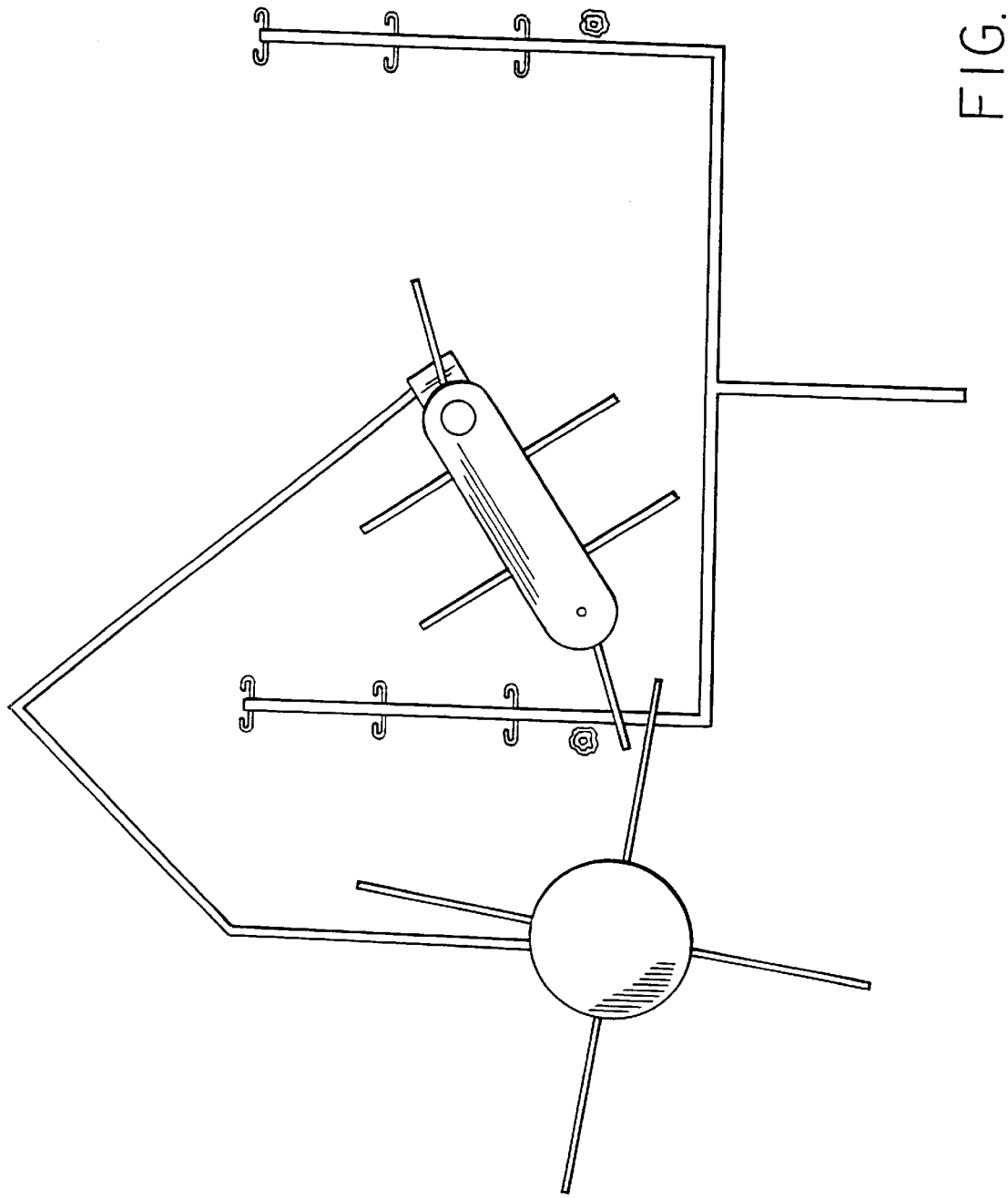

Bilateral cordon (BC) with a (105 cm) 42-inch cordon and two stationary top catch wires on a vertical trellis or moveable catch wires utilizing spur pruning on the upper 180° of the cordon currently are common training systems in *Vitis vinifera* vineyards in many parts of the world (FIG. 30). The fruiting spurs are selected from the upper 180° of the cordon since *Vitis vinifera* cultivars grow upright. A 210 cm stake is driven into the ground to a depth of 50 cm at each vine. One or two 12-gauge high tensile strength (HTS) cordon wires are located about 105 cm above the vineyard floor. However, with the moveable catch wire system two or three moveable foliage support wires (13-gauge HTS) are moved upward to support the new growth as the vine grows. These systems can be successfully pruned, thinned, fruiting zone leaf removed, summer tipped or trimmed, and harvested mechanically.

Mechanical Shoot Positioning:

Effective mechanical pruning only can be accomplished with species with a drooping growth habit when produced on a 170 cm (6 ft.) GDC or BC system when the vines are shoot positioned, which places the canes in proper position for the winter mechanical pruning operation. See Oldridge U.S. Pat. No. 5,101,618, dated Apr. 7, 1992 and hereby incorporated by reference, for a GDC vine comber with pivoting counterforce brush. Also, see FIGS. 41–43 for positioning and pruning equipment. Shoot positioning has been shown to be an effective method of improving fruit quality and of exposing the lower nodes on the bearing units (canes) to sunlight to make the basal nodes more productive than under shaded conditions (27, 38, 40). Shoot positioning has proven particularly effective with large vigorous vines on GDC which have a drooping-shoot growth habit. Shoot positioning can be accomplished by mechanical means. A new shoot positioner patented and manufactured by Tommy Oldridge is an improvement over other machines for the positioning of GDC-trained vines (FIG. 42 and U.S. Pat. No. 5,101,618 to Oldridge).

Figure 48:
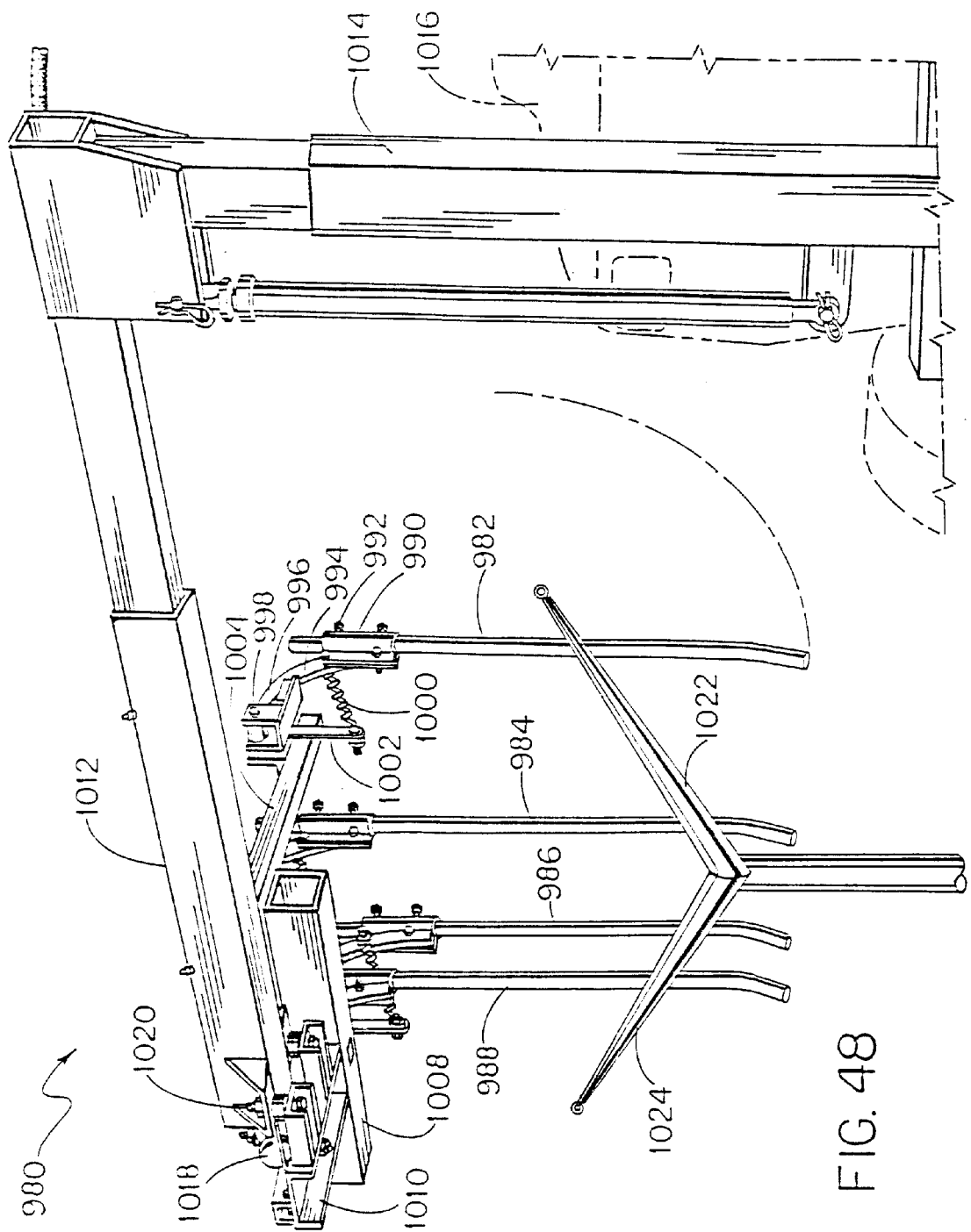
FIG. 48 is a perspective view illustration of a center breaker adapted for use with GDC or other double curtain trellising systems.
Figure 49:
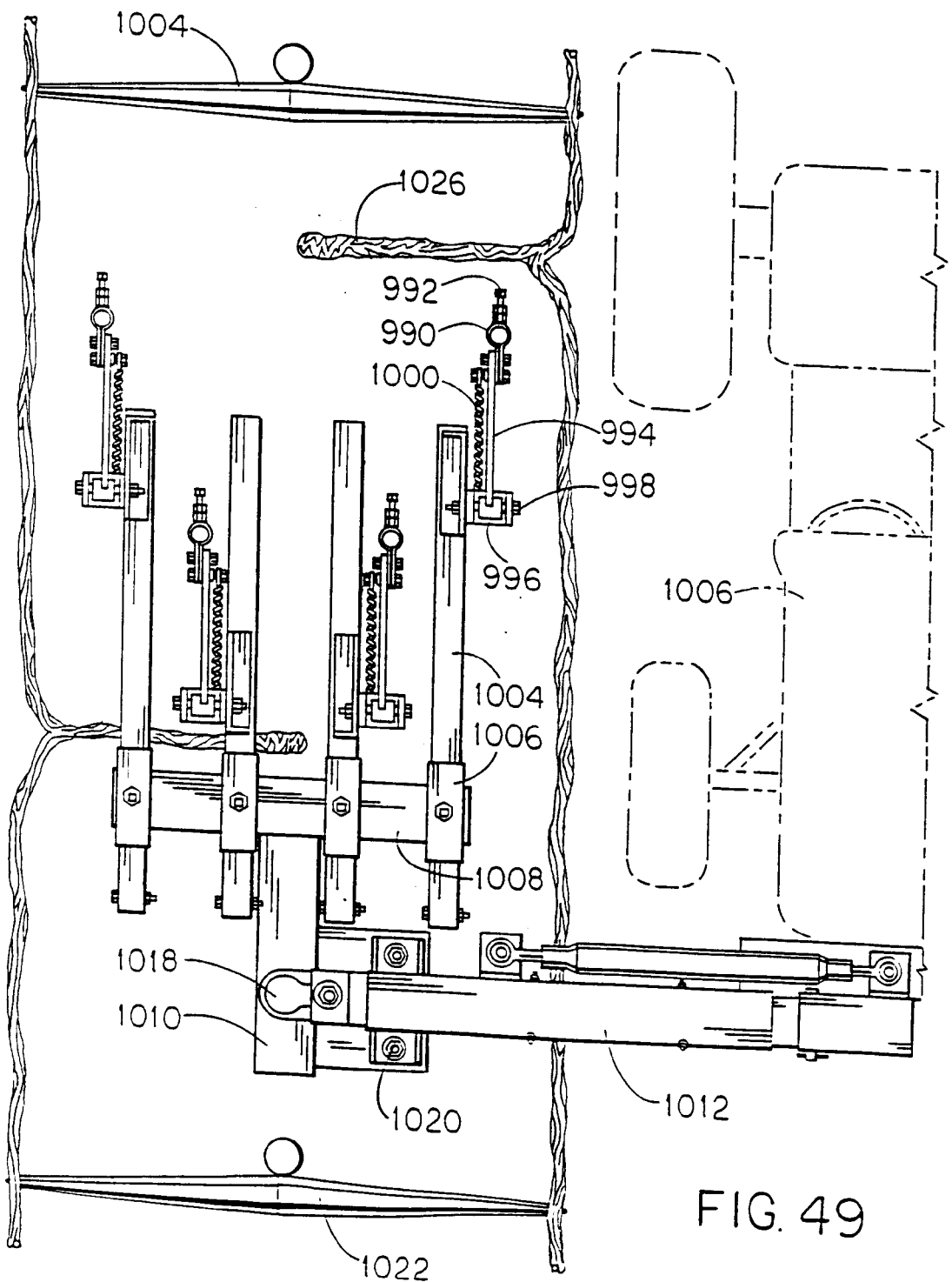
FIG. 49 is a top view representation of the center breaker of FIG. 48.

As soon as the tendrils touch the wire or another cane, they fasten very quickly; therefore, vines are usually first shoot positioned just before bloom. Shoot positioning may require a second pass with a mechanical shoot positioner. For the GDC system, all vigorous shoots growing between the two cordon wires must be pulled or brushed down in order to maintain two separate foliage canopies. This can be accomplished with the Oldridge shoot positioner and middle breaker (FIGS. 48 and 49). Also, other vineyard operations can be carried out at the same time while the shoots are positioned or broken (spraying, etc.).

Mechanical Pruning and/or Trimming During the Dormant Season:

In the late 1960s, grape producers indicated that once mechanical harvesting was totally implemented, the most time-consuming hand labor operations in the vineyard were dormant pruning and tying. Grape producers complained of decreasing availability of qualified labor for pruning and tying and indicated that these should be the next operations mechanized (22).

Background Information On:

A mechanical pruner or trimmer was successfully tested in 1967 and 1968 by Morris at the University of Arkansas Agricultural Experiment Station on a BC cordon-trained mature Concord vineyard (FIGS. 2–7). The most significant findings of these studies were that the vines had to be shoot positioned before and following bloom in order for the canes to be in the proper position for dormant pruning or trimming and equally important was the need to produce the lower nodes in sunlight to maintain node productivity and fruit quality.

A mechanical pruning aid for Concord grapes was developed in New York by Pollock et al. (32) for use on cordon-trained vines. A triangular arrangement of reciprocating cutter bars established the length of cane and cane position. This New York pruning system was supplemented by a mechanized brushing technique to remove the top shoots (upper 180° of the cordon) early in the spring.

In 1971, the Arkansas studies indicated mechanical pruning of grape vines could be accomplished and would reduce pruning labor by as much as 50% (26). One viticultural concern was observed in this early research, the impossibility of treating each vine individually to control crop load (balance pruning according to vine size), which might result in the overcropping or undercropping of individual vines.

Figure 2:
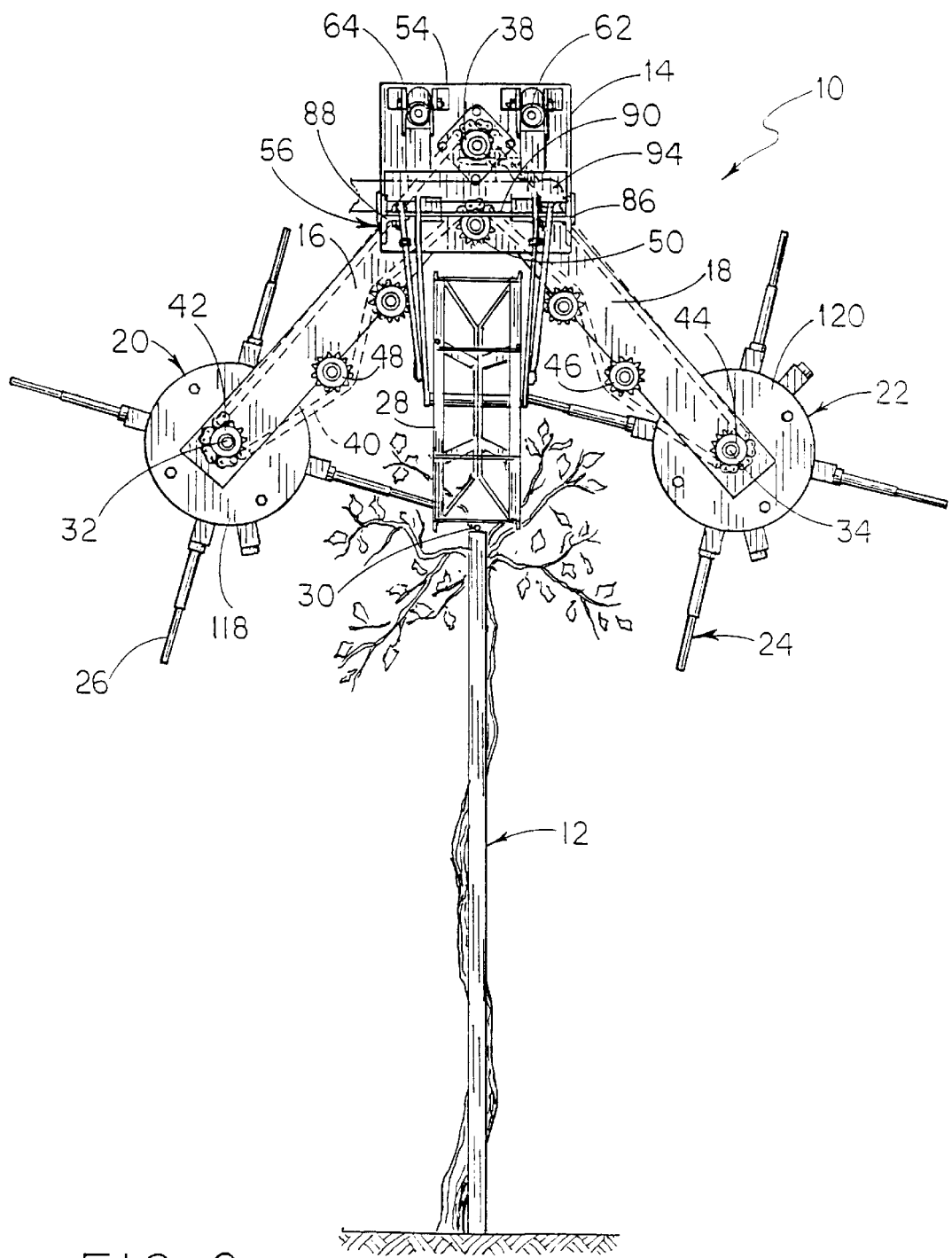
FIG. 2 is a front plan view representation of a shoot and fruit thinner for *Vitis vinifera*, French-American hybrid, American hybrids and some cultivars of other species of grapes.
Figure 3:
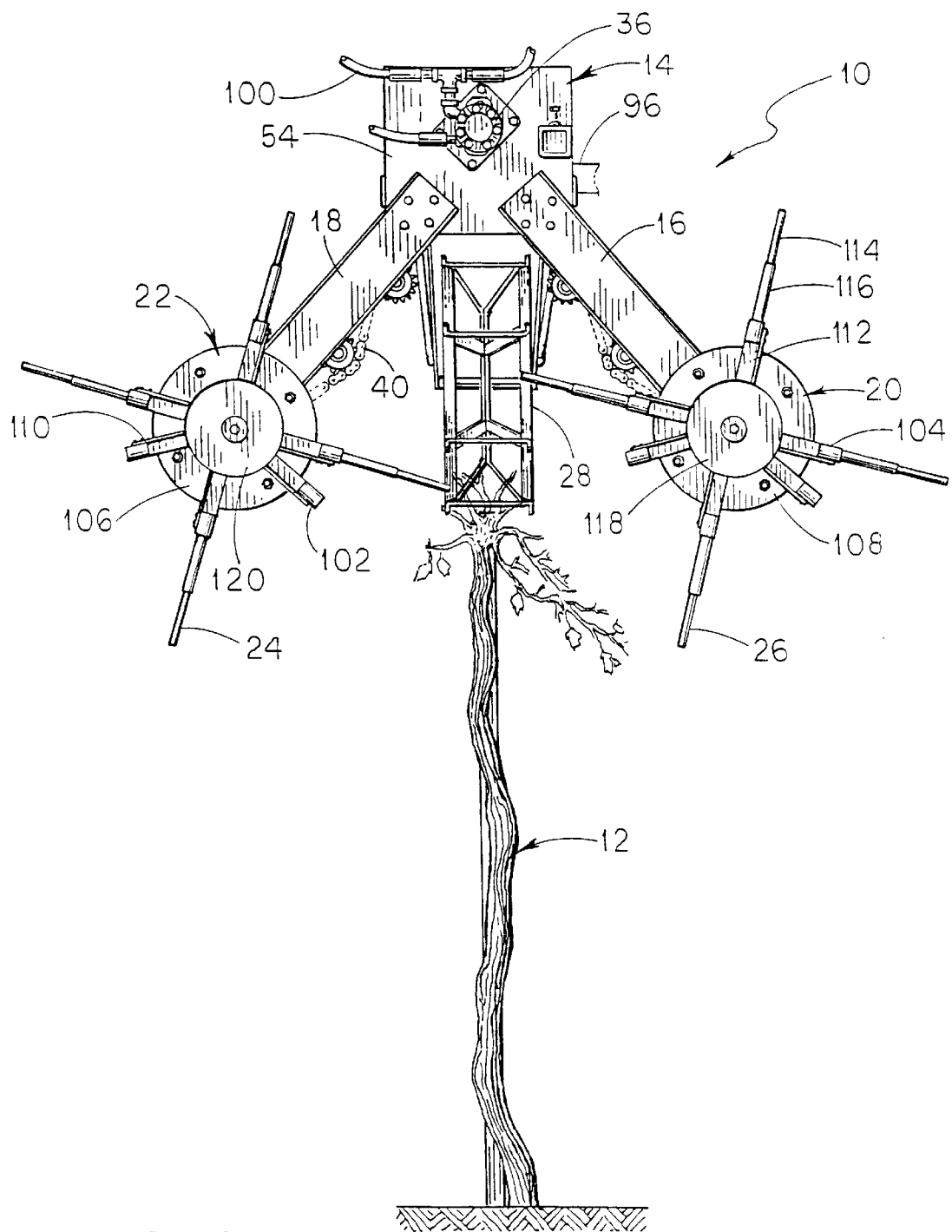
FIG. 3 is a rear plan view illustration of the shoot and fruit thinner of FIG. 2.
Figure 53:
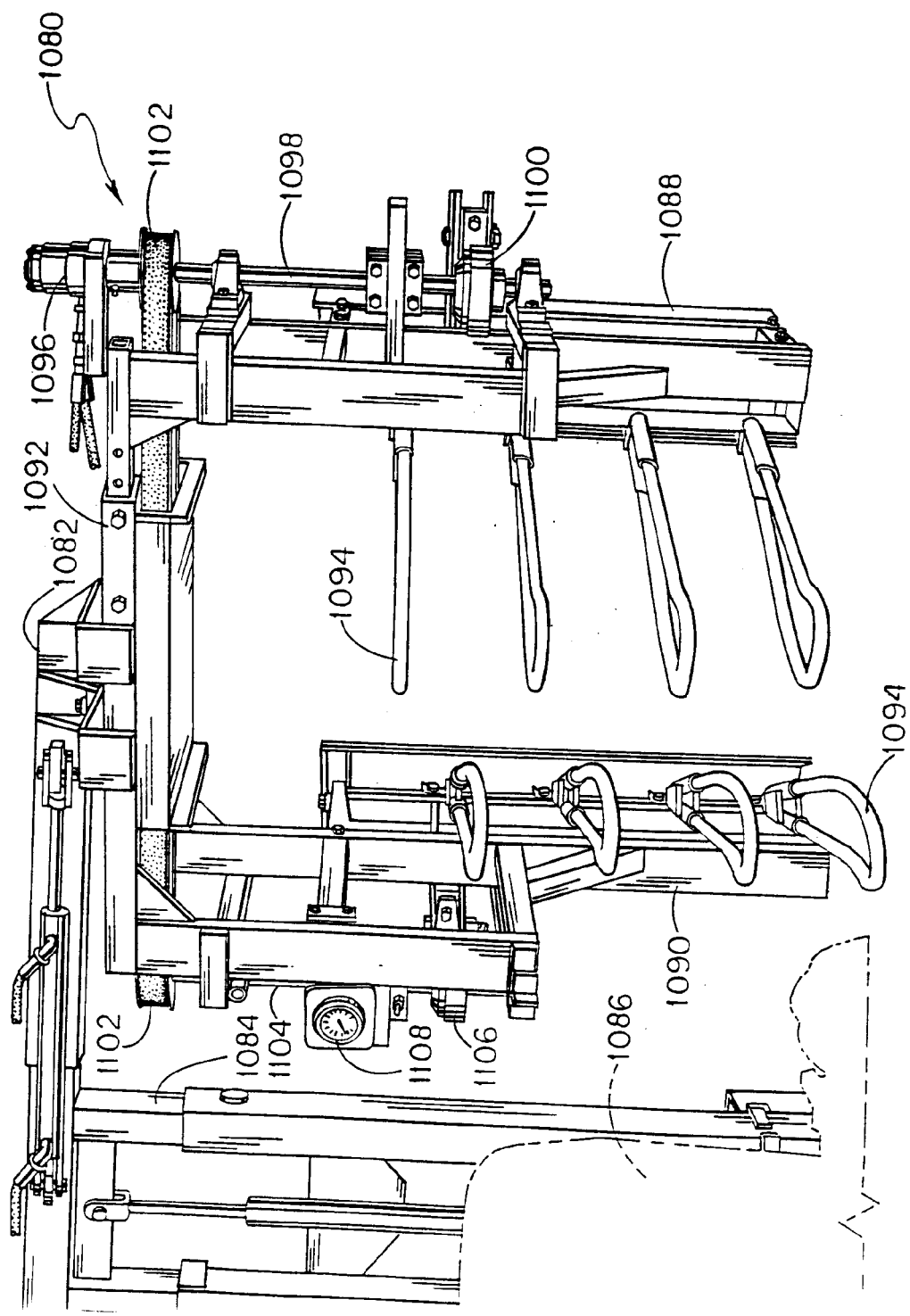
FIG. 53 is a rear perspective view illustration of a bow, bow-head or Quad-rod fruit thinner adapted for use with a single curtain system.
Figure 54:
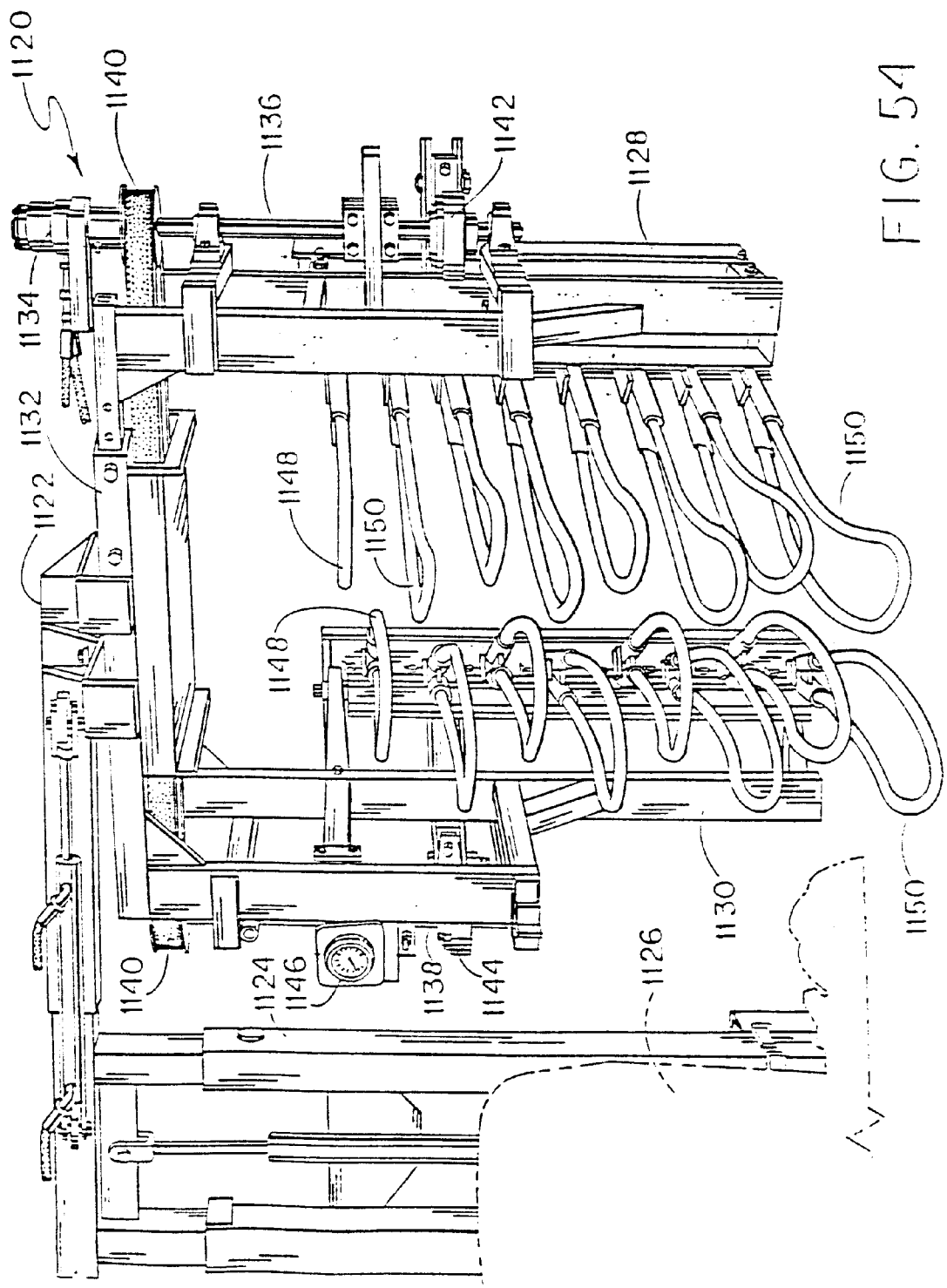
FIG. 54 is a rear perspective view representation of a modified bow, bow-head or Quad-rod fruit thinner that can be adapted for use with a GDC or other divided canopy trellising system.

The mechanical thinner (shown in FIGS. 53 and 54) in this application has eliminated this concern for BC-trained vines by being able to effectively adjust fruit loads by controlling the beater speed (rpm) of this unit. The unit shown in FIGS. 2–9 is extremely effective in adjusting crop load with the French-American hybrid and *Vitis vinifera* grapes. This economical thinning system for the BC 170 cm (6 ft.) system is a mechanical thinning unit using bow-rods, fingers, or strikers in an over-the-row beater side-mounted unit built where the operator can see to adjust fruit load on individual vines (FIG. 2 and FIGS. 53 and 54). Results are shown in Tables 2 and 3 where less efficient equipment than that discussed in this application was used to accomplish the desired pruning results of mechanical pruning on yield, vine size, and juice quality (Tables 2 and 3) on shoot positioned Concord grapevines on GDC or BC training systems (23, 24). This study was established in a 20-year old vineyard. The vines were either mechanically pruned or balance pruned to a 30+10 severity. The mechanically pruned vines were left untouched or were adjusted to the best 60 or 90 nodes per vine. After six consecutive years, follow-up pruning by hand, to limit the number of nodes per vine to 60 following mechanical pruning, maintained vine size and produced fruit yield and juice quality comparable to vines balance pruned to a 30+10 schedule in this older vineyard and under conditions of this study. Both the no-touch-up treatment and retaining 90 nodes per vine following mechanical pruning treatments reduced per vine and per node fruit yields (data not shown) after the sixth year and resulted in unacceptable objective and sensory juice quality. Also, these two treatments resulted in uneven ripening of Concord grapes (% green fruit), which contributed to the problem of low soluble solids and poor juice color.

Sensory color acceptability ratings (Table 3), which included both the parameters of color intensity and hue, generally declined with increasing treatment severity on single curtain SC trained vines. However, the color acceptability was rated lower than expected on hand pruned (30+10) GDC-trained vines because of the blue appearance, rather than the expected intense purple juice color. This result was due to the influence of high pH on juice color. The high pH allowed structural transformations of the anthocyanin molecule, resulting in the shift in hue. SC-trained, no touch-up vines had the lowest ratings for both color intensity and color acceptability.

Juice flavor was rated unacceptable from plots limited to 90 nodes or with no touch-up on the GDC training system and with no touch-up treatment on the SC system, following mechanical pruning.

From this study it was concluded that continuous mechanical pruning in Concord vineyards is recommended only in shoot-positioned vineyards where pruning can be followed by cane selection and adequate node limitations. However, recent unpublished data shows that mechanical fruit thinning also eliminates this problem without the need for hand thinning.

These preliminary findings indicated a need for a better mechanical shoot positioner and mechanical pruner. This unit has been patented by Oldridge, U.S. Pat. No. 5,544,444 hereby incorporated by reference (FIGS. 44–47). A study was designed at the Arkansas Agricultural Experiment Station with the objective of examining various levels of mechanical pruning in combination with shoot positioning on Concord grapes. The vineyard was planted in 1981. The vines were extremely uniform in vigor, and all vines were trained to the GDC training system with 3 m×2 m spacing and drip irrigation. The experimental field plot was an incomplete latin square 7×4 factorial (7 columns, 4 rows) with four replications. Treatments consisted of: 1. Four levels of shoot positioning; a) hand positioning, b) machine positioning, c) separating the canopy by breaking centers only, and d) no shoot positioning. (In treatments a, b, and c, the shoots were positioned vertically toward the vineyard floor two or three times, as required). 2. Seven pruning treatments; a) balance pruned by hand to a 30+10 level (6 node canes), b) balance-pruned by hand to a 50+10 level (6 node canes), c) mechanically pruned and adjusted to the best 60 nodes, d) mechanically pruned and adjusted to the best 80 nodes, e) mechanically pruned with fruit removed by mechanical beating at a green-pea size to a level approximating the fruit load of a 30+10 pruning severity, f) mechanically pruned with no touch-up in even-numbered years and hand pruned to 30+10 (6 node canes) in odd-numbered years, and g) mechanically pruned with no touch-up.

Yield, pruning weight, and juice quality have been determined for eight consecutive years. Unlike some of the recent research findings in other regions, our results indicate that continued mechanical pruning with no node adjustments may have undesirable effects on fruit quality when the mechanical pruning results in extremely high yields (Tables 4 and 5). Our main concern about mechanical pruning is its affect on percent soluble solids and color (Tables 3 and 4). Shoot positioning showed reduction in soluble solids in 1991, but there was no need to position the vines in 1991 due to reduced vigor and vine size (Table 5). It was obvious that shoot positioning for sunlight exposure was not needed. The excessive heat, hot nights, and fruit exposure to the sun was detrimental to the production of soluble solids. This points out the need to maintain vine vigor or size on high yielding vineyards and also again point out the need for selective mechanical fruit thinning in order to maintain balanced high yielding production of high quality fruit.

Freeman and Cullis (12) studied mechanical hedge pruning of Cabernet Sauvignon and Doradillo vines in Australia that were trained to a BC system. The following hedge shapes were established in this study: 1) a square hedge with three cutting planes that produced a square cross-section (the distance from the cutting plane to the cordon was set to give node numbers that were similar to the controls); 2) an offset rectangular hedge where the vines were trimmed close to the cordon on one side on alternate years to allow for new spurs to develop; and 3) a hedge pruned to a triangular shape on the upper 180° portion of the cordon. The yield and capacity of hedged vines were equal to or greater than the manually-pruned vines, except in 1976, when the hedged Doradillo vines had lower yields. With the Cabernet Sauvignon, a triangular hedge initially had lower yields but in later years yielded more than the square and offset hedges. This increase in Cabernet yield with the triangular hedge was a result of increased berry number compared to the other hedge shapes.

Freeman and Cullis (12) concluded that under Australian conditions vine hedging was a viable alternative to detailed manual pruning for vinifera grapes in Australia. The major quality characteristics affected by total mechanical pruning are smaller berries and clusters. Minimal pruning of *Vitis vinifera* vines on a commercial scale is being adopted in Australia. Also, they indicated that the mechanically pruned hedge presents no problems during the mechanical harvesting operation. Machine-assisted pruning has become a fixture in the Australian wine industry (6).

Minimal Pruning:

Working on the theory that winter pruning disturbs the vines' natural process of self-regulation of growth and production, Clingeleffer and Possingham (5) have developed a trellising system in Australia that requires minimal pruning and provides ideal vine conformation for mechanical harvesting. They call it Minimal Pruning of Cordon-Trained Vines. Cordon-trained vines are trained to either a single or double high wire in the vertical plane. Pruning consists of trimming at the sides only in the summer and trimming at 30 inches above the ground as a harvest aid. Over the seasons, the cordons and canes grow into a large permanent canopy. Trimming can be accomplished with simple and inexpensive tractor-mounted equipment. Commercial production has been accomplished in Australia and to a limited extent in California with this system.

Pool et al. (35) have used minimal pruning in New York vineyards. Pool (34) has also studied mechanical thinning and found that the resultant crop reduction enhanced juice soluble solids contents.

Intrieri and Marangoni (15) reported alternate "up-down" mechanical pruning of GDC-trained *Vitis vinifera* grapes in Bologna, Italy, has given satisfactory results in terms of production and vegetative response of the vines for a three-year period. After four years of tests and surveys, Cargnello and Lisa (1) in Veneto, Italy, concluded that for mechanical pruning to be practical it is necessary to control the bud load annually, and that mechanical pruning must ensure an adequate number of renewal canes with short cuts on some parts of the cordon to avoid the premature aging of the vine. In some regions, success is not or will not be possible until trellis systems are modified for mechanization. Also, this system will not work in regions with short growing seasons, where harvest may be delayed from big crops, and vines are subject to severe injury from low winter temperatures.

Parallel work on pruning and shoot positioning mechanization has occurred in other grape growing regions of the world, e.g., New Zealand (42), France (37, 44), Italy (7, 8, 9, 10, 16, 33, 41, 43), Spain (13), Bulgaria (21, 29, 30), and the Ukraine (28).

Mechanized Systems for the Production of French-American hybrids:

The French hybrids are interspecific hybrids that vary a great deal in their vine characteristics, but, in general, the majority of the cultivars that have been selected for production have shorter internodes than the *Vitis labruscana* species. Most all hybrids tend to be extremely fruitful. This fruitfulness is due to a large extent to the high cluster numbers for shoot and extremely fruitful basal buds. These basal buds are seldom, if ever, fruitful with *Vitis labruscana* and *Vitis vinifera* species. These basal buds or nodes are considered non-count on *V. labruscana*, but on some French hybrids the basal or non-count buds can account for 30–40% of the fruit that is produced.

An individual bud of the French-Hybrid is more productive since the secondary bud at each node can produce almost as many grapes as the primary buds.

Hand thinning is a method to produce consistently high quality fruit from these cultivars. Hand thinning is expensive and one of the greatest challenges in producing these cultivars. To fruit and shoot thin these cultivars mechanically and economically, the mechanical shoot and fruit thinner described in this application (FIGS. 2–33) is recommended. The fruit zone area for most French hybrids is the same as for the *Vitis vinifera* species (FIGS. 2–7). Mechanical crop control of this group of grapes may be accomplished by both mechanical shoot and fruit thinning (FIGS. 2–33). This new mechanical fruit and shoot thinner is relatively simple and extremely effective.

Mechanization of the Vitis vinifera species:

Most of the *Vitis vinifera* cultivars have upright growth habits and require that the fruiting zone be located on the upper 180° of the cordon. The majority of the premium wine produced in the world comes from this species of grapes. Wineries pay premium prices for high quality vinifera grapes. In many premium wine grape regions, the need to restrict crop sizes following mechanical pruning is paramount. These concerns become even greater in regions of the world where there are short growing seasons and potential for winter injury. Producers have to go to extreme hand thinning measures to reduce crop loads, to ensure maturity and maximize winter hardiness. In both cases, the need for cluster and/or berry thinning is necessary to adjust the fruit load to the capacity of the vine. The rule of thumb for foliage to fruit ratio for many cultivars has been 10 to 15 square centimeters of leaf to one gram of fruit. Lakso (18) has reported that after the final exposed leaf area/grams reaches about 8–12 $cm^2$ of functional leaf area per gram of fruit, there is little benefit of having additional leaf area. Crop adjustments to ensure the proper leaf-fruit ratios is used in many grape regions of the world and is even enforced by law in some regions.

Dr. Robert Pool, Cornell University, Geneva, N.Y. (37), has developed a method to estimate crop level to determine the amount of fruit that should be mechanically removed. Assuming the grower knows the number of vines per acre, an estimate of crop weight (lb.) can be calculated. The grower should harvest all fruit from a representative sample (e.g. two post-lengths) at 1200 growing degree-days, or when berries reach 50% of final weight. For 'Concord' in N.Y., Pool has shown that regardless of pruning system, weather, year, or crop level, 50% of final cluster weight will occur at 1200 growing degree days. However, this timing will change for different cultivars and for different grape growing regions. The grower then multiplies the weight of fruit per vine at 1200 degree-days by 2 to determine crop weight per vine at harvest. Then multiply lb./vine by vines per acre and divide by 2000 to arrive at tons/acre. If the estimated crop is above the desired tons/acre for maximum quality for the cultivar or vineyard, the grower can calculate the percent of fruit he needs to remove from each vine to arrive at the desired cropping level. As a rule, machine thinning should be used about 20–30 days following bloom in cool growing regions such as the "grape belt" region of New York.

Winkler et al. (Text 1974), who wrote one of the most respected texts on viticulture, felt that one approach to this functional leaf/fruit ratio was to leave vines unpruned and control the crop by thinning. However, during this time period, it was not practical or feasible since mechanization of harvest of unpruned vines was not an option. Unlike the French hybrids, most vinifera grapes are only moderately fruitful and normally do not produce fruitful basal buds. Therefore, mechanical thinning and shoot removal of vigor or large size vines becomes more critical, and in most cases and some trellising systems, will need to be combined with mechanical leaf removal (FIGS. 34–40).

Although the Morris-Oldridge complete vineyard mechanization system of the present invention provides the viticulturist with an arsenal of tools, careful use and intelligent implementation of the desired results from each of these tools must be understood for the system to be successful. Adoption of these new completely mechanized systems will mean a more reliable, more stable, and more economical production of premium quality fruit that will be competitive for the local, regional, national and global markets.

With reference again to FIGS. 2–5 of the drawings, an exemplary shoot and fruit thinner in accordance with the present invention generally designated by the reference numeral 10 is especially adapted for use with *Vitis vinifera* and French-American hybrid grapes and is shown in use in connection with a high wire single curtain bilateral cordon trellising system 12.

The shoot and fruit thinner 10 includes a central support platform 14, right and left depending arms 16 and 18 each supporting at the lower end thereof a circular rotary striker unit 20 and 22 having striker fingers or beaters 24 and 26 extending therefrom. The shoot and fruit thinner 10 also includes a guide wheel 28 which is adapted to ride on a guide wire or cordon wire 30 to facilitate the proper positioning of the shoot and fruit thinner 10 relative to the vine being treated.

Each of the rotary striker units 20 and 22 rotates about a substantially horizontal shaft in the same or opposite directions under the influence of a hydraulic motor 36 which provides drive to a drive sprocket 38 which in turn drives a drive chain 40 which supplies drive to respective rotary unit drive sprockets 42 and 44 and which also passes around a plurality of idler and directional sprockets or rollers 46, 48 and 50.

Figure 5:
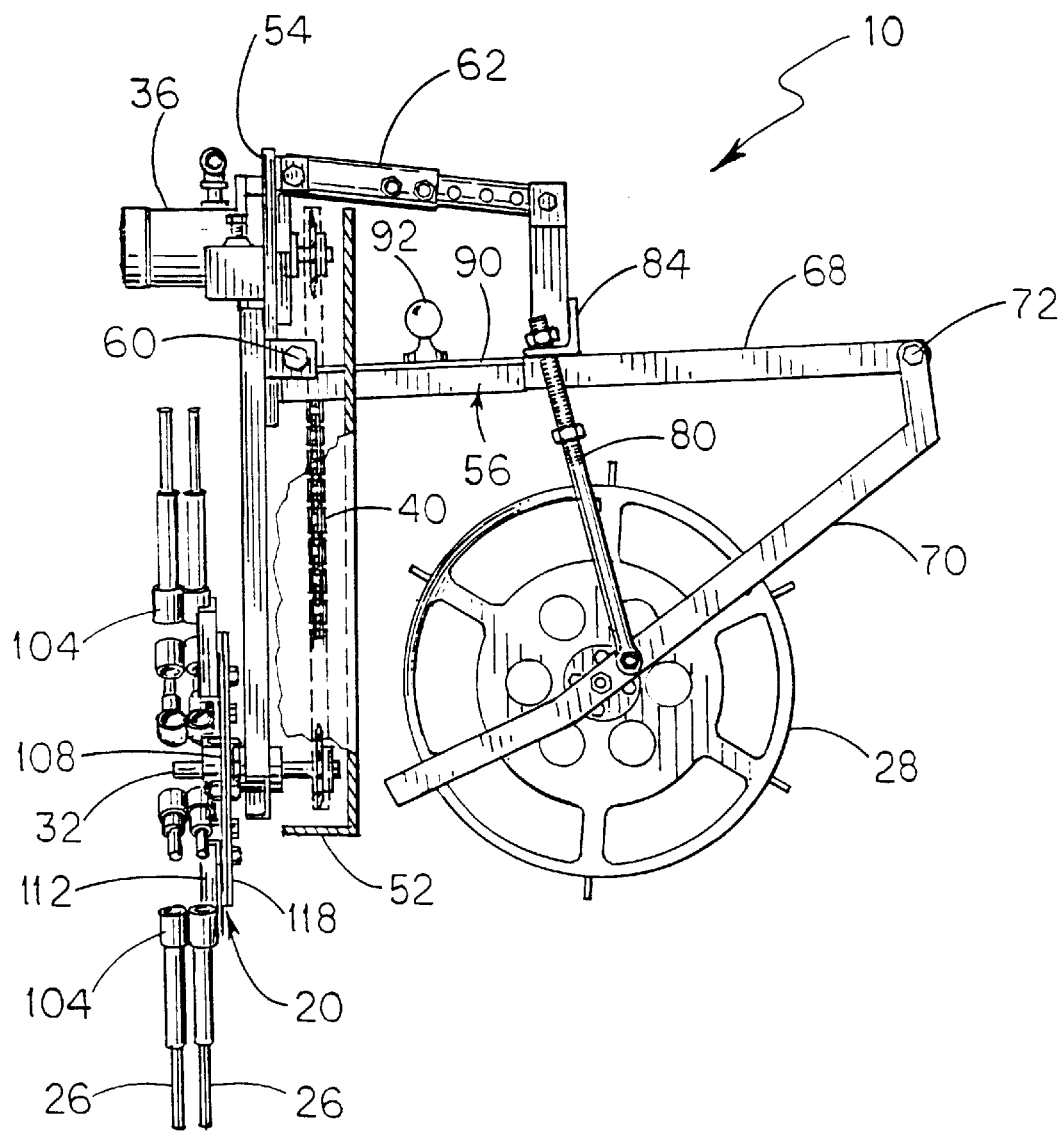
FIG. 5 is a right plan view illustration of the shoot and fruit thinner of FIG. 2.

As shown in FIG. 5 of the drawings, the chain and sprockets are usually covered with a removable metal cover or guard 52 to prevent shoots and foliage from obstructing movement of the chain.

The support platform 14 includes a vertical plate 54 and a horizontal support member 56 pivotally connected to one another by brackets and bolts 58 and 60. The angle of the vertical plate 54 with respect to the horizontal member 56 is adjusted by respective turn buckles or length adjustable telescoping members 62 and 64. Since the upper end of each of the arms 16 and 18 is attached to the vertical plate 54, the angle of each of the rotary heads 20 and 22 can be adjusted by adjusting the length of members 62 and 64 by, for example, removing the bolts therefrom, and adjusting the length of the members 62 and 64 to a different hole setting, and replacing the bolts therein.

Guide wheel 28 is adjustable and is supported from platform 14 by forwardly extending members 66 and 68 which extend from horizontal support member 56 and support a pivoting yoke 70 about a pivot bolt 72. Upward and lower travel of the guide wheel 28 is limited by upper and lower nuts 74 and 76 placed on respective side rods 78 and 80 which pass through respective circular openings in guide brackets 82 and 84 which are themselves attached to the extension members 66 and 68.

Horizontal member 56 of support platform 14 is made up of two side pieces 86 and 88 welded to a horizontal plate 90. A hitch ball 92 is attached to plate 90 and provides for quick attachment and detachment of the shoot and fruit thinner 10 to and from a hitch tongue 94 extending horizontally from a horizontal member 96 of a vineyard tractor mast 98 such as shown in any one of FIGS. 34, 36, 39, 48, 51, 56, 74, or the like. After the hitch tongue 94 of mast member 96 is attached to the ball 92, the horizontal plate 90 and horizontal member 56 of support platform 14 are fixed in position relative to the end of mast member 96 by, for example, bolts which pass through brackets extending from member 96 and into plate 90.

In accordance with the present invention, and as shown throughout the drawings, each of the devices, apparatus, implements, or the like of the present invention preferably utilize a quick disconnect ball hitch mechanism or assembly to facilitate the attachment and detachment of the respective implements or devices to the mast of a vineyard tractor, harvester, or other machinery or equipment. Also, the ball hitch can be used to facilitate the storage of each of the implements, devices, apparatus, and the like by having a storage rack with a plurality of spaced ball receiving hitch ends which are adapted to attach to the ball on the respective implements.

Although the shoot and fruit thinner 10 is shown to utilize a hydraulic motor 36 which receives hydraulic fluid from hydraulic lines 100 operatively connected to a hydraulic system of the tractor or other vineyard equipment (or an anxiallary hydraulic system attached to, for example, the power take off on the back of the tractor) which is used to transport the shoot and fruit thinner 10 through the vineyard and simultaneously drive both rotary striker units 20 and 22, it is to be understood that other motors such as pneumatic or electric motors can be used to simultaneously drive both rotary units 20 and 22 or respective separate drive motors can be added in place of the single motor 36 to drive each of the rotary units 20 and 22 independently of one another. See, for example, FIG. 36 of the drawings which shows respective hydraulic motors for driving each of two rotary units.

The amount of shoot and fruit thinning that is accomplished using the rotary striker units 20 and 22 and in particular by the striker fingers 24 and 26 of the rotary units 20 and 22, is determined by the speed and direction of the rotary units, the number of striker fingers, the flexibility of the fingers, the spacing of the rotary units and fingers from one another, the alignment of the flexible fingers on the respective rotary units (in sync with one another or out of sync with one another), the speed with which the shoot and fruit thinner 10 is moved through the vineyard and along the vine, and combinations thereof.

Figure 4:
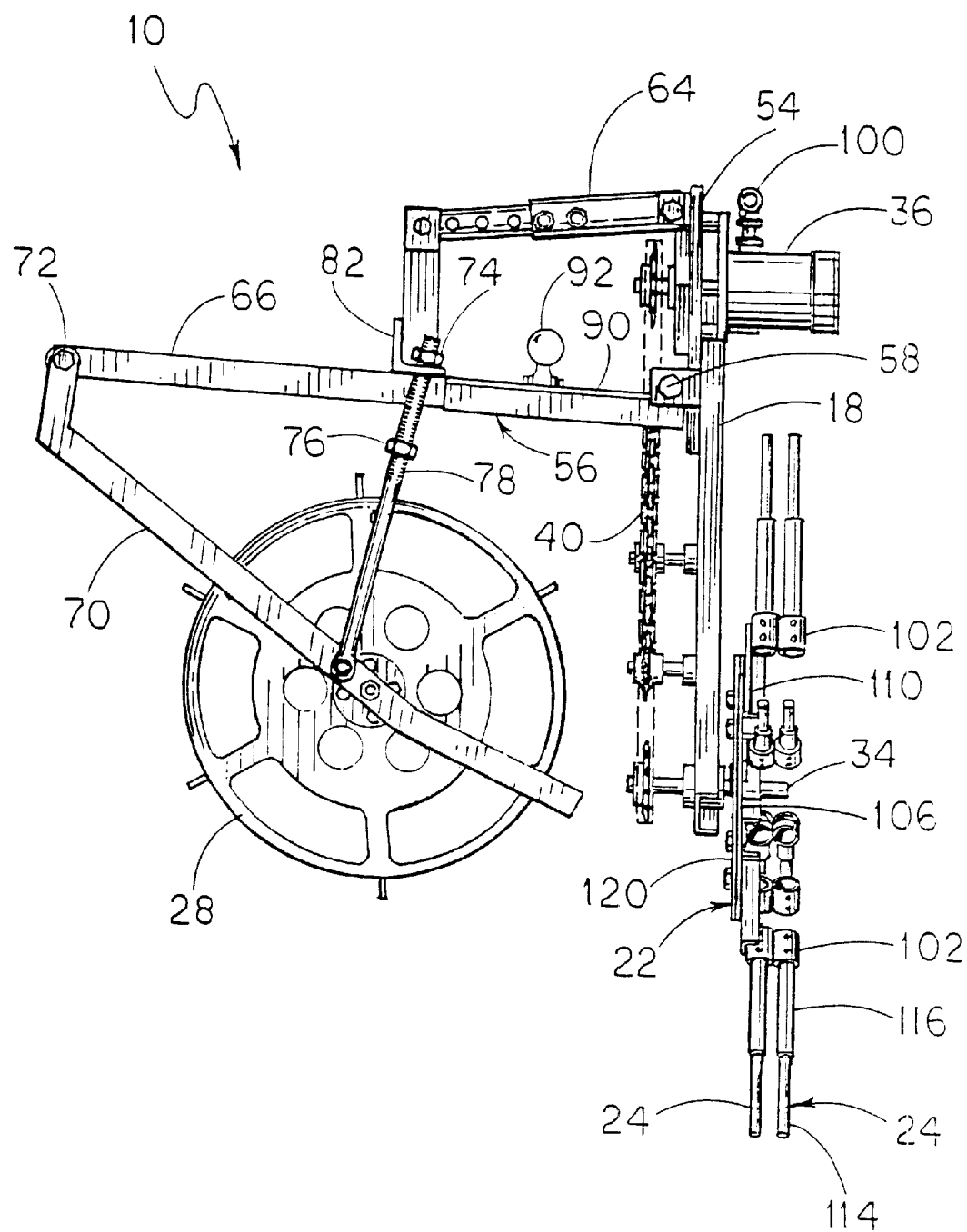
FIG. 4 is a left plan view representation of the shoot and fruit thinner of FIG. 2.
Figure 14:
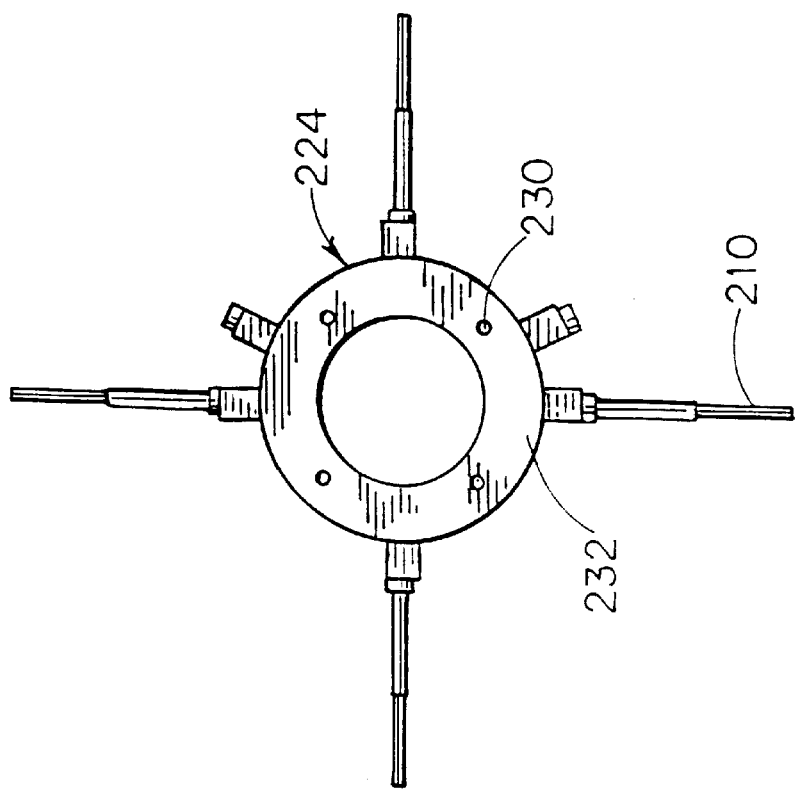
FIG. 14 is a rear view illustration of the circular, rotary striker assembly of FIG. 13.
Figure 13:
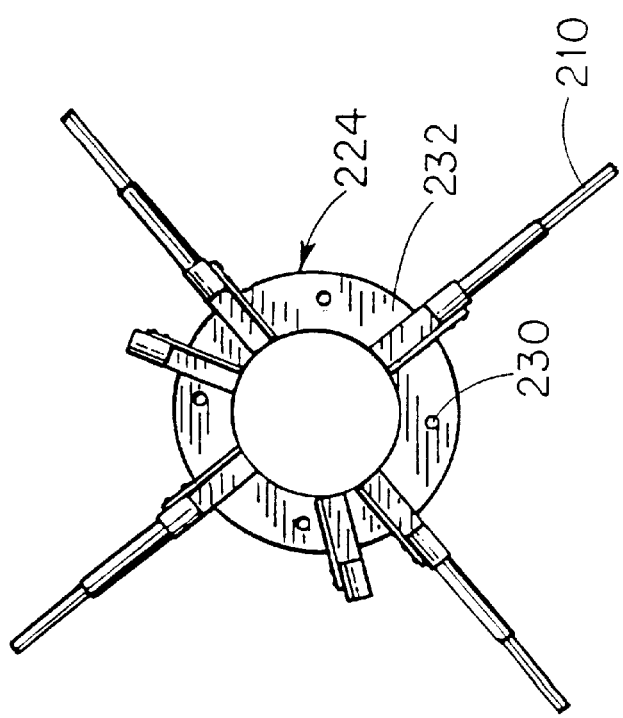
FIG. 13 is a front view representation of a circular, rotary striker assembly.

With reference to FIGS. 4 and 5 of the drawings, the striker fingers 24 and 26 are attached to or mounted in respective finger receiving sockets 102 and 104 which are attached to respective rings or annuluses 106 and 108 by respective radial support members 110 and 112 (see FIGS. 13 and 14). In accordance with the present invention, it has been discovered that a preferred arrangement of striker fingers includes a pair of such fingers placed adjacent one another and with each of the fingers having a flexible core 114 such as a rubber hose, tube, shaft, or the like, covered partially near its base with a rigid support 116 such as a metal pipe, tube, or the like. The flexible ends 114 of the adjacent fingers 24 of the finger pair tend to grab foliage, shoots, grape bunches, and the like, during travel of the fingers through the vine. Also, the flexible ends 114 on the fingers allow the ends to bend or give, should they contact a solid item such as a wire, post, brace, stay, trellis member, cordon wire support, cordon, other striker fingers, brushes, brush bristles, or the like. Although it is preferred to use pairs of fingers, especially for fruit bunch removal, it is contemplated that one could use single fingers to, for example, remove foliage, shoots, thin bunches, or the like, or one could use a single finger having a split end to achieve nearly the same result as a pair of adjacent fingers. Further, the pair of fingers may be further supported by attaching them one to the other near their base by, for example, wrapping tape around the base supports 116 of adjacent fingers. This increases the rigidity of the finger pair and increases the amount of foliage or fruit which is removed during use thereof. Each of the fingers 24 and 26 may be releasably attached or mounted in the receiving sockets 102 and 104 by, for example, threaded fasteners, cotter keys, wire, or the like.

The number and arrangement of the striker fingers is selected to achieve the desired amount of shoot and fruit thinning, leaf removal, and the like. The rotary striker units 20 and 22 of FIGS. 2–5 are adapted to receive anywhere from one to twelve fingers per unit. The speed of rotation of the striker fingers is controlled by controlling the hydraulic fluid sent to motor 36.

The amount of shoot and fruit removal can be adjusted along the travel of a particular row in a vineyard or along a particular vine section to adjust for different physiological stages or conditions of the vine, shoots, fruit, or the like to insure that the shoots and fruit are evenly spaced along the length of the cordon. Also, the rotary striker units may be replaced with brushes or bristles (see FIGS. 15–22) or with oval rotary striker units (see FIG. 23) to achieve a desired result. In accordance with a particular example of the present invention, the rotary striker units 20 and 22 of the shoot and fruit thinner 10 each included four respective pairs of striker fingers driven at a rotary speed from 10 to 250 rpm with the fingers of the respective units 20 and 22 offset or out of sync by about 45°, and with the transporting tractor driven from 1½ mph to 2½ mph to achieve a desired shoot and fruit thinning along a row of *Vitis vinifera* trained on a high wire single curtain bilateral cordon trellis system. Also in accordance with a particular example of the present invention, each of the rotary striker units 20 and 22 of the shoot and fruit thinner 10 is about 32 inches from tip to tip having a 10 inch center disk and 12 inch length fingers with one inch of each finger inserted into its receiving socket. Further, each of the fingers is one-half inch in diameter and made of a flexible solid rubber material. It is preferred to use striker fingers having an outer diameter of from about one quarter inch to one inch and varying in length from about 4 to 24 inches. Further, when brush units are used in place of rotary striker units, it is preferred to use a brush unit having a tip to tip dimension of about 20 to 40 inches, preferably 32 inches. Adjustments in shoot and fruit removal depend on cultivar and shoot numbers and the projected or desired fruit load.

Although it is not shown in FIGS. 2–5 of the drawings, an automatic height adjustment mechanism or device can be added, for example, to the guide wheel yoke 70 or one of the height adjustment members 78 and 80 to automatically adjust the height of the striker fingers 24 and 26 relative to the vine by automatically adjusting the position of the guide wheel 28 relative to the platform 14. For example, a hydraulic cylinder or an electric motor and screw arrangement can be used to automatically adjust the position of the guide wheel relative to the platform from a control lever or mechanism on the tractor.

Figure 6:
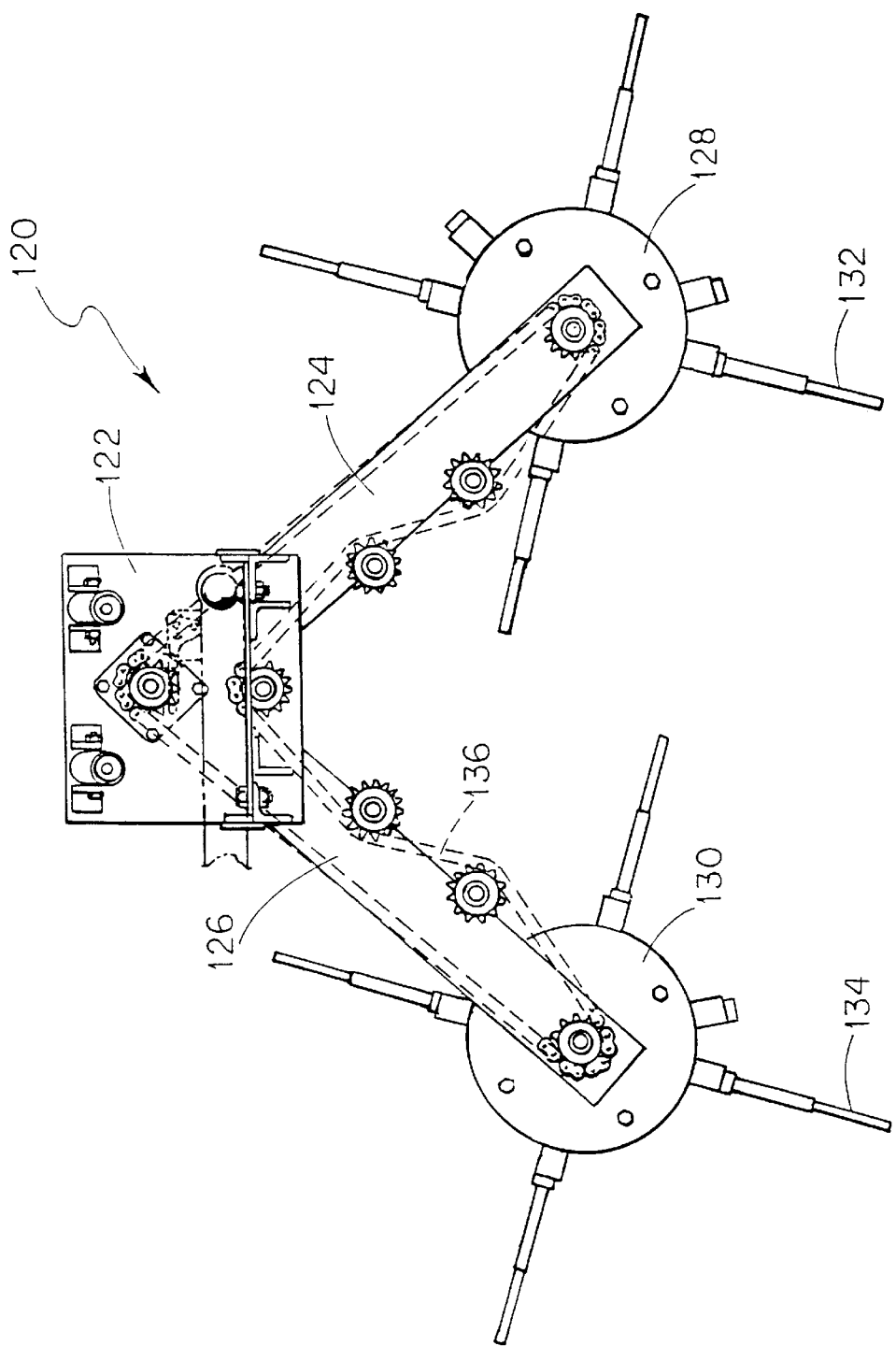
FIG. 6 is a front plan view representation of another shoot and fruit thinner.
Figure 7:
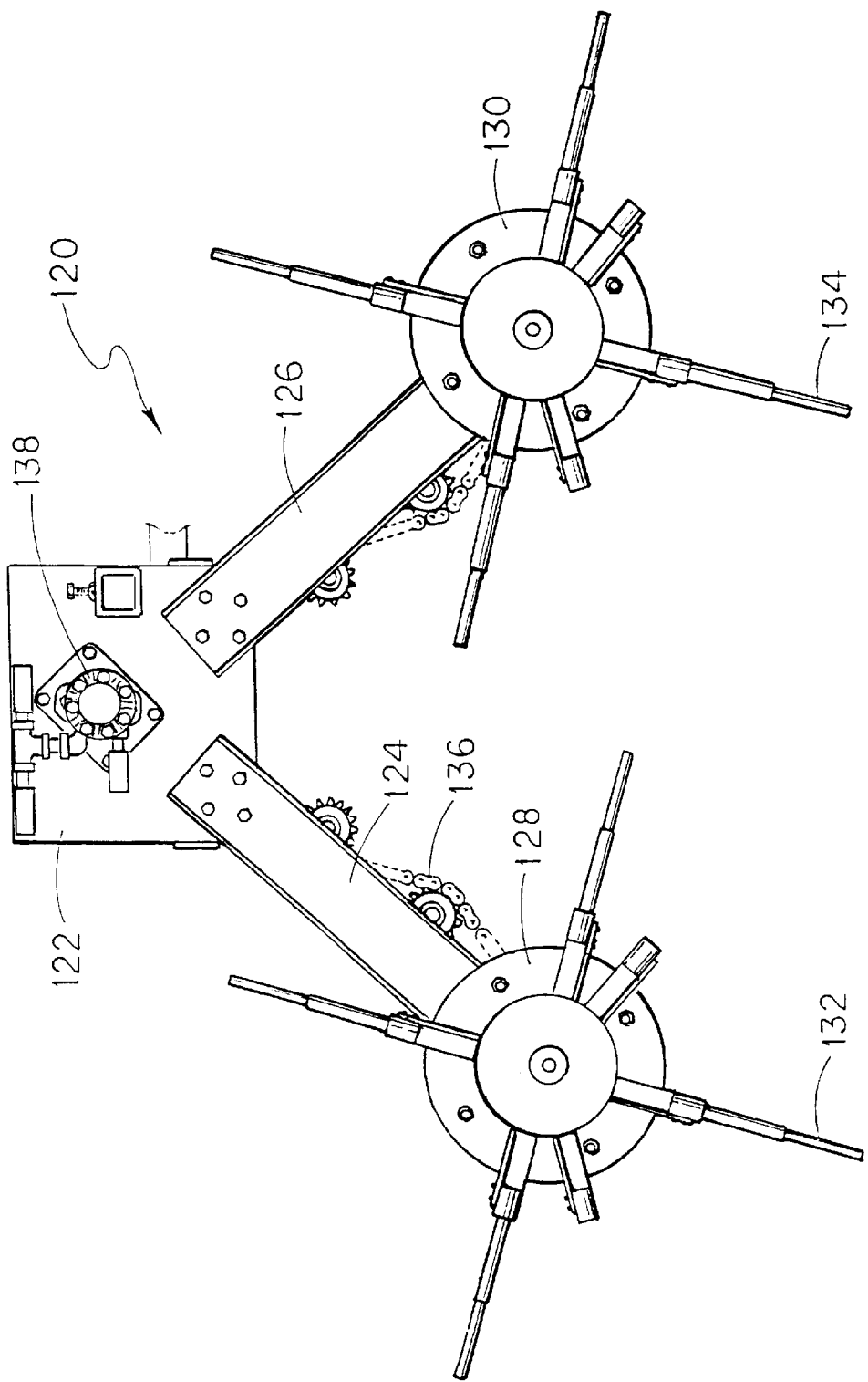
FIG. 7 is a rear plan view illustration of the shoot and fruit thinner of FIG. 6.

As shown in FIGS. 6 and 7 of the drawings, and in accordance with another embodiment of the present invention, a shoot and fruit thinner is generally designated by the reference numeral 120 and shown to be substantially identical to the shoot and fruit thinner 10 of the FIGS. 2–5 with the exception of the removal of the guide wheel 28 and the supporting assembly therefor. The shoot and fruit thinner 120 includes a support platform 122, right and left arms 124 and 126, circular rotary striker units 128 and 130, striker fingers 132 and 134, chain 136, hydraulic motor 138, and the like.

Figure 8:
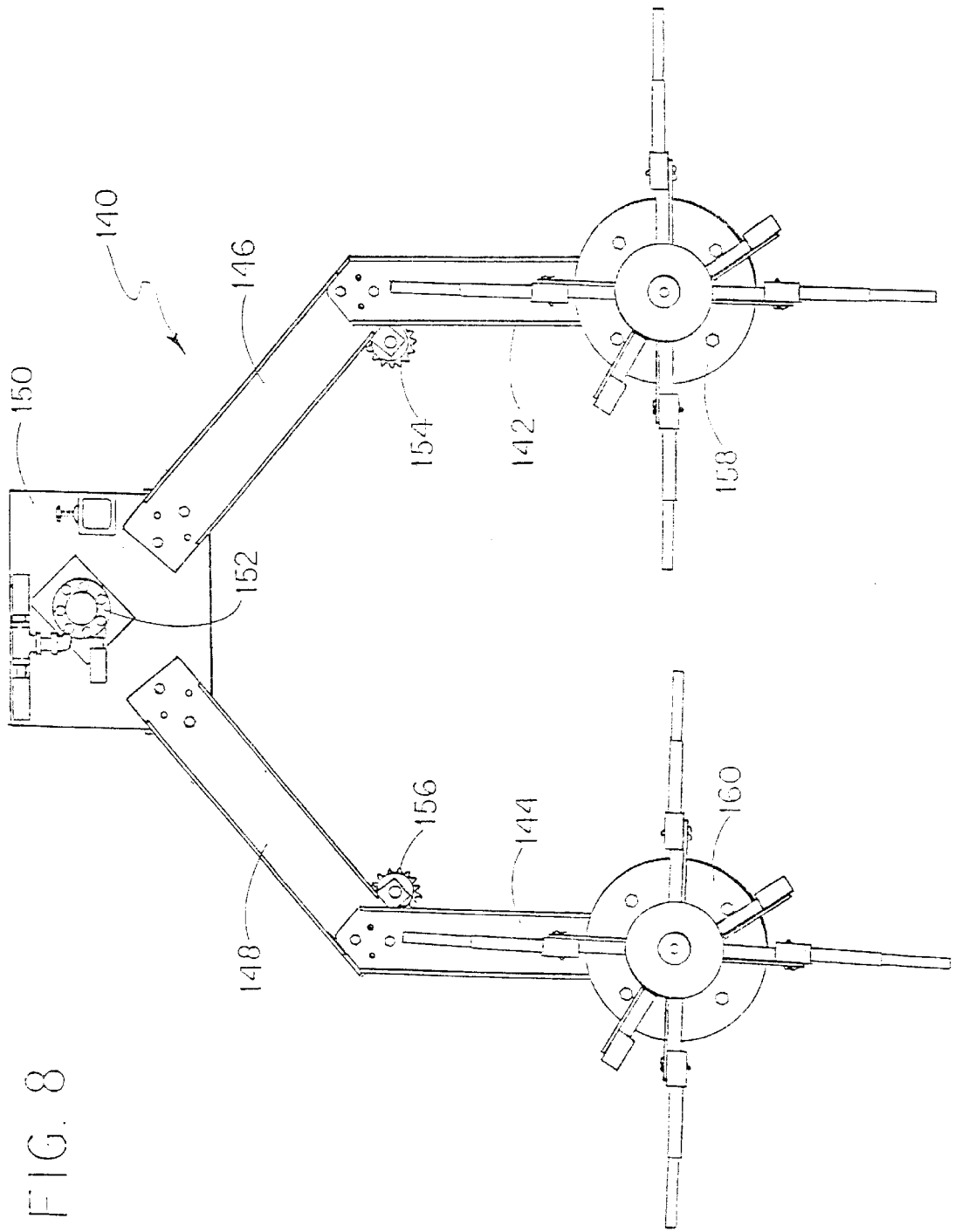
FIG. 8 is a rear plan view of another embodiment of a shoot and fruit thinner with vertical extensions for each of the thinner arms and with the thinner having right and left circular rotary striker or thinning finger assemblies for use with vertical moveable catch wire trellis and Lyre or "U" trellis.

As shown in FIG. 8 of the drawings and in accordance with yet another embodiment or arrangement of a shoot and fruit thinner of the present invention, a shoot and fruit thinner 140 is especially adapted for use with a standard single catch wire trellis system and is substantially identical in its construction to the shoot and fruit thinner 120 of FIGS. 6 and 7 with the exception of the addition of vertical lower extension arms 142 and 144 added to the bottom of each of right and left angled arms 146 and 148 attached to the support platform 150. The shoot and fruit thinner 140 is similar to the shoot and fruit thinners 10 and 120 of FIGS. 2–7 in that it includes a hydraulic motor 152, a drive chain, and a plurality of sprockets 154 and 156 for providing drive to each of two circular rotary striker units 158 and 160.

Figure 9:
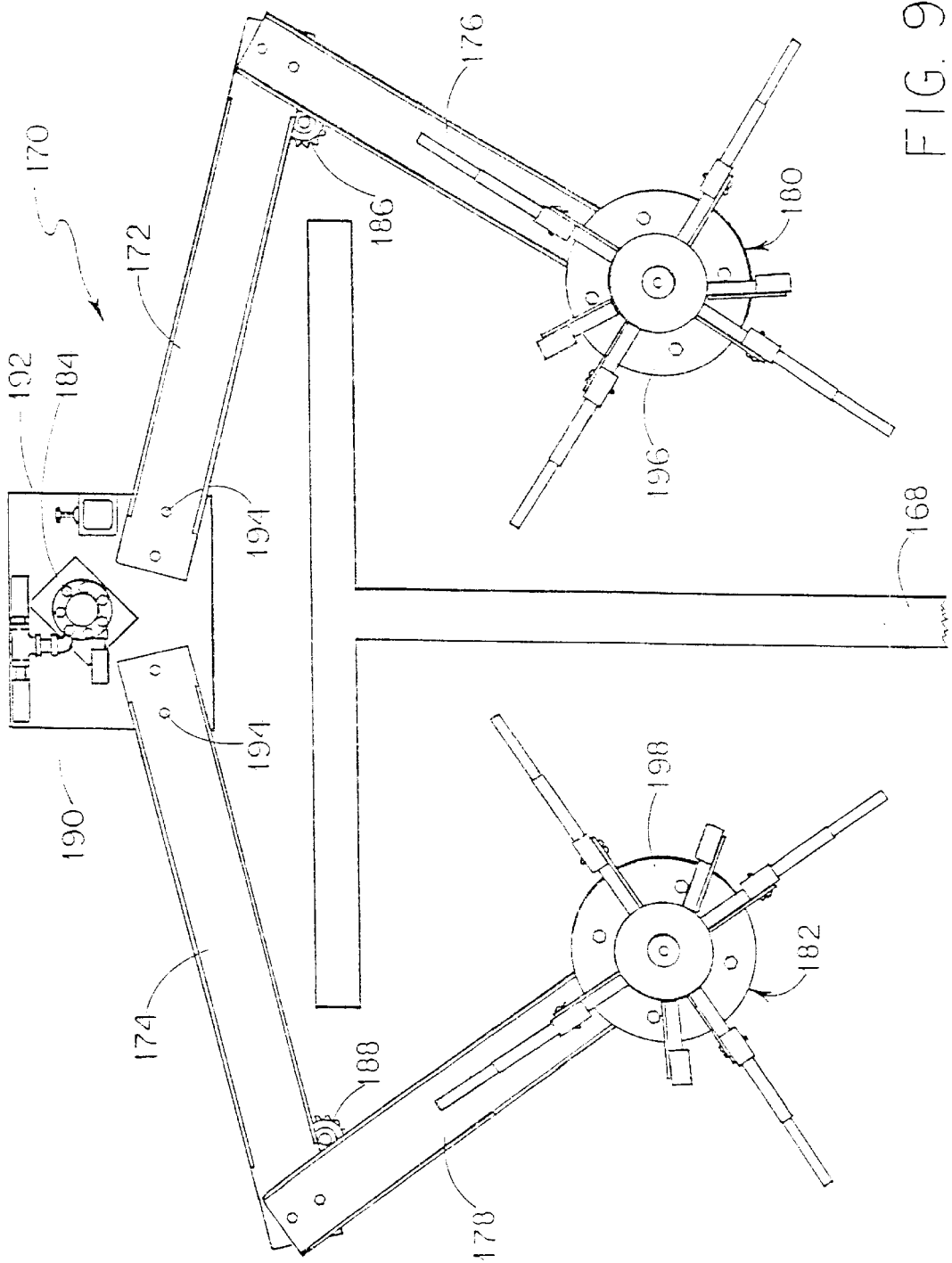
FIG. 9 is a rear plan view representation of an alternative shoot and fruit thinner embodiment with horizontal and vertical extensions adapted for use with a California T-trellis.

With reference to FIG. 9 of the drawings, and in accordance with still yet another embodiment of the present invention, a shoot and fruit thinner is generally designated by reference numeral 170 and has a substantially identical construction to that of the shoot and fruit thinner 140 of FIG. 8 except that the extension arms are elongated and positioned at different angles to accommodate a California T-trellis 168. The shoot and fruit thinner 170 includes upper arms 172 and 174 which extend outwardly and lower extension arms 176 and 178 attached to the free end of each of the upper arms 172 and 174 and which extend inwardly toward the trellis 168. Respective rotary striker units 180 and 182 are supported at the base of each of arms 176 and 178 and are driven by a hydraulic motor 184 and a chain which passes over directional sprockets 186 and 188. The motor 184 and upper arms 172 and 174 are supported on a substantially vertical plate 190 of a support platform 192. As shown in the drawings, the vertical plate 190 and support arms 172, 174, 176 and 178 include a plurality of openings to allow for angular adjustment and repositioning of the support arms relative to one another and to the support platform 192. The arms are attached to the support platform by releasable fasteners 194 such as nuts and bolts. Further, rotary striker assemblies 196 and 198 are attached to the rotary disks by releasable fasteners such as bolts and locknuts.

As shown in FIGS. 10–14 of the drawings, and in accordance with still another embodiment of the present invention, a shoot and fruit thinner generally designated by the reference 200 is substantially identical in construction to the shoot and fruit thinner 10 of FIGS. 2–5 except that the shoot and fruit thinner 200 includes only a single arm 202 and single rotary striker unit 204. The arm 202 is attached to a support platform 206. The rotary striker 204 is rotatably driven by a motor and a chain 208 to drive a plurality of striker fingers 210 in either a clockwise or counterclockwise direction. The support platform 206 of shoot and fruit thinner 200 is releasably attached to a horizontal mast member 212 by a ball hitch 214 and bolts 216.

Figure 11:
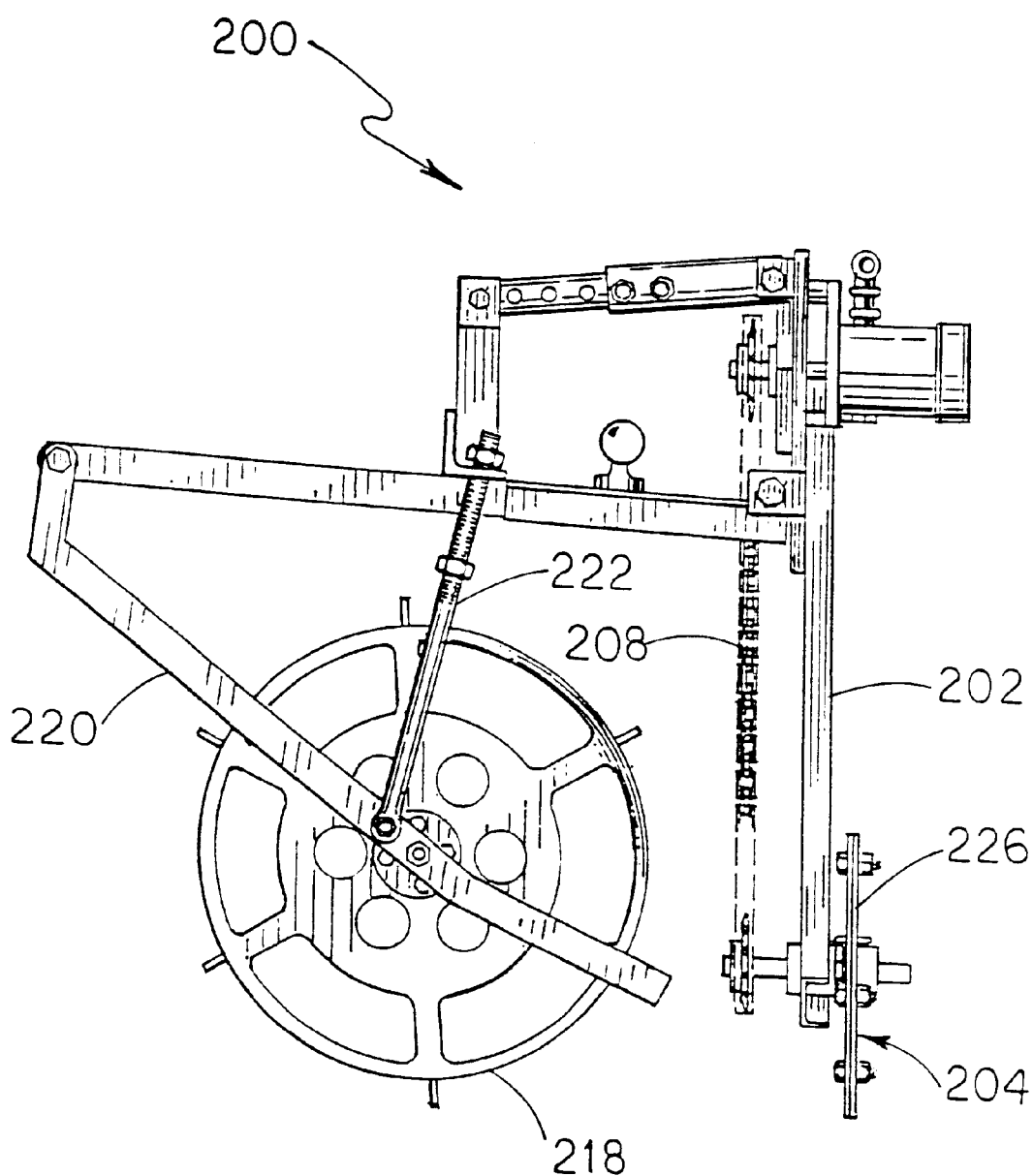
FIG. 11 is a left side view representation of the shoot and fruit thinner of FIG. 10.
Figure 12:
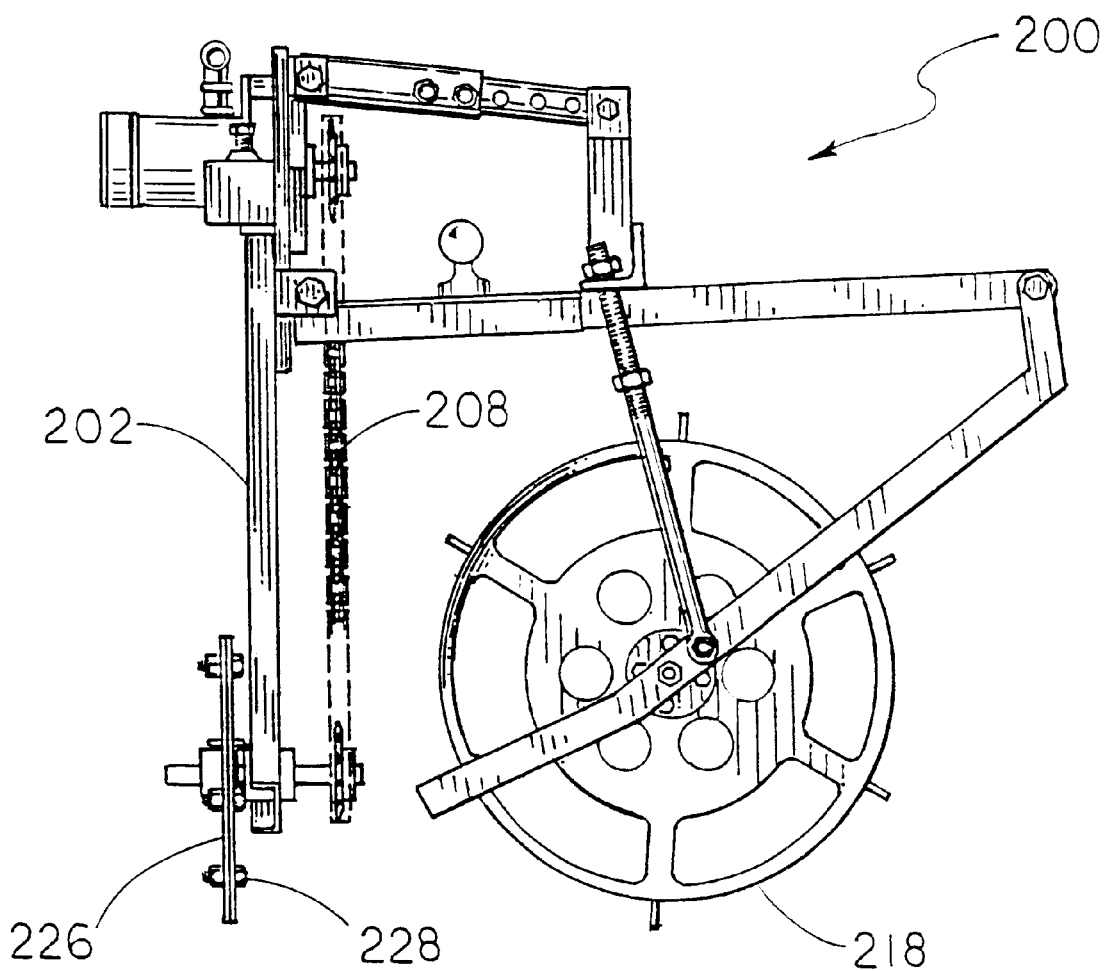
FIG. 12 is a right side view illustration of the shoot and fruit thinner of FIG. 10.

With particular reference to FIGS. 11 and 12 of the drawings, a guide wheel 218, supporting assembly 220 and adjustment mechanism 222 has been added to the shoot and fruit thinner 200. Also, for the sake of clarity, a rotary striker assembly 224 has been removed from a rotary striker support disk 226 of the rotary striker unit 204.

Figure 10:
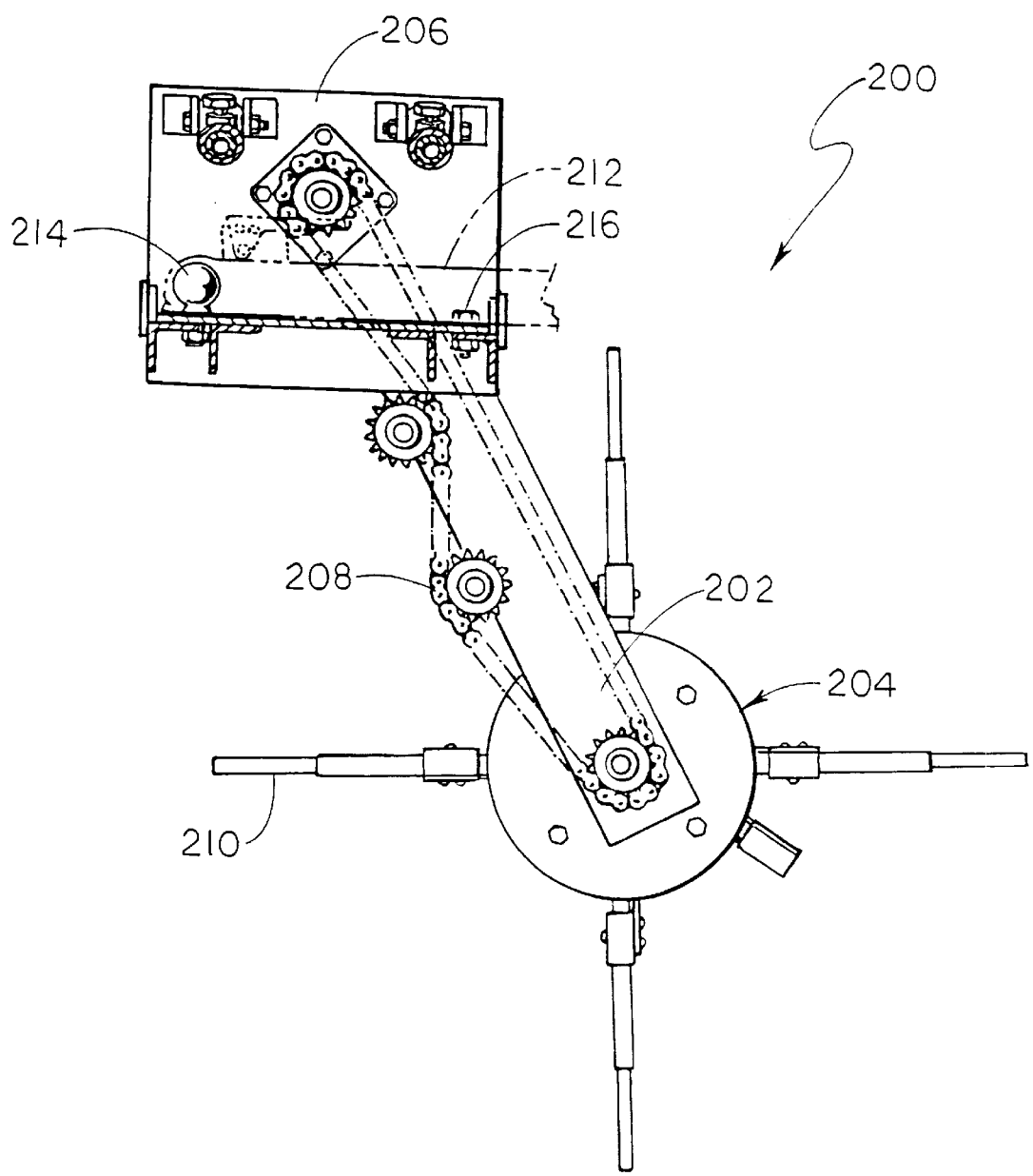
FIG. 10 is a front plan view illustration of a shoot and fruit thinner embodiment having one circular rotary striker with a chain drive arrangement for transmitting rotary motion from a hydraulic motor to the rotary striker.

With reference to FIGS. 10, 13 and 14 of the drawings, the rotary striker assembly 224 is adapted to be releasably connected to the support disk 226 by a plurality of threaded fasteners such as nuts and bolts 228 with the bolts being received through respective openings 230 in a disk or ring 232.

With reference to FIGS. 15–22, 25, and 26 of the drawings, in accordance with the present invention, one can replace, substitute or augment one or both circular rotary striker units with one or more rotary circular brush units. The brush units may be driven by an independent motor, for example, a separate hydraulic motor.

Figure 15:
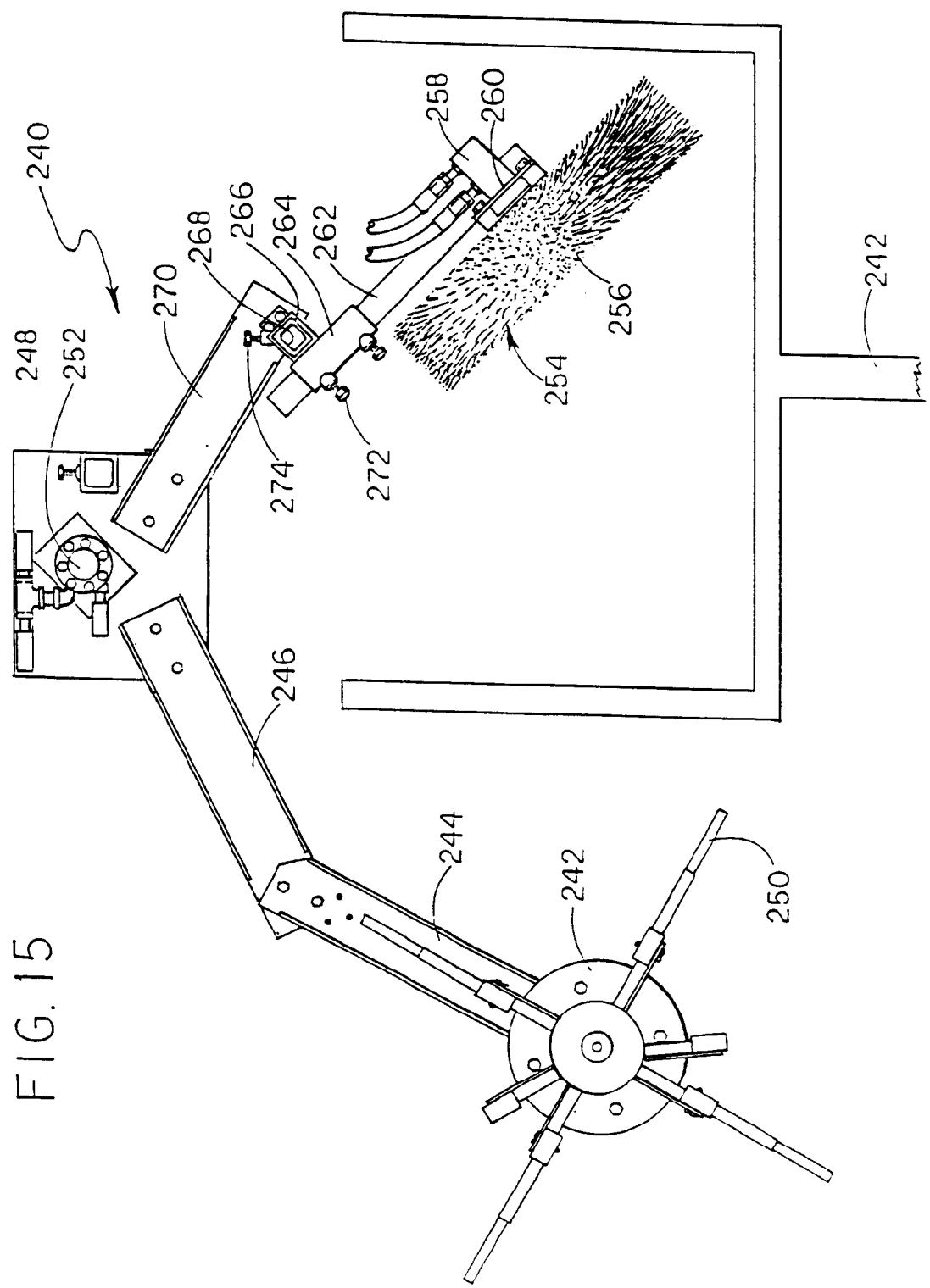
FIGS. 15 and 16 are respective rear plan view illustrations of alternative fruit and shoot thinner embodiments each having a brush unit on one arm and a circular, rotary striker on the other arm for use with a Lyre, or "U", or modified "U" trellis.
Figure 16:
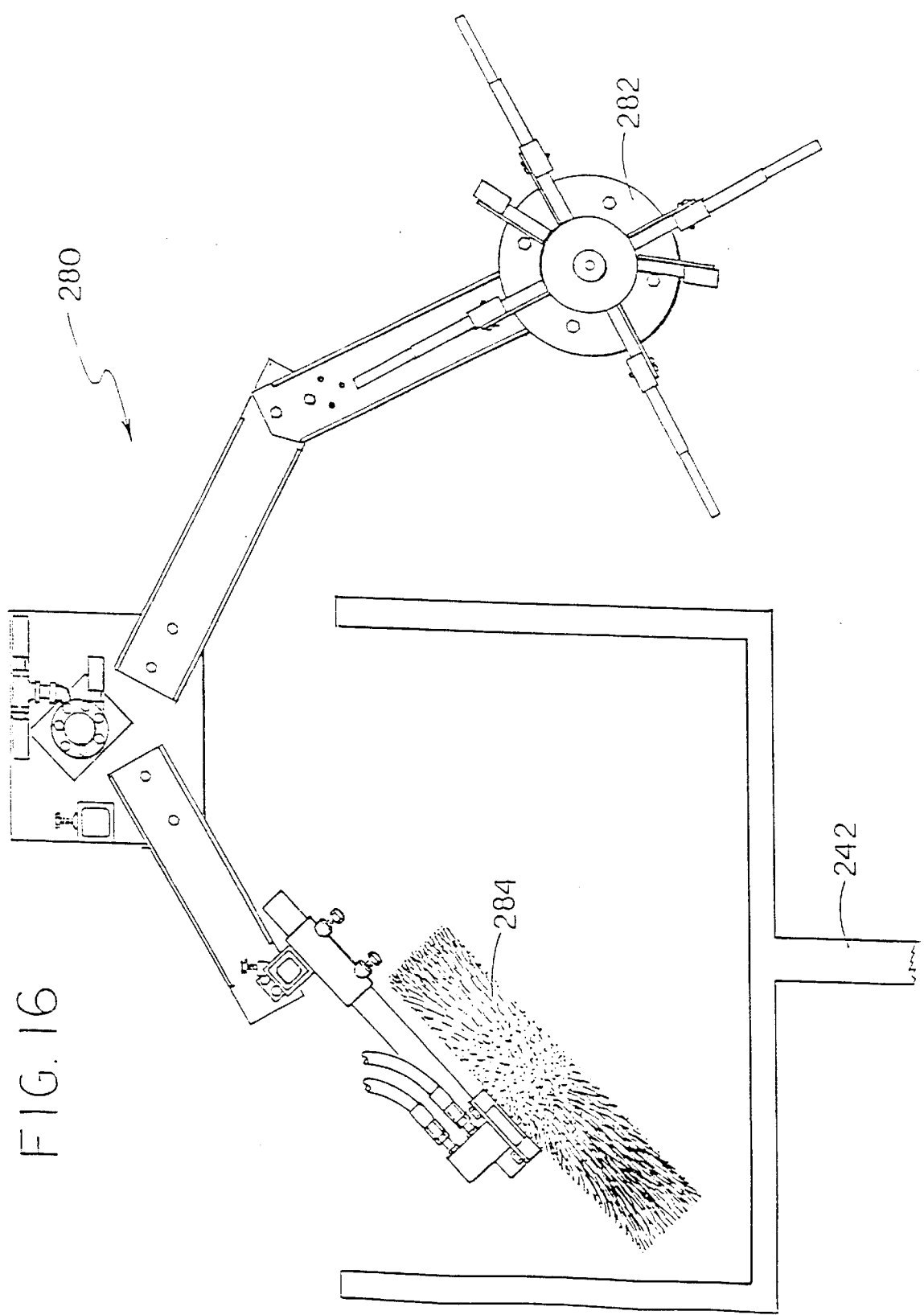

With particular reference to FIGS. 15 and 16 of the drawings, respective shoot and fruit thinner embodiments 240 and 280 each have a brush unit at the lower end of one arm and a circular rotary striker unit on the lower end of the other arm and are adapted for use with a Lyre, "U", or modified U-trellis 242. As shown in FIG. 15 and in accordance with a still another embodiment of the present invention, shoot and fruit thinner 240 is shown to include a circular rotary striker unit 243 operatively attached to the lower end of a lower arm 244 with the upper end of the arm 244 attached to the lower end of an upper arm 246 having the upper end thereof attached to a support platform 248. The rotary striker unit 243 includes a plurality of striker fingers 250 which are rotated under the action of a hydraulic motor 252 which provides drive to the rotary striker unit 243 via a chain and a plurality of sprockets.

The shoot and fruit thinner 240 also includes a rotary brush unit 254 including a plurality of stacked circular bristle assemblies 256 which are operatively attached to the rotary shaft of a hydraulic motor 258. The hydraulic motor 258 and rotary brush unit 254 are supported by a plate 260 which is attached to a lower end of a first or lower rectangular support member 262. The first support member 262 is received in a first adjusting collar or bracket 264 which is welded to a second adjusting collar or bracket 266 which is received on a second rectangular support member 268. The second or upper support member 268 is attached to the lower end of an arm 270 and the upper end of the arm 270 is attached to the support platform 248. Hydraulic fluid is supplied to the motor 258 to rotate the bristles 256 of brush unit 254 in either a clockwise or counterclockwise direction and at a selected speed to provide the desired removal of foliage, shoots, fruit, and the like from the interior of the trellis and/or from the area of the cordon. The brush unit 254 can be used to provide an almost complete removal of shoots, foliage, fruit, and the like from a cordon. Adjustable collars or brackets 264 and 266 include releasable set screws or bolts 272 and 274 which allow for a wide range of adjustment in the angle and position of the brush unit 254. The shoot and fruit thinner 240 is adapted to thin the foliage, shoots, and fruit from the exterior of the trellis 242 using the circular rotary striker unit 243 and to clean out the interior of at least one side of the trellis using the bristles 256 of brush unit 254 to remove foliage, shoots, and fruit from the interior of the trellis.

With reference to FIG. 16 of the drawings, an alternative shoot and fruit thinner 280 is substantially similar to the shoot and fruit thinner 240 of FIG. 15 except that the rotary striker unit 282 and rotary circular brush unit 284 are on opposite sides of the device. The shoot and fruit thinners 240 and 280 of FIGS. 15 and 16 are adapted to thin the exterior of at least one side of the trellis and clean the interior of at least the other side of the trellis with a single pass along a vine or can clean the entire interior of the trellis 242 and both exterior sides of the trellis by either using the shoot and fruit thinners 240 and 280 in combination or by making two passes along a particular row in opposite directions. In accordance with one example, the bristle or brush unit 254 is 32 inches from tip to tip and has relatively stiff plastic or resin bristles.

Figure 17:
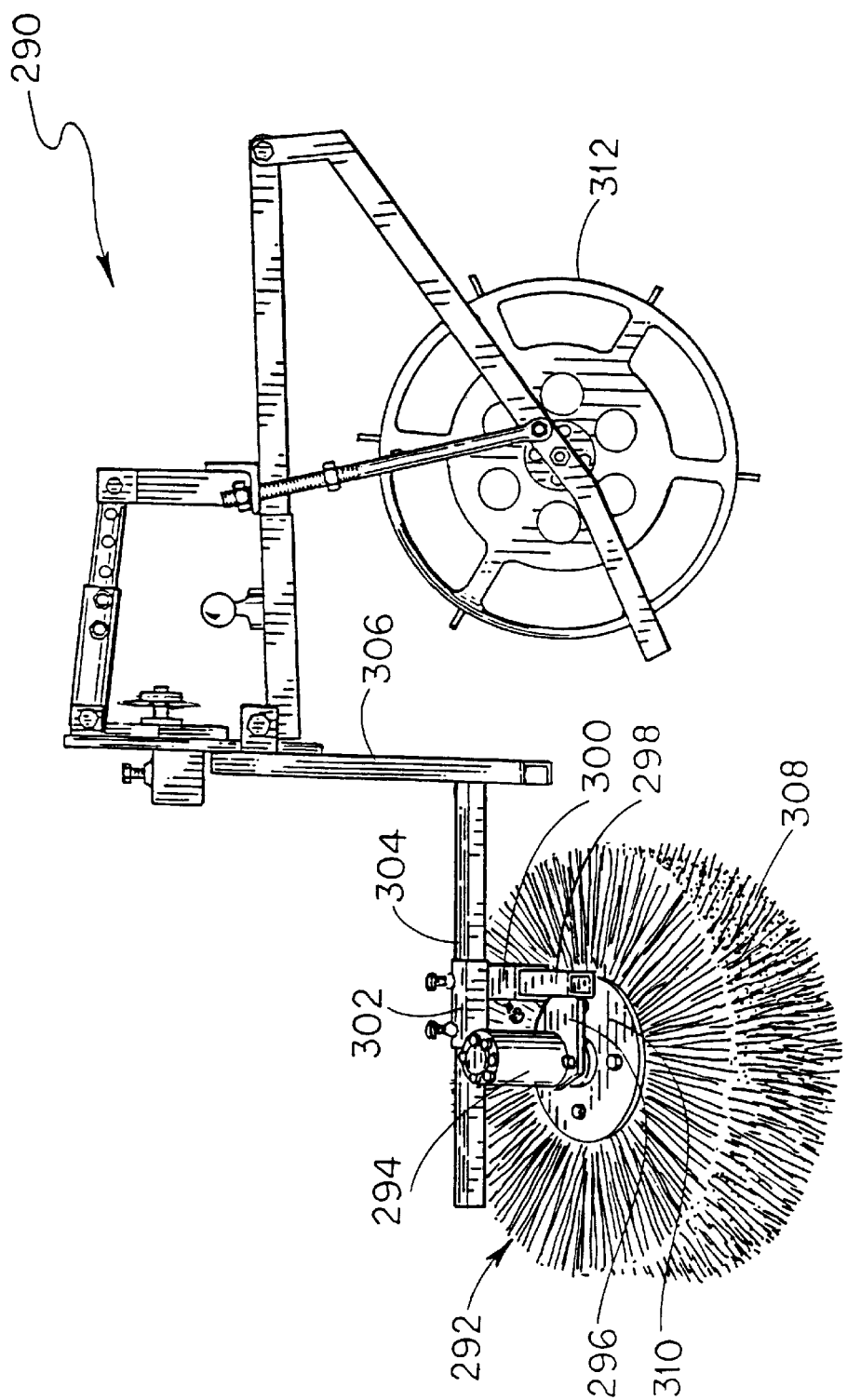
FIG. 17 is a side view illustration of a shoot and fruit thinner embodiment with a brush unit on one arm.
Figure 18:
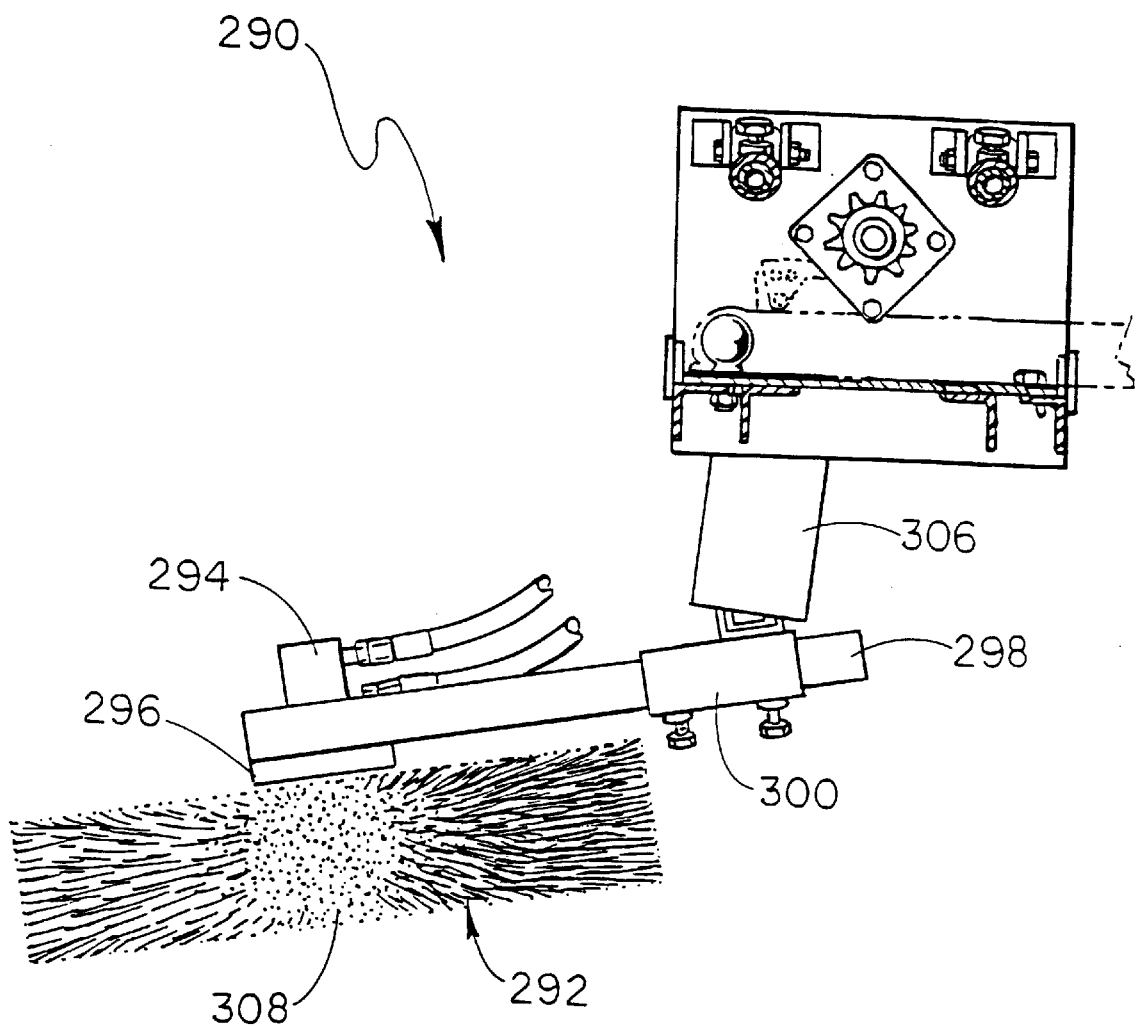
FIG. 18 is a front view representation of the brush unit on the shoot and fruit thinner of FIG. 17.

As shown in FIGS. 17 and 18 of the drawings, a shoot and fruit thinner or removal device generally designated 290 includes a single rotary brush unit 292 of substantially similar construction to that of the rotary brush unit and support assembly 254 of FIG. 15. The rotary brush unit 292 includes a hydraulic motor 294 attached to a plate 296 which is attached to one end of a first or lower rectangular support member 298. The first support member 298 is clamped in an adjustment collar or bracket 300 which is attached to another adjustment collar or bracket 302. The bracket 302 is releasably attached to a second or upper rectangular support member 304 which is welded to a support arm 306. The brush unit 292 includes a plurality of circular bristle assemblies 308 which are clamped to a circular disk 310 which is operatively connected to the rotary shaft of motor 294. The number of bristle assemblies 308, the stiffness of the bristles, the speed of rotation of the motor 294, the position of the brush unit 292, the ground speed of the tractor or other equipment transporting the device 290, and the like can be varied to provide the selected removal of foliage, shoots, fruit, and the like from the interior of the trellis.

Removal device 290 may include a guide wheel 312 as shown in FIG. 17 if desired or may be operated without a guide wheel as shown in FIG. 18 of the drawings. The brush unit 292 may be used to clean the interior or exterior of a trellis, a cordon, or the like and may also be used for pruning. It is important to open up the interior of a GDC, Lyre, "U", or modified "U" trellis to allow light and air to get to the fruit, and to assist in the mechanical harvesting thereof.

Figure 19:
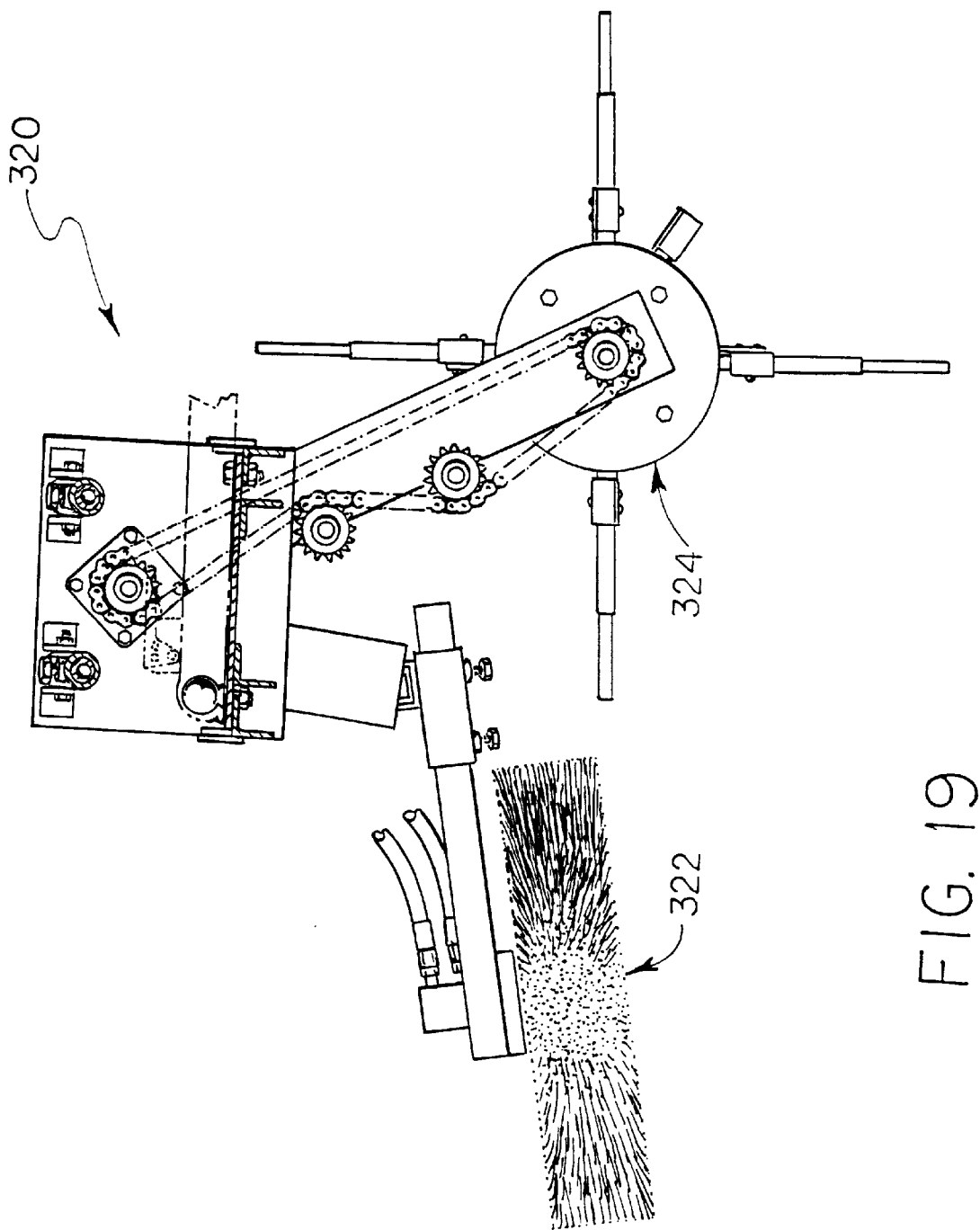
FIG. 19 is a front view illustration of a shoot and fruit thinner embodiment having a brush unit on one arm and a circular, rotary striker assembly on the other arm.

With respect to FIG. 19 of the drawings, a multi-purpose shoot and fruit thinner or removal device generally designated 320 is similar to a combination of the shoot and fruit thinners 290 of FIGS. 17 and 18 and 200 of FIGS. 10–14 and includes both a circular rotary brush unit 322 and a circular rotary striker unit 324 each having their own separate drive motor and which can be driven at different speeds and in different directions. The shoot and fruit thinner 320 is in a similar arrangement to that shown in FIG. 26 of the drawings and can be used in connection with a Y or GDC trellising system.

Figure 20:
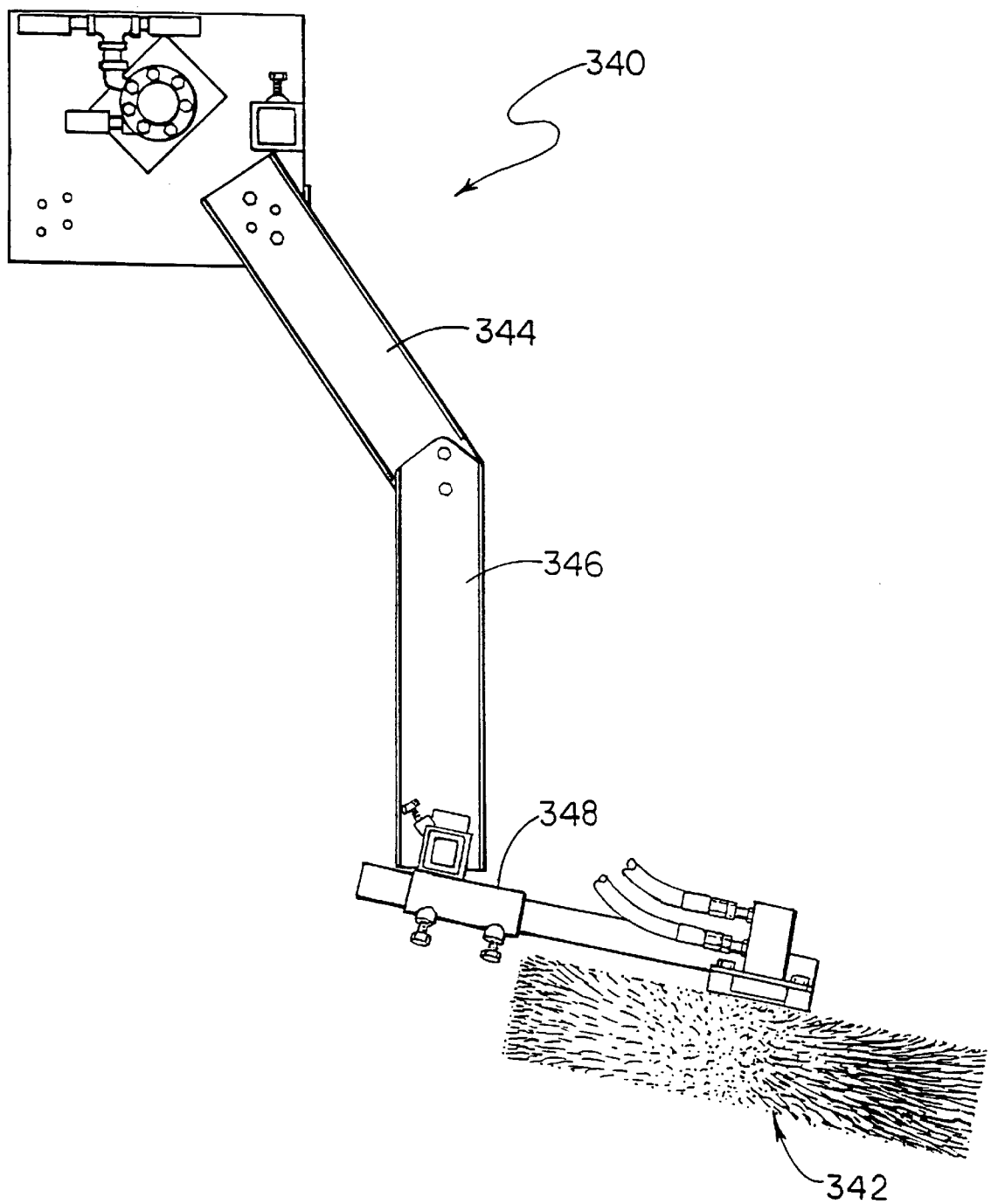
FIG. 20 is a rear view illustration of a shoot and fruit thinner embodiment having a brush unit attached to an elongate arm for use with a Lyre or "U", or modified "U" trellis.
Figure 21:
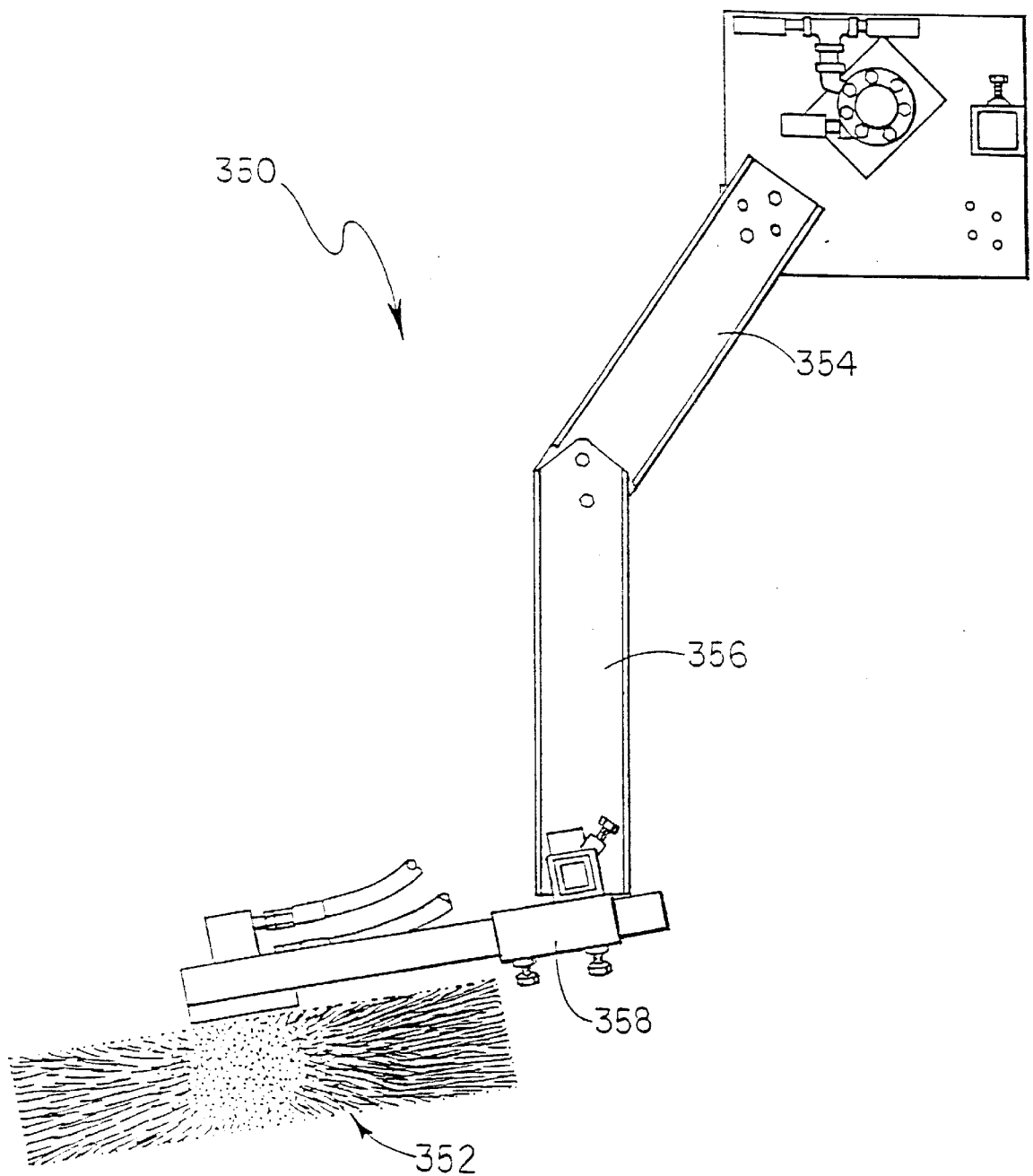
FIG. 21 is a rear view representation of another shoot and fruit thinner embodiment having a brush unit extending from an arm on the opposite side as that shown in FIG. 20.

FIGS. 20 and 21 of the drawings show respective shoot and fruit thinner embodiments 340 and 350 each having a circular rotary brush unit 342 and 352 each mounted at the base of an elongate arm assembly including respective upper arms 344 and 354, lower arms 346 and 356, and adjustable support assemblies 348 and 358. The shoot and fruit thinners 340 and 350 of FIGS. 20 and 21 are adapted to reach down into the interior of a deep divided curtain trellis such as a Lyre, "U", or modified "U", or to reach down and under the "U" or upper end of a Y, T, Lyre, "U", or modified "U" trellising system.

Figure 22:
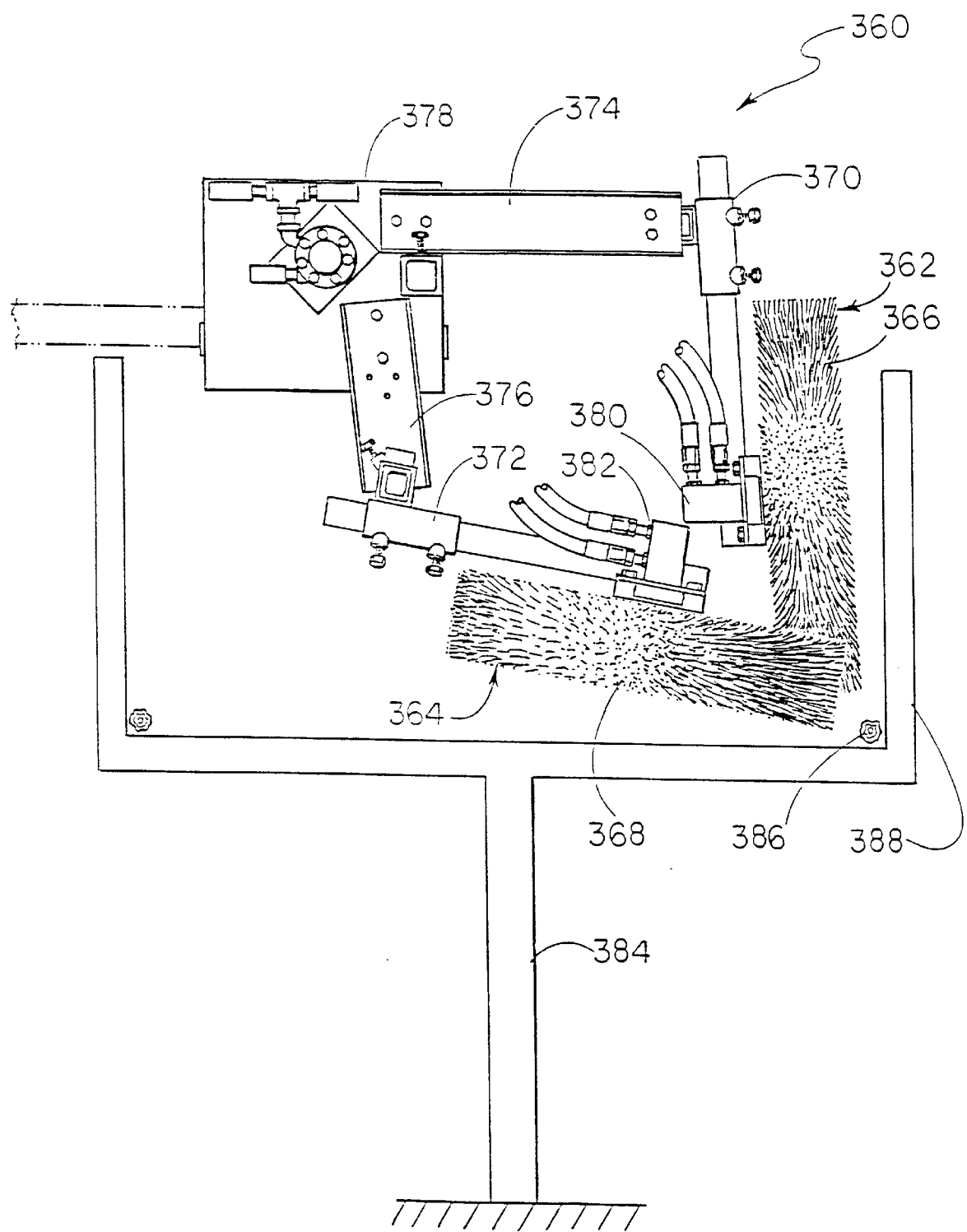
FIG. 22 is a rear view illustration of a shoot and fruit thinner embodiment having first and second brush units extending from one side thereof and adapted for use with a Lyre or "U", or a modified "U" trellis.
Figure 23:
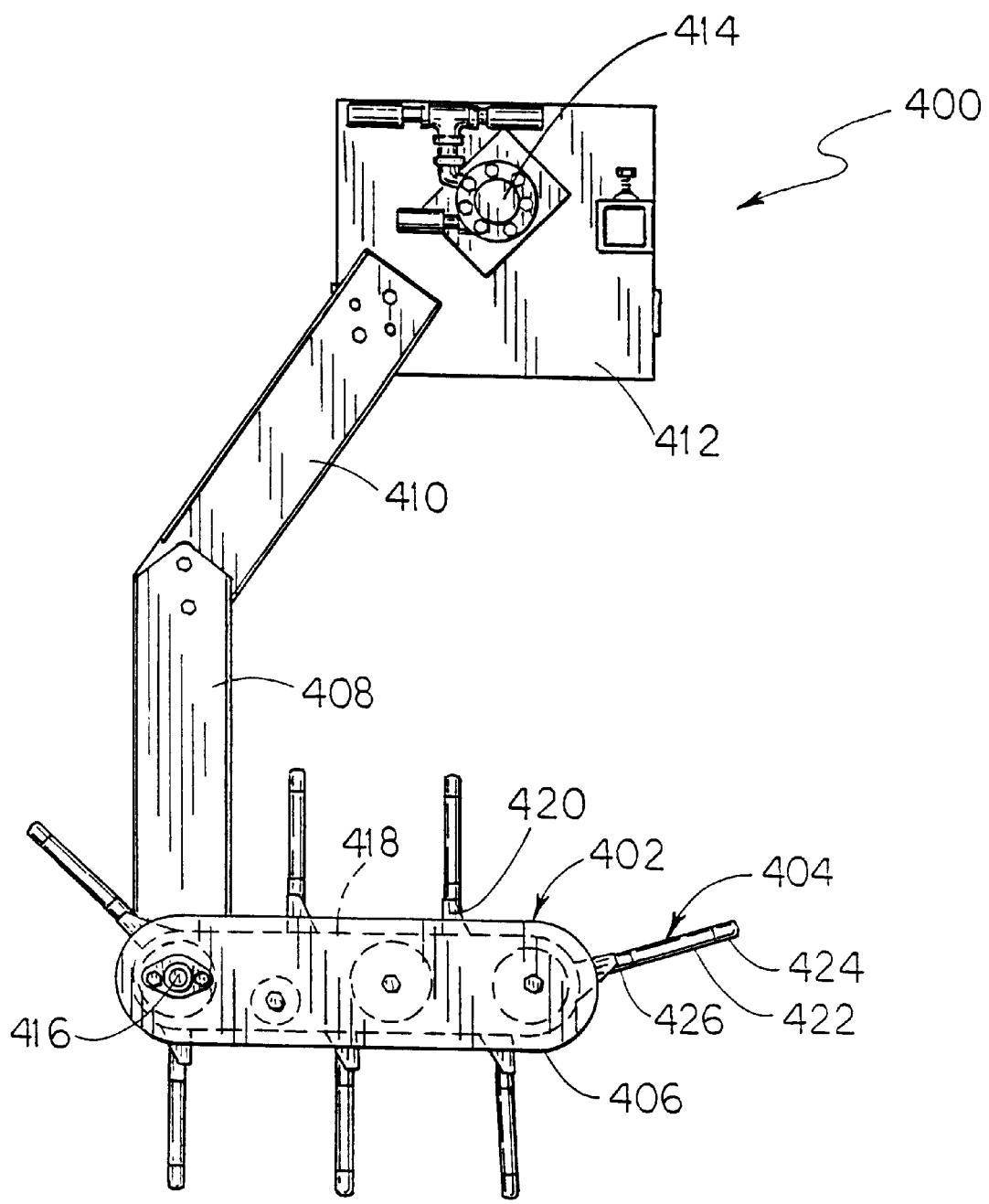
FIG. 23 is a rear view illustration of a shoot and fruit thinner embodiment having an oval rotary striker assembly mounted on the end of an elongate arm.

With respect to FIG. 22 of the drawings, a shoot and fruit thinner embodiment or arrangement in accordance with yet another embodiment of the present invention is generally designated by the reference numeral 360 and shown to include first and second circular rotary brush units 362 and 364 with the first rotary brush unit having a circular bristle assembly 366 positioned substantially vertically and in front of the second rotary brush unit 364 having a circular bristle assembly 368 position substantially horizontally and trailing the first brush unit 362. Each of the rotary brush units 362 and 364 is supported by respective adjustment assemblies 370 and 372, attached to respective support arms 374 and 376, each of which is attached to a support platform 378. Each of the rotary brush units 362 and 364 includes a separate and independent drive motor 380 and 382 to provide for driving of the bristles of each of the brush units at independently selected speeds and in independently selected directions.

The circular rotary brush units 362 and 364 of shoot and fruit thinner or removal device 360 are adapted for use on the interior of a Lyre, "U", or modified "U" trellis 384 and are shown in operation adjacent a cordon 386 within the interior of the upper or U portion 388 of the trellis 384.

With reference to FIGS. 23, 24, 27, 28, and 33 of the drawings, in accordance with the present invention, one can replace, substitute or augment one or both circular rotary striker units or circular rotary brush units with one or more oval rotary striker units each having a plurality of striker fingers attached to a single chain or belt which provides for movement of the fingers around the unit.

In accordance with another embodiment of the present invention, a shoot and fruit thinner generally designated 400 is shown to include a singular oval rotary striker unit 402 having a plurality of striker fingers 404 emanating circumferentially therefrom and having an oval front casing or support member 406. The oval rotary striker unit 402 is supported in a substantially horizontal position at the lower end of a lower arm 408 which is attached to the lower end of an upper arm 410 which is attached to a platform 412 of the device 400. The rotary striker unit 402 may be driven by a motor 414 and chain and sprocket arrangement leading from the motor down to the oval rotary striker unit 402 or from a separate and independent motor on the front end of a striker unit drive shaft 416. It is preferred that the oval rotary striker units also include an oval rear housing or support member opposite housing 406, a drive sprocket and a plurality of idler sprockets therebetween, a chain 418, and a plurality of finger receiving sockets or bases 420 attached to the chain 418. As with the circular rotary striker units, the number, spacing, and flexibility of the fingers or strikers, speed of operation, speed of movement of the unit along the vine, and the like can be selected as desired to provide the necessary removal or thinning of foliage, fruit, canes, shoots, and the like.

In accordance with a preferred embodiment of the present invention, each of the striker fingers 404 of the oval rotary striker unit 402 are short sections of hydraulic line 422 having metal threaded connection ends 424 and 426 with at least connection end 426 adapted to be threadably received into base 420. In contrast to the circular rotary striker units, it is preferred to use single spaced fingers 404 in place of finger pairs.

Figure 24:
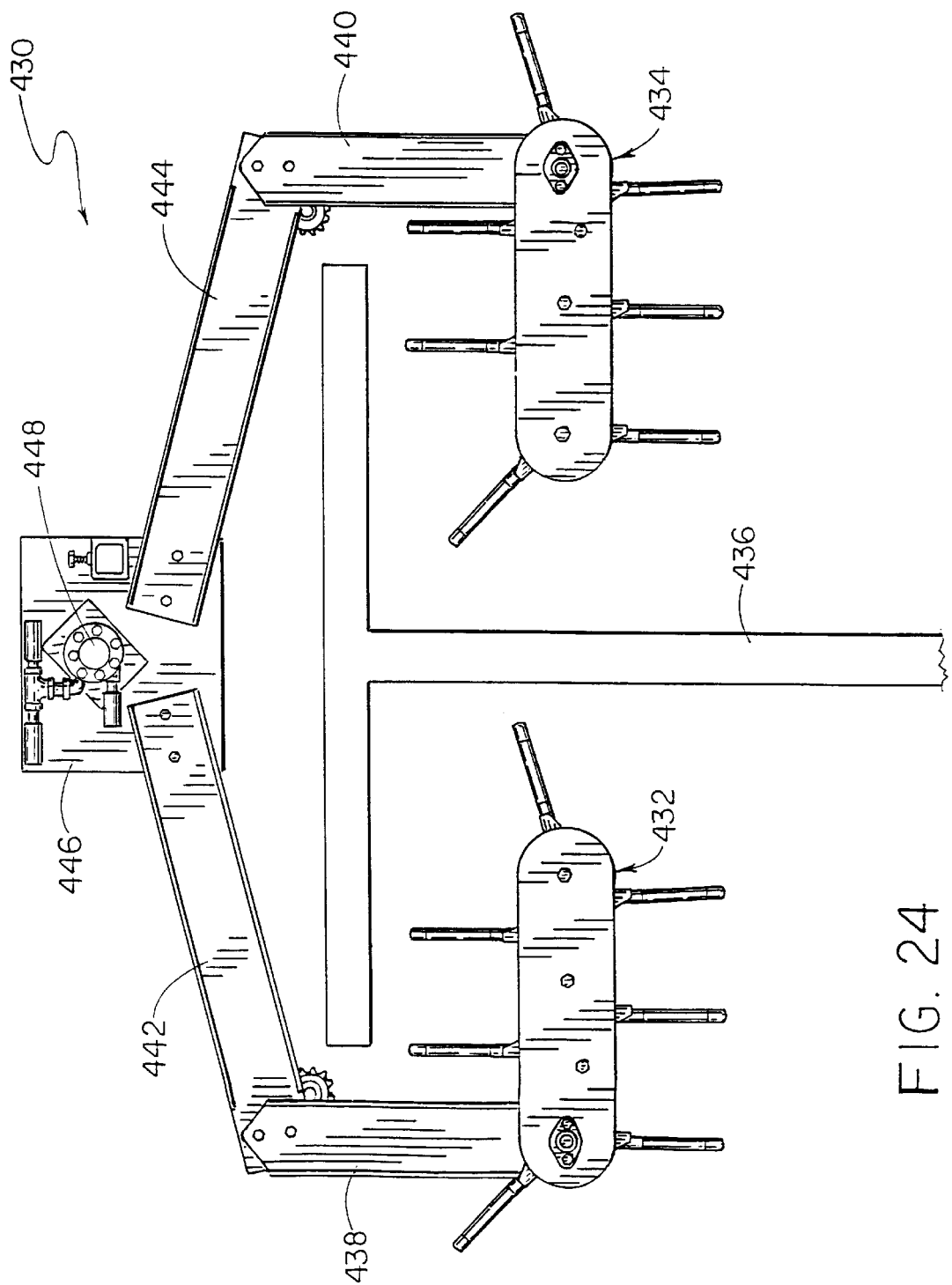
FIG. 24 is a rear plan view representation of a shoot and fruit thinner embodiment having right and left oval rotary striker assemblies mounted on the base of each arm and adapted for use with a California T-trellis.
Figure 25:
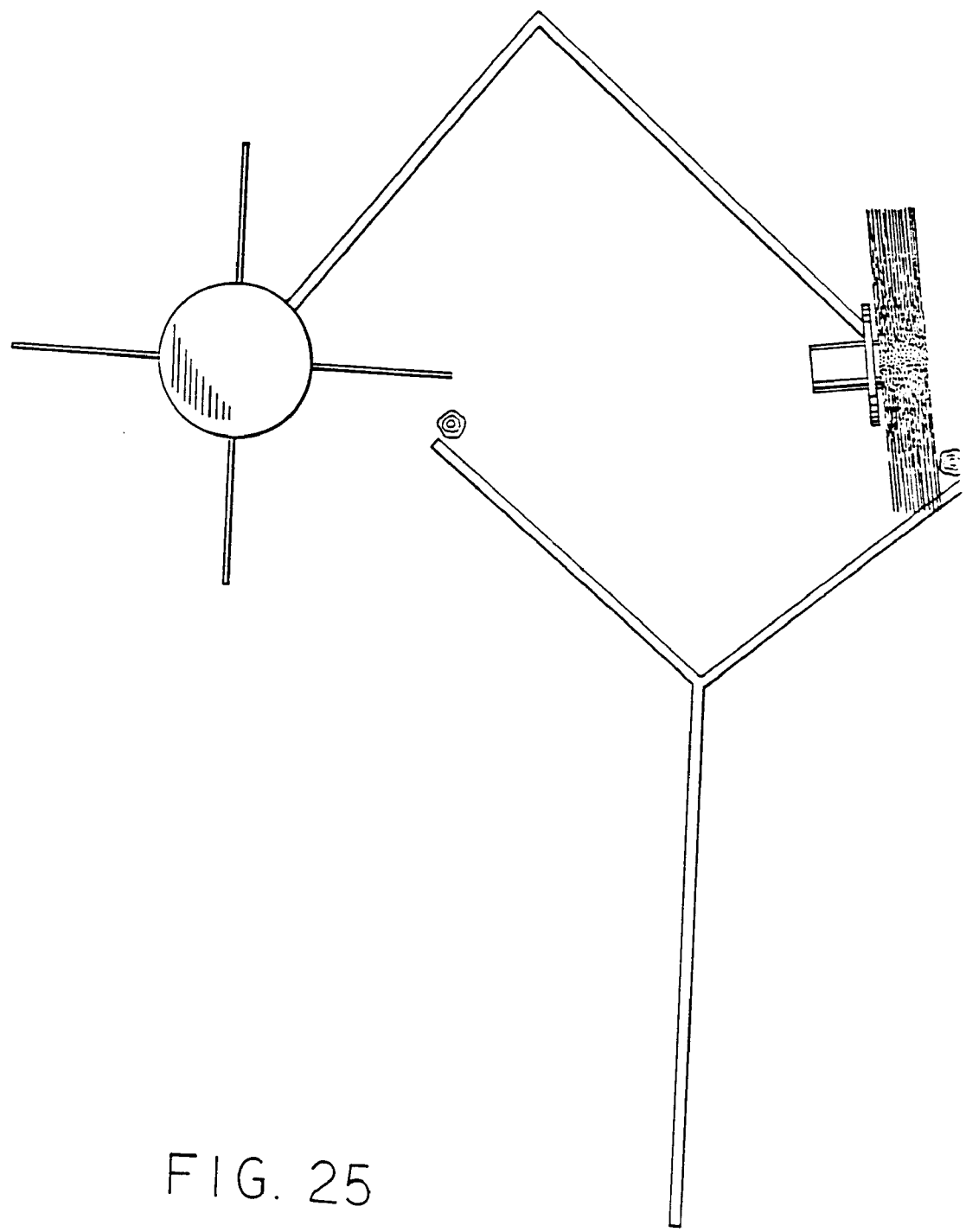
FIGS. 25–33 are schematic elevational view representations of exemplary shoot and fruit thinner arrangements or embodiments 452–468 indicating the versatility of the shoot and fruit thinner of the present invention as it is adapted for use with a variety of trellises and in a variety of arrangements. Brushes are used for total removal of unwanted shoots and strikers are for thinning unwanted shoots and fruit. More particularly.
Figure 26:
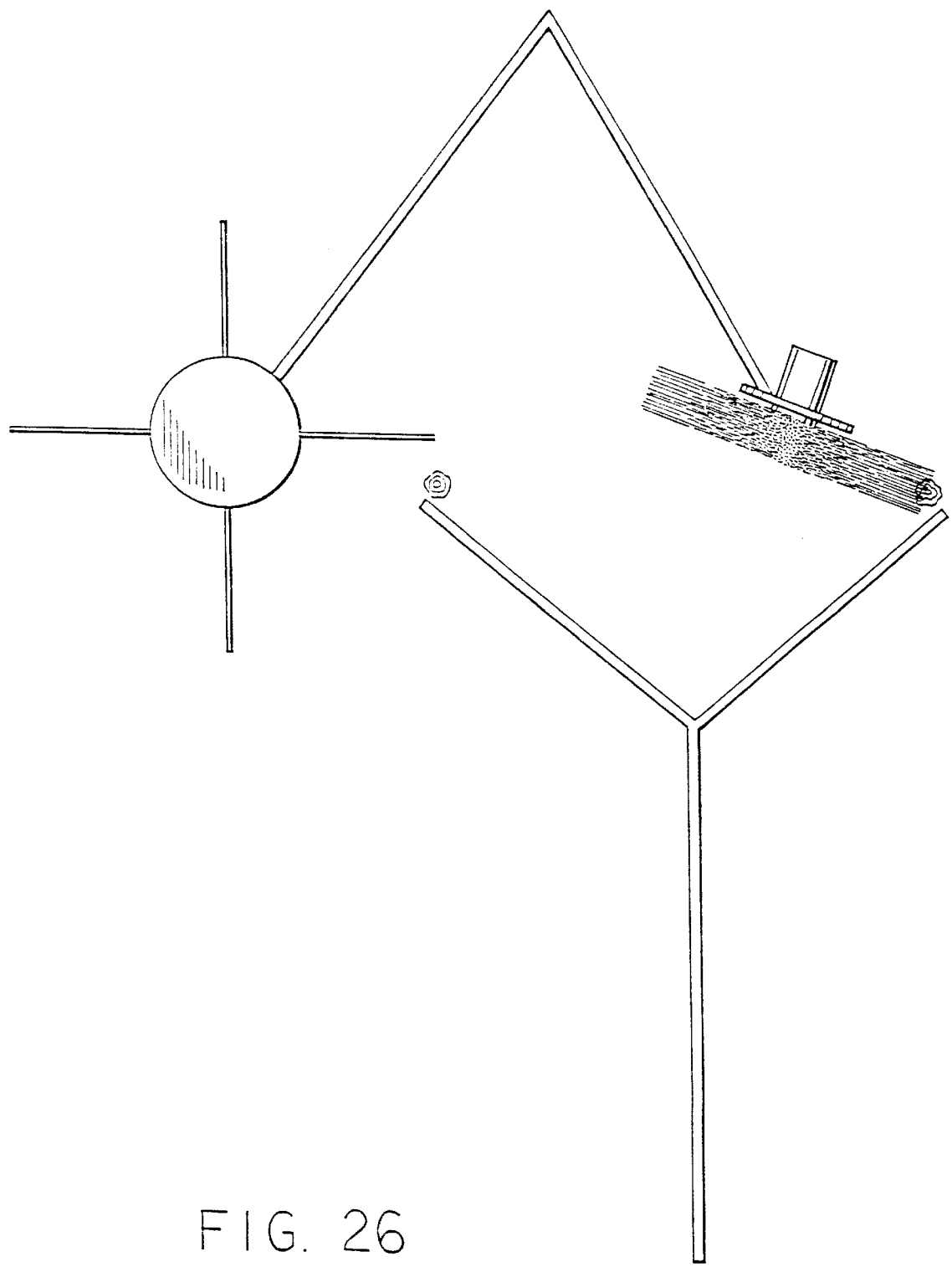
Figure 27:
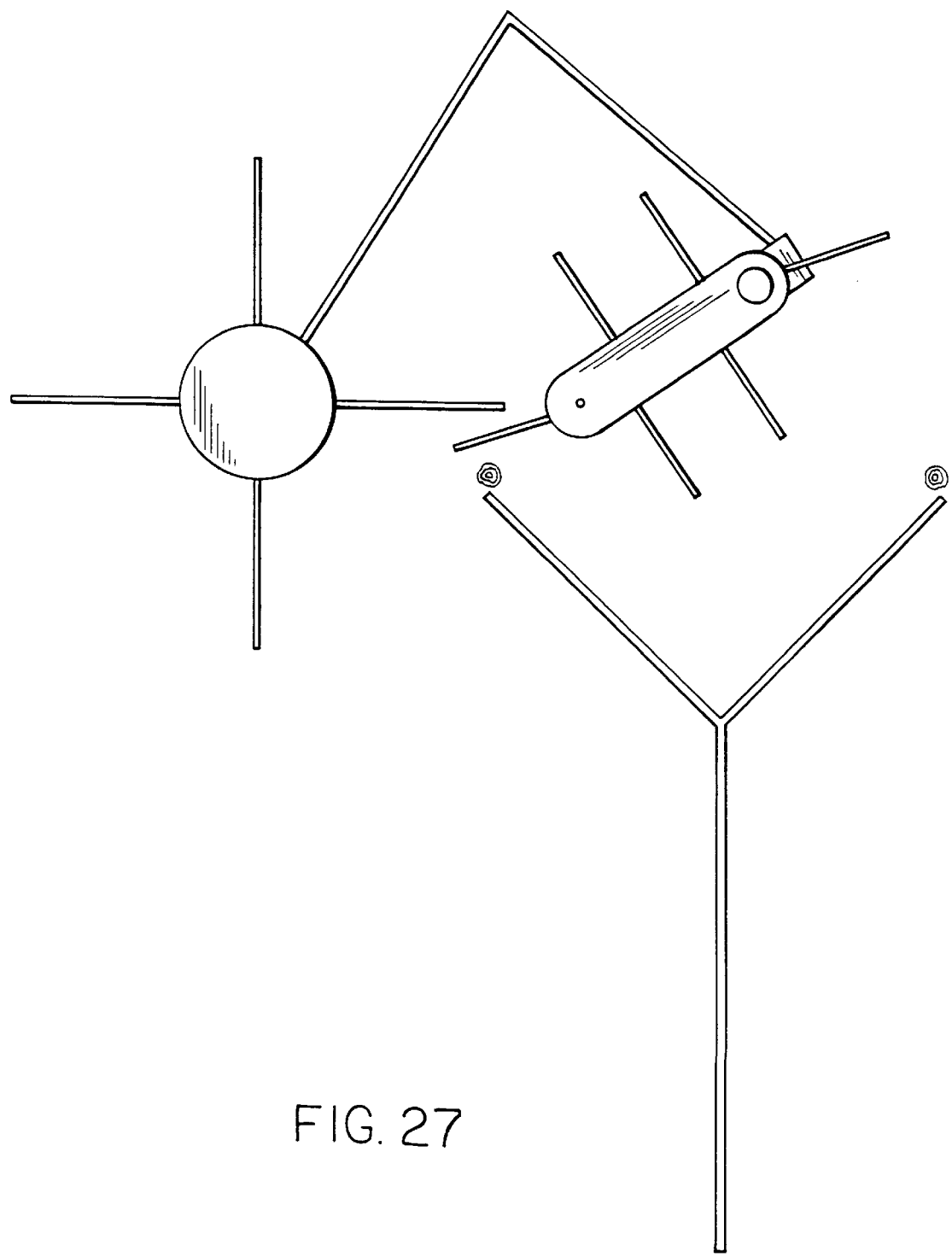
Figure 28:
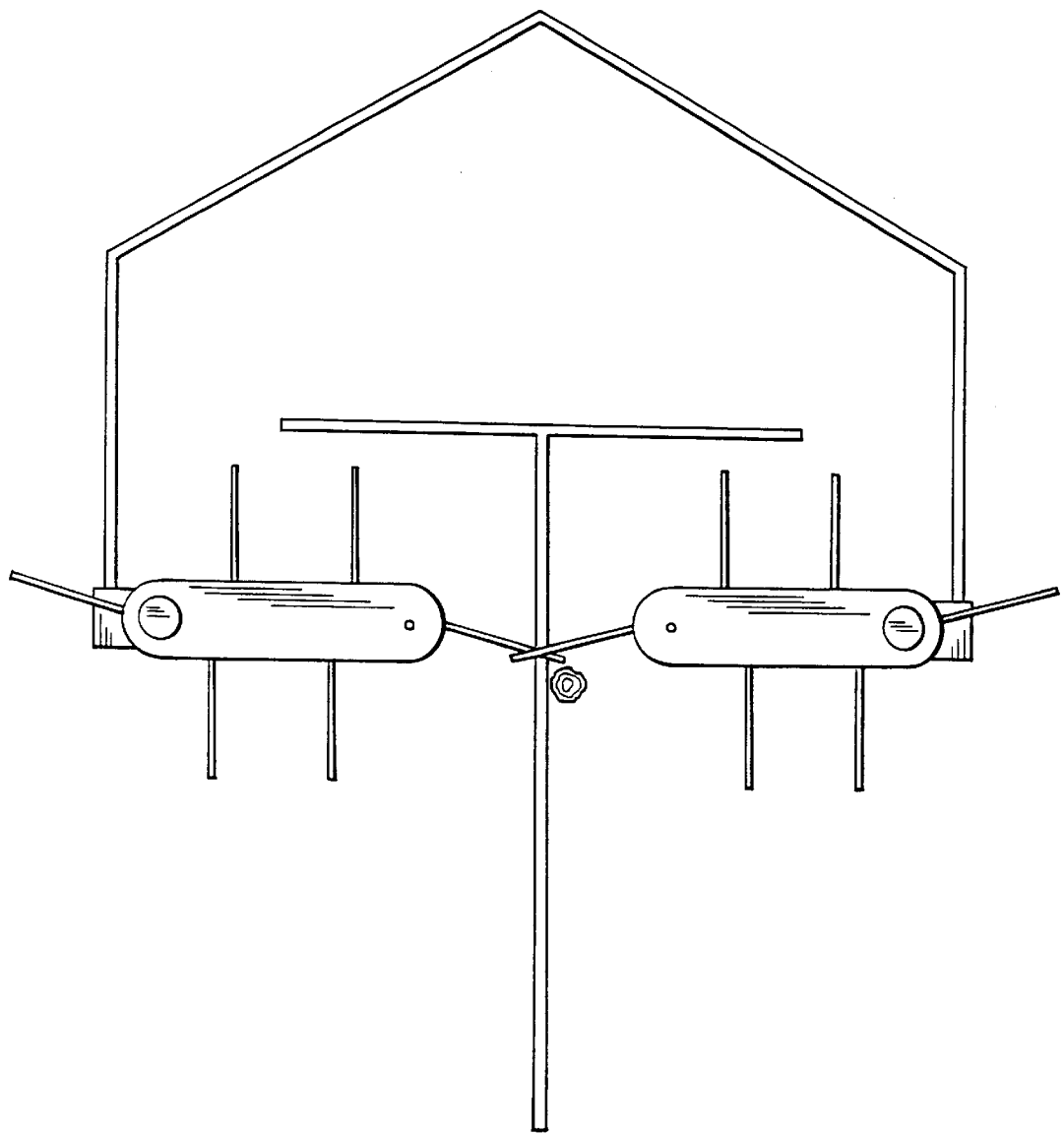
Figure 29:
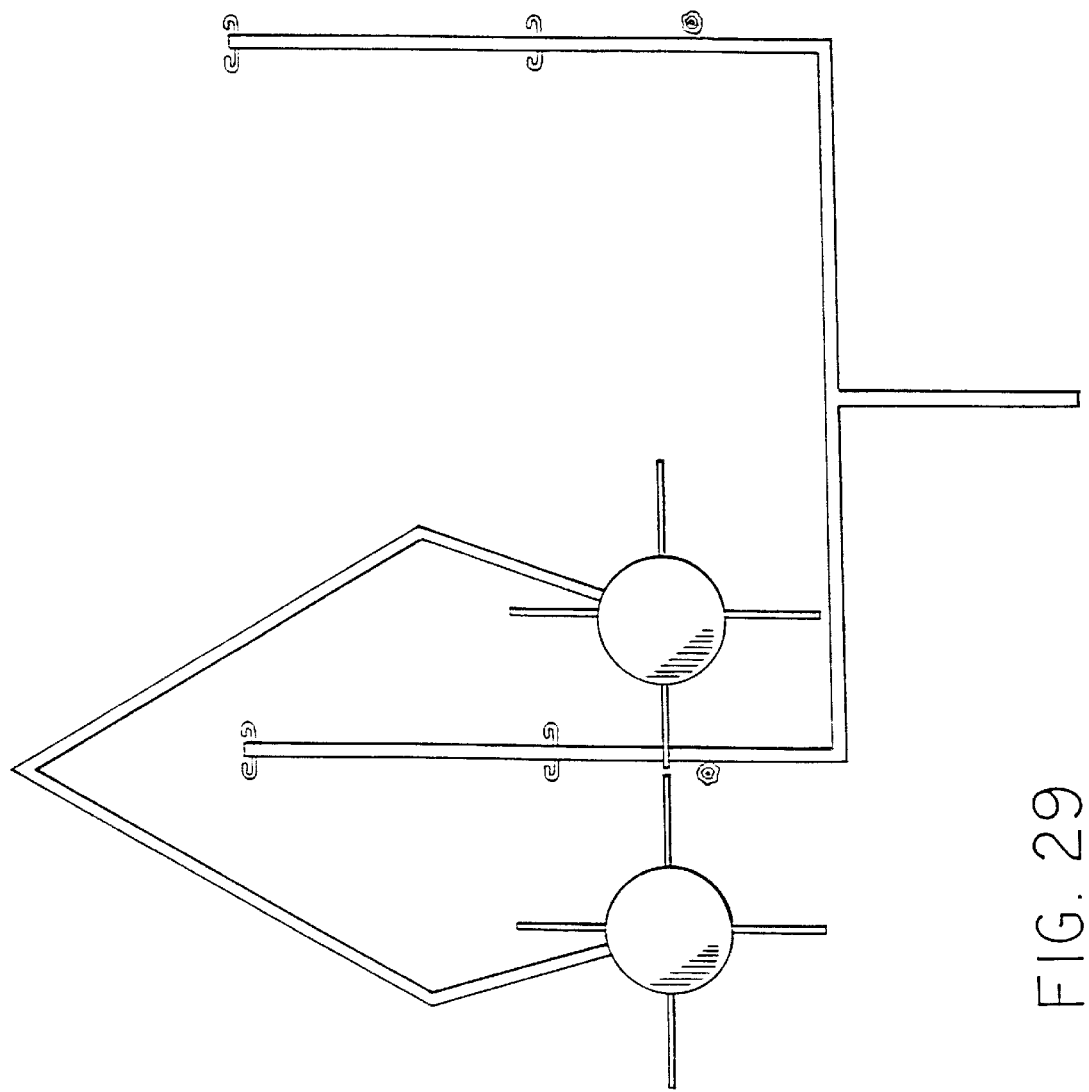

With reference to FIGS. 24 and 28 of the drawings, a shoot and fruit thinner embodiment generally designated 430 is shown to include first and second oval rotary striker units 432 and 434 and which is especially adapted for use with a California T-trellis 436. Each of the oval rotary striker units 432 and 434 are supported by respective lower arms 438 and 440 and upper arms 442 and 444, each attached to a support platform 446. Each of the striker units 432 and 434 may be driven by a common hydraulic motor 448 or by respective separate independent drive motors mounted adjacent to the lower end of each of support arms 438 and 440. In accordance with a particular example of the present invention, and with respect to the California T-trellis of FIG. 28, the cordon is located approximately 42 inches above the vineyard floor, there is about 24 inches between the cordon and the horizontal cross bar, the cross bar spans about 48 inches, and the overall height of the T-trellis is about 64 inches. Also, in accordance with this example, each of the flexible strikers or fingers of the oval rotary strikers is about 9–12 inches in length and the short turning radius on the ends of the chain-driven oval rotary strikers adjacent the cordon is used for close cordon to top cross bar shoot and fruit removal to adjust shoot numbers.

FIGS. 25–33 of the drawings depict schematic shoot and fruit thinner or removal device embodiments or arrangements and highlight the versatility of this equipment with respect to the use for different trellises or training systems and to accomplish different results. Further, FIGS. 2–24 also highlight the versatility and adaptability of the shoot and fruit thinner embodiments of the present invention. In order to facilitate the operation of the fruit and shoot thinner devices and to provide for a selected removal, clearing, thinning, or pruning, each of the shoot and fruit thinners may include one or more meters or gauges which indicate the speed of rotation of, for example, each circular rotary striker, oval rotary striker, or brush unit and allow the tractor or other vehicle operator to adjust the speed of rotation accordingly, depending on the physiological condition of the vine in that area, amount of fruit, or the like.

Figures 67, 68:
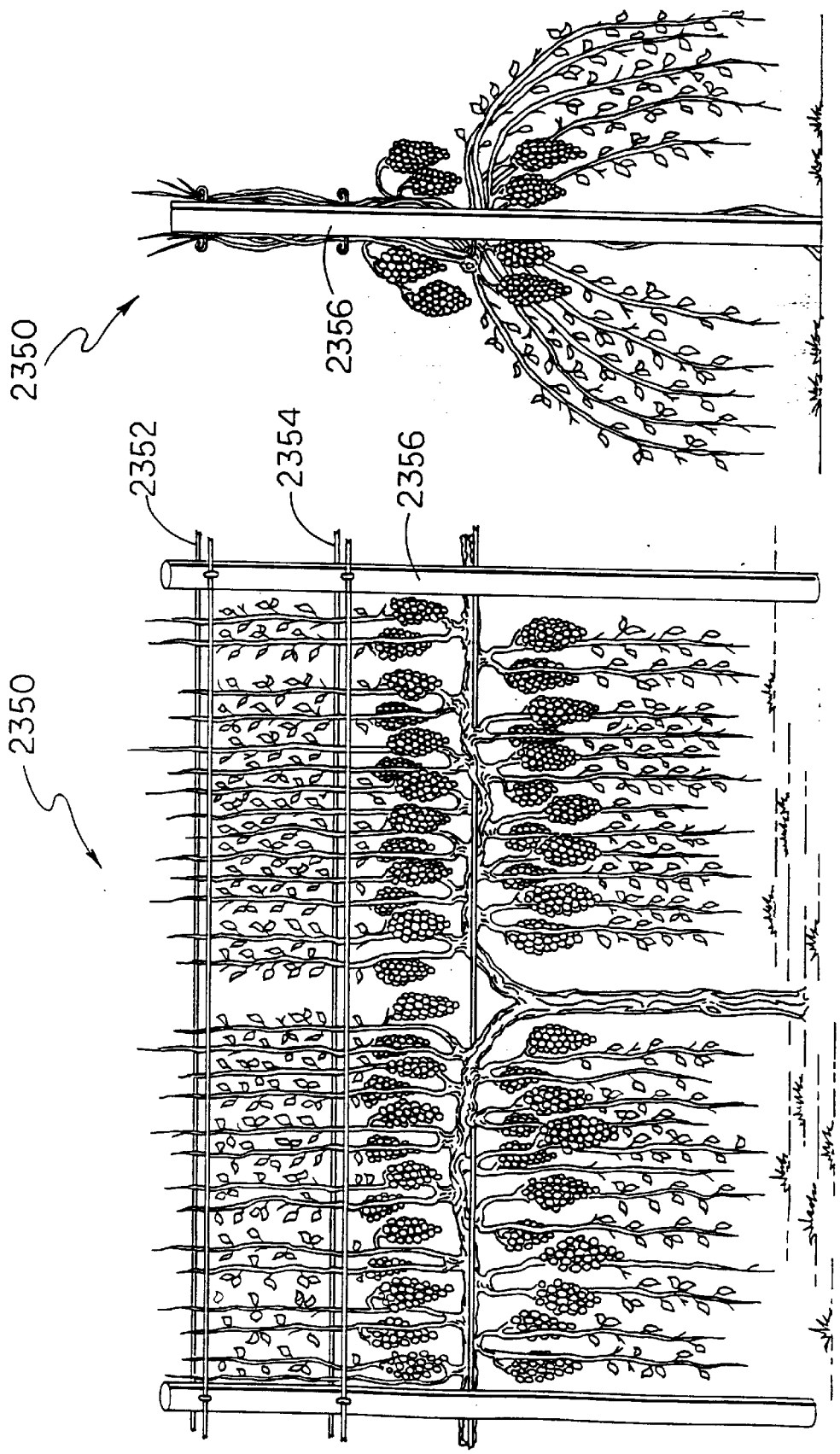
FIG. 67 is a side view illustration of a modified Smart-Dyson ballerina trellising system.
FIG. 68 is an end view illustration of the Smart-Dyson ballerina trellising system of FIG. 67.

Also, it is to be understood that the shoot and fruit thinner embodiments or arrangements of FIGS. 2–33 of the drawings are adapted for use with the modified trellises of FIGS. 76–81 of the drawings as well as the Smart-Dyson ballerina trellising system of FIGS. 67 and 68.

FIGS. 34–40 and 69 of the drawings depict improved leaf removal fan units in accordance with other embodiments of the present invention. More particularly, FIGS. 34 and 35 of the drawings are directed to an improved leaf remover or fan and blade unit generally designated 500 and shown to include a single vertically and angularly adjustable blade and fan assembly 502 adapted for cleaning one side of a standard vertical, movable catch wire trellising system. Fan assembly 502 includes a fan blade 504, a housing 506, an intake connected to a conical cutting blade housing 508, and a discharge 510 at the lower end of the housing 506. A cutting blade 512 is located in the cutting blade housing 508 directly behind a plurality of horizontal bars or rods 514 which pass across the circular fan intake opening 516. The bars or rods 514 are spaced a sufficient distance apart to allow leaves and small shoots to enter the cutting blade housing 508 and to be cut by the blade 512 or cut by being sheared between the rods 514 and the blade 512. Fan blade 504 and cutting blade 512 are mounted on a drive shaft 518 which is rotatably driven by a hydraulic motor 520 and supported by a pair of spaced shaft bearings 522.

The fan assembly 502 of leaf remover or fan unit 500 is vertically supported by spaced vertical support members 524 which extend downwardly from a horizontal support member 526 which is attached to the horizontal mast member 96 via a ball hitch 528 and nuts and bolts 530. The angle of the fan and blade assembly 502 is selected by adjusting the relative position of first and second angle support members 532 and 534 with the upper end of member 532 being connected to horizontal member 526 and the lower end of member 534 being pivotally connected to a bracket extending from fan housing 506. Also, the lower end of vertical support members 524 are pivotally connected to a housing or plate supporting the fan housing 506, shaft bearings 522, and motor 520. Furthermore, the vertical position of the fan assembly 502 can be quickly and easily altered by vertical extension and retraction of a hydraulic cylinder 536 of mast 98. Also, the side to side position of the fan unit (the distance of the fan unit from the tractor 538) can be adjusted by extending or contracting a cylinder located within or adjacent the horizontal member 96 of mast 98.

Figure 35:
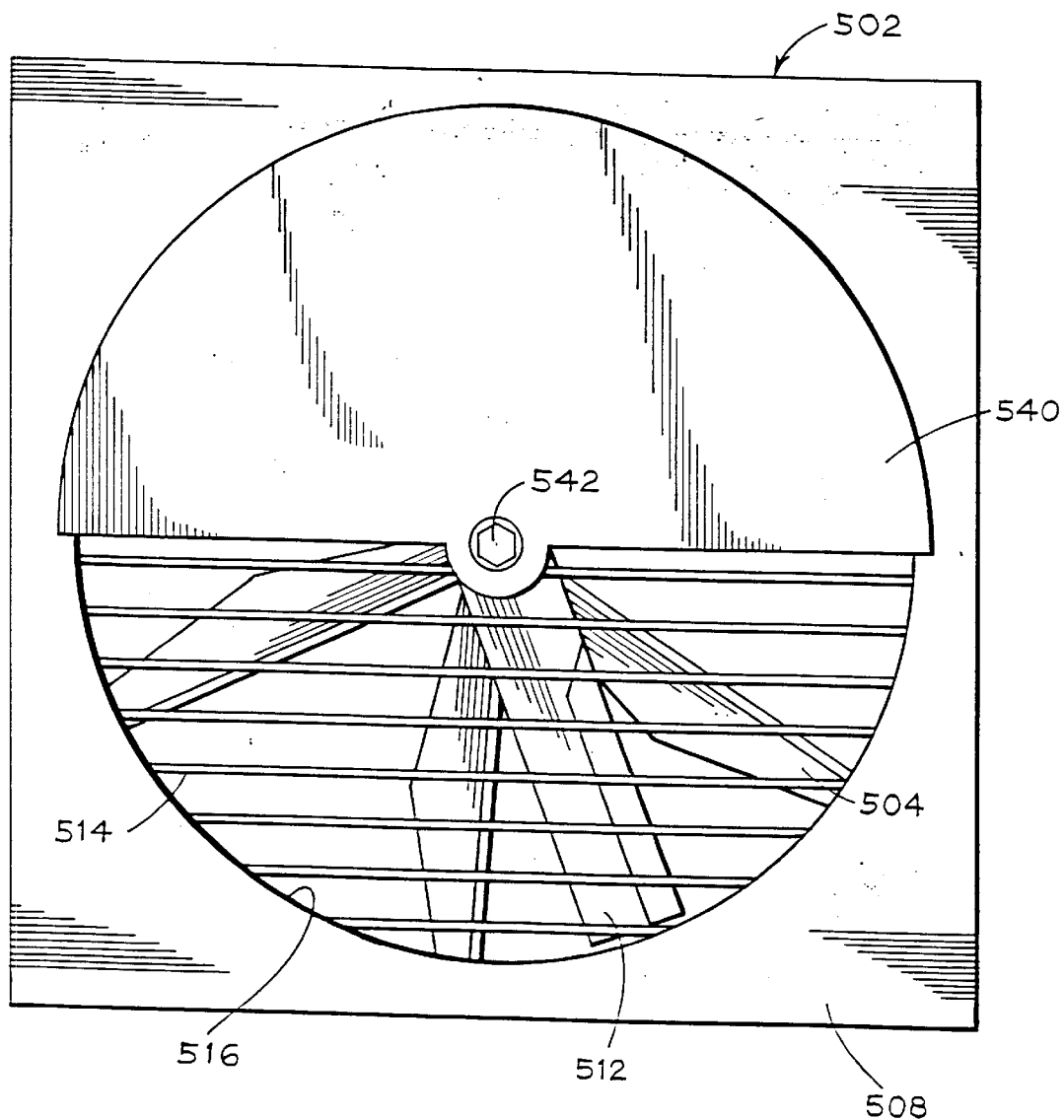
FIG. 35 is a partial side view illustration of the leaf remover of FIG. 34 with an adjustable cover.

With particular reference to FIG. 35 of the drawings, fan assembly 502 of fan unit 500 may have an adjustable fan cover 540 added to the face thereof to selectively cover a portion of the fan intake opening 516 and thereby provide for leaf and shoot removal in only a selected region or area, for example, the bottom half of opening 516. A threaded fastener or bolt 542 provides for adjustment of the location of the cover 540 relative to the opening 516. Although the rods or bars 514 are shown as being cylindrical, it is to be understood that other cross-sections such as semi-circular, rectangular, or triangular may be used.

Figure 36:
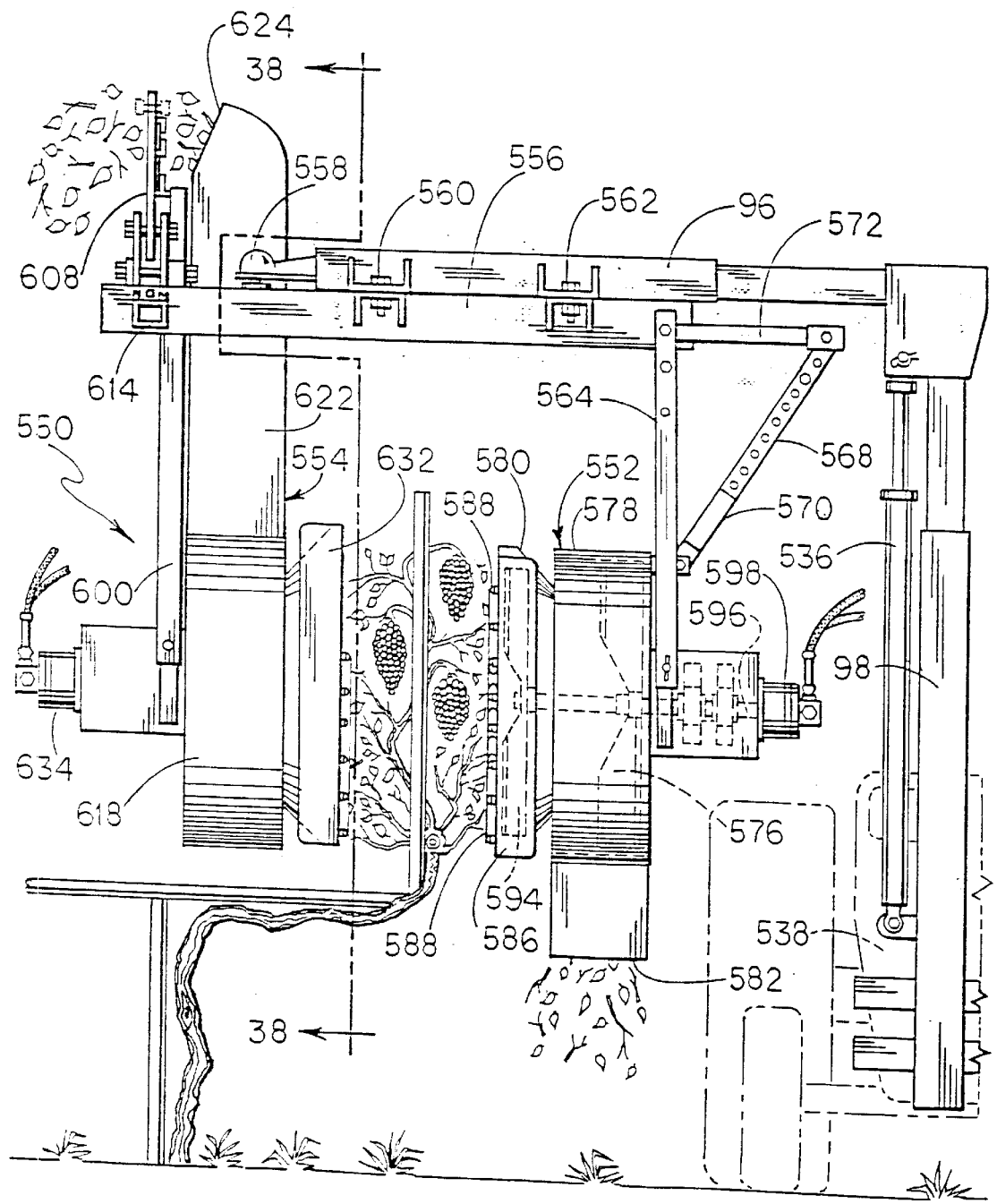
FIG. 36 is a front view representation of an improved dual fan unit leaf remover with a leading and trailing fan unit and adapted for use with a Lyre or "U" trellis system.
Figure 37:
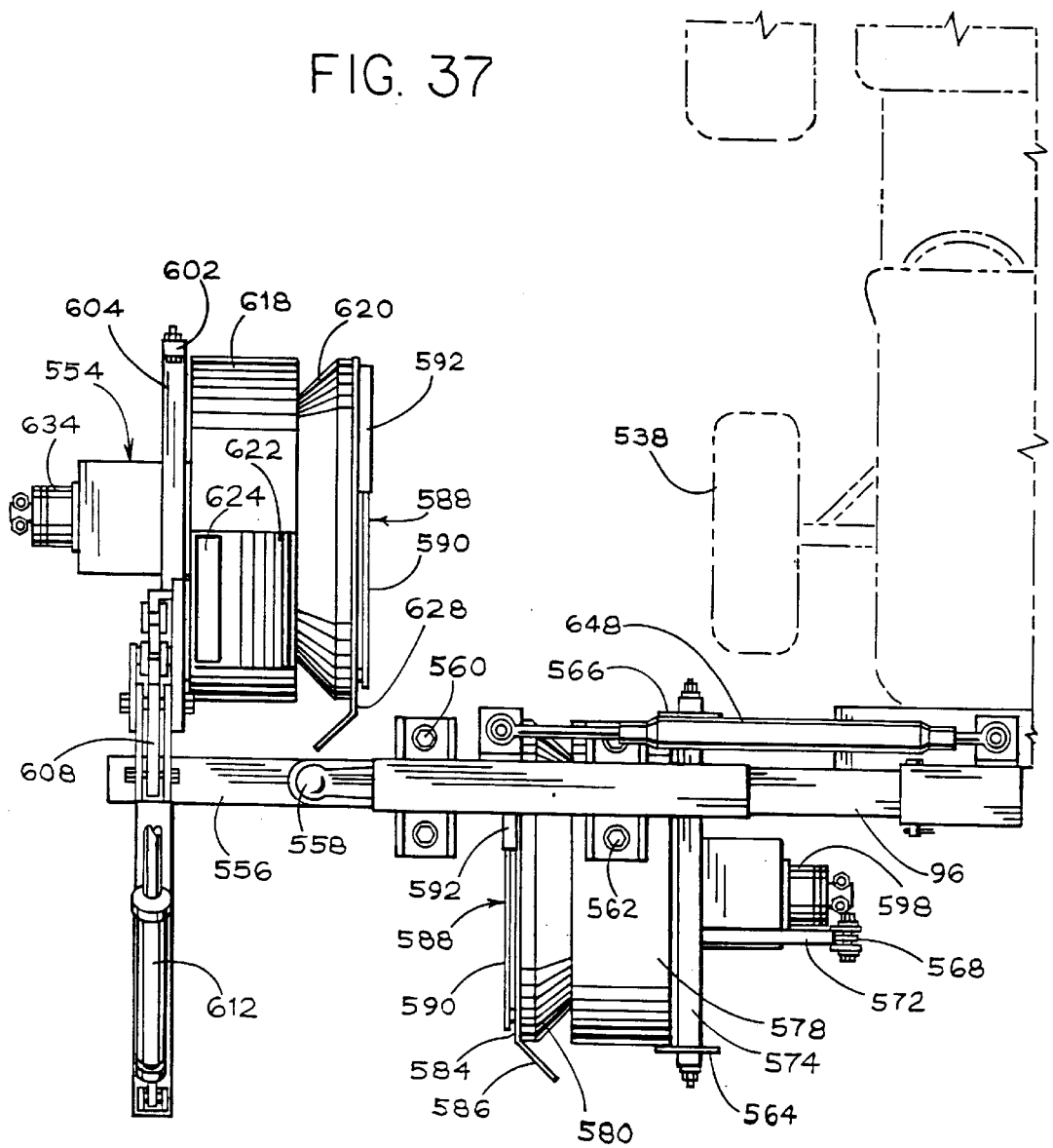
FIG. 37 is a top view illustration of the dual fan unit leaf remover of FIG. 36.
Figure 38:
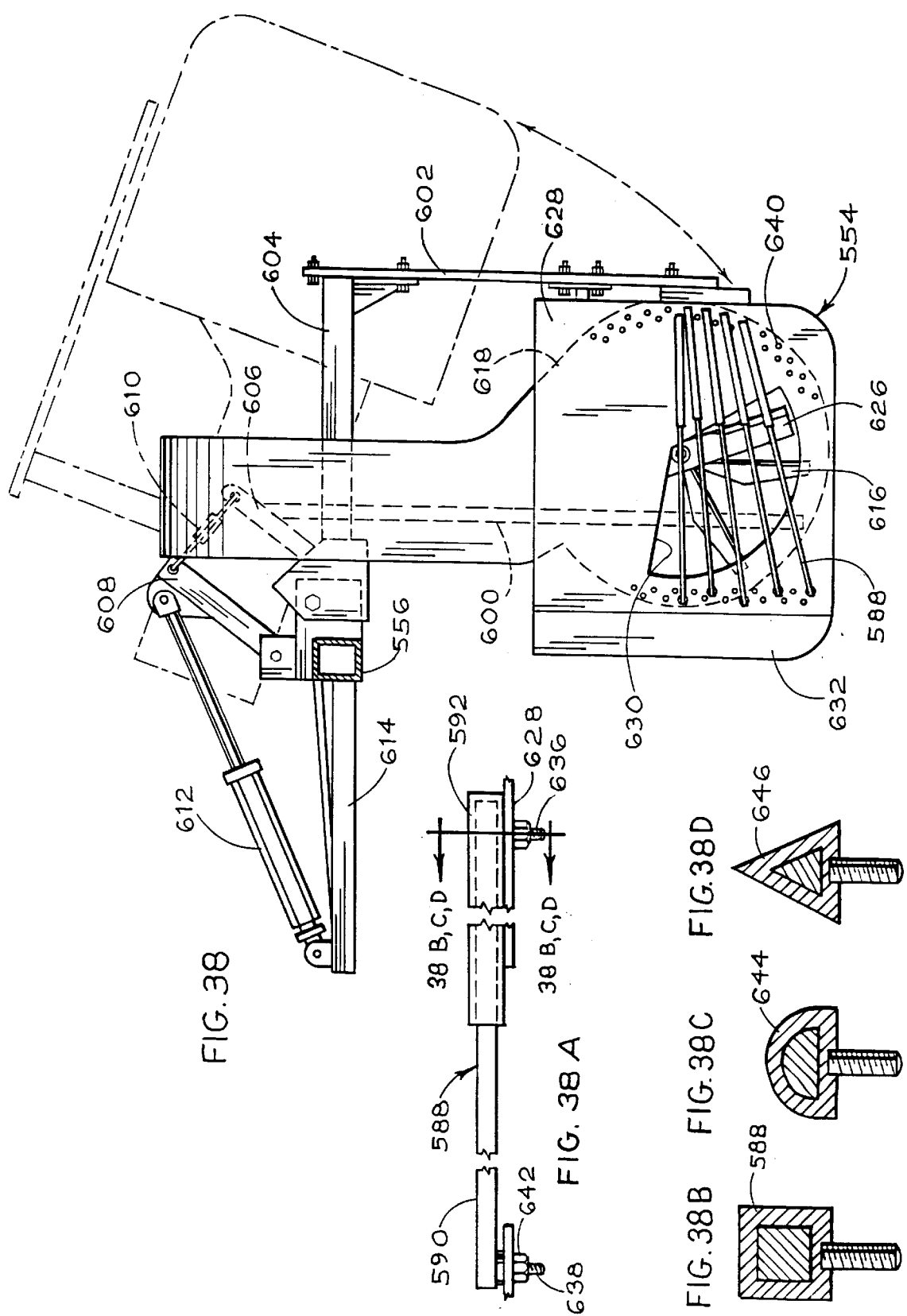
FIG. 38 is a side view illustration of the trailing fan unit of FIG. 37 with adjustable grates.

With reference to FIGS. 36–38 of the drawings, a modified or improved dual fan leaf remover is generally designated 550 and shown to include leading and trailing fan units 552 and 554 adapted for use with a Lyre, "U", or modified "U" trellising system. Each of the fan units 552 and 554 of the dual unit leaf remover 550 is similar to the fan assembly 502 of FIGS. 34 and 35. The leading and trailing fan units 552 and 554 are supported from a horizontal support member 556 which is attached to the horizontal mast member 96 by ball hitch 558 and nut and bolt and bracket assemblies 560 and 562. Leading fan unit 552 includes spaced vertical support members 564 and 566 and angle adjust support members 568 and 570. Upper angle adjust member 568 is pivotally attached to a horizontal member 572 which is attached to a horizontal cross member 574 which is attached to horizontal member 556 and supports the upper end of vertical support members 564 and 566.

Leading fan unit 552 includes a fan blade 576, a fan blade housing 578, an intake operatively connected with a conical cutting blade housing 580, and a bottom discharge 582. Attached to the front surface of conical cutting blade housing 580 is a cowling or cover plate 584 having a bent or angled leading surface 586 which facilitates movement of the fan unit along the vine. Attached to cowling or cover plate 584 are a plurality of adjustable rods or bars 588 each having small and large sized portions 590 and 592 with the small portion 590 telescopically received within the large portion to allow adjustment of the length thereof. A cutting blade 594 is located within the housing 580 just behind the adjustable bars 588 to provide not only a cutting of the leaves and small shoots by the blade 594 but also by being sheared between the blade 594 and the bars 588. Cutting blade 594 and fan blade 576 are attached to a drive shaft 596 of hydraulic motor 598.

Trailing fan unit 554 differs from leading fan unit 552 in that the trailing fan unit 554 is adapted to be swung up and out of the way of the trellis if necessary for egress into and exit out of the trellis or for angular adjustment with respect to the vine. Trailing fan unit 554 is supported by vertical support members 600 and 602 connected by an upper horizontal cross member 604. Vertical support member 600 is attached to a pivotally supported member 606 which is operatively connected to a second pivoting support member 608 by a length adjustable turnbuckle or connector 610. The second pivotal support member 608 is connected to the shaft of a hydraulic cylinder 612 which itself is supported by a horizontal member 614 extending forwardly from horizontal support member 556. The hydraulic cylinder 612 is not shown in its entirety in FIG. 36 for the sake of clarity of other components. With this arrangement, retraction of the shaft of hydraulic cylinder 612 causes upward movement of the fan housing of fan unit 554 with complete retraction providing movement to the phantom line position shown in FIG. 38.

Further, trailing fan unit 554 includes a fan blade 616, a fan housing 618, a fan housing intake operatively connected to a conical cutting blade housing 620, an upper discharge channel 622, and an upper discharge outlet 624. A cutting blade 626 is located in cutting blade housing 620 just behind a cover plate or cowling 628 having an inlet or opening 630. Opening 630 like the intake opening in leading fan unit 552 is covered by a plurality of adjustable rods or bars 588, each having large diameter and small diameter portions 592 and 590. Trailing fan unit cover 628 has a forward bent edge 632 which facilitates movement of the fan unit along the vine. Cutting blade 626 and fan blade 616 are connected to a drive shaft of a drive motor 634.

The cutting opening 630 of trailing fan unit 554 subtends an arc of over 90° but less than 180° and provides for leaf and small shoot removal over only a small section of the fan housing. In contrast, the cutting opening of leading fan unit 552 is circular and similar to the opening 516 of the fan unit 500 of FIGS. 34 and 35. In accordance with one example, the leading fan unit 552 has a cutting blade 594 with a length of about 16 inches while trailing fan unit 554 has a cutting blade 626 with a length of 28 inches. Hence, the total effective area of the intake of each of the fan units 552 and 554 is substantially the same even though the opening 630 is not circular.

With reference to FIGS. 38 and 38A–38D, each of the adjustable bars or rods 588 has depending studs 636 and 638 extending therefrom which pass through stud receiving openings 640 and are adapted to receive a locknut 642 for securement in a selected position. The spacing between the rods or bars 588 and the angle of attack of the rods with respect to the vine can be adjusted or varied upon the conditions to provide for more or less leaf and small shoot removal and also to facilitate the guiding of the leaves and shoots to the inlet or cutting openings of the fan units.

With respect to FIGS. 38, 38A, and 38B of the drawings, the rods or bars 588 have a substantially rectangular cross-section with the large portion 592 telescopically receiving at least a portion of the small end 590 therein with each of the large and small portions having a flat base which provides for a shearing action between the cutting blades 594 and 626 and the lower surface of each of the bars or rods 588.

With respect to FIGS. 38C and 38D of the drawings, it is contemplated that the rods 588 may have other cross-sections than rectangular. For example, the rods may have a semi-circular cross-section such as rods 644 of FIG. 38C or a triangular cross-section such as rods 646 of FIG. 38D. Each of the rods 644 and 646 have a flat base which provides for shearing action between the base of the rod and the cutting blades 594 and 626.

With respect to FIG. 37 of the drawings, horizontal mast member 96 is shown to have an external hydraulic cylinder 648 which provides for extension and retraction of a large rectangular section relative to a smaller rectangular section of horizontal member 96. Hence, one can adjust the horizontal position of the leading and trailing fan units relative to the tractor by extending or retracting cylinder 648. Further, one can adjust the vertical position of the leading and trailing fan units with respect to the vine by adjusting the vertical support members and/or the hydraulic cylinder 536.

Figure 39:
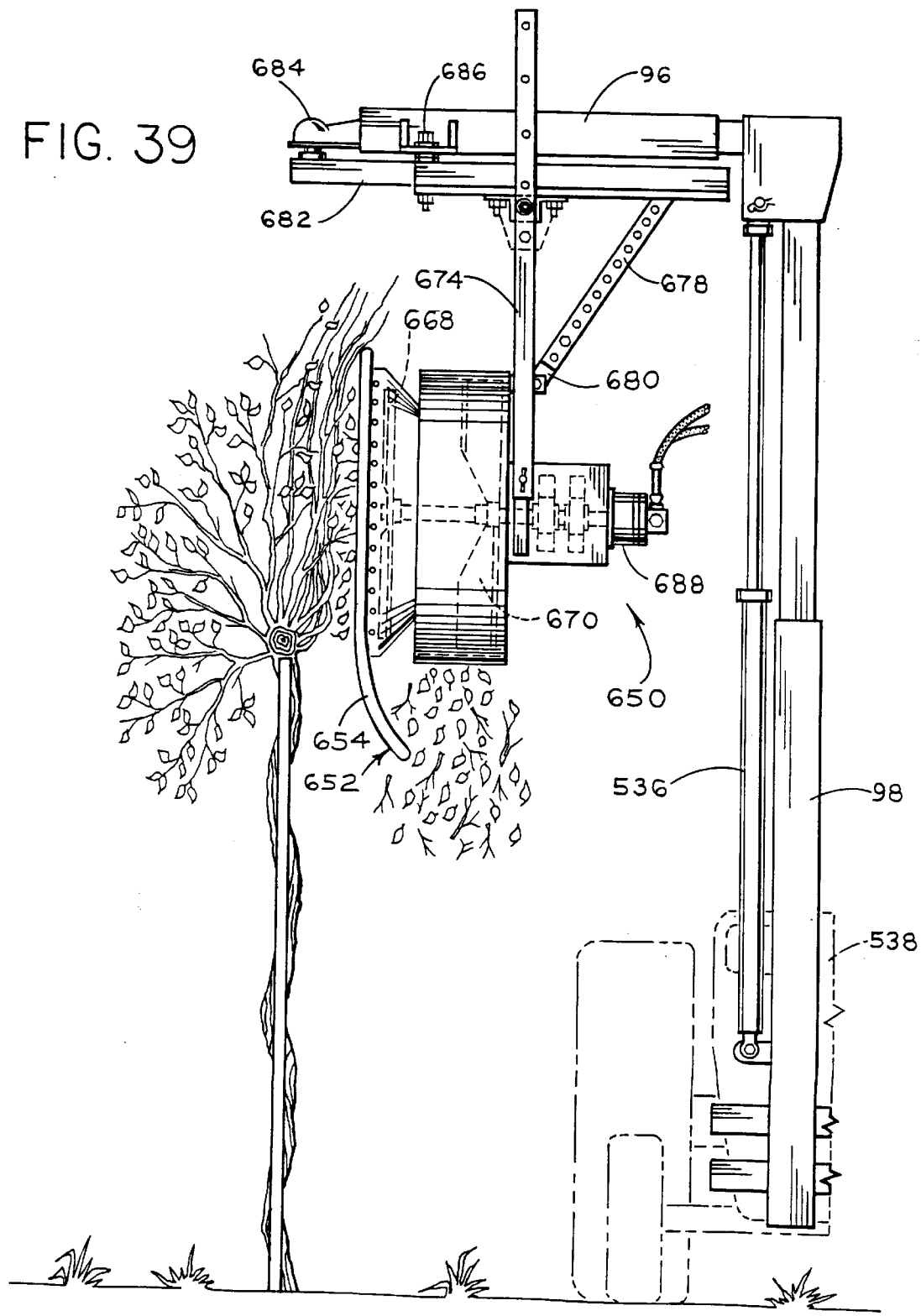
FIG. 39 is a front view representation of a modified leaf remover adapted for use with a highwire single curtain bilateral cordon trellis system and including a cane lifter.
Figure 40:
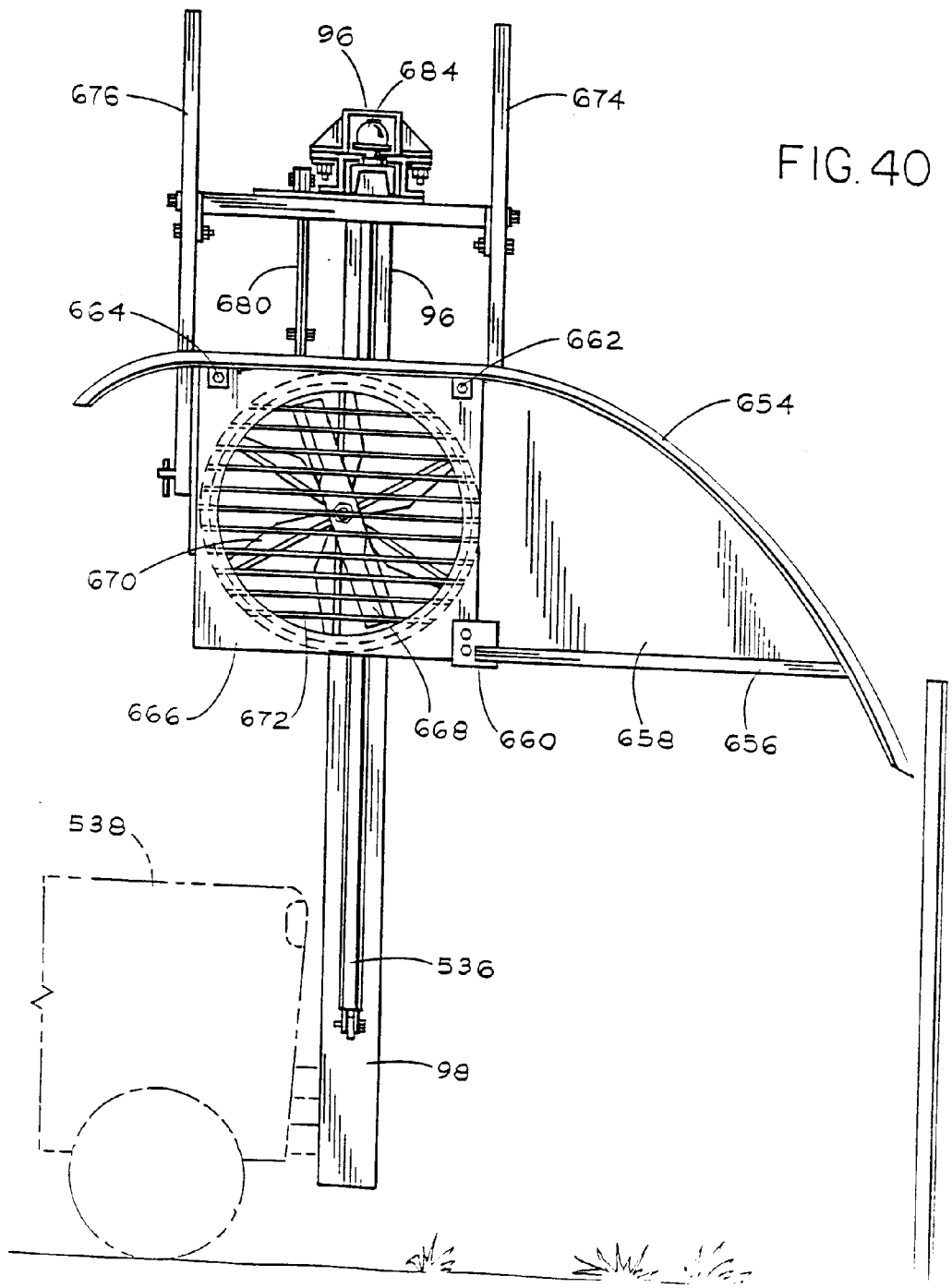
FIG. 40 is a side view illustration of the leaf remover of FIG. 39.

FIGS. 39 and 40 of the drawings are directed to a modified leaf remover or fan and blade unit 650 adapted for use with a high bilateral cordon trellis system and including a cane lifter 652 for lifting the canes prior to leaf and small shoot removal. The leaf remover or unit 650 is identical in construction to the leaf remover or unit 500 of FIG. 34 with the exception of the addition of the cane lifter 652 including an arcuate upper pipe or tube 654, a lower horizontal pipe or tube 656, an intermediate plate or skin 658, and a plurality of attachment brackets 660, 662, and 664 which provide for attachment of the cane lifter 652 to the cover or front plate 666 of the fan unit.

Figure 34:
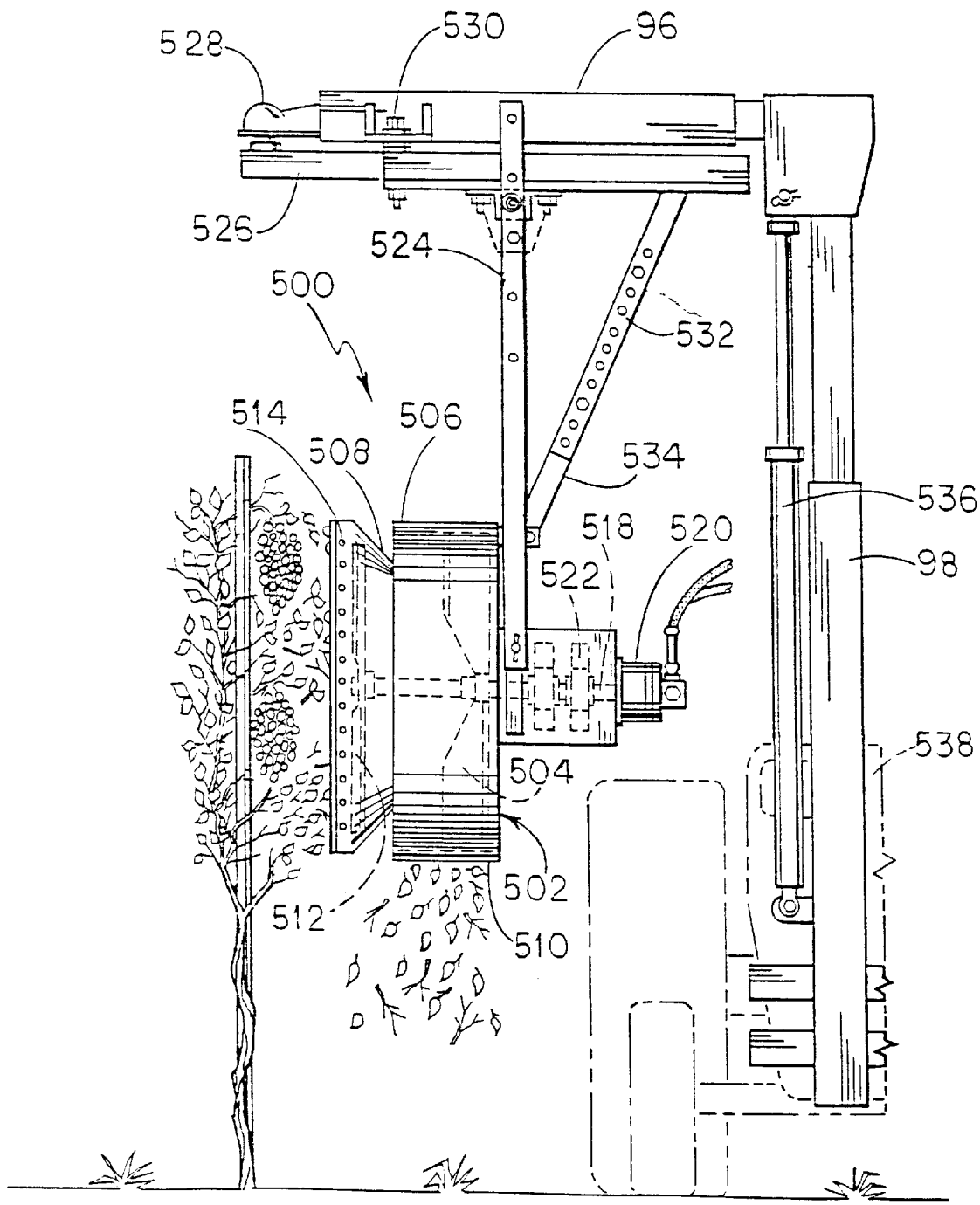
FIG. 34 is a front plan view representation of an improved leaf remover or fan and blade unit for removing leaves and small shoots from one side of a standard vertical movable catch wire system.

Like fan unit 500 of FIG. 34, leaf remover or unit 650 of FIGS. 39 and 40 includes a cutting blade 668, a fan blade 670, a plurality of cross rods or bars 672, vertical support members 674 and 676, angle adjust members 678 and 680, a horizontal support member 682, a ball hitch 684, bolt nut and bracket assembly 686, and a motor 688.

Figure 41:
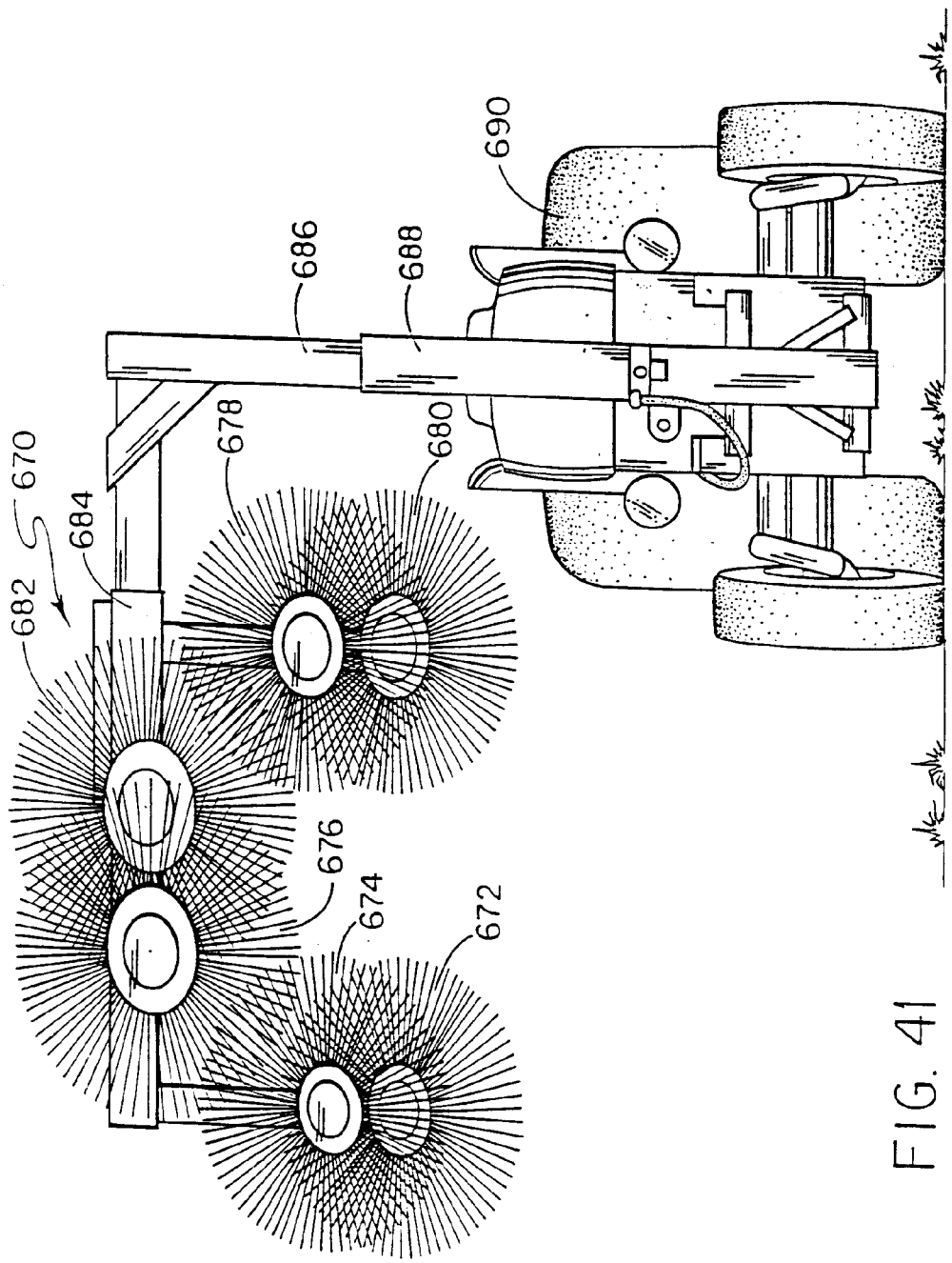
FIG. 41 is a front view illustration of a single trellis shoot positioner.

As shown in FIG. 41 of the drawings, a single trellis shoot positioner such as a single curtain or bilateral cordon shoot positioner (Slawson-Meade) is generally designated by the reference numeral 690 and shown to include a plurality of selectively positioned motor driven brush units 691–696 supported from a horizontal member 697 extending from a vertical member 698 of a mast 699 attached to the front of a tractor 689. Such a single trellis shoot positioner is used to mechanically shoot position the vines to place the canes in proper position for the winter mechanical pruning operation. Shoot positioning is an effective method of improving fruit quality and of exposing the lower node to sunlight to make the basal nodes more productive than under shady conditions.

Shoot positioning has proven particularly effective with large vigorous vines on GDC which have a drooping-shoot growth habit. Also, as soon as the tendrils touch the wire or another cane, they fasten very quickly. Therefore, vines are usually first shoot position just before bloom. Shoot positioning may require a second pass with the mechanical shoot positioner.

Figure 42:
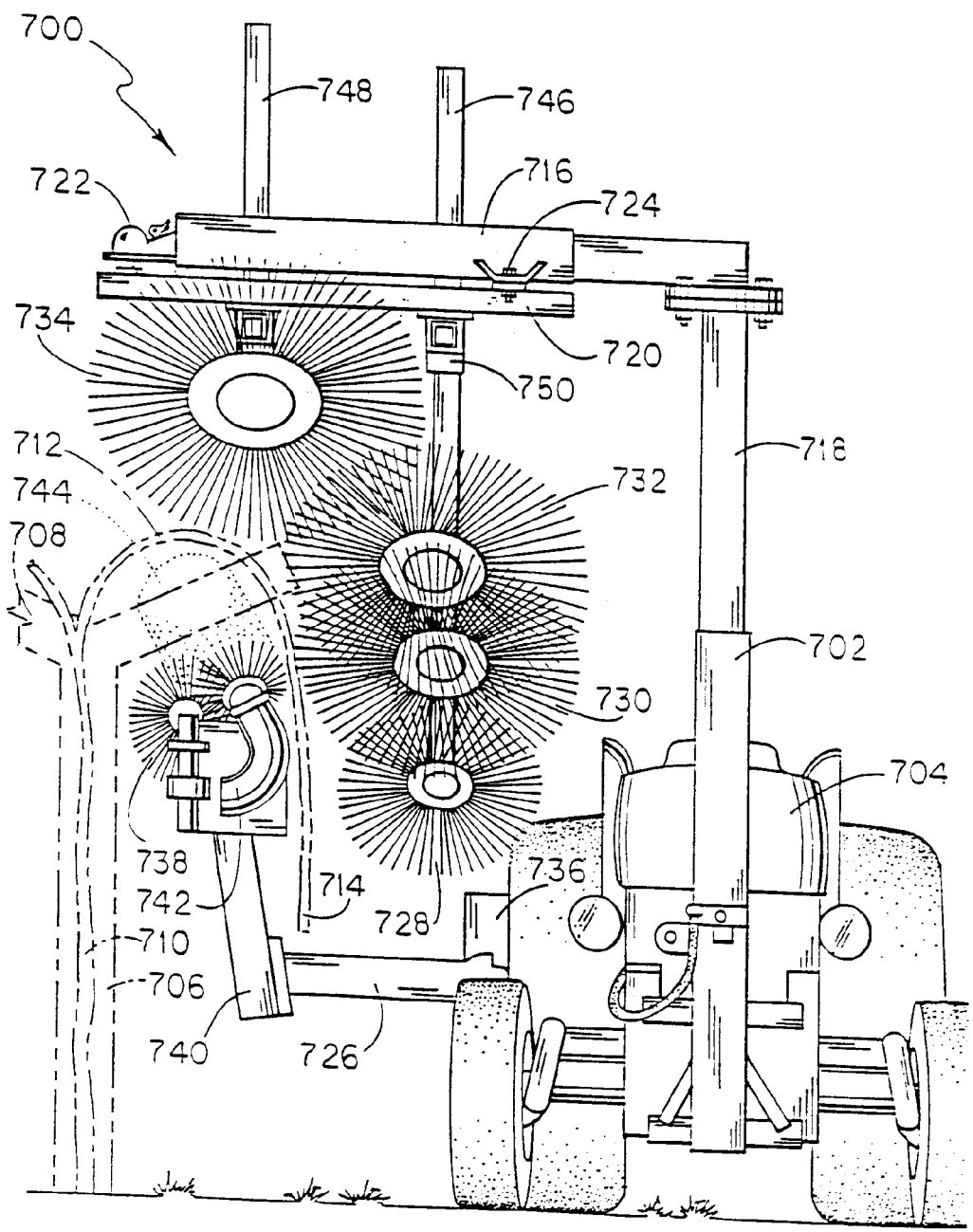
FIG. 42 is a front view representation of a divided canopy comber as described in U.S. Pat. No. 5,101,618 issued to Tommy Oldridge.

For the GDC system, all vigorous shoots growing between the two cordon wires must be pulled or brushed down in order to maintain two separate foliage canopies. This can be accomplished with the Oldridge shoot positioner of FIGS. 42, 42A, 43, and 43A and middle breaker of FIGS. 48 and 49. With particular reference to FIG. 42 of the drawings, a grape vine comber and shoot positioner adapted for use with a divided canopy is generally designated by the reference numeral 700 and is shown and described in U.S. Pat. No. 5,101,618 issued to Tommy L. Oldridge on Apr. 7, 1992 and hereby incorporated by reference. The grapevine comber or combing unit 700 is operatively attached to a mast 702 on the front of a tractor 704 and is adapted for use with a divided canopy vine system including a series of upright members 706 with cross-member 708 in a "T" or "Y" configuration. Vine trunks 710 extend vertically past a central wire to roof portions 712 which extend out to a cordon supported by a cordon wire near the extremity of cross-member 708. Extending downwardly from the cordons are fruiting canes 714.

The grapevine combing unit and shoot positioner 700 is releasably mounted to a horizontal member 716 which is attached to the top of a vertical mast member 718 of mast 702. Comber unit 700 includes a horizontal support member 720 releasably attached to horizontal mast member 716 by a ball hitch 722 and a bracket assembly 724. The comber unit 700 includes a U-shaped underslung frame 726 mounted to horizontal member 720 so that the vine canes 714 can hang down within the U-shaped frame 726. A plurality of brushes 728, 730, 732, and 734 are supported on the tractor side of an upright 736 of frame 726 and are operated against a plurality of brushes 738 mounted on a vine side upright 740 to comb the canes 714 hanging downwardly from the cordon and cordon wire. Brush 734 is a primary brush which grooms the roof portion 712 of the vine. However, primary brush 734 cannot effectively accomplish its purpose without a counterforce being exerted from the underside of the roof portion 24 by a pivoting counterforce brush assembly 742 including an elongate brush 744 which is urged upwardly against the lower surface of the roof portion of the canopy. As described in U.S. Pat. No. 5,101,618, the brush 744 remains free to rotate downwardly about a spindle in response to contact of the brush with the canopy, cross-members 708, or other immovable objects.

In accordance with a particular example, the U-shaped frame 726 and in particular the tractor side upright 736 is attached to vertical support members 746 and 748 received in respective mounting bracket 750 attached to horizontal support member 720. Adjustment of the vertical support members 746 and 748 in their respect bracket 750 provides for raising and lowering of the brushes with respect to the divided canopy system and vines. Further, the vertical position of the frame and brushes can be adjusted by raising and lowering the vertical member 718 of mast 702 by, for example, extending or contracting a hydraulic cylinder located within vertical member 718. Likewise, the comber unit 700 can be adjusted horizontally with respect to the tractor 704 by moving horizontal mast member 716 by, for example, extending or contracting the hydraulic cylinder located within mast member 716.

Figure 42A:
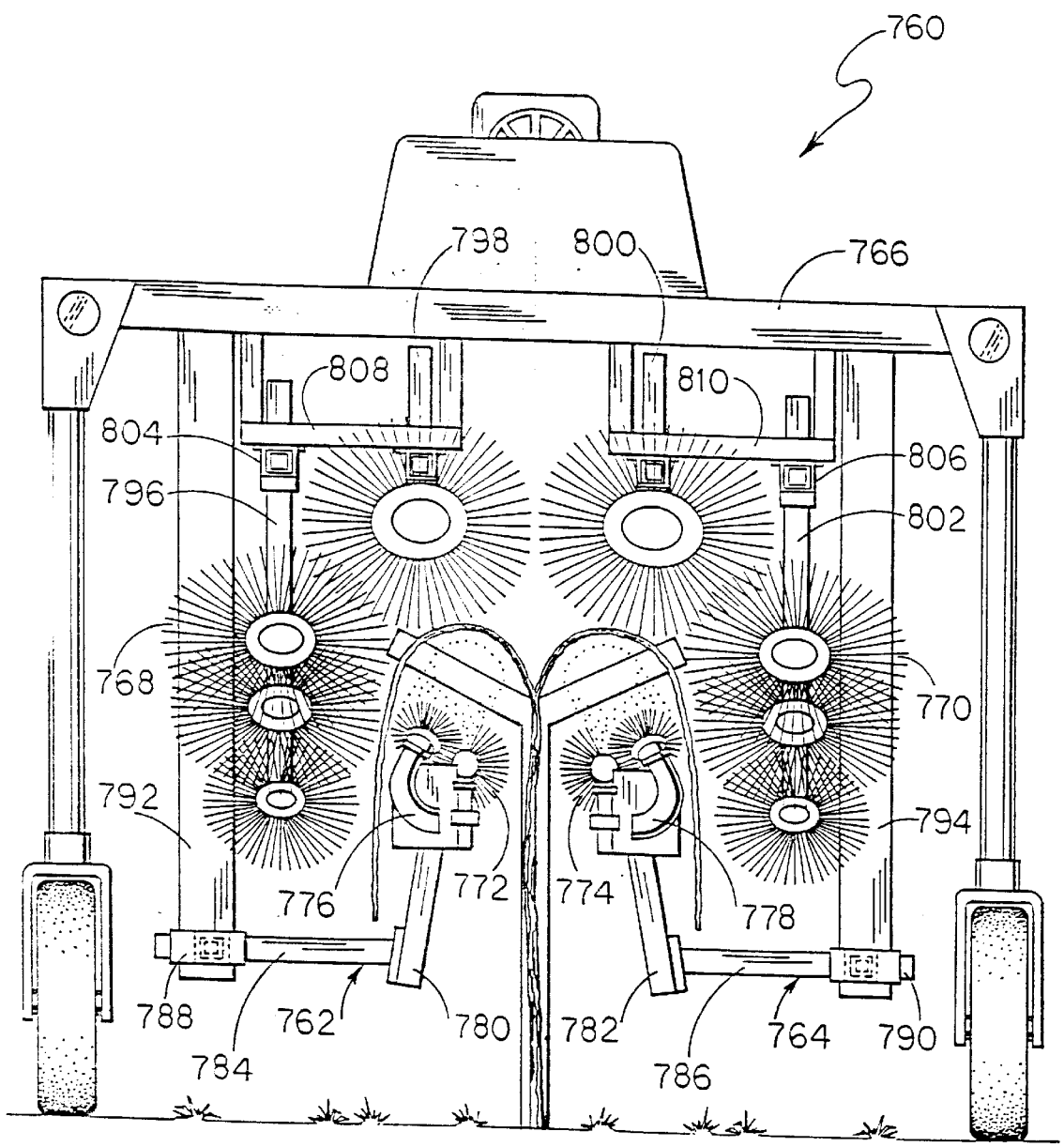
FIG. 42A is a front view representation of a GDC full-row comber incorporating operative elements as described in U.S. Pat. No. 5,101,618 issued to Tommy Oldridge.

Like the Oldridge vine comber 700 of FIG. 42, the vine comber and shoot positioner 760 of FIG. 42A is adapted to shoot position and vine comb both halves of a GDC system and incorporates both right and left vine combers or shoot positioner units 762 and 764 suspended from a power driven harvester chassis or modified high clearance type 4-wheeled tractor 766. Each of the combers or shoot positioning units 760 and 762 is of substantially identical construction to the comber 700 of FIG. 42 except that the comber unit 762 is a mirror image of the unit 764. The comber or shoot positioner 760 of FIG. 42A is adapted to treat both halves of the GDC or divided canopy system with a single pass of the machine along the row or vines. The comber 700 of FIG. 42 is adapted to treat one-half of the GDC system and as such requires two passes, one down each side of the GDC, or divided canopy system, to treat the entire row.

The comber units 762 and 764 of machine 760 each include a plurality of outer brushes 768 and 770, inner brushes 772 and 774, and pivoting counterforce brush assemblies 776 and 778. The inner brushes and pivoting counterforce brush assemblies 772 and 776 of unit 762, and 774 and 778 of unit 764 are supported on respective vertical members 780 and 782 which extend from respective horizontal members 784 and 786 which are received in brackets or channels 788 and 790. The brackets 788 and 790 are adjustably mounted to respective vertical support members 792 and 794 which allow for vertical adjustment of the inner brushes and counterforce brushes relative to the GDC system and vines.

Further, the outer brushes 768 and 770 of units 762 and 764 are supported on respective vertical support members 796, 798, 800, and 802 which are received in respective brackets 804 and 806 attached to horizontal support members 808 and 810. Hence, the position of the outer brushes 768 and 770 can be adjusted by adjusting the position of the vertical support members in their respective brackets.

Figure 43:
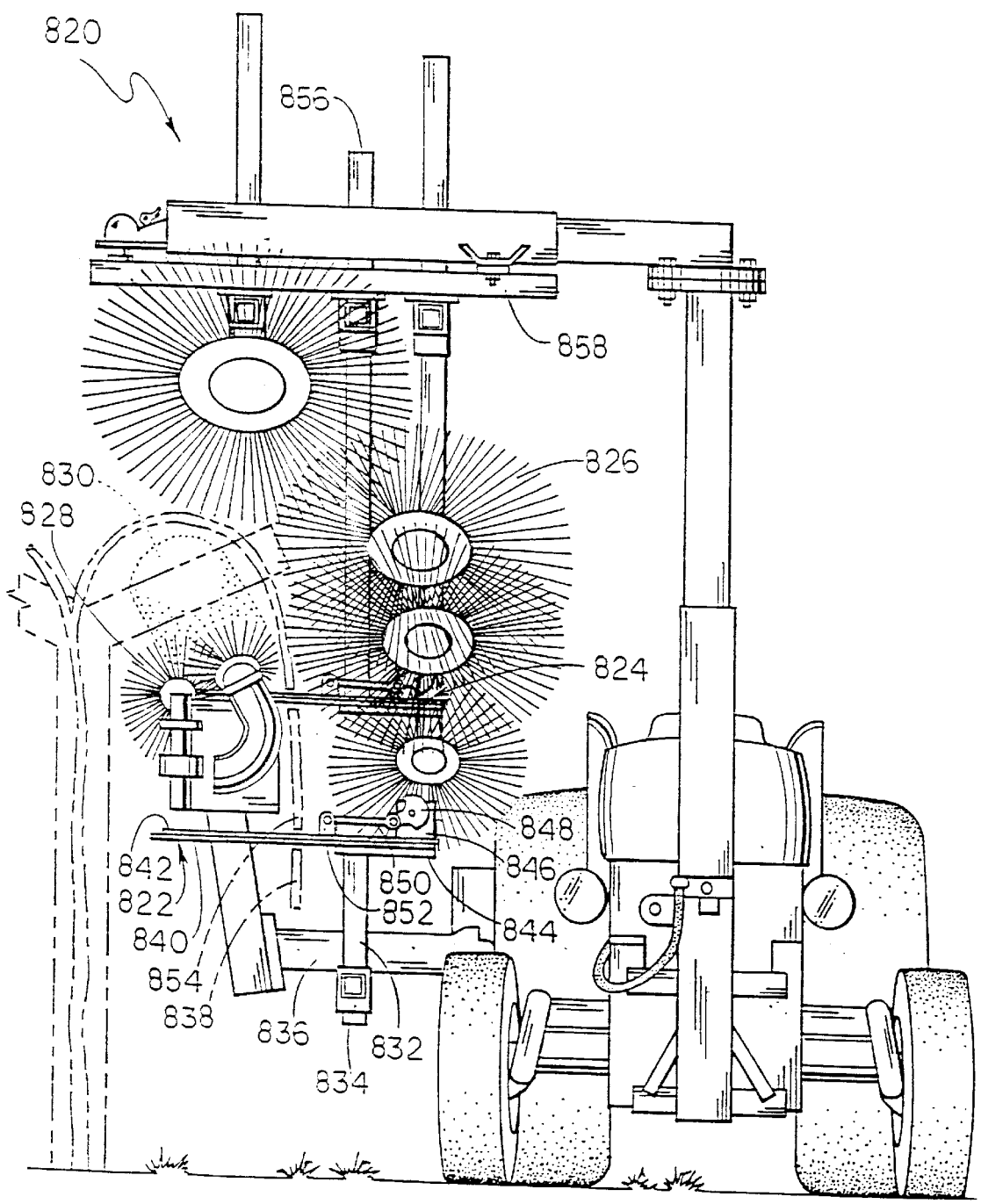
FIG. 43 is a front view representation of a GDC half-row shoot positioner and pruner trimmer which is similar to the comber described in U.S. Pat. No. 5,101,618 issued to Tommy Oldridge (FIG. 42) with the addition of cutting sickles.

Simultaneous vine combing, shoot positioning, and pruning is accomplished using the comber, (positioner), pruner, and trimmer or positioning and pruning unit 820 of FIG. 43. The unit 820 is identical in construction to the comber and positioner unit 700 of FIG. 42 with the exception of the addition of first and second horizontal sickles or cutter bars 822 and 824. The comber and pruner 820 includes a plurality of outer brushes 826, inner brushes 828, and counterforce brush 830. First or lower horizontal sickle or cutter 822 is mounted atop a vertical support member 832 received in a bracket 834 attached to horizontal frame member 836. Lower sickle 822 is mounted near the front of the unit 820 and in front of at least the lower exterior brushes 826 to cut off and prune or trim any lower ends of canes or shoots extending below sickle 822 and to facilitate the movement of the unit along the vine without having canes wrap around the lower frame members.

Lower sickle 822 includes a lower fixed sickle blade 840, an upper movable sickle blade 842, a support plate 844, a motor support plate 846, a counterweighted drive disk 848, a drive rod 850, and a drive bracket 852 attached to upper blade 842. A motor, for example, a hydraulic motor, is attached to the rear surface of motor plate 846 and in position to drive disk 848.

Upper sickle 824 of unit 820 is located above lower sickle 822 and behind brushes 826, 828, and 830 in a position to prune, cut, or trim depending vine sections 854 of vines which have been positioned, combed, and the like by the brushes 826, 828, and 830. Upper sickle 824 is identical in construction to lower sickle 822 and is supported from a vertical support member 856 received in a bracket attached to a horizontal support member 858. The position of each of the upper and lower sickles 824 and 822 can be adjusted by adjusting the relative positions of their support members 856 and 832.

Figure 43A:
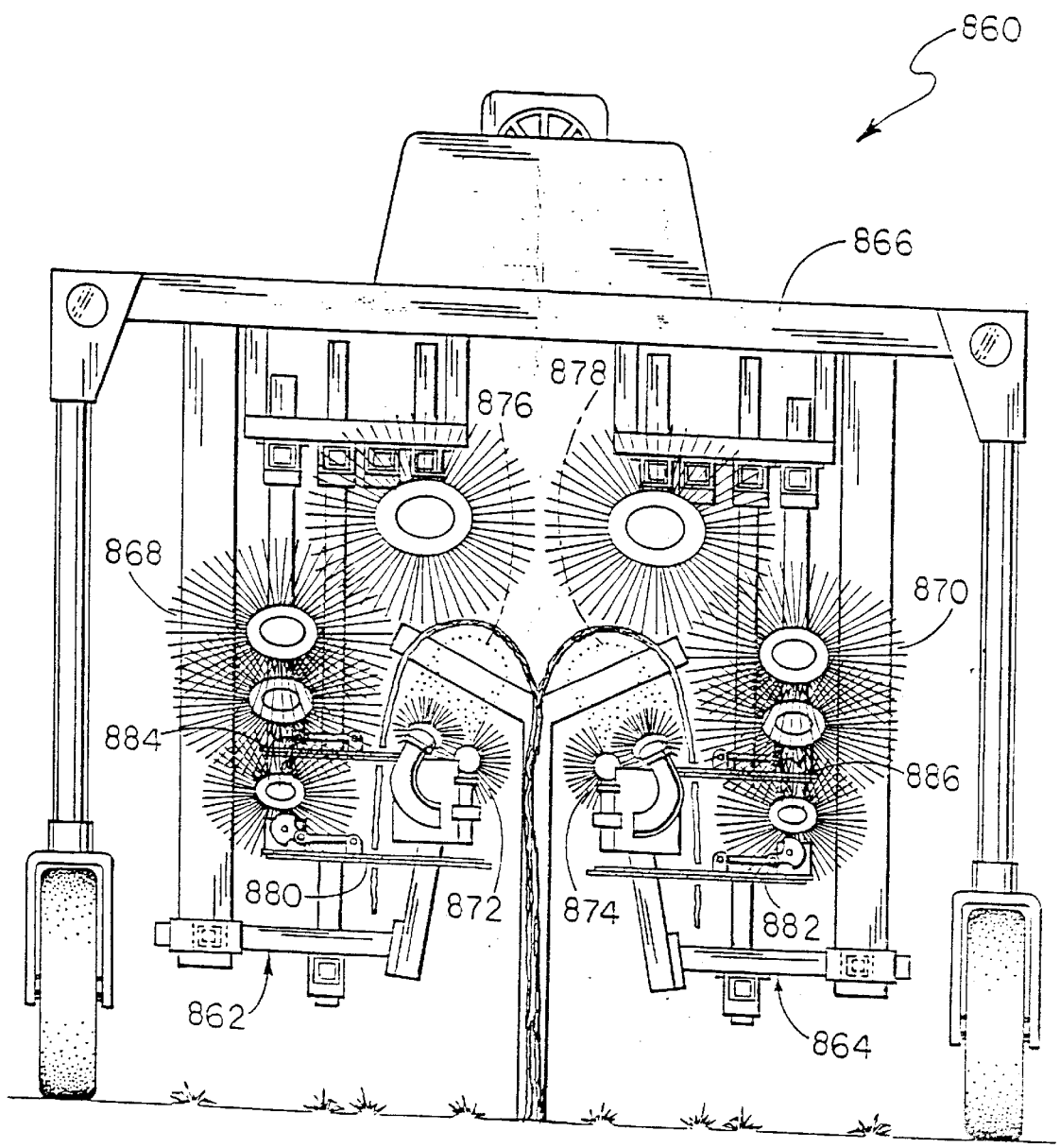
FIG. 43A is a front view representation of a GDC full-row shoot positioner and pruner trimmer which combines two sets of the working elements of the shoot positioner and pruner trimmer shown in FIG. 43.
Figure 44:
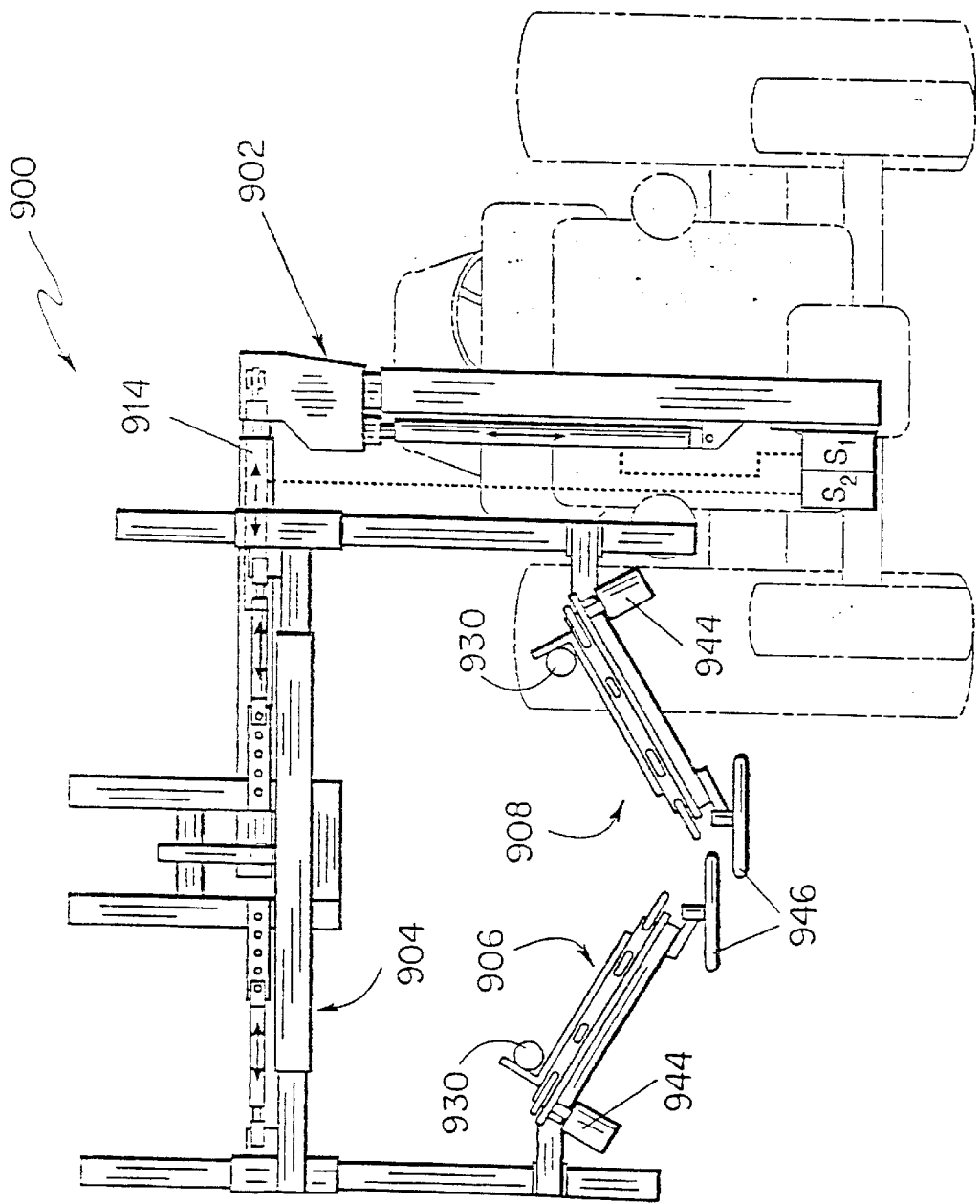
FIGS. 44–47 are directed to the single curtain trellis pruner of U.S. Pat. No. 5,544,444 issued to Tommy Oldridge and relate to FIGS. 2, 4, 6, and 8 of that patent, respectively.

With reference to FIG. 43A of the drawings, a vine comber, shoot positioner, pruner and trimmer machine, or device generally designated 860 includes right and left comber, positioner, pruner, and trimmer units 862 and 864 extending downwardly from a modified high clearance 4-wheeled tractor or harvester chassis 866. The units 862 and 864 are identical in construction to the comber and pruner 820 of FIG. 43 except that the unit 862 is a mirror image of the unit 864 and the frame members and vertical support members are similar to those of the comber machine 760 of FIG. 42A. Like the comber and pruner unit 820 of FIG. 43, each of the comber and pruner units 862 and 864 of the machine 860 include outer brushes 868 and 870, inner brushes 872 and 874, counterforce brushes 876 and 878, first lower forward horizontal sickles 880 and 882, and second upper rear horizontal sickles 884 and 886.

The comber and pruner unit 820 of FIG. 43 is adapted to treat one-half of a GDC or other divided canopy trellising system while the comber and pruner machine 860 of FIG. 43A is adapted to treat both halves of a GDC or other divided canopy system simultaneously and with a single pass down along a row or vine.

The combing, shoot positioning, pruning, and trimming apparatus of FIGS. 42, 42A, 43, and 43A of the drawings, are particularly suited for use with GDC and other divided canopy trellises and training systems, especially those with downward or drooping growth and fruiting zones.

As shown in FIGS. 44–47, a single curtain vine cane pruner is generally designated 900 and is identical to that shown and described in U.S. Pat. No. 5,544,444, issued to Tommy L. Oldridge on Aug. 13, 1996 and hereby incorporated by reference. More particularly, FIGS. 44–47 each relate respectively to FIGS. 2, 4, 6, and 8 of U.S. Pat. No. 5,544,444. As described in U.S. Pat. No. 5,544,444, the vine cane pruner 900 includes a main support structure or mast 902, a suspension carriage 904, vertical cane pruners 906 and 908, and horizontal cane pruners 910 and 912. As shown, the machine 900 is mounted on the mast 902 which is attached to the front of a tractor and has a horizontal member 914 which extends laterally to the tractor and over the single curtain system. The suspension carriage 904 supports each of the vertical cane pruners 906 and 908 on opposite sides of and on the front end of the carriage and supports each of the horizontal cane pruners 910 and 912 on opposite sides of the carriage and rearwardly of the vertical cane pruners. Thus, as the vehicle travels along the single curtain trellis system, the trellis and vine first pass between the vertical cane pruners 906 and 908 and then between the horizontal cane pruners 910 and 912.

Each of the vertical cane pruners 906 and 908 include a housing 920, a substantially planar reciprocating hedger, sickle, or cutter 922 mounted on the housing with cutting teeth 924 extending forwardly from a cane inlet end 926 to a cane outlet end 928. A cutter drive motor 930 is connected to a suitable linkage 932 for driving the sliding tooth plate of the hedger 922 in relation to the fixed tooth plate.

Further, each of the vertical cane pruners 906 and 908 include a vertical cane gathering device 934 including a plurality of prongs 936 attached to fittings 938 which are themselves attached to a chain 940. The chain 940 is driven by a drive sprocket 942 operatively attached to a drive motor 944. In accordance with one example, prongs 936 are made of lengths of ⅜ inch rubber hose and are of sufficient length to extend approximately 4 to 12 inches beyond the cutter 922. The chain or spine 940 is driven in a counterclockwise direction so as to move the prongs from the inlet end 926 to the outlet end 928 of hedger 922. Also, each of the vertical cane pruners 906 and 908 include a horizontal disk or bumper 946.

Figure 45:
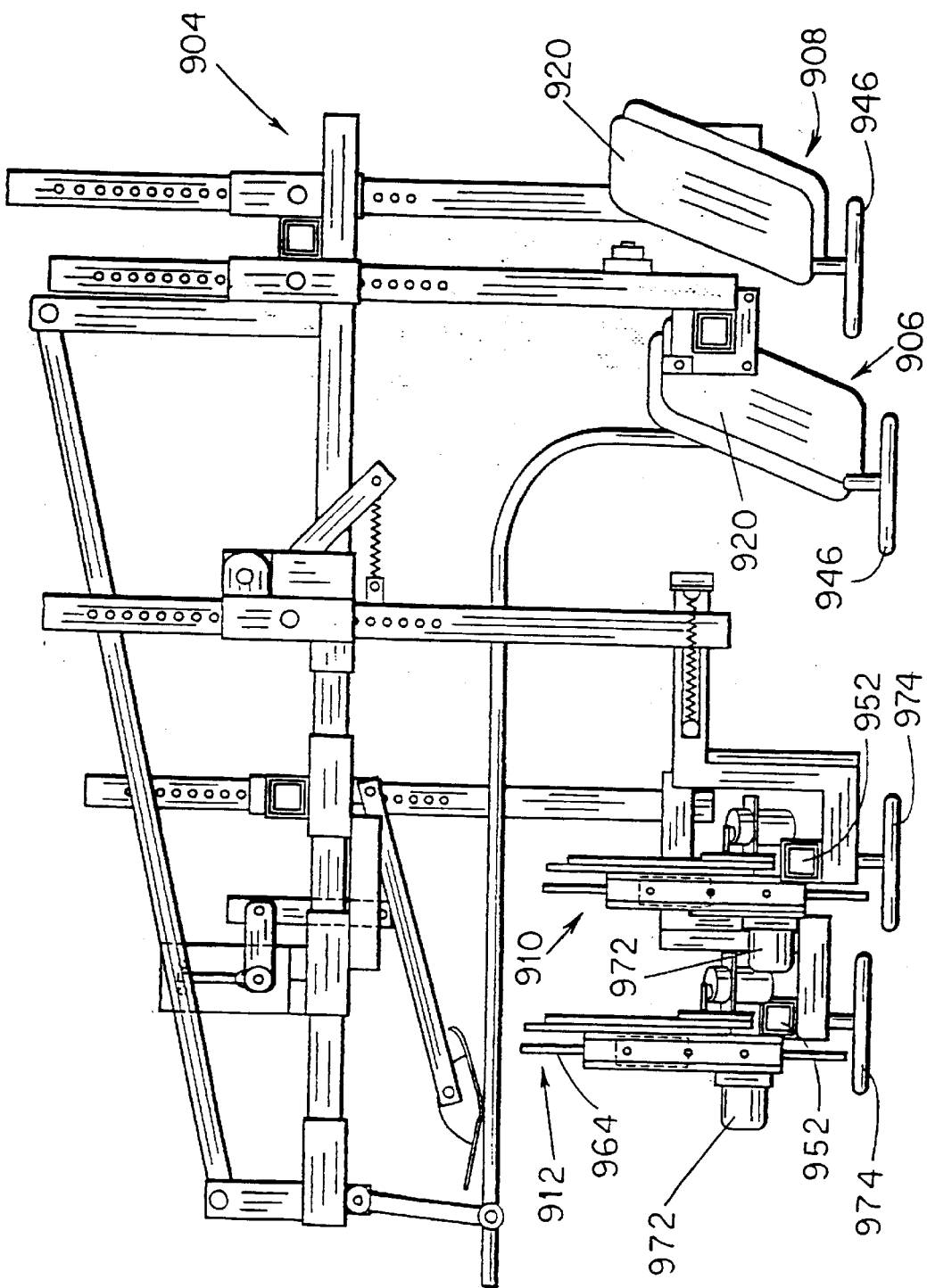
Figure 46:
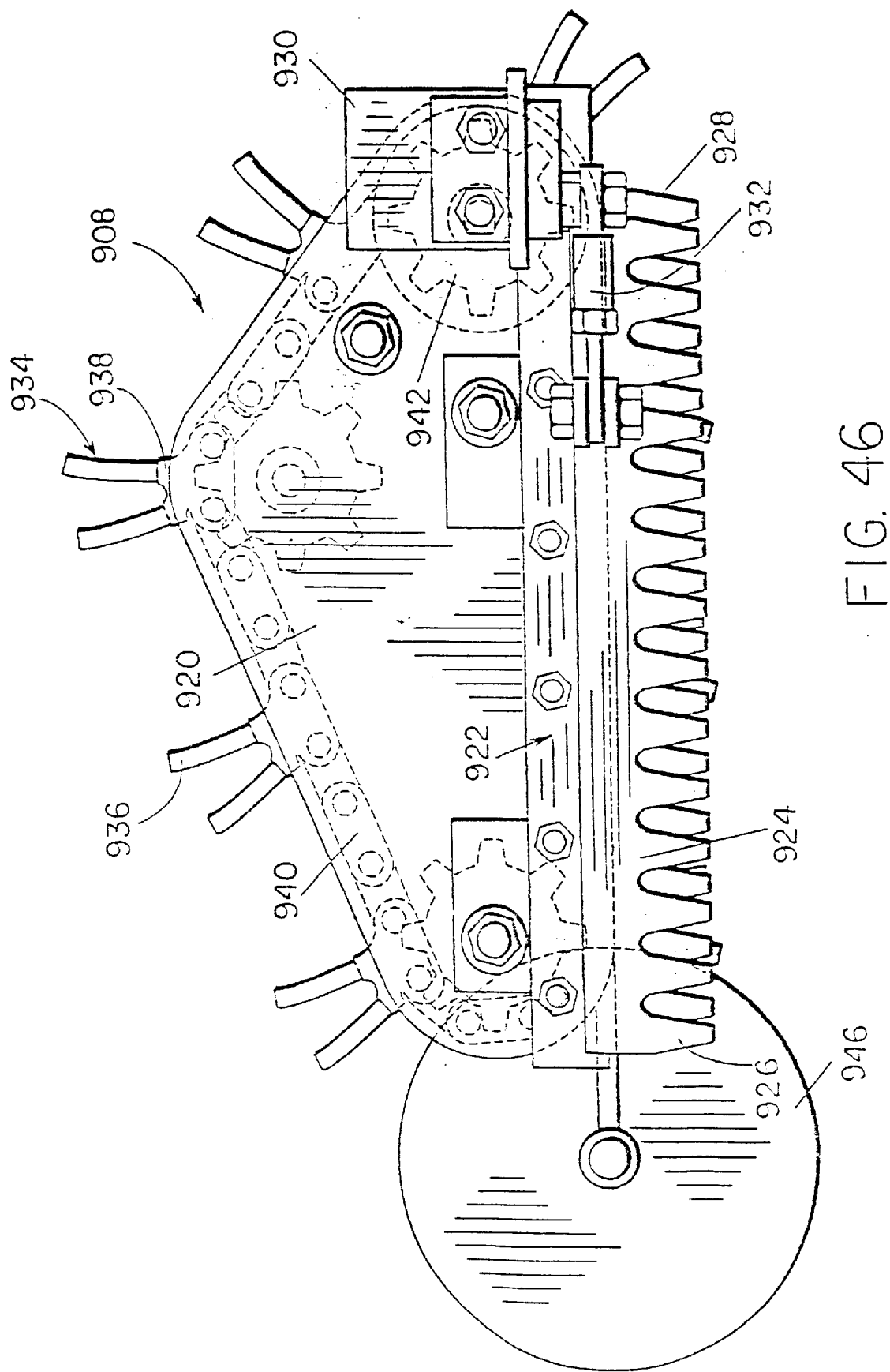
Figure 47:
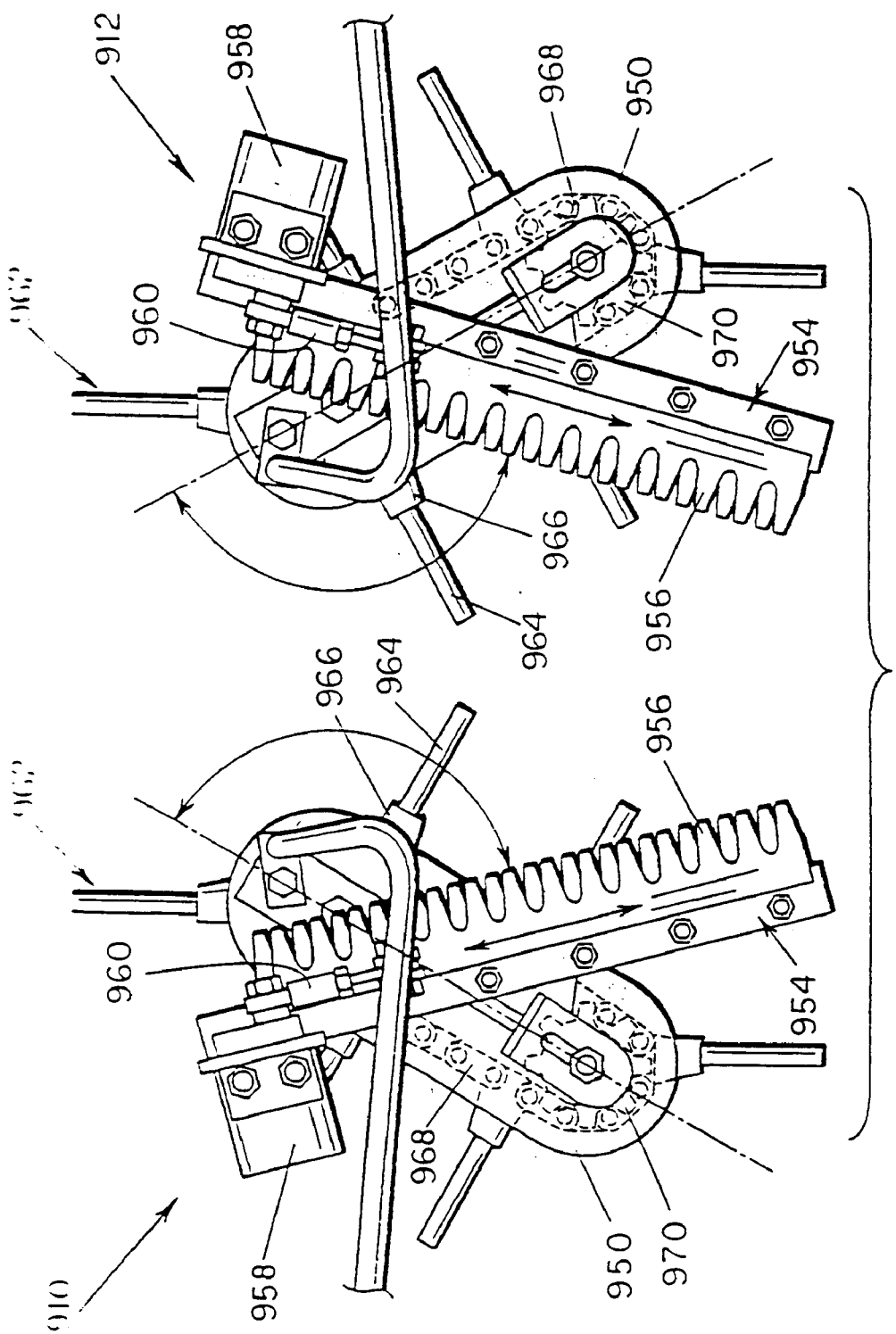

With respect to FIGS. 45 and 47 of the drawings, each of the horizontal cane pruners 910 and 912 of the pruning machine 900 includes a housing 950 mounted on an arm 952. Each horizontal cane pruner includes a substantially planar reciprocating hedger, pruner, sickle, or cutter 954 mounted on housing 950 with cutting teeth 956 facing substantially inwardly in relation to the pruning machine. A cutter drive motor 958 is connected by a suitable linkage 960 for driving one or both of the sliding tooth plates of the hedger 954.

Further, each of the horizontal cane pruners 910 and 912 includes a cane grabber or feeder 962 having a plurality of prongs 964 extending from fittings 966 attached to a chain 968 driven by a drive sprocket 970 operatively attached to a motor 972. The chain 968 of horizontal cane pruner 910 is driven clockwise while the chain 968 of horizontal cane pruner 912 is driven counterclockwise so that the prongs 964 of each cane grabber 962 travel downwardly on the vine side of the respective housings 950. Lastly, each of the horizontal cane pruners 910 and 912 include a horizontal disk or bumper 974 which are adapted to come into contact with obstacles and cause the horizontal cane pruners to rotate on their pivot points to clear the obstacles and then return under spring bias to the operating position.

As shown in FIGS. 48 and 49 of the drawings and in accordance with another aspect of the present invention, an Oldridge center breaker generally designated 980 is shown to include a plurality of vertically depending breaker bars or rods 982, 984, 986, and 988 each having an elongate downwardly extending portion and a forwardly bent portion at the lower end thereof. The breaker bars 982–988 are adapted for clearing out the center of the top of a GDC, Y, U, or other double curtain trellising system in order to open up the center, prepare the vine for shoot positioning and pruning, facilitate harvesting, and the like. The breaker bars 982–988 are adapted to be dragged along the row to reposition movable items such as canes, shoots, foliage, and the like, to partially remove, break, or clear away canes, foliage, shoots, and the like, while tripping rearwardly and passing over immovable objects such as trellises, vine trunks, catch wire stakes, wires, and the like. Further, the breaker bars 982–988 open up the center and break or position shoots to allow air and light into the center of the divided canopy system.

Also in accordance with the present invention, the center breaker 980 can be used in combination with, for example, spraying equipment to accomplish a plurality of activities while driving the tractor down along the row. Also, although four breaker bars are shown in use in FIGS. 48 and 49, it is to be understood that one to four breaker bars may be utilized simply by removing or adding breaker bars to the device. Also, additional breaker bars could be added for clearing, positioning, and breaking out the center on a larger trellising system.

In accordance with the embodiment shown in FIGS. 48 and 49 of the drawings, each of the breaker bars 982–988 is supported in a releasable bracket 990 having one or more set screws 992 which hold the breaker bar 982 in position relative to the bracket. Depending on the vine being treated, the breaker bar can be raised or lowered simply by loosening the set screws 992, positioning the bar to the selected position, and tightening the set screws. Each of the brackets 990 is supported on an arcuate lever 994 which is pivotally attached to a support bracket 996 by a bolt 998. Thus, each of the breaker bars 982 pivots in an arc about the pivot point 998. Attached near the base of each of the levers 994 is one end of a coil spring 1000 having the other end thereof fixed to the lower end of a vertical support member 1002.

Each of the brackets 996 and support members 1002 are connected to a rearwardly extending horizontal support member 1004. Each of the support members 1004 is received in an adjustment bracket 1006 which allows for adjustment in the position of the support relative to a cross member 1008. The cross member 1008 is attached to a forwardly extending support assembly 1010 adapted to be attached to a horizontal member 1012 of a mast 1014 on a tractor 1016 via a ball hitch 1018 and nut and bracket assemblies 1020.

With particular reference to FIGS. 48 and 49 of the drawings, breaker bars 982, 984, 986, and 988 of breaker device 980 are adapted to trip rearwardly upon contact with solid structures such as trellis support arms 1022 and 1024 and vine trunks 1026. The amount of center breaking, shoot positioning, shoot breaking, foliage removal, and the like by device 980 can be adjusted or controlled by selecting the length of the breaker bars, the strength of the trip springs 1000, the number and rigidity of breaker bars, the ground speed of the tractor, and the like. In accordance with a particular example, each of the breaker bars 982–988 is made of a length of 2–6 ft., preferably 4 ft., of steel or aluminum pipe, tubing, rod, or the like having an outer diameter of from ½ inch to 4 inches, preferably 1–2 inches.

Figure 50:
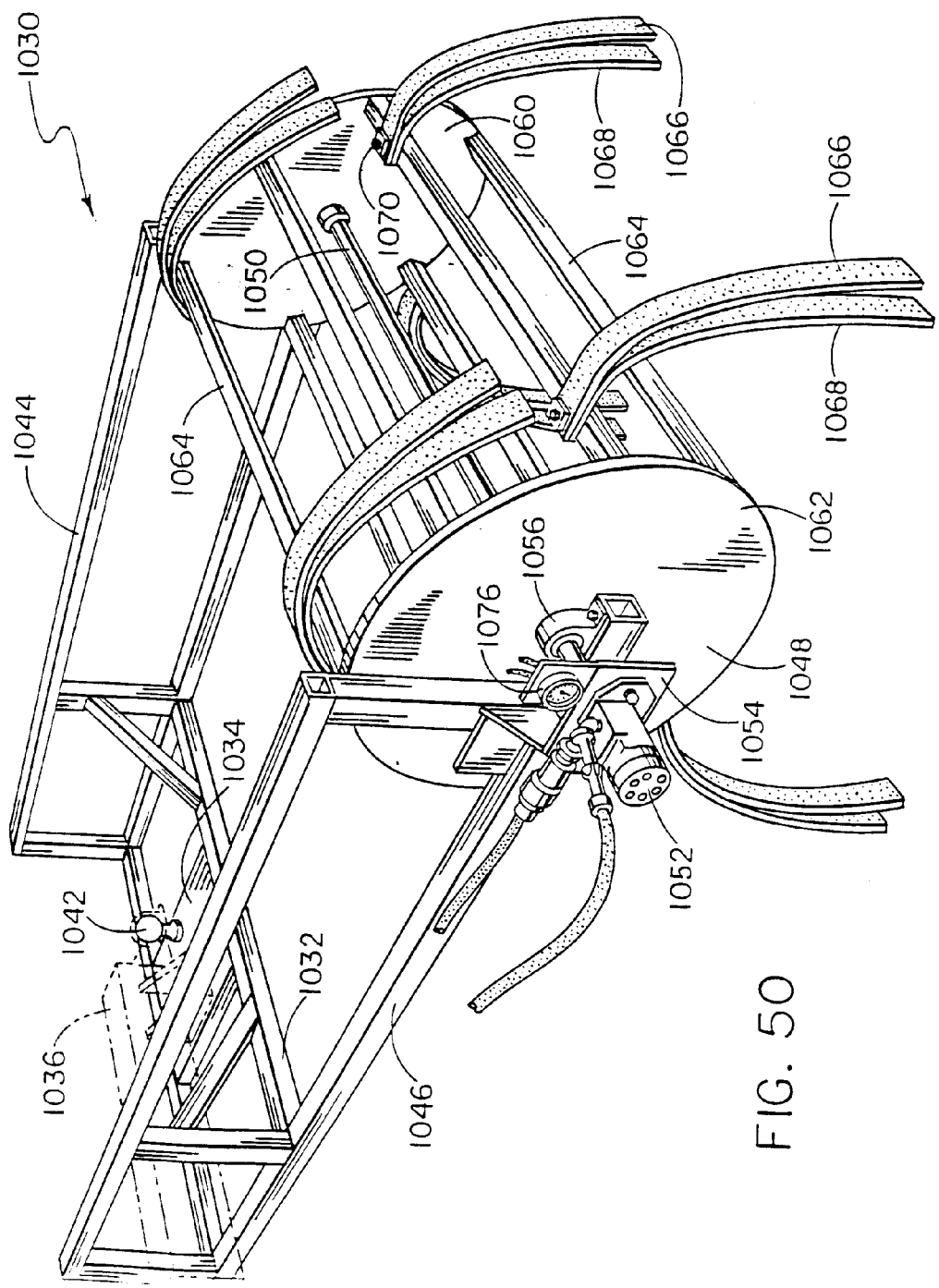
FIG. 50 is a perspective view illustration of a modified Orton slapper adapted for use with GDC and other divided canopy trellising systems. This unit is a modification of a unit built by Roy Orton (grape grower, Ripley, N.Y.).
Figure 51:
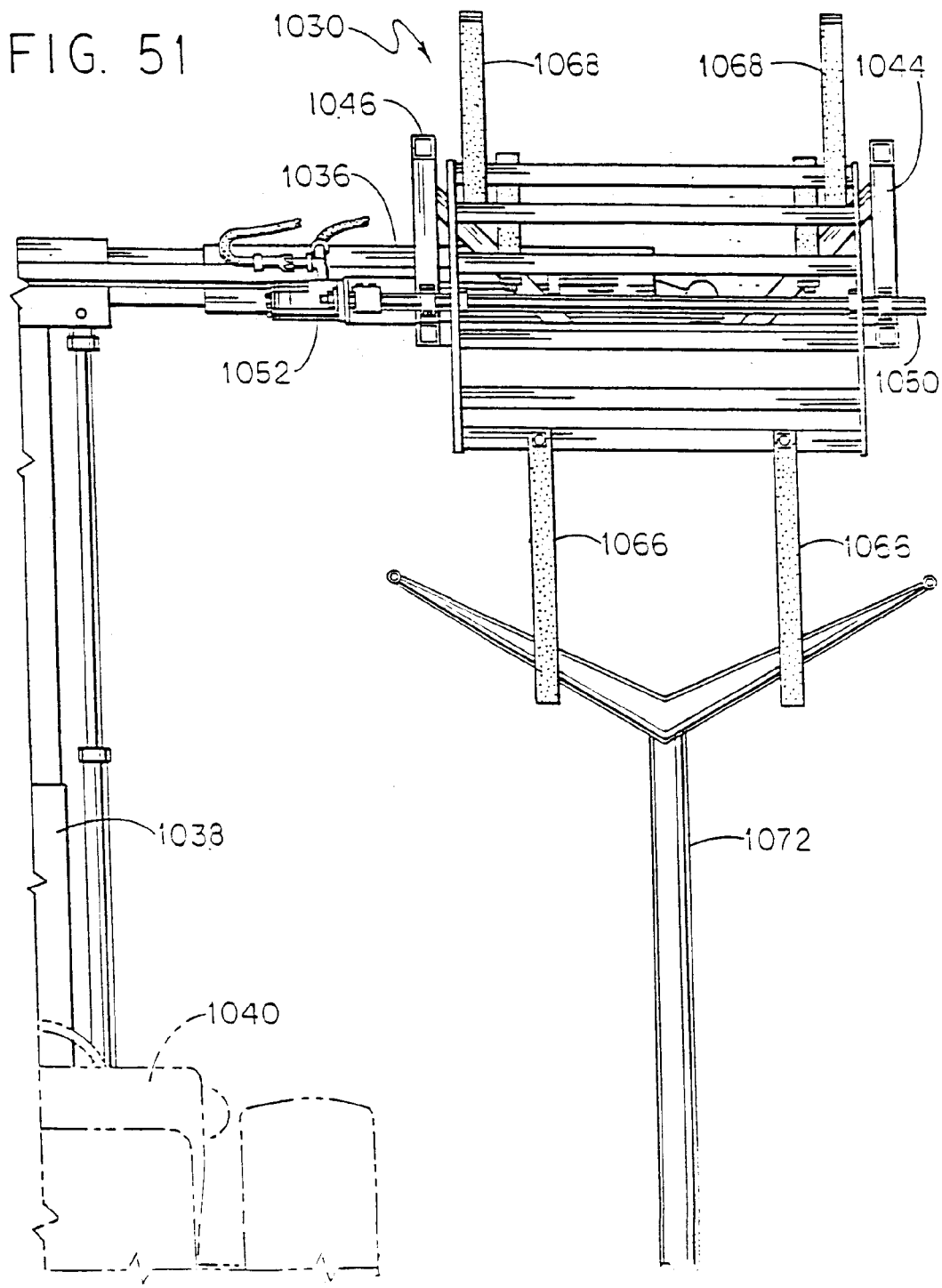
FIG. 51 is a rear view representation of the modified, extended strikers on the modified Orton slapper of FIG. 50 in operation with a GDC-trellis.
Figure 52:
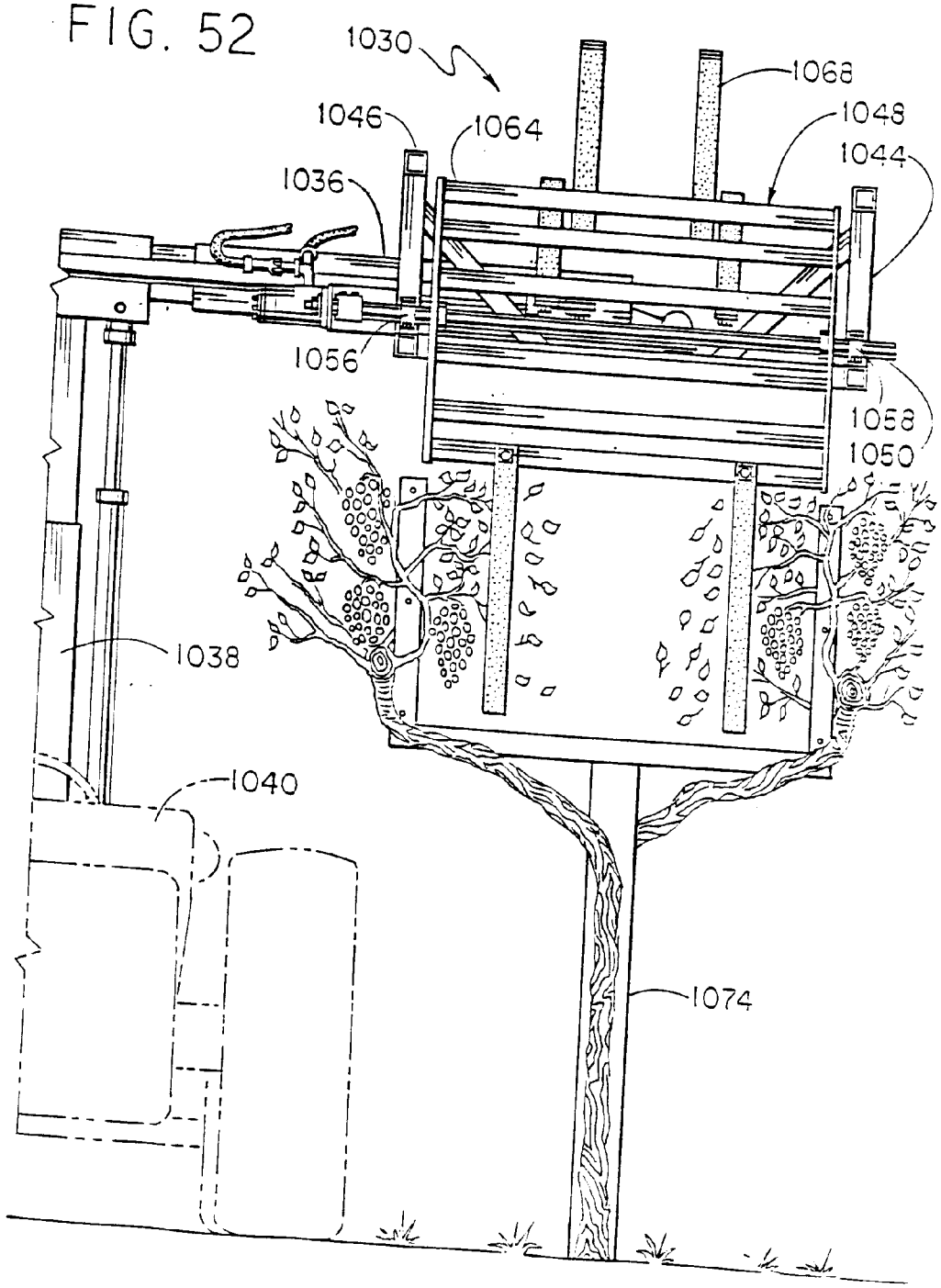
FIG. 52 is a rear view illustration of the modified Orton slapper of FIG. 50 with extended strikers in use with a Lyre or "U" trellis system.

As shown in FIGS. 50–52 of the drawings, a modified Orton slapper generally designated 1030 is adapted for use with GDC and other divided canopy trellising systems and is designed to clean out the center of the trellis removing shoots, foliage, fruit, and the like from the interior of the trellis to open up the center of the trellis to light, air, and the like. The modified slapper 1030 includes a support frame 1032 having a support platform 1034 adapted to be releasably attached to a horizontal member 1036 of a mast 1038 attached to a tractor 1040 via a ball hitch 1042 and bolt and bracket assemblies. The slapper support frame 1032 includes right and left side assemblies 1044 and 1046 which serve as a yoke for supporting a rotary slapper unit 1048 on a drive shaft 1050 extending from a motor 1052 attached to a motor support plate 1054 attached to left side frame assembly 1046. The drive shaft 1050 is supported by respective shaft journal bearings 1056 and 1058. Each of the shaft journals 1056 and 1058 is attached to a respective side assembly 1046 and 1044.

The rotary slapper unit 1048 of modified slapper 1030 includes large right and left circular support plates 1060 and 1062 each attached to shaft 1050 to rotate therewith and support therebetween a plurality of cross members 1064 which serve as not only structural support members between the plates 1060 and 1062 but also as attachment elements for extended striker straps or striker pairs 1066 and 1068. Each of the striker straps or striker pairs 1066 and 1068 is releasably attached to a respective cross member 1064 by a bolt assembly 1070. The number and location of the striker straps or striker pairs 1066 and 1068 is selected to provide the desired clearing and removal of foliage, shoots, and the like from the center of the trellis. Successful operation of this unit is influenced by the size of the trellis, the condition of the vine, the ground speed of the tractor, and the like.

It is preferred to form each of the striker straps or striker pairs 1066 and 1068 of a flexible yet sturdy material such as leather or rubber, pieces having a width of one to four inches, preferably two inches, a thickness of at least ¼ inch, preferably ½ inch, and a length of from 1 to 3 feet, preferably 18 to 24 inches. In accordance with one example of the present invention, each of the slapper or striker straps is about 2 inches in width by 18 inches in length and formed of rubber belting material, the modified slapper has 4 to 6 slappers or slapper pairs, the circular support plates have a diameter of about 20 inches, the circular plates are supported by 6 cross members, and the overall width and length of the modified slapper are 32 inches by about 56 inches.

As shown in FIGS. 50–51 of the drawings, there are six striker pairs 1066 and 1068 attached to support members 1064 in sets of two pairs at an angular spacing of 120° between sets. It is to be understood that singular striker straps 1066 or 1068 may be attached in such an arrangement, that additional sets of strikers or striker pairs may be added, or that fewer sets of strikers or striker pairs may be used to accomplish the desired clearing and cleaning out of the center or interior of the trellis. FIGS. 51 and 52 show the modified slapper 1030 in use with a GDC and Lyre or "U" trellis, respectively.

With reference to FIG. 50 of the drawings, in accordance with another aspect of the present invention, a speed gauge 1076 may be added to the modified slapper 1030 to provide the tractor operator with an indication of the speed of rotation of the rotary unit 1048 so that a desired removal can be reproduced from row to row by selecting a speed of rotation of the rotary slapper unit 1048, selection and arrangement of striker slapper or striker pairs, ground speed of tractor, and the like.

As shown in FIG. 53 of the drawings, a bow, bow-head, or Quad-rod fruit thinner is generally designated 1080 and adapted for use with a single curtain system. The bow-head or Quad-rod fruit thinner 1080 is attached to a horizontal member 1082 of a mast 1084 attached to a tractor 1086. The bow or Quad-rod fruit thinner includes right and left bow-rod support and drive assemblies extending downwardly from a horizontal support member 1092. Each of the side assemblies 1088 and 1090 supports four bow-rods 1094 with the bow-rods of the left side assembly offset slightly lower than the bow-rods of the right side assembly. The bow-head or Quad-rod fruit thinner includes a drive motor 1096 which drives an output shaft 1098 which provides reciprocatory drive to the bow-rods of the right side assembly via a rotary to reciprocating converter 1100. Drive is transferred from shaft 1098 to a second shaft 1104 via a drive belt 1102 and from second shaft 1104 to a rotary to reciprocatory converter 1106 to drive the bow-rods of the left side assembly.

Bow-head or Quad-rod fruit thinner 1080 may include a speed gauge 1108 which provides an indication to the tractor operator of the speed of rotation of the shafts 1098 and 1104 and the speed of reciprocation or operation of the bow-rods 1094. One can adjust the amount of fruit thinning by adjusting the speed of operation of the bow-rods, the number of bow-rods, the angle or inclination of the bow-rods, the rigidity of the bow-rods, the ground speed of the tractor, and the like.

Figure 55:
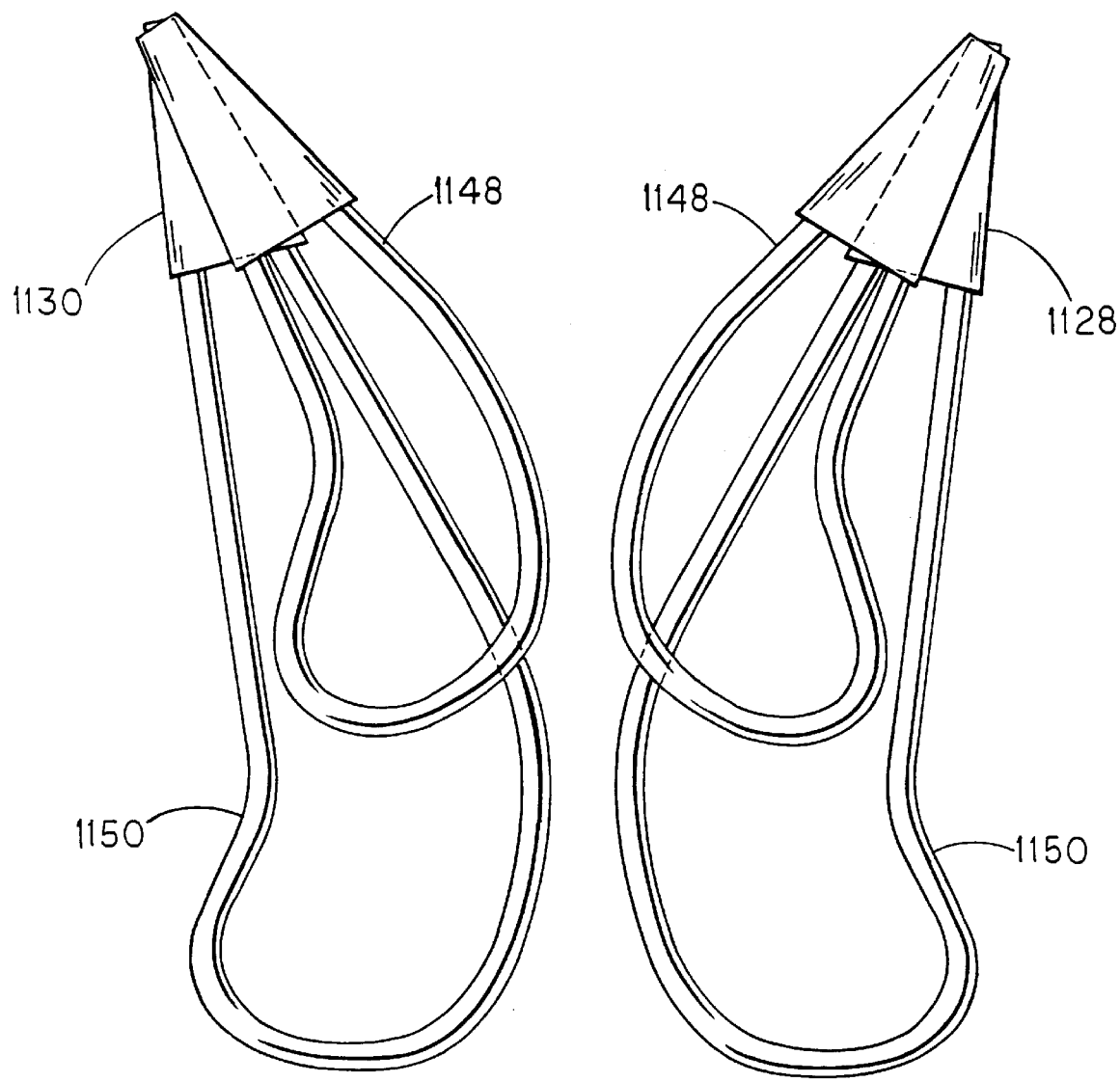
FIG. 55 is a schematic top view illustration of the bows of the bow-head or Quad-rod fruit thinner of FIG. 54.
Figure 80:
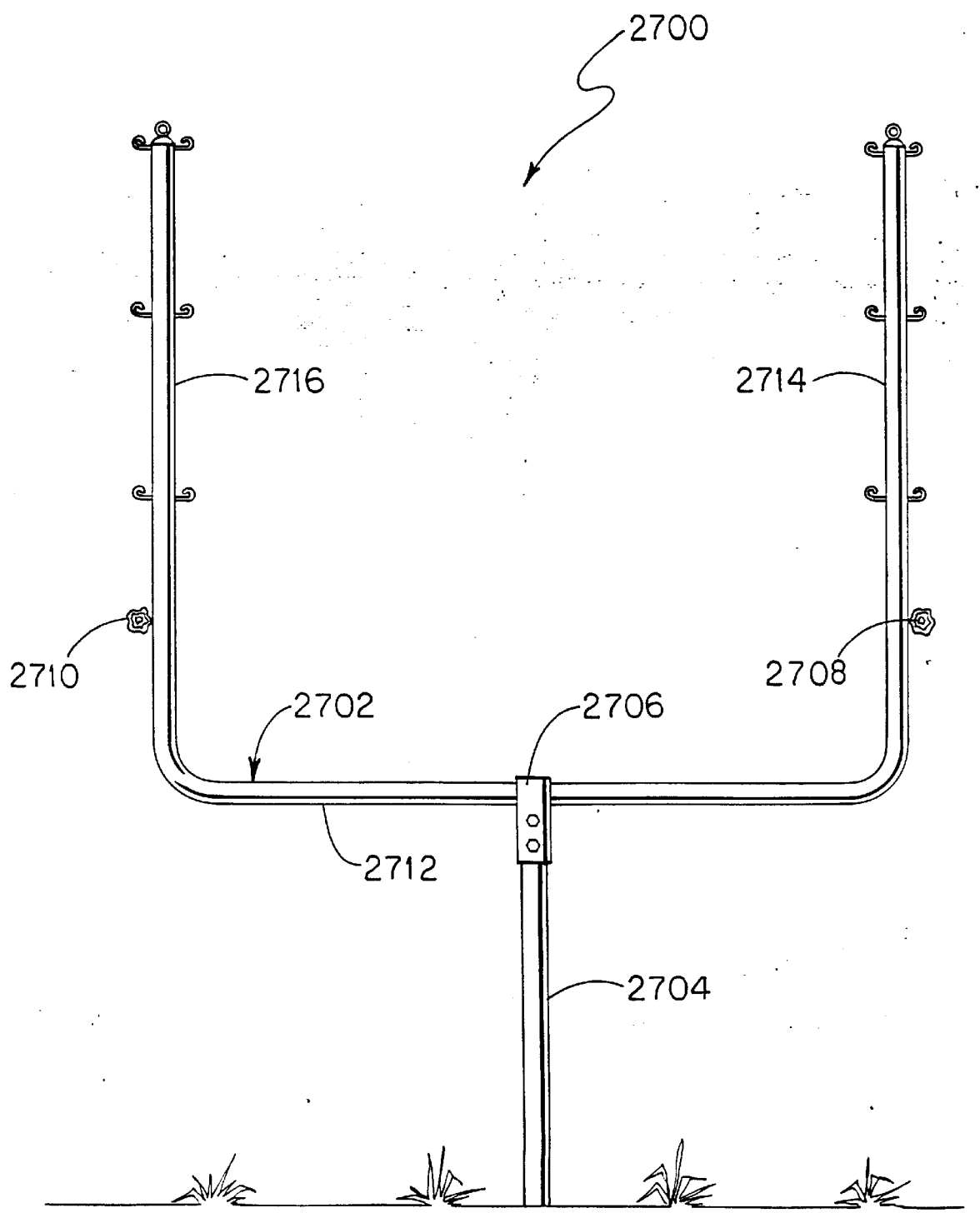
FIG. 80 is an end view representation of a modified Lyre or "U" trellis adapted for total mechanization. Note that the cordon is located approximately 10 inches (25 cm) above the lower cross bar, this allows sufficient space for the operation of all mechanization equipment including shoot and fruit thinner, leaf removal equipment, harvesting equipment, etc.

With reference to FIGS. 54 and 55 of the drawings, and in accordance with another embodiment of the present invention, a modified bow, bow-head or Quad-rod fruit thinner is generally designated 1120 and can be used for use with the modified "U" of FIG. 80 or adapted for use with GDC or other divided canopy trellising systems. Bow-head or Quad-rod fruit thinner 1120 is similar in construction to the bow-head or Quad-rod fruit thinner 1080 of FIG. 53 in that it is supported from a horizontal member 1122 of a mast 1124 attached to the front of a tractor 1126. Further, the bow-rod fruit thinner 1120 includes right and left bow-rod assemblies 1128 and 1130 depending from a horizontal support member 1132, a motor 1134, first and second drive shafts 1138, a drive belt 1140, rotary to reciprocatory converters 1142 and 1144, and a speed gauge 1146.

The bow-rod fruit thinner 1120 of FIGS. 54 and 55 differs from the bow-rod fruit thinner 1080 of FIG. 53 in that different sized bow-rods are arranged in an alternating sequence of small and large bow-rods 1148 and 1150 with the bow-rods of the left assembly 1130 slightly offset downwardly from the bow-rods of the right assembly 1128. With particular reference to FIG. 55 of the drawings, each of the short bow-rods 1148 is angled inwardly with respect to the adjacent longer bow-rod 1150. Further, it is to be understood that the bow-rods may be angled downwardly, for example, from 5–30° with respect to horizontal depending on the cultivar, trellis, and fruit load. With respect to a particular example of the present invention, each of the bow-rods 1150 is about 44 inches in overall length and made from a flexible beater rod material about 1 inch in diameter, each of the short bow-rods 1148 is about 24–32 inches in overall length and formed of the same flexible beater rod material, also the gap between the bow-rods of the left assembly and the right assembly is about 4 or more inches to prevent excessive damage to the vine, trellis, and the like.

The bow-rod fruit thinner 1120 is adapted for use with a GDC or other divided canopy trellising system. In particular, selected bow-rods may be removed to avoid contact with a cordon. Also, the thinner 1120 may be adapted for use with GDC by removing the right or left assembly 1128 and 1130 and/or tilting one or both of the right or left assembly to a 10–20° angle with respect to vertical. In accordance with one example, the bow-head or bow-rod fruit thinner 1120 is adapted for use with a GDC trellising system by removing the right assembly 1128 altogether and tilting the left assembly 1130 at a 10–20° angle with respect to vertical. Alternatively, both the right and left assemblies may be angled away from on another and mounted under a harvester chassis to simultaneously treat both sides of a GDC or other divided canopy system having flexible or pivoting support arm.

Figure 56:
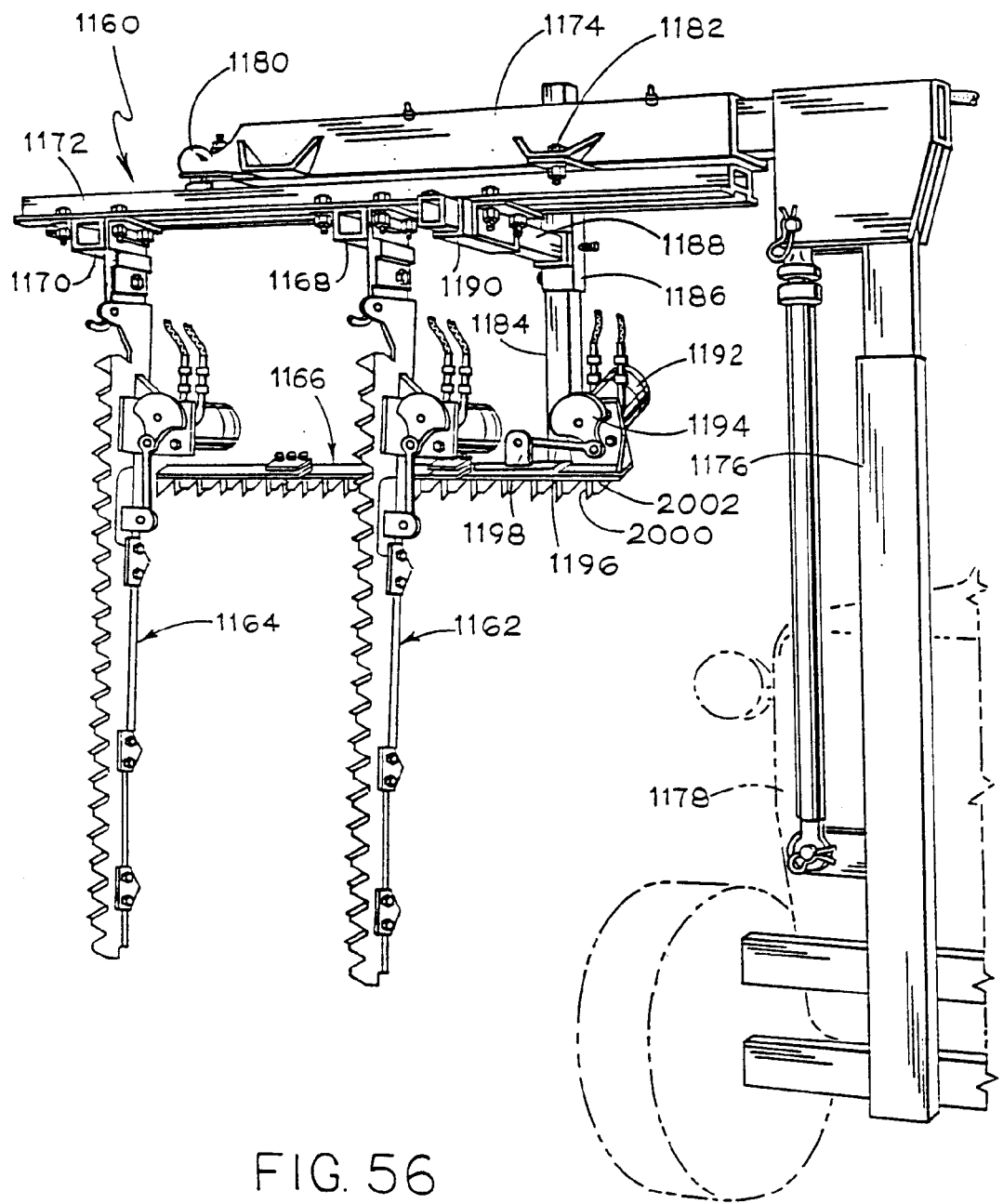
FIG. 56 is a front perspective view illustration of a top and side pruner.

With reference to FIG. 56 of the drawings, a vertical and horizontal sickle or hedger unit 1160 is shown to include first and second vertical sickles or cutter bars 1162 and 1164 and a trailing horizontal sickle or cutter bar 1166 adapted for use with a single curtain system. The first and second vertical sickles or hedgers 1162 and 1164 extend from respective support brackets 1168 and 1170 attached to a horizontal support member 1172 releasably attached to a horizontal member 1174 of a mast 1176 on a tractor 1178 by a ball hitch 1180 and bolt and bracket assemblies 1182.

Horizontal sickle 1166 is attached to a vertical support member 1184 received in a collar or bracket 1186 attached to a horizontal member 1188 received in a collar or bracket 1190 attached to horizontal support member 1172. The support members 1184 and 1188 and brackets 1186 and 1190 allow for adjustment of the location of the horizontal sickle relative to the vertical sickles 1162 and 1164 with respect to not only the height of the horizontal sickle 1166 but also the distance that the horizontal sickle trails the vertical sickles 1162 and 1164. Each of the sickles or hedgers 1162, 1164, and 1166 includes a drive motor 1192, a drive disk 1194, a drive rod 1196, a drive bracket 1198 attached to a movable set of teeth 2000 which translate relative to a fixed set of teeth 2002 to provide for cutting, pruning, trimming, hedging, and the like.

Figure 57:
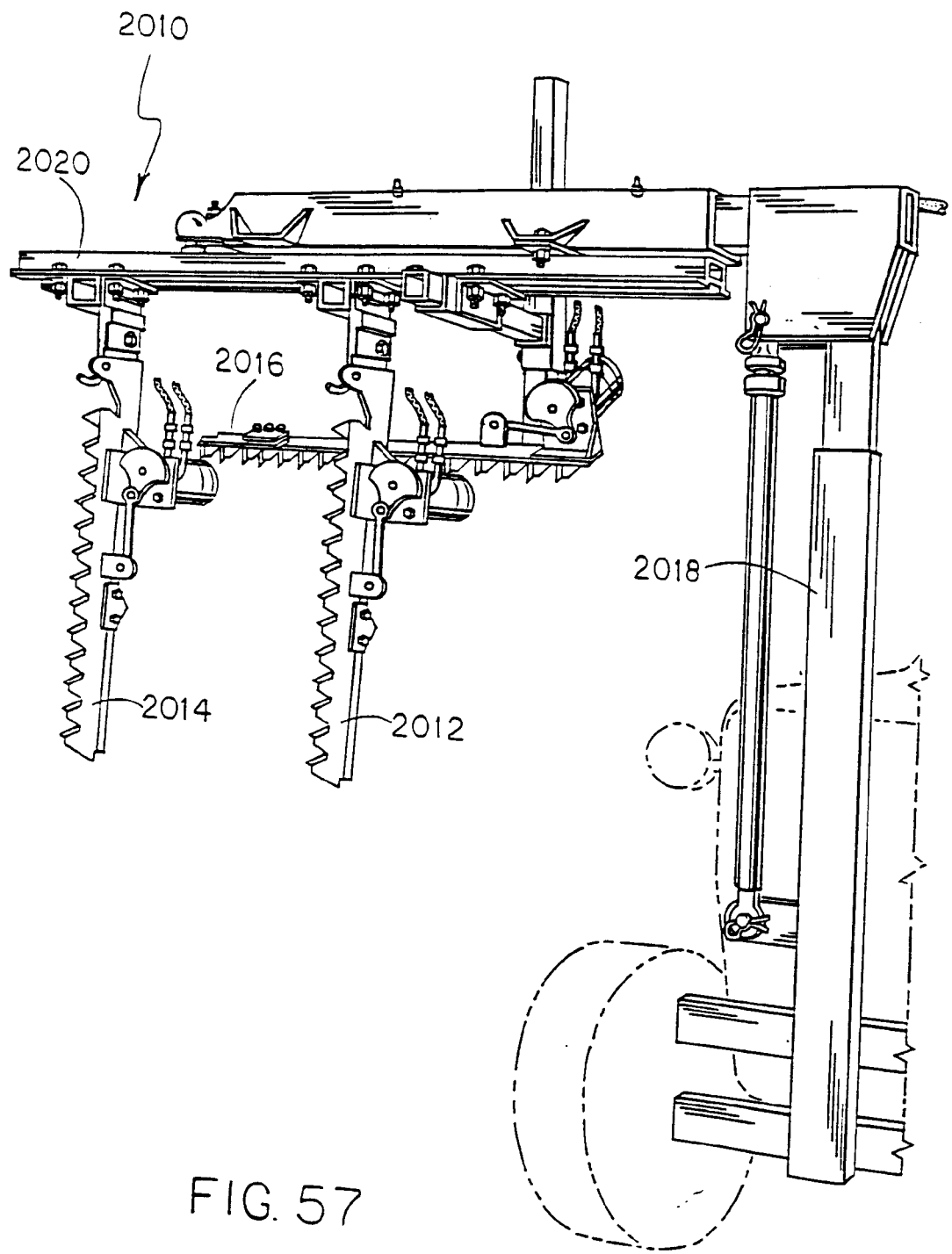
FIG. 57 is a front perspective illustration of an adaption of the embodiment in FIG. 56 with two relatively short vertical sickles and a horizontal sickle adapted for GDC or other divided canopy systems.

As shown in FIG. 57 of the drawings, a top and side pruner generally designated 2010 is similar in construction to the top and side pruner 1160 of FIG. 56 except that the vertical sickles have been shortened and the horizontal sickle has been raised to adapt the top and side pruner 2010 for GDC or other divided canopy systems. More particularly, top and side pruner 2010 includes first and second vertical sickles or hedgers 2012 and 2014 and a trailing horizontal sickle or hedger 2016. Vertical sickles 2012 and 2014 and trailing horizontal sickle 2016 can be tilted relative to vertical to accommodate a Y or GDC trellis by either tilting mast 2018 (see FIG. 74) or by angling the attachment of each of the sickles to support member 2020. The short second vertical sickle or hedger 2014 is adapted to be inserted down inside a Lyre or "U" trellis and prune or trim foliage, shoots, and the like from the interior of the trellis. The first vertical sickle 2012 is adapted to prune or trim on the outside of the trellis. The trailing horizontal sickle 2016 is adapted to trim above the trellis.

Figure 58:
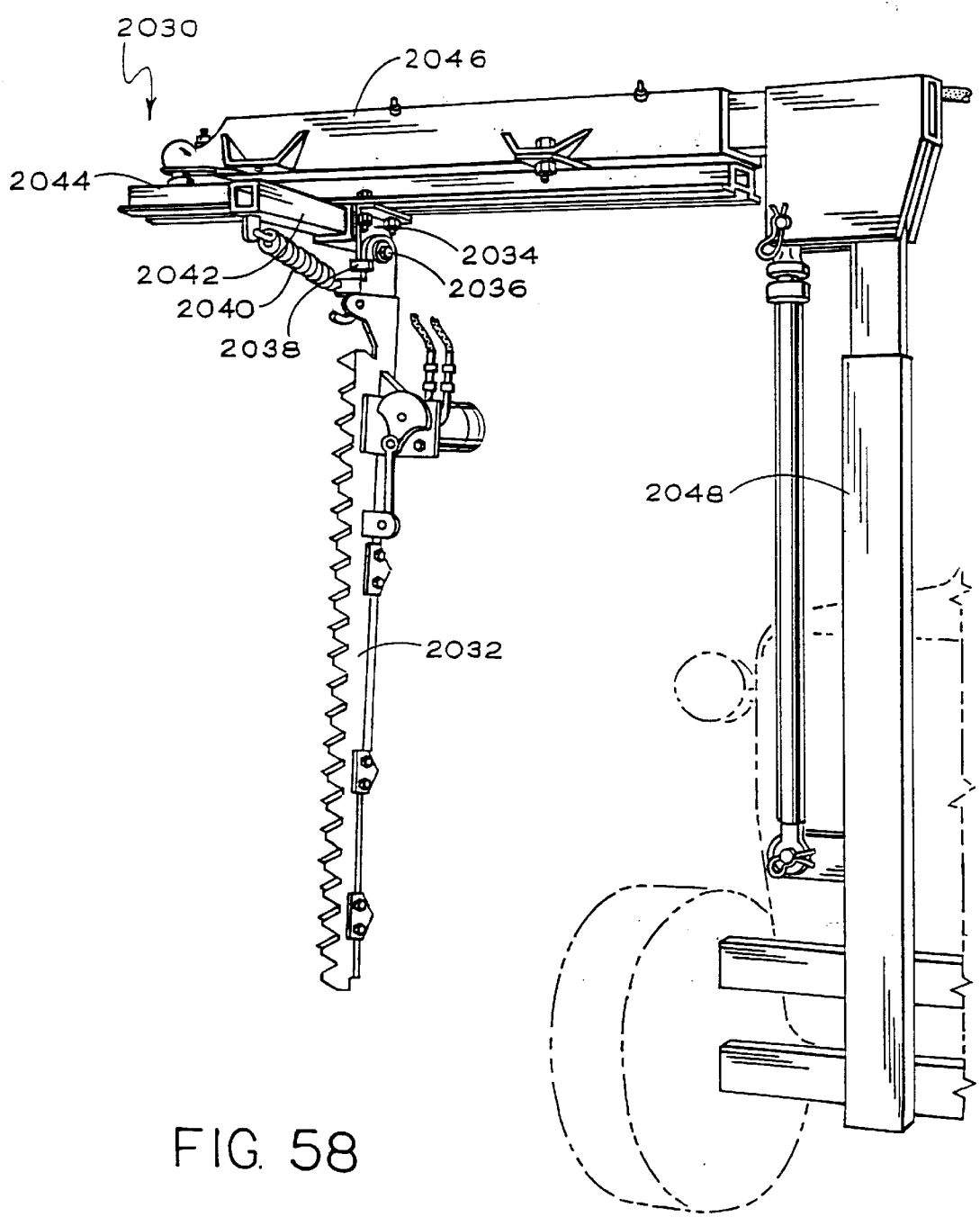
FIG. 58 is a front perspective representation of a single vertical sickle which trips rearwardly for summer pruning.

As shown in FIG. 58 of the drawings and in accordance with another embodiment of the present invention, a single vertical sickle pruner 2030 includes a vertical sickle or hedger 2032 pivotally attached to a support bracket 2034 by a bolt 2036. Attached to bracket 2034 is a stop 2038 which limits forward travel of the sickle 2032. One end of a spring 2040 is attached to sickle 2032 while the other end is attached to a forwardly extending support member 2042. The spring 2040 allows the sickle 2032 to trip rearwardly should the sickle contact an immovable or uncutable object. Support member 2042 is attached to a horizontal support member 2044 which is releasably attached to a horizontal member 2046 of a mast 2048. Single vertical sickle pruner 2030 is adapted for summer pruning of, for example, a single curtain system.

Figure 59:
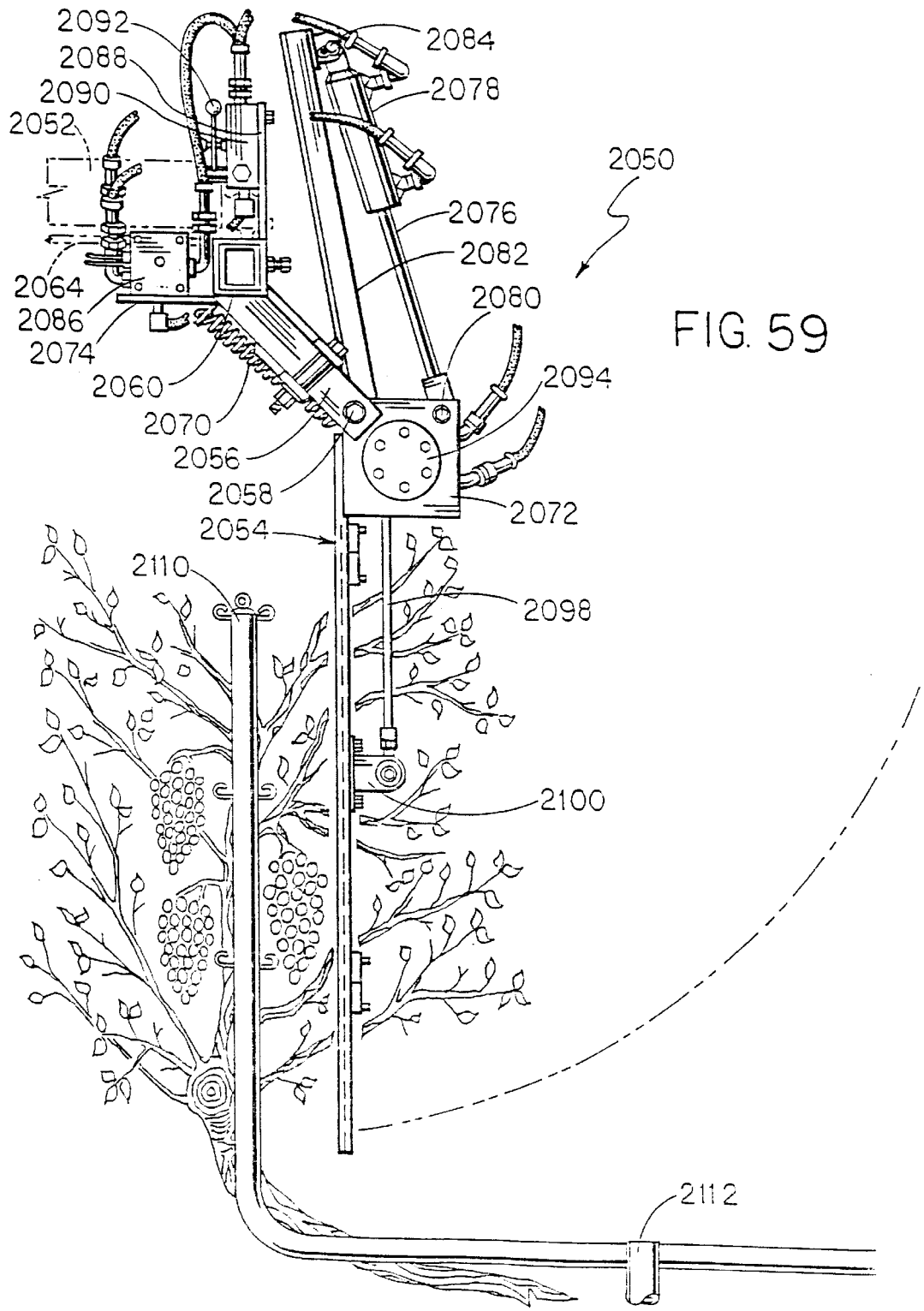
FIG. 59 is a partial rear view illustration of an angularly adjustable summer cane pruner.
Figure 60:
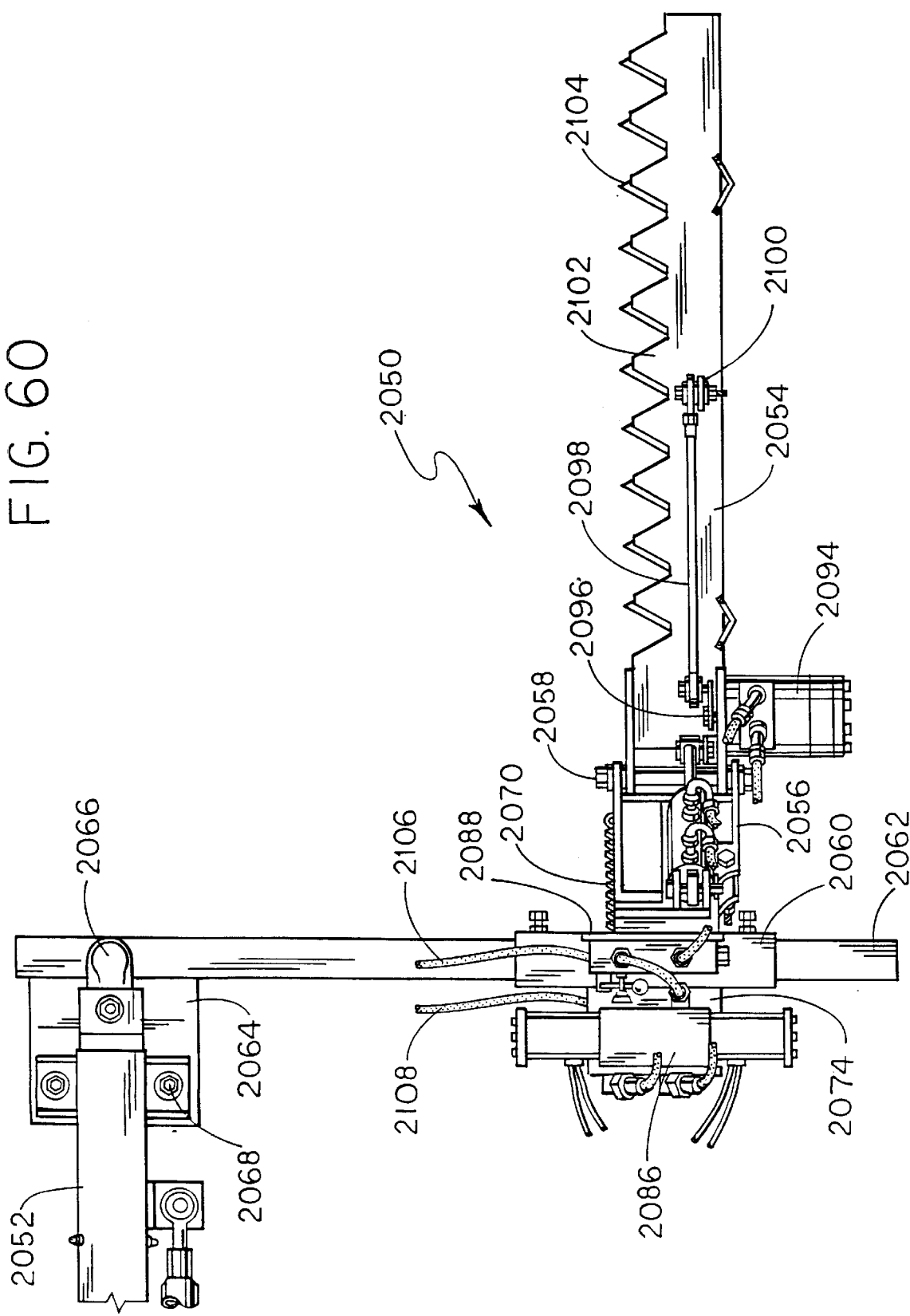
FIG. 60 is a top view illustration of the summer cane pruner of FIG. 59.

With reference to FIGS. 59 and 60 of the drawings, an angularly adjustable summer cane pruner is generally designated 2050 and shown attached to the end of a horizontal member 2052 of a mast attached to a tractor. The pruner 2050 includes a sickle or hedger 2054 pivotally attached to a cantilever member 2056 by a bolt 2058. The cantilever member 2056 is attached to a collar 2060 which is received on a support member 2062 which is attached to a support plate 2064 which is releasably attached to mast member 2052 by a ball hitch 2066 and nut and bracket assemblies 2068. Sickle 2054 is biased downwardly to the position shown in FIG. 59 by a spring 2070 having one end attached to a motor support plate 2072 and the other end attached to a flange extending from a horizontal valve support plate 2074 attached to collar 2060. The sickle 2054 is raised to a horizontal position by retraction of a shaft 2076 of a hydraulic cylinder 3078 having the shaft pivotally attached to motor support plate 2072 by a bolt 2080. The opposite end of hydraulic cylinder 2078 is attached to an almost vertical support member 2082 by a pivot pin 2084. Hydraulic cylinder 2078 is controlled by a hydraulic cylinder control valve 2086 attached to valve support plate 2074. The hydraulic cylinder support plate 2082 is fixed to cantilever member 2056.

A vertical valve support plate 2088 is attached to collar 2060 and supports a hydraulic motor speed control valve 2090 having a control lever 2092 which allows the operator to control the speed of sickle motor 2094. Sickle 2054 also includes a drive disk 2096, a drive rod 2098, a drive bracket 2100, a movable rack or set of cutting teeth 2102, and a fixed rack or set of cutting teeth 2104. Hydraulic lines 2106 and 2108 are operatively connected to the hydraulic system of the tractor or an auxiliary hydraulic system attached to the tractor.

Hydraulic cylinder control valve 2086 receives electronic signals from, for example, a control panel located adjacent to the tractor operator to raise and lower the sickle 2054 by extending and contracting cylinder 2078. One can easily maneuver the sickle 2054 over the side of a Lyre, "U", or modified "U" trellis by raising the sickle 2054 to the horizontal position shown in FIG. 60, extending the horizontal member 2052 of the mast to locate the sickle 2054 inward of the side 2110 of a modified "U" trellis 2112, and then lowering the sickle 2054 to the vertical position shown in FIG. 59 by extending hydraulic cylinder 2078. One can adjust the amount of pruning or trimming by adjusting the location of the sickle relative to the vine, adjusting the speed of the motor 294, selecting the ground speed of the tractor or other machinery, and the like.

Figure 61:
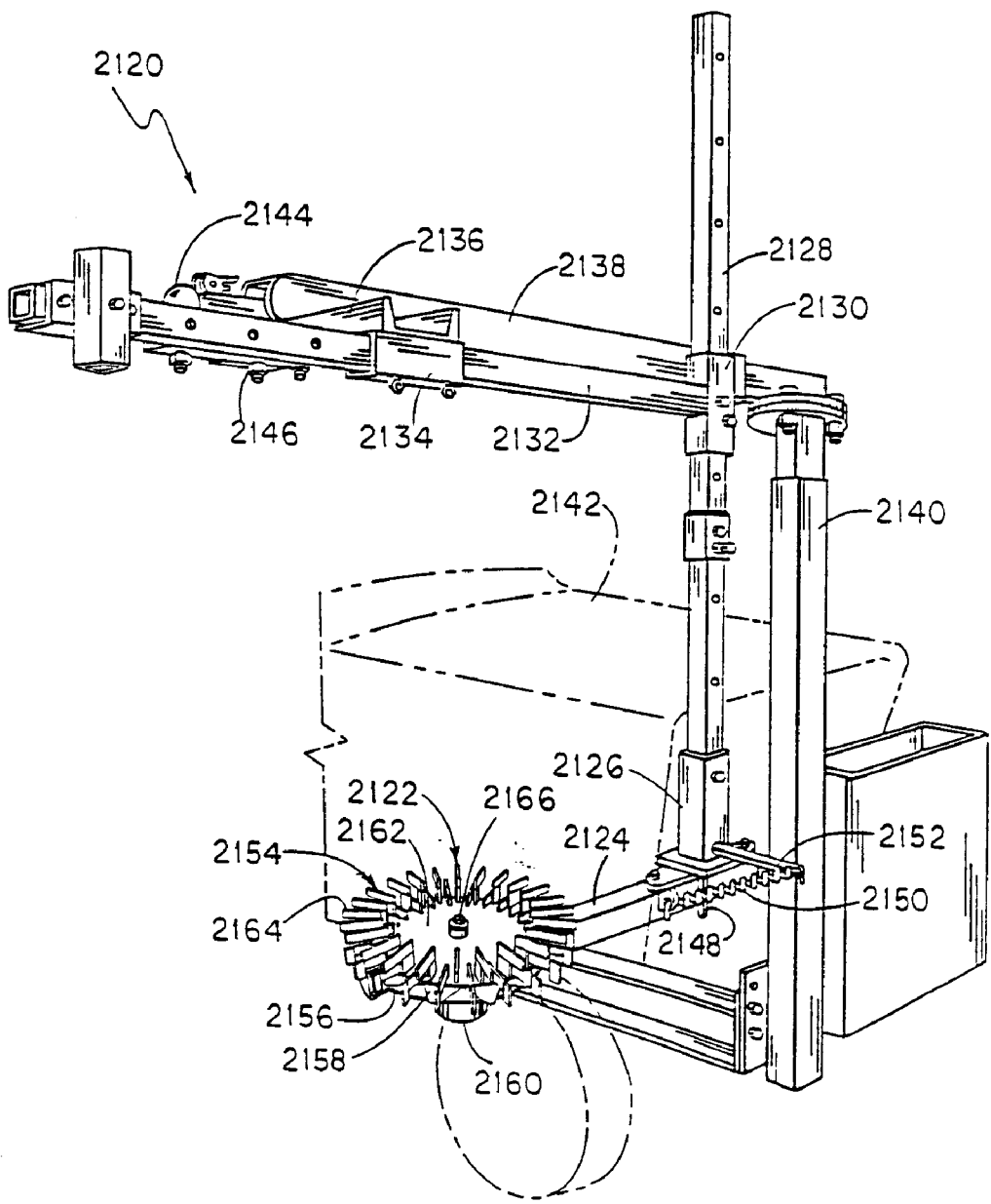
FIG. 61 is a perspective view illustration of a horizontal rotary cutter.
Figure 62:
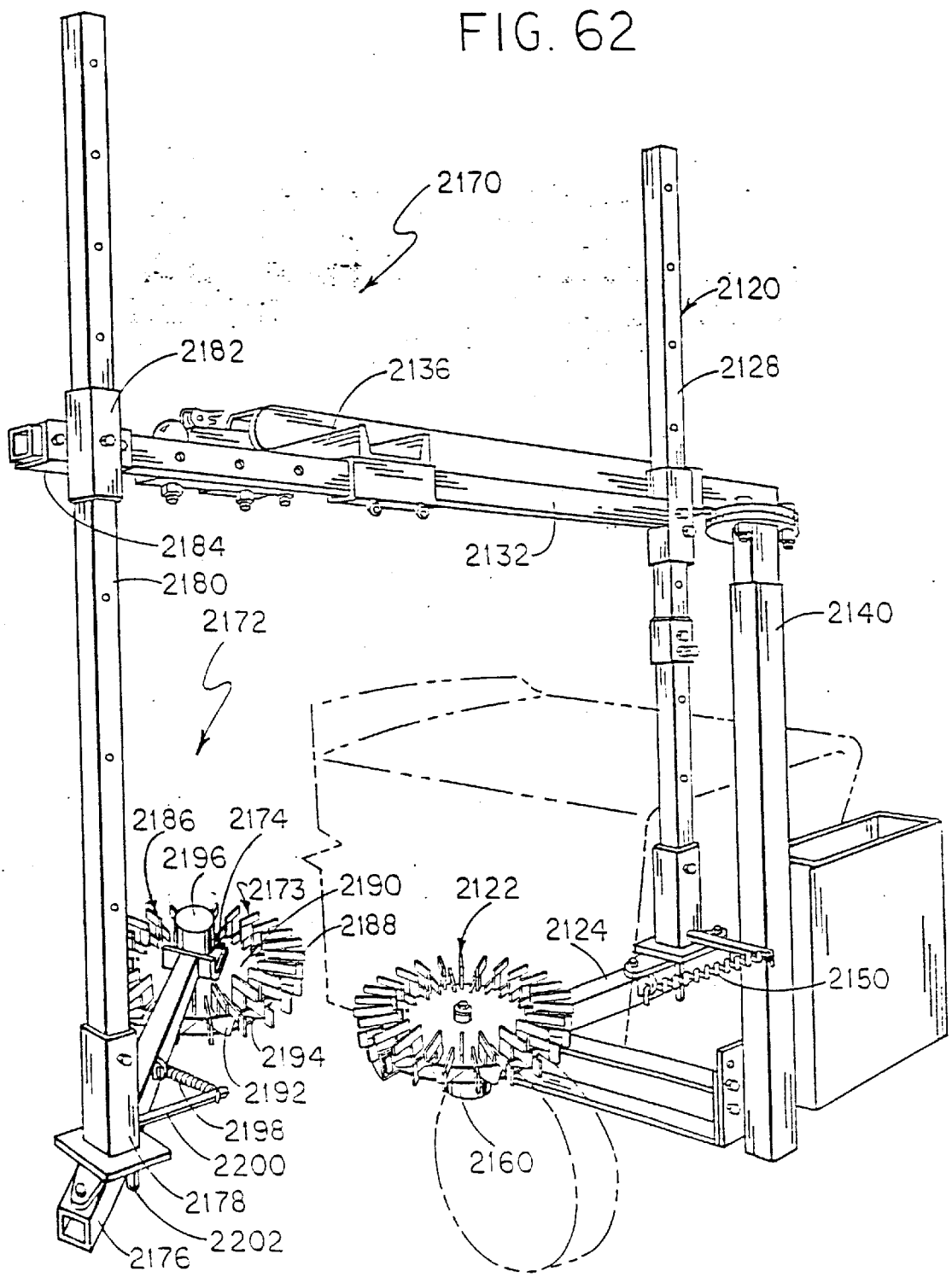
FIG. 62 is a perspective view representation of a dual unit horizontal rotary cutter having leading and trailing cutting heads.
Figure 63:
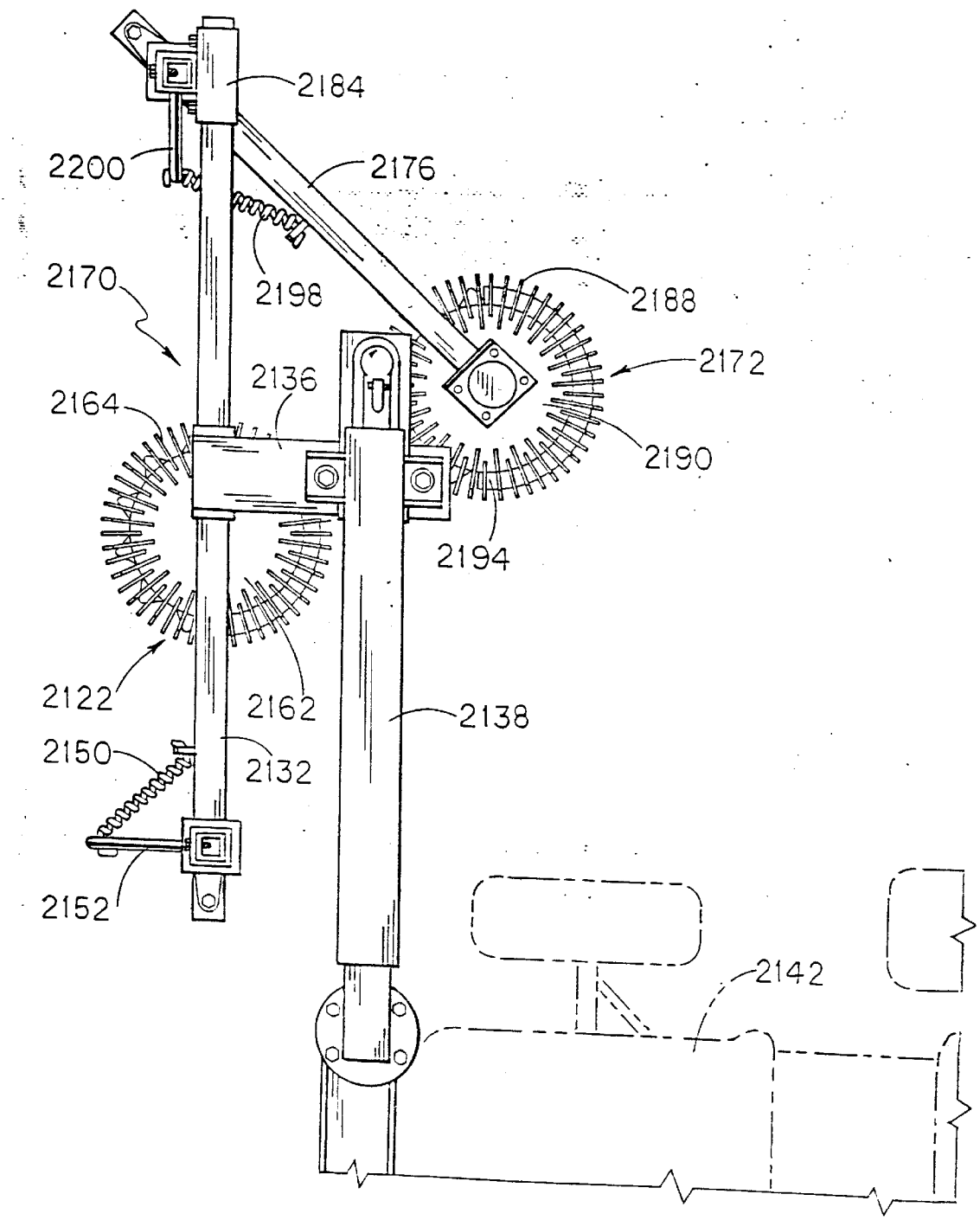
FIG. 63 is a top view illustration of the dual unit horizontal rotary cutter of FIG. 62.

As shown in FIG. 61 of the drawings and in accordance with another embodiment of the present invention, a modified single horizontal rotary cutter or pruner adapted for use in, for example, the dormant pruning of the canes adjacent to the cordon of *Vitis vinifera* and French-American hybrid vines is generally designated 2120 and shown to include a rotary cut head 2122 attached to the end of a horizontal support member 2124 pivotally attached to a base 2126 of a vertical support member 2128. The vertical support member is adjustably received in a bracket or collar 2130 attached to one end of a horizontal support member 2132 which itself is received in an adjustable support bracket or collar 2134 attached to a support platform 2136. The support platform 2136 is releasably attached to a horizontal member 2138 of mast 2140 on tractor on 2142 by a ball hitch 2144 and bolts 2146 (FIGS. 62 and 63).

Horizontal support member 2124 pivots about a vertical axis with forward movement of support member 2124 limited by a vertical stop 2148 extending downwardly from base 2126. Further, a spring 2150 extends from support member 2124 to a forwardly extending anchor member 2152 attached to base 2126 to draw support member 2124 and rotary cut head 2122 forwardly while allowing the rotary head and support member 2124 to pivot or trip rearwardly when the rotary head contacts an immovable or uncutable object such as a trellis or post.

Rotary cut head 2122 of horizontal rotary cutter or pruner 2120 includes a free wheeling or idling deflector assembly 2154 and a housing 2156, a cutting blade having radial cutting teeth extending from a cutting opening in the housing, and a hydraulic motor 2160 for rotating the cutting blade and teeth relative to the housing. The motor 2160 is attached to housing 2156 which is attached to support member 2124. The deflector assembly 2154 includes a horizontal circular plate or disk 2162 and a plurality of deflecting veins or vertical flanges 2164 welded to the disk 2162. The disk 2162 is rotatably journaled on a shaft 2166 with disk 2162 free to rotate in either direction upon contact of one or more of the deflecting veins 2164 with an immovable object or an object larger than the space between the veins, such as the trunk of a vine. The deflector assembly 2154, and in particular the deflecting veins 2164, are shaped and spaced to prevent the contact of the cutting teeth 2158 with an immovable object such as a trellis or post and to prevent objects larger then, for example, 1 or 2 inches in diameter, preferably anything larger than 1½ inches in diameter, from being cut or pruned. Since the entire rotary cutting head 2122 can trip rearwardly and the deflector assembly 2154 is free to rotate about shaft 2156, the rotary cut head 2122 is adapted to prune, trim, or cut smaller items such as shoots or canes without damaging trellises, vine trunks, or the like.

The horizontal rotary cutter or pruner 2120 of FIG. 61 is especially adapted for the horizontal cutting and pruning of substantially vertically oriented canes or shoots, for example, in the dormant pruning of *Vitis vinifera* or French-American hybrid grape vines (seasonal charts of FIGS. 94–97). The horizontal rotary cutter 2120 is highly versatile in that the vertical height can be adjusted over a wide range by adjusting the position of vertical support member 2128 relative to support bracket 2130, and the distance of the rotary cut head 2122 from the tractor can be adjusted by adjusting horizontal support member 2132 relative to bracket 2134. The cutter 2120 can be used with different trellises or training systems including California T-trellis, standard vertical moveable catch wire, GDC, Lyre, "U", Smart-Dyson ballerina, Scott-Henry, or the like. Typically the canes are cut or pruned by the rotary cutting teeth 2158 of rotary cut head 2122 within a few inches of a substantially horizontal cordon.

Although the cutting teeth of blade 2158 of rotary cut head 2122 are shown as large triangular cutting teeth, it is contemplated that in accordance with the present invention any circular cutting blade such as a circular saw cutting blade for cutting wood may be used as the rotary cutting blade. In accordance with a particular example, the rotary cutting blade 2158 is a conventional circular saw blade adapted for cutting wood and having an outer diameter from about 10–36 inches.

In accordance with another embodiment of the present invention, and as shown in FIGS. 62 and 63 of the drawings, a dual unit horizontal rotary cutter or pruner generally designated 2170 is substantially identical in construction to the single horizontal rotary cutter 2120 of FIG. 61 except that a second trailing horizontal rotary cutter 2172 has been added. Items having identical construction to that shown in FIG. 61 have the same reference numeral. The second and trailing rotary cutter 2172 is similar in construction to the cutter 2120 except that the support arm and motor are located above the rotary cut head to prevent entanglement or obstruction of the support arm and motor of the second trailing cutter 2172 with, for example, the interior of a Lyre, "U", or modified "U" trellis.

The dual unit horizontal rotary cutter or pruner 2170 includes a first or leading rotary cutter 2122 and a second or trailing rotary cutter 2172. The rotary cutters 2122 and 2172 are designed and adapted to simultaneously prune or cut substantially vertically oriented canes, shoots, or the like extending from a cordon. The rotary cutters 2122 and 2172 can be used to simultaneously prune, for example, a *Vitis vinifera* or French-American hybrid vine trained on a standard vertical catch wire, Lyre, "U", or modified "U" trellis or trellising system. In contrast, the single rotary cutter 2122 of the single horizontal rotary cutter 2120 of FIG. 61 is adapted to prune or trim only one side or the exterior of a trellis, for example, a GDC or other divided canopy trellis.

The trailing rotary cutter 2172 has a cut head 2173 and is operatively attached to a bracket 2174 extending from a horizontal support member 2176 pivotally attached to a base 2178 of a vertical support member 2180 adjustably received in a bracket or collar 2182 attached to a second collar or bracket 2184 adjustably received on horizontal support member 2132.

Rotary cut head 2173 includes a free-wheeling or idling deflector assembly 2186 having a plurality of veins or vertical deflector members 2188 fixed to a rotating disk 2190. Further, rotary cut head 2173 includes a cutting blade 2192 having cutting teeth extending from an opening in a housing 2194. Cutting blade 2192 rotates within housing 2194 under operation of a motor 2196. Further, support arm 2176 and rotary cutter 2173 are biased forwardly or towards the leading rotary cutter 2122 by a spring 2198 attached to support arm 2176 and a member 2200 extending from base 2178. A stop 2202 limits forward travel of the second cutter and support arm 2173 and 2176.

With reference again to FIGS. 62 and 63 of the drawings, cut head 2173 of second or trailing rotary cutter 2172 is shown in its forward most position where it trails the cut head 2122 of the first or leading cutter by at least several inches. Both rotary cutters 2122 and 2172 of dual horizontal cutter or pruner 2170 are free to trip rearwardly should they contact an immoveable or uncutable object.

Figure 64:
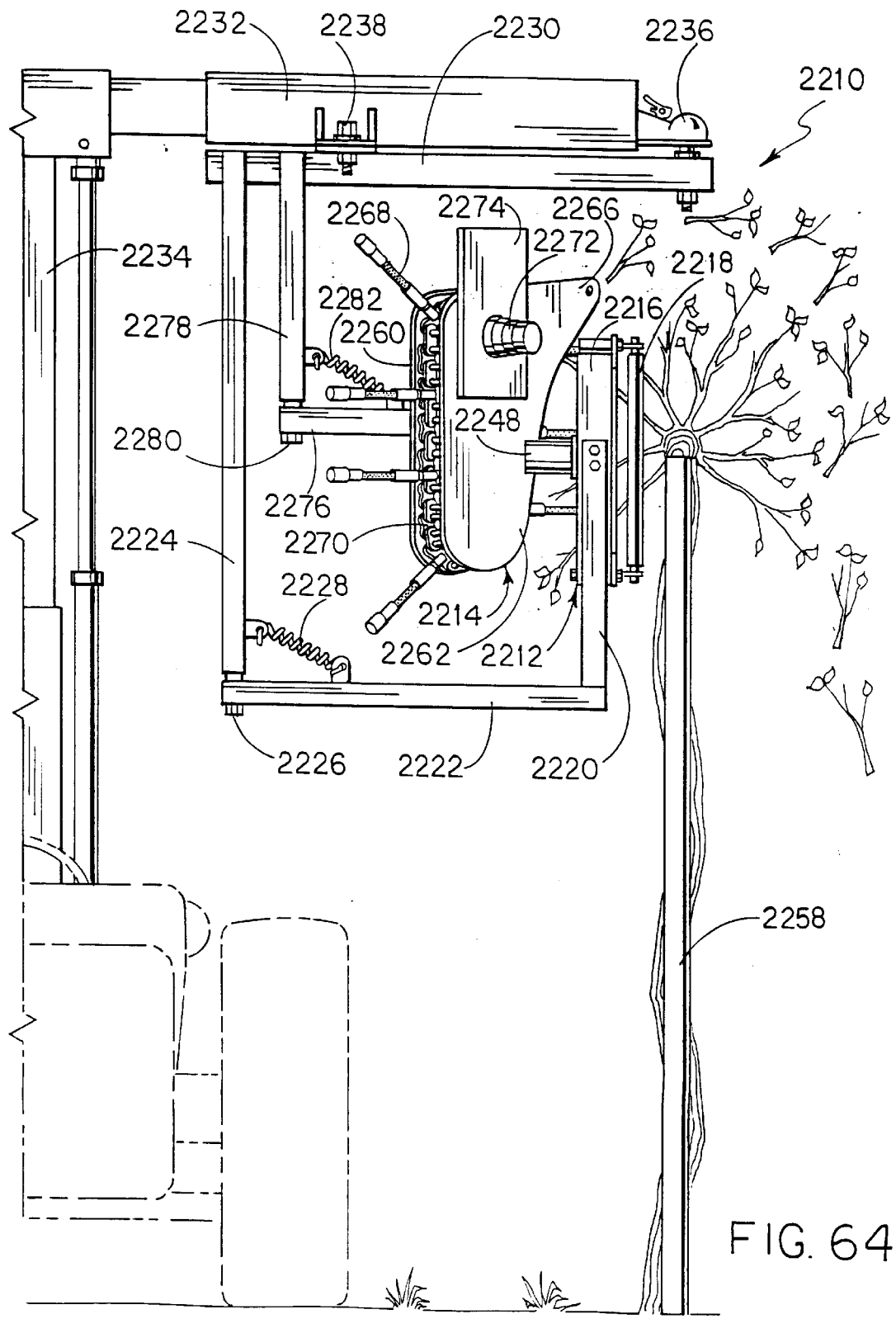
FIG. 64 is a rear view illustration of a vertical rotary cutter and cane grabber.
Figure 65:
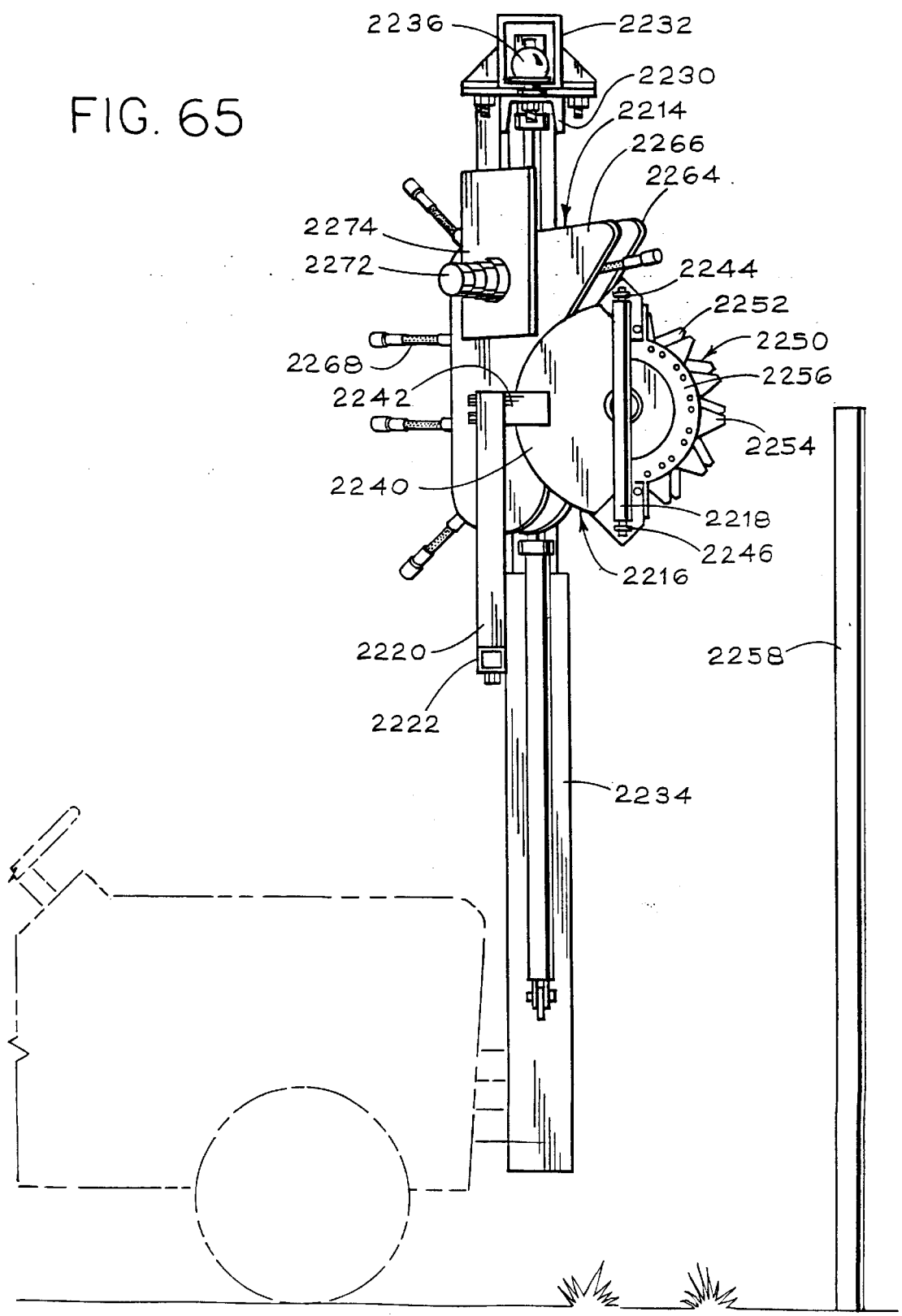
FIG. 65 is a side view illustration of the vertical rotary cutter and cane grabber of FIG. 64.

As shown in FIGS. 64 and 65 of the drawings and in accordance with another embodiment of the present invention a vertical rotary cutter and cane grabber assembly or vertical pruner is generally designated 2210 and is shown adapted for use with a single curtain high bilateral cordon system and suited for dormant pruning of the canes of *Vitis vinifera* and French-American hybrid grape vines. Although the vertical rotary cutter and grabber 2210 is shown in use in conjunction with a single curtain high bilateral cordon arrangement, it is contemplated that this device may be used for the vertical pruning or cutting of substantially horizontally oriented canes of vines on other training or trellising systems. The vertical rotary cutter and cane grabber 2210 includes a vertical rotary cutter 2212 and a substantially vertical cane grabber 2214. The vertical rotary cutter 2212 includes a vertical rotary cut head 2216 and a parallel deflector or guide roller 2218 operatively supported from a vertical support member 2220, the base of which is attached to first end of a horizontal support member 2222 pivotally attached at its second end to a lower end of a vertical support member 2224 by a bolt 2226. A spring 2228 having one end attached to horizontal member 2222 and the other end attached to vertical member 2224 allows the vertical cutter 2212 to trip rearwardly should it contact an immovable or uncutable object. Vertical support member 2224 is attached to a horizontal support member 2230 releasably attached to a horizontal member 2232 of mast 2234 by a ball-hitch 2236 and bolts 2238.

Further, rotary cut head 2216 includes a housing 2240 attached to vertical member 2220 by a short member 2242. Also, housing 2240 supports upper and lower brackets or journals 2244 and 2246 which support deflector roller 2218 therebetween. Housing 2240 supports a motor 2248, for example, a hydraulic motor, having a drive shaft operatively attached to a rotary cutting blade 2250 having a plurality of cutting teeth 2252 thereon. A plurality of separate cutting teeth 2254 are fixed to a cutting opening 2256 of housing 2240 to form a circular or rotary sickle or hedger with the rotating cutting teeth 2252 of cutting blade 2250.

Deflector or idler roller 2218 of the vertical rotary cutter unit 2212 of the rotary cutter and cane grabber 2210 of FIGS. 64 and 65 is adapted to contact the cordon and guide the vertical cutter 2216 along the cordon to trim or prune the canes extending therefrom while at the same time serving as a deflector for deflecting the vertical cutter 2216 away from immovable objects such as a trellis or post 2258, a vine trunk, and the like. The vertical cutter 2212 can trip rearwardly should the roller 2218 or forward edge or surfaces of the cutter 2216 contact an immovable object and thereby prevent damage to the teeth 2252 and 2254.

Cane grabber 2214 of vertical pruner or rotary cutter and grabber 2210 of FIGS. 64 and 65 are similar in construction to the cane grabbers 962 of FIG. 47 of the drawings with the exception that inner and outer housings 2260 and 2262 of cane grabber 2214 include elongated upper protrusions 2264 and 2266, respectively, which facilitate the removal of cut cane pieces from the cane grabber once they have been trimmed from the vine by the vertical rotary cutter 2216. The cane grabber 2214 includes a plurality of flexible fingers 2268 extending from a chain 2270 driven in a counter-clockwise direction by a motor 2272 mounted on a plate 2274 attached to housing 2262.

As shown in FIGS. 64 and 65 of the drawings, the vertical rotary cutter 2216 is mounted substantially parallel to the tractor and vine while the cane grabber 2214 is offset at an angle of, for example, 20° to 60°, preferably 30° to 45°, with respect to the plane of the cutter 2216. With the fingers 2268 moving about the cane grabber 2214 in a counter-clockwise direction, the fingers tend to grab and direct the canes toward the cutting blade 2250 and cutting opening 2256 of vertical cutter 2216. Also, the fingers 2268 draw the cut ends of the canes away from the vertical cutter 2216 and then the protrusions 2264 and 2266 of the housings 2260 and 2262 force the cut cane pieces and any uncut canes away from the fingers and away from the device to avoid entanglement of the device with sections of cut cane as well as uncut canes which would otherwise tend to wrap around and be entangled with the device. It is to be understood that the vine and canes are not shown in FIG. 65 for the sake of clarity of the device 2210 and its components.

Cane grabber 2214 and more particularly housing 2260 is attached to a first end of a horizontal member 2276 pivotally attached at its second end to the lower end of a vertical member 2278 by a bolt 2280. A spring 2282 has one end attached to horizontal member 2276 and the other end attached to vertical member 2278 to allow the cane grabber 2214 to trip rearwardly should it contact an immovable obstruction or object. The upper end of vertical member 2278 is attached to horizontal support member 2230.

In accordance with one example of the vertical rotary cutter and cane grabber 2210, the cane grabber 2214 includes a plurality of flexible fingers 2268 formed of 9–12 inch lengths of 3/8 to 3/4 inch diameter hydraulic line having a metal fitting on each end thereof and rotary cutting blade 2250 having an outer diameter of from 10–36 inches. Also in accordance with one example, it is preferred to drive the motor, chain, and fingers of cane grabber 2214 in a counter-clockwise direction while driving the motor and cutting blade of the rotary cutter 2216 in a clock-wise direction using separate hydraulic motors 2272 and 2248 receiving hydraulic fluid from the hydraulic system of the tractor or an auxiliary hydraulic system mounted on the tractor.

Figure 66:
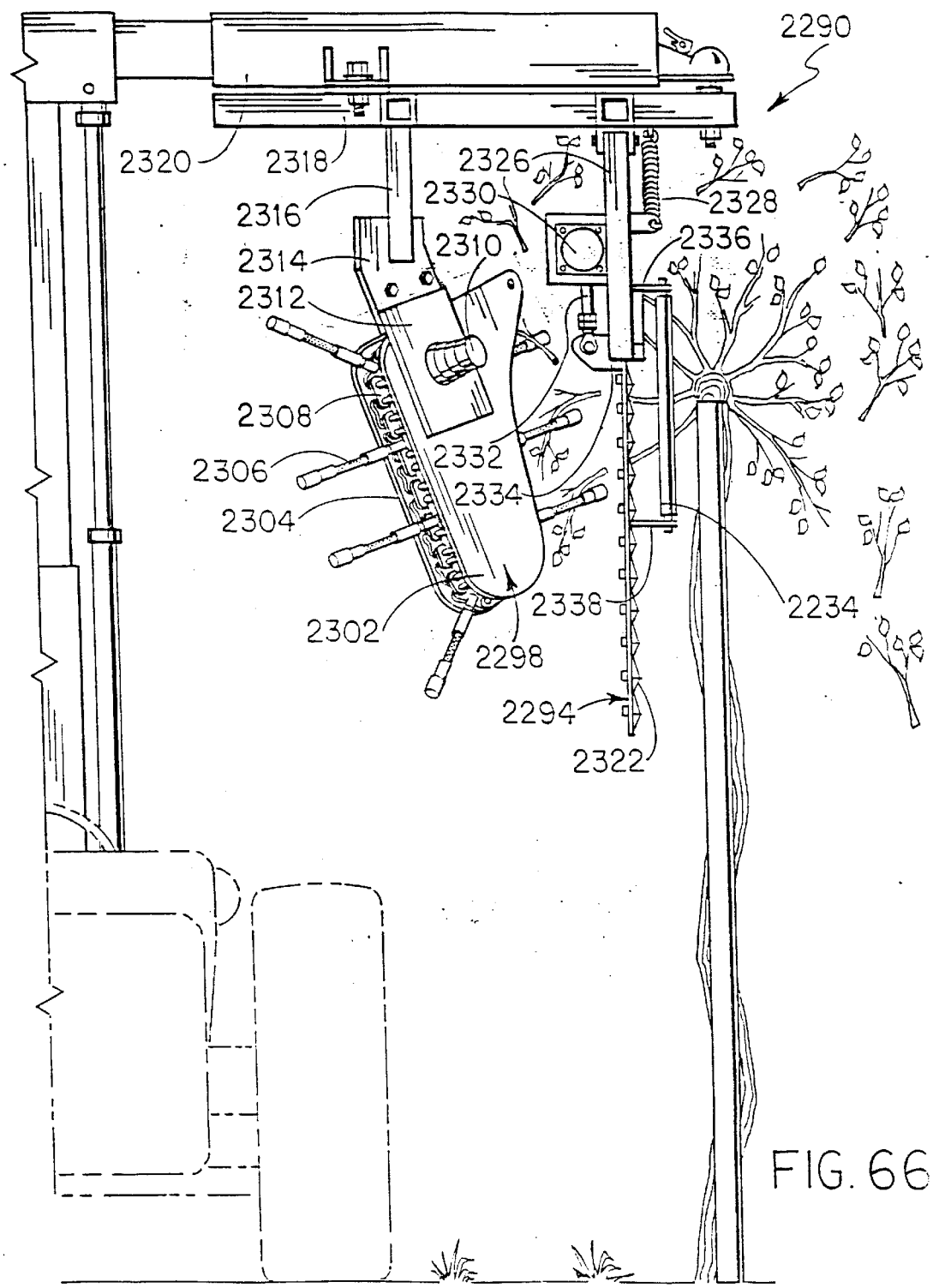
FIG. 66 is a rear view illustration of an alternative vertical pruner and cane grabber unit with a vertical sickle or cutter.
Figure 70:
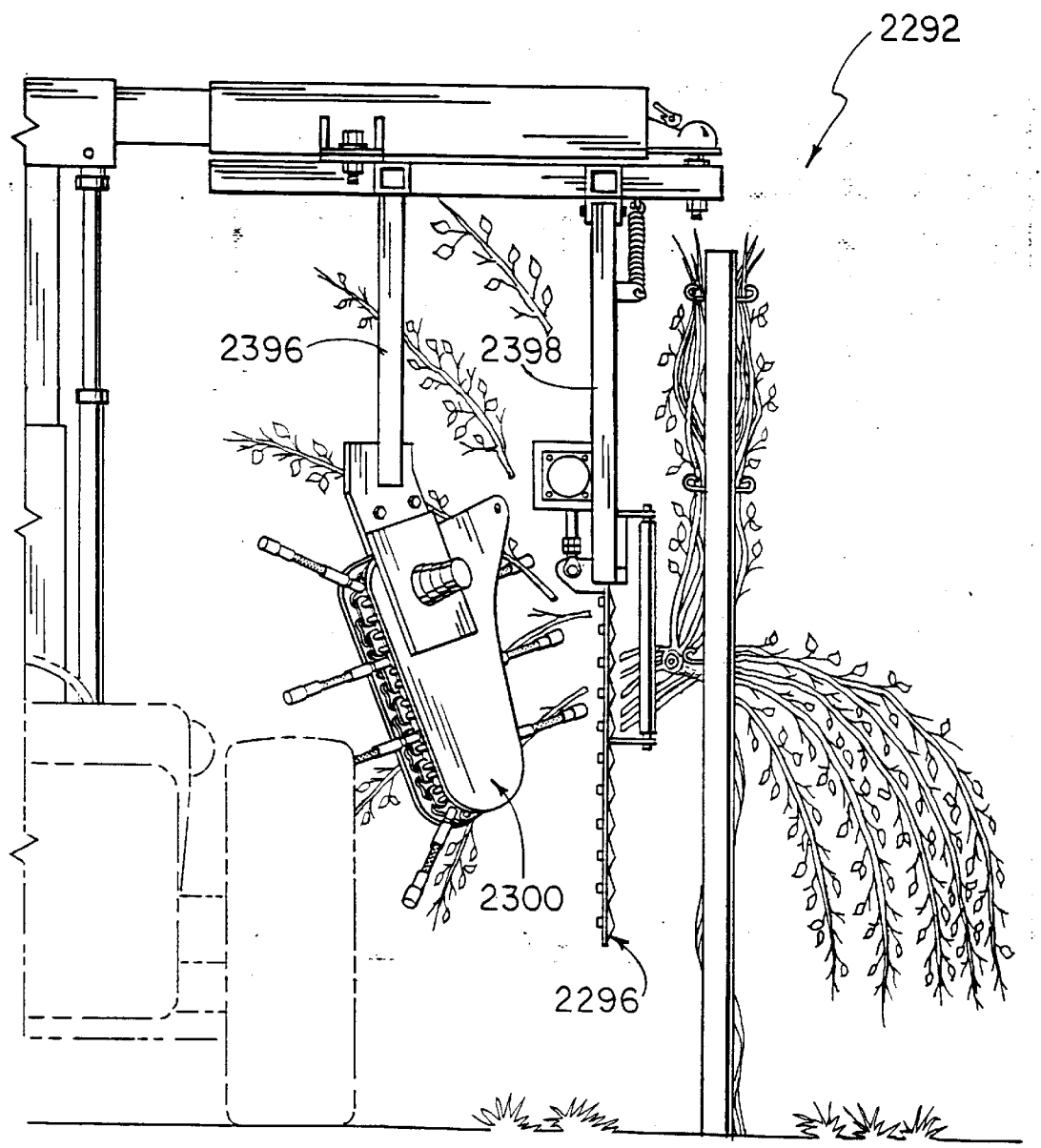
FIG. 70 is a rear view illustration of a vertical pruner and cane grabber unit adapted for use with the bottom section of the Smart-Dyson ballerina trellising system.

As shown in FIGS. 66 and 70 of the drawings, and in accordance with alternative embodiments of the present invention, vertical pruner units, devices, or apparatus generally designated 2290 and 2292 each include respective vertical sickles or cutters 2294 and 2296 and cane grabbers 2298 and 2300. The vertical pruner 2290 of FIG. 66 is similar to the vertical pruner 2210 of FIG. 64 except that the rotary cutter has been replaced with a vertical linear, sickle, hedger, or the like and that both the cane grabber 2298 and vertical cutter 2294 are supported from above rather than from the side. The vertical pruner 2292 of FIG. 70 is similar to the vertical pruner 2290 of FIG. 66, except that the cane grabber 2300 and vertical cutter 2296 are supported from above in a position closer to the ground than that of the cane grabber 2298 and vertical cutter 2294 of vertical pruner 2290.

With reference again to FIG. 66 of the drawings, the cane grabber 2298 like cane grabber 2214 of FIG. 64, includes outer housings 2302 and 2304 and a plurality of flexible fingers 2306 extending from a chain 2308 driven in a counter-clockwise direction by a motor 2310 mounted on a plate 2312 attached to housing 2302. Plate 2312 is attached to a support plate 2314 attached to the lower end of a vertical support member 2316 the upper end of which is attached to a horizontal support member 2318 releasably attached to a horizontal mast member 2320.

The vertical linear cutter, sickle, hedger, or the like 2294 includes an elongate cutting bar 2322 and a parallel deflector or guide roller 2324 supported by a vertical support member 2326 the upper end of which is pivotally attached to a horizontal support member 2318. A spring 2328 having one end attached to a member extending from horizontal support member 2318 and the other end attached to vertical support member 2326 allows the vertical pruner 2294 to trip rearwardly should the deflector roller or sickle contact an immovable or uncuttable object. Vertical pruner 2294 further includes a hydraulic motor 2330, a drive link 2332, and a drive bracket 2334 attached to a movable set of cutting teeth. Deflector roller 2324 is supported at its upper and lower ends by brackets or journals 2336 and 2338.

Figure 97:
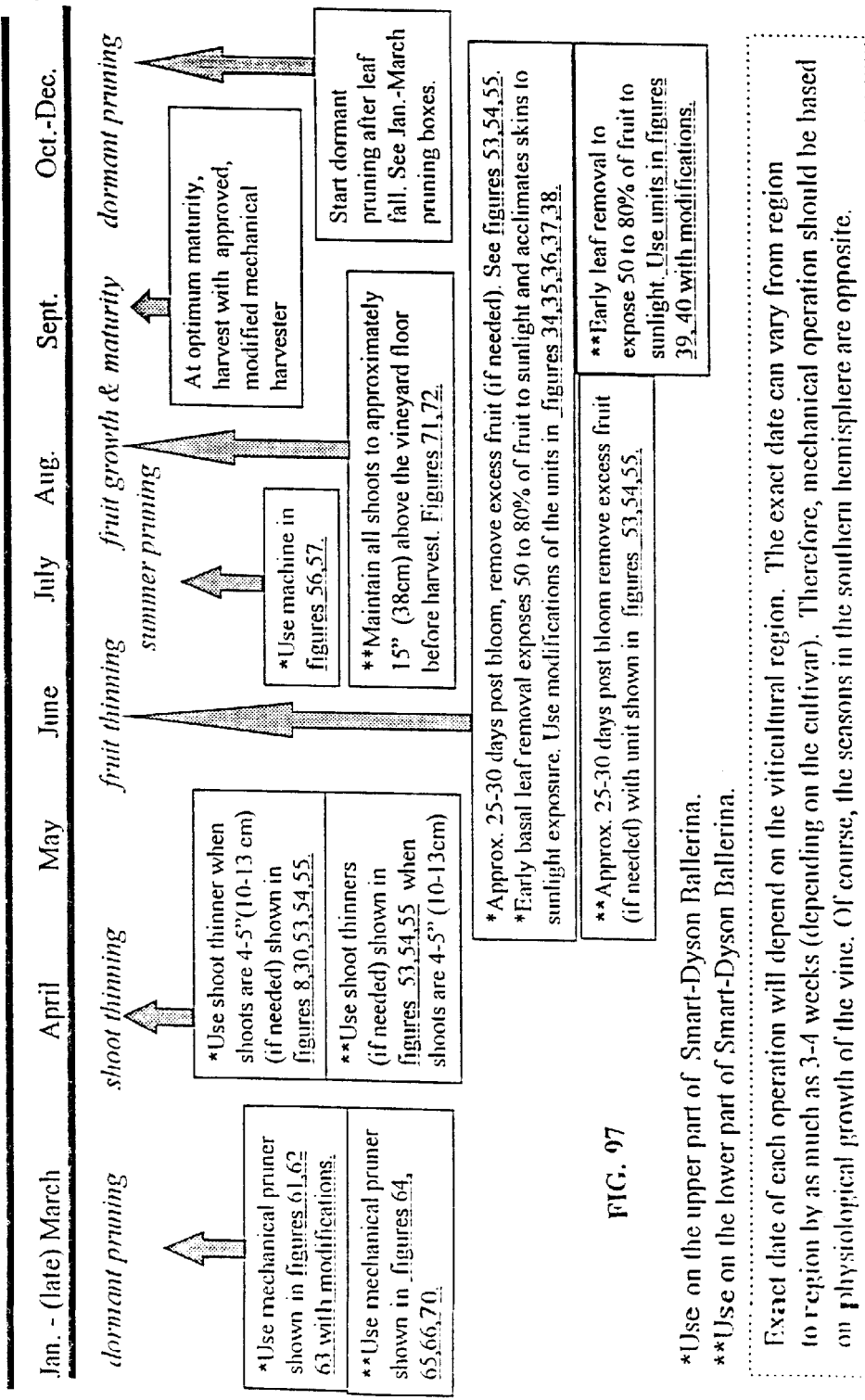

Vertical pruner or pruning and grabbing unit 2290 operates in the same fashion as vertical pruner 2210 of FIGS. 64 and 65 and is adapted for dormant pruning as described, for example, in stage chart XII of FIG. 97.

FIG. 67 and 68 of the drawings illustrate a modified Smart-Dyson ballerina trellising system 2350 having the shoot growth from the top canes trained upward and the shoot growth from the bottom canes trained downward. The upward shoot growth is hedged to prevent an umbrella-like canopy from developing. Upward shoot growth is held in place by two pairs of catch wires 2352 and 2354 supported on spaced vertical posts 2356. The downward growth is not hedged and is allowed to develop an umbrella-like canopy similar to a bilateral cordon. Hence, the upper half (40 inches, 1.02 m) is treated as Vertical Shoot Positioned (VSP) while the lower half (48 inches, 1.2 m) is treated as bilateral trellising systems. The Smart-Dyson Ballerina trellis 2350 is modified from that described in an article by Dr. Richard Smart, the Australian Grape Grower and Winemaker, May 1994, pages 27 and 28. The Smart-Dyson Ballerina trellis has two fruiting zones each approximately within 14 inches above and below the cordon.

The Smart-Dyson Ballerina trellis system was developed by Dr. Richard Smart of Port Macguaire, Australia, and John Dyson of New York. This system was designed to manage extremely high vigor vinifera vines to obtain fruit shoot balance and produce both high yields and quality. The advantage of this modified Smart-Dyson system is the "Ballerina" that has a single cordon with spurs at 48 inches or 1.2 m. The spurs that are on the lower part of the 180° of the cordon forms the lower balerina and the upper spurs form the vertical shoot position part of the system. The lower part of the Smart-Dyson Ballerina system is mechanized in the same manner as shown with respect to the bilateral cordon system. The upper part of the system is trained utilizing the equipment shown for use with vertical shoot position systems.

Figure 69:
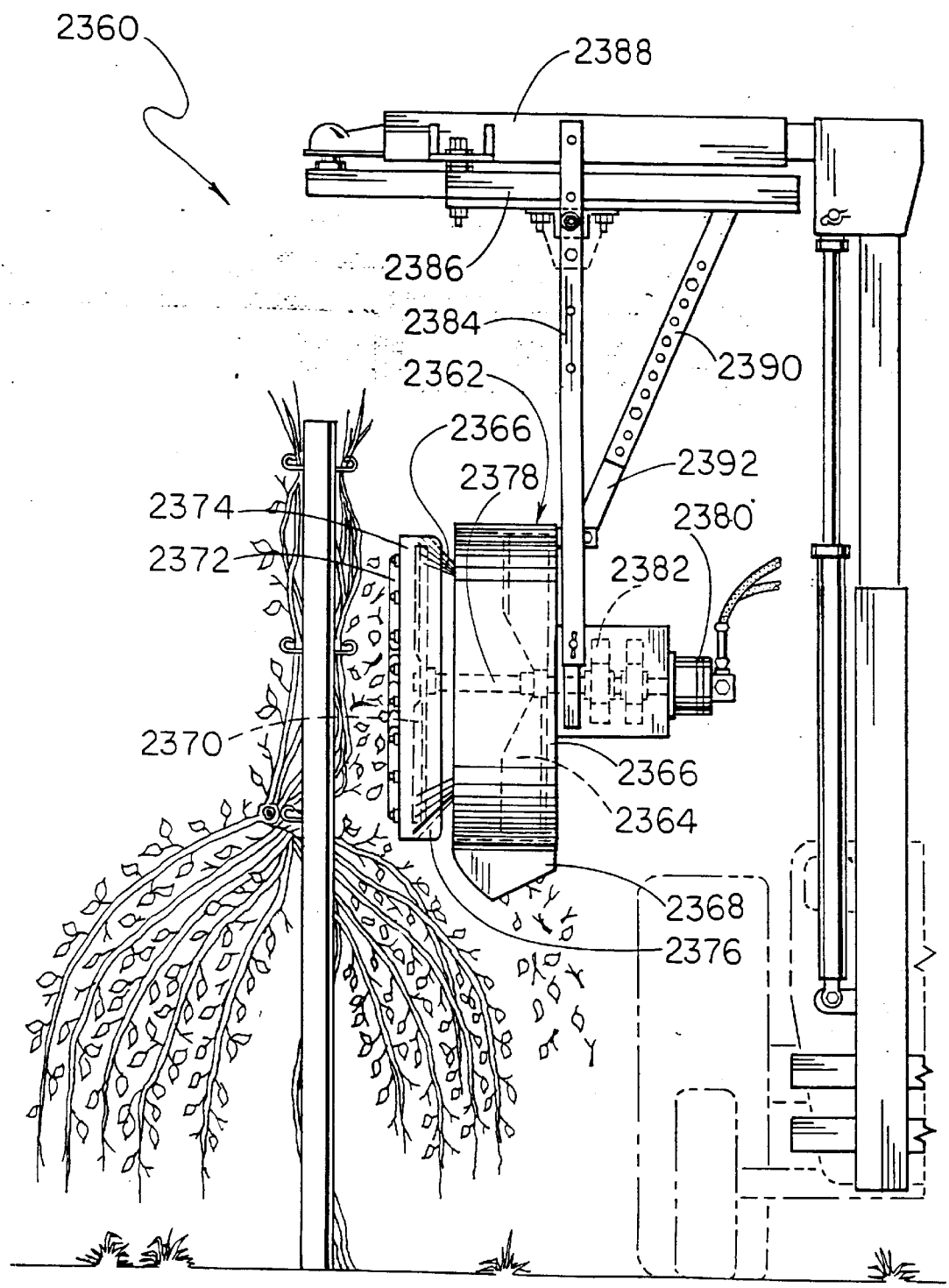
FIG. 69 is a front view representation of a leaf remover adapted for use with the top section of the Smart-Dyson ballerina trellising system of FIGS. 67 and 68.

With reference to FIG. 69 of the drawings, a leaf removal unit 2360 is shown in operation in connection with the upper half of a Smart-Dyson ballerina system. The leaf removal unit 2360 of FIG. 69 is similar to the leaf removal unit 500 of FIG. 34 and includes a fan unit 2362 substantially identical to the fan unit 552 of FIGS. 36 and 37. Leaf remover or unit 2360 includes the single vertically and angularly adjustable blade and fan unit 2362 adapted for cleaning one side of a standard vertical, movable catch wire trellising system, for example, the upper half of a Smart-Dyson ballerina trellising system. Fan unit 2362 includes a fan blade 2364, a fan housing 2366, an intake contacted to a conical cutting blade housing 2368, and a discharge 2368 at the lower end of the housing 2366. A cutting blade 2370 is located in the cutting blade housing 2366 behind a plurality of adjustable length bars or rods 2372 which pass across a circular fan intake opening in a cowling or cover plate 2374 having a bent forward surface 2376. The bars or rods 2372 are spaced a sufficient distance apart to allow leaves or small shoots to enter the fan intake and to be cut by the blade 2370 or by being sheared between the rods and the blade. Fan blade 2364 and cutting blade 2370 are mounted on a drive shaft 2378 which is rotatably driven by a hydraulic motor 2380 and supported by a pair of spaced shaft bearings 2382.

The fan unit 2362 of leaf remover 2360 is vertically and pivotally supported by spaced vertical support members 2384 adjustably attached to a horizontal support member 2386 which is releasably attached to a horizontal mast member 2388. The angle of the fan and blade unit 2362 is selected by adjusting the relative position of first and second angle support members 2390 and 2392 with the upper end of member 2390 being attached to horizontal support member 2386 and the lower end of member 2392 being pivotally attached to the upper end of fan housing 2366. Like fan unit 500 of FIG. 34, the vertical position and angle of the fan unit 2362 can be quickly and easily altered or adjusted to accommodate different trellising systems and growth habits. Further, the length adjustable bars or rods 2372 like the rods or bars 588 of fan unit 552 and fan unit 554 can be placed at different angles and spaced at selected distance (as shown in FIG. 38) to accommodate differing foliage loads, desired clearance, tractor speed, and the like.

With reference again to FIG. 70 of the drawings, vertical pruner 2292 is substantially identical to vertical pruner 2290 of FIG. 66 except that the vertical support members 2396 and 2398 of the cane grabber 2300 and vertical sickle 2296, respectively, have been lengthened in order to prune the lower ballerina section of a Smart-Dyson ballerina trellising system.

Figure 71:
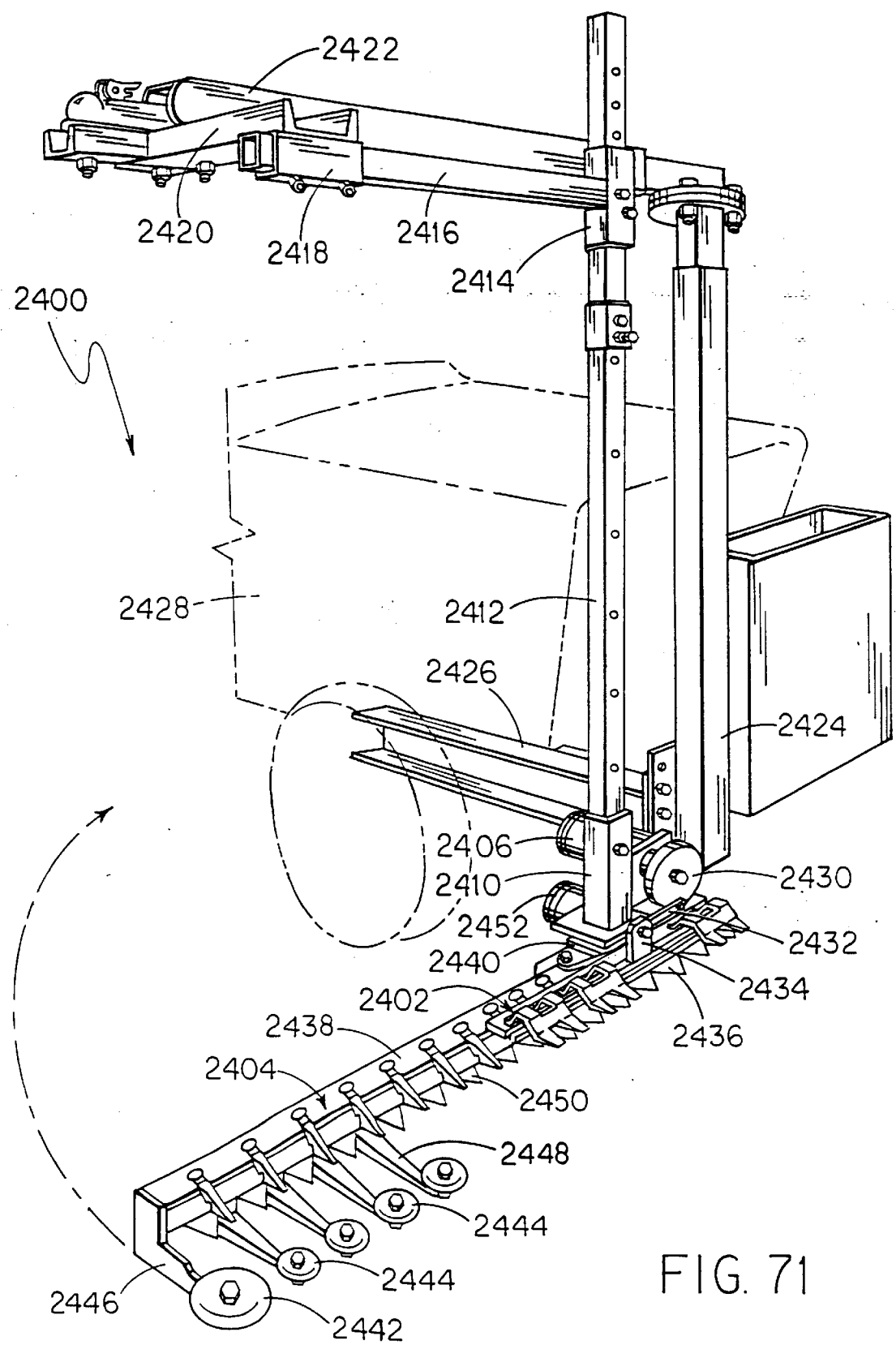
FIG. 71 is a front perspective view illustration of a dual sickle horizontal cutter having a short length, fixed upper sickle and an elongate lower sickle which trips rearwardly. This unit is a modification of a unit developed and tested by Dr. C. Intrieri of Bologna, Italy.

As shown in FIG. 71 of the drawings and in accordance with another embodiment of the present invention, a modified dual sickle horizontal cutter is generally designated 2400 and shown to include a short length, fixed position upper sickle 2402 and an elongate, rearwardly tripping lower sickle 2404. This cutter 2400 is a highly modified version of a horizontal sickle unit developed and tested by Dr. C. Intrieri of Bologna, Italy. The horizontal dual sickle cutter 2400 is adapted, for example, for trimming all shoots to approximately 15 or 30 inches above the vineyard floor as described in stage charts III, IV, VII, VIII, IX, and XII of FIGS. 88, 89, 92, 93, 94, and 97, respectively.

The short length, fixed angular position upper sickle 2402 is located above and slightly forwardly of the lower longer horizontal sickle 2404. Upper horizontal sickle 2402 includes a hydraulic motor 2406 attached to a plate 2408 which is attached to a base member 2410 on the lower end of a vertical support member 2412. Like the vertical support member 2128 of FIG. 61, the vertical support member 2412 is adjustably received in a bracket or collar 2414 attached to one end of a horizontal support member 2416 which itself is received in an adjustable support bracket or collar 2418 attached to a support platform 2420. The support platform 2420 is releasably attached to a horizontal mast member 2422 of a mast 2424 attached to a frame member 2426 of a tractor 2428. The support platform 2420 is releasably attached to horizontal mast member 2422 via a ball hitch and bolt assemblies.

Upper horizontal sickle 2402 further includes a drive disk 2430 operatively attached to a drive shaft of motor 2406. A drive link 2432 has one end attached to drive disk 2430 and the other end attached to a drive bracket 2434 which is attached to a movable set of cutting teeth 2436.

Lower horizontal sickle 2404 includes an elongate support member 2438 attached to a support plate 2440 pivotally attached to the lower end of base 2410 of vertical support member 2412. The pivotal connection between support plate 2440 and base 2410 includes a torsion spring which allows support member 2438 of lower horizontal sickle 2404 to trip rearwardly about a vertical axis should the lower horizontal sickle contact an immovable or uncuttable object. More particularly, a single large bumper disk or roller 2442 and plurality of smaller bumper rollers or disks 2444 are rotatably attached to corresponding cantilever support members 2446 and 2448 which are attached to support member 2438. The rollers or disks 2442 and 2444 are adapted to contact, for example, vine trunks, posts, trellises, and the like and cause the horizontal sickle 2404 to trip rearwardly before such objects can contact cutting teeth 2450 and cause damage to the lower sickle 2404. The rollers or bumpers 2442 and 2444 are spaced from one another a selected distance to only allow items having a diameter or width of less than about two inches, preferably less than one inch to pass between the rollers and contact the cutting teeth 2450. Like sickle 2402, lower sickle 2404 includes a motor and drive linkage for reciprocating the cutting teeth 2450.

Figure 83:
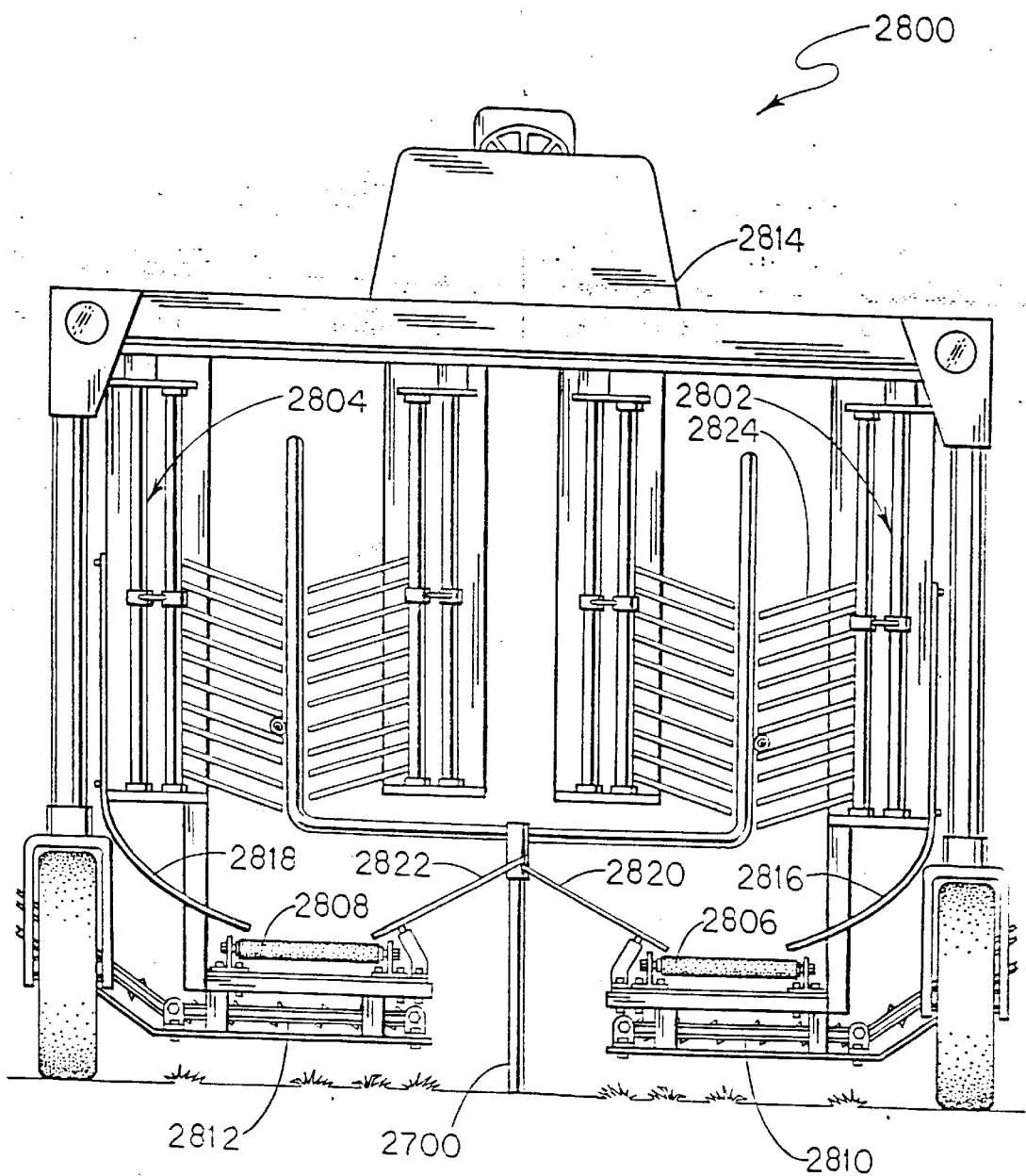
FIG. 83 is a schematic front view illustration of a grape harvester machine adapted for use with the modified Lyre or "U" trellis of FIGS. 80 and 81. This harvester contains two picking heads and a collecting system with a conveyor belt under each picking head.
Figure 84:
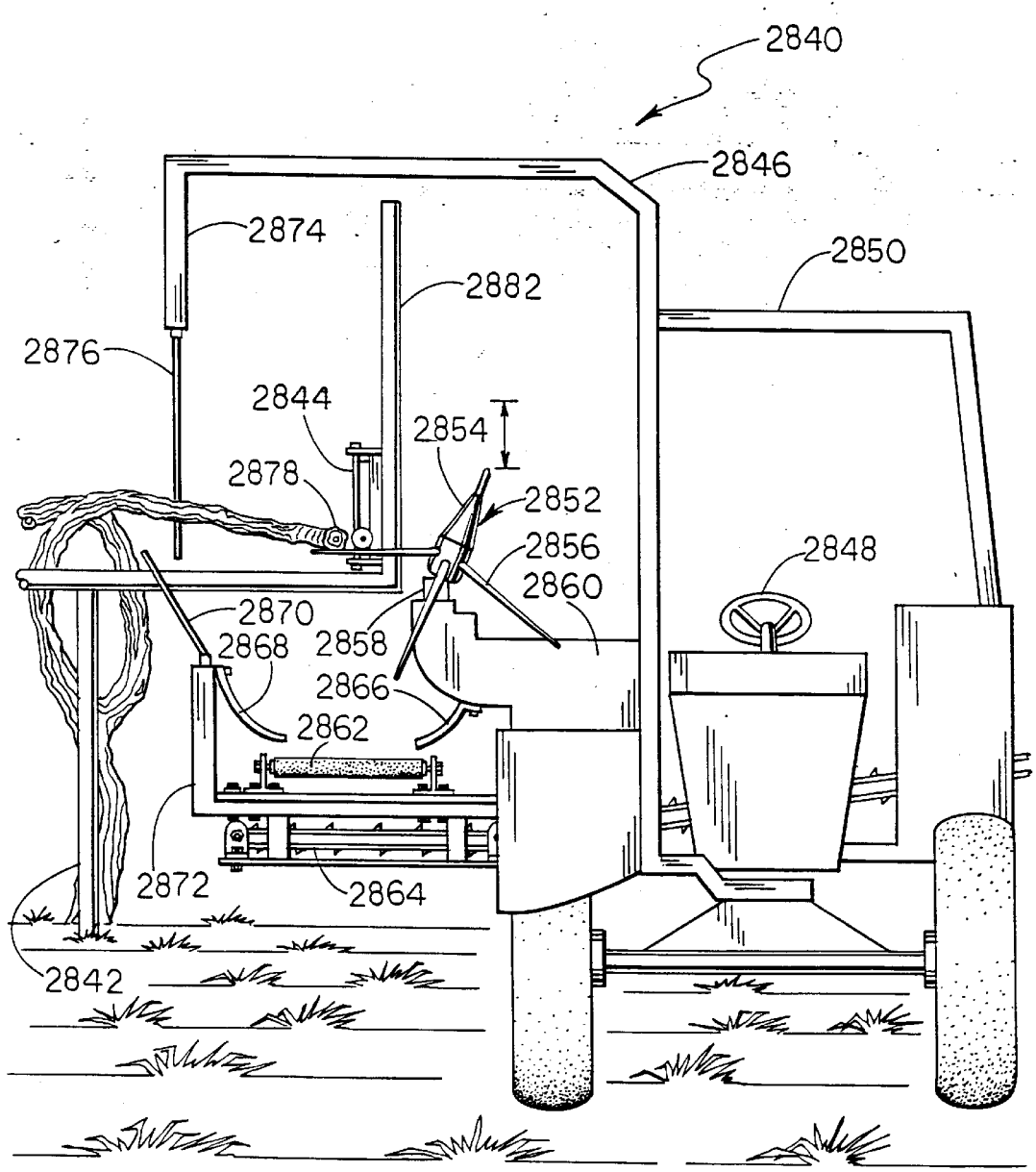
FIG. 84 is a schematic front view representation of a modified half-row, floating, at least vertically shaking, rotating head picker mechanical harvester adapted for use with a Lyre or "U" trellis modified to include a moveable cordon wire support, roller or slide assembly.
Figure 85:
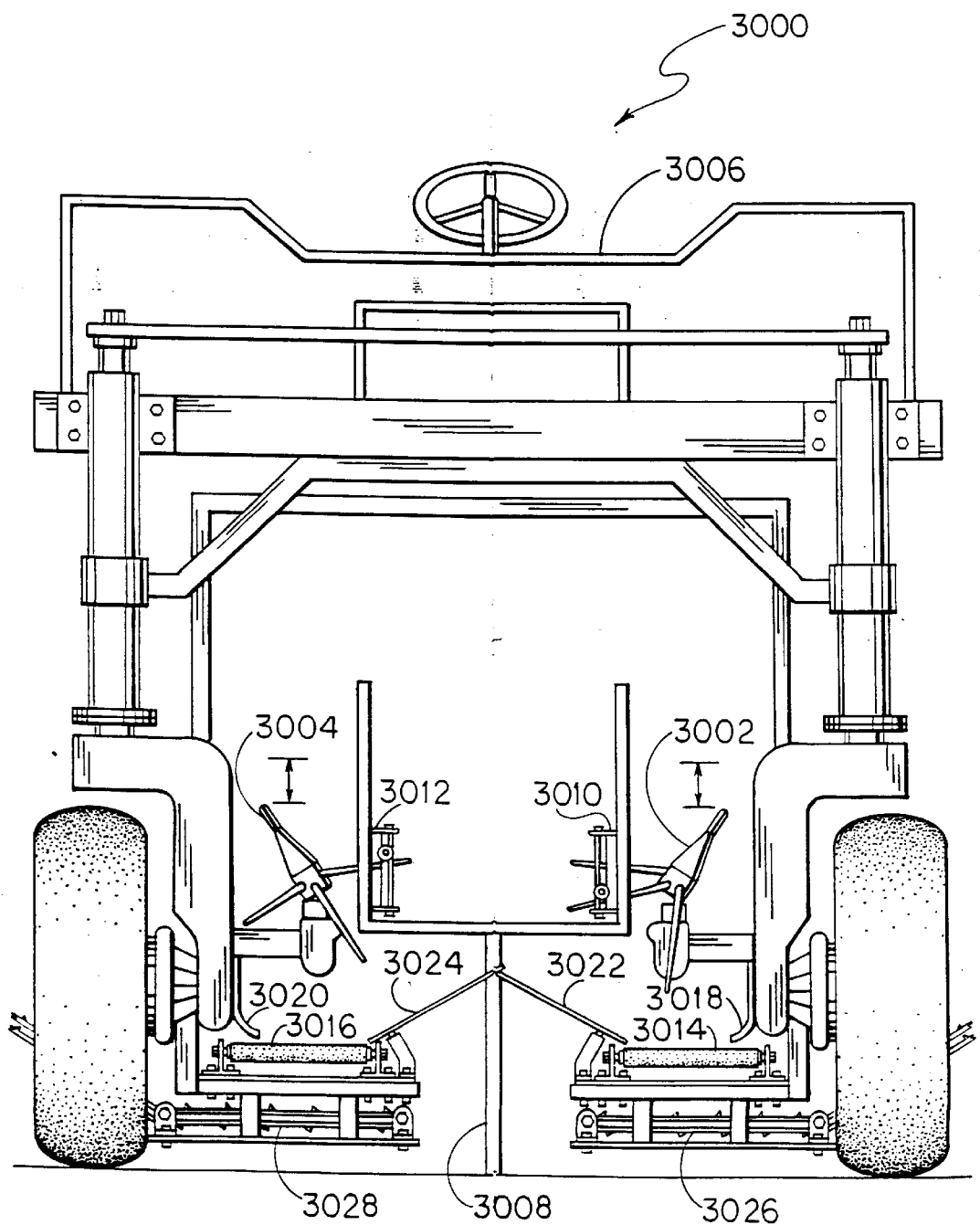
FIG. 85 is a schematic front view representation of a modified full-row, floating, at least vertically shaking, rotating head picker mechanical harvester adapted for use with a Lyre or "U" trellis having moveable cordon wire roller or slide assemblies.
Figure 86:
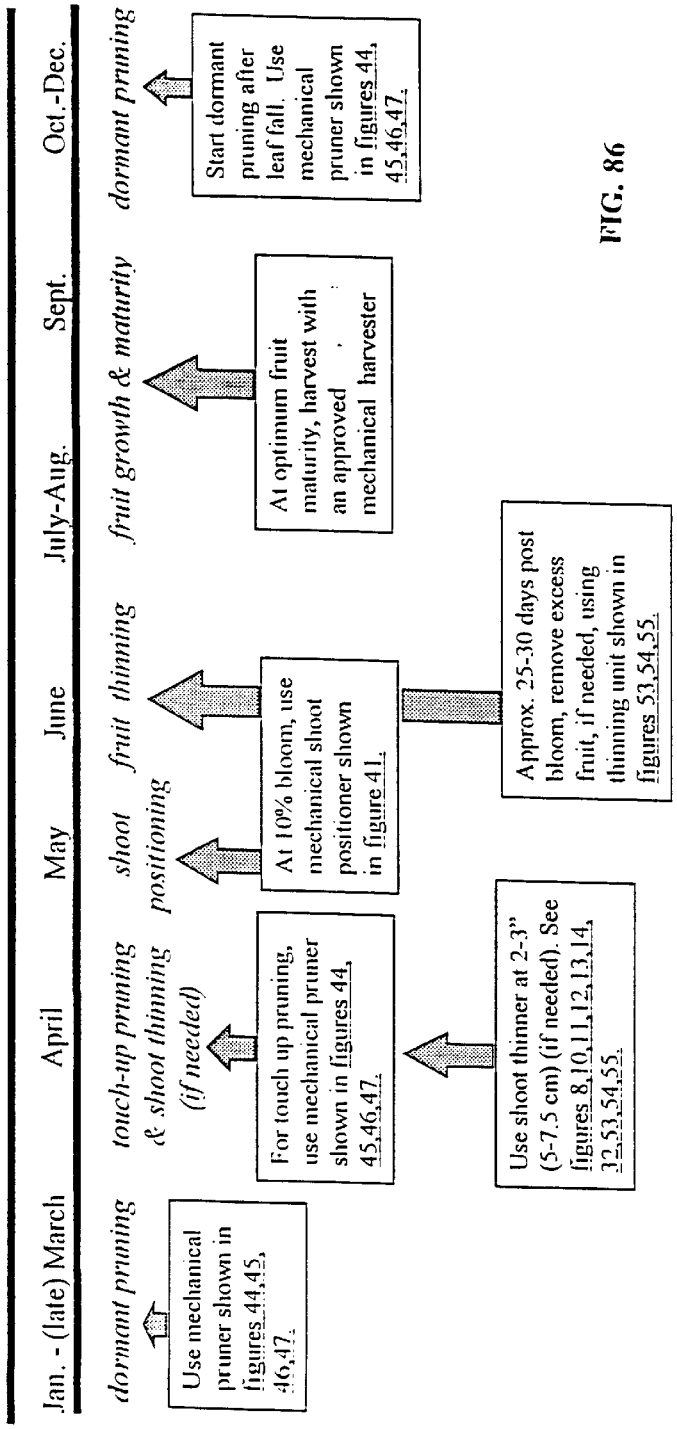
FIGS. 86–97 are seasonal charts showing respective embodiments of the Morris-Oldridge vineyard mechanization system in accordance with the present invention. More particularly.

The unit 2400 includes a plurality of set screws or bolts which make it easy to quickly and easily adjust the vertical height of the upper and lower horizontal sickles 2402 and 2404. The short fixed, upper horizontal sickle 2402 tends to protect the support structure and drive arrangement of the sickles by cutting any canes or vineyard floor growth which would otherwise wrap around or entangle these items. The lower horizontal sickle 2404 provides the bulk of the trimming of canes and shoots at a selected distance above the vineyard floor, for example 15 or 30 inches, prior to harvest to facilitate mechanical harvesting using, for example, a harvester such as shown in FIGS. 83, 84, 85, or the like.

Figure 72:
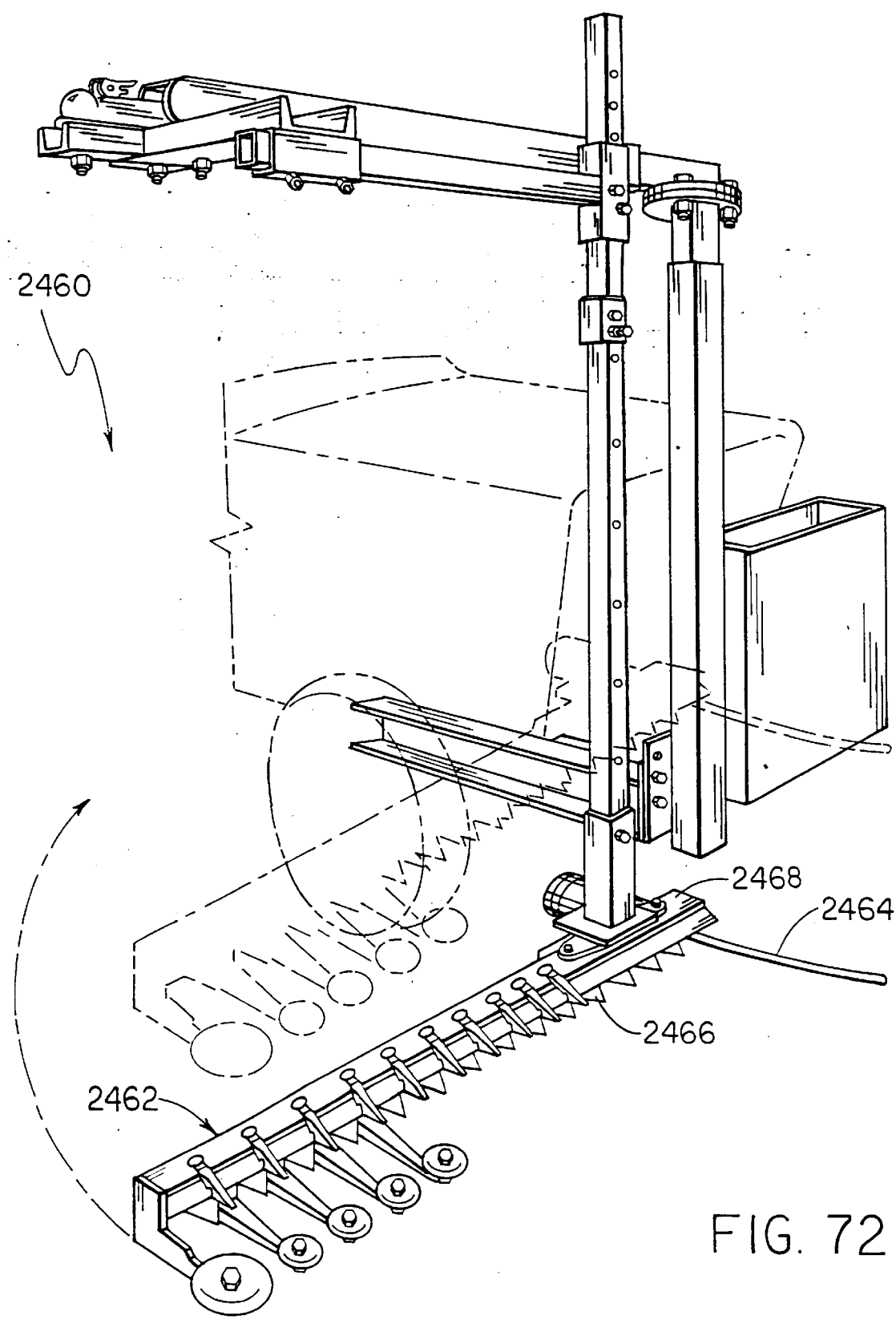

With reference to FIG. 72 of the drawings and in accordance with another embodiment of the present invention, a more simplified single unit single bar half-row horizontal cutter generally designated 2460 is shown to include an elongate, rearwardly tripping, sickle 2462 substantially identical to the lower horizontal sickle 2404 of dual sickle horizontal cutter 2400 of FIG. 71. The single horizontal sickle unit 2460 of FIG. 72 differs from the dual unit 2400 of FIG. 71 in that it does not include the upper short fixed horizontal sickle 2402 and does include a forwardly extending arced rod or bar 2464 which serves to direct canes, shoots, and the like toward the cutting teeth 2466 of sickle 2462. The cane guiding bar 2464 is fixed in position relative to support member 2468 of sickle 2462.

As shown in phantom lines in FIG. 72 of the drawings, horizontal sickle 2462 may be vertically adjusted to a variety of selected vertical positions, for example, 15 inches or 30 inches from the vineyard floor, depending on what trellising system is being trimmed or pruned. For example, trimming of shoots and canes prior to harvest may require the shoots or canes to be trimmed to approximately 30 inches above the vineyard floor as described in stage chart VII of FIG. 92.

Figure 73:
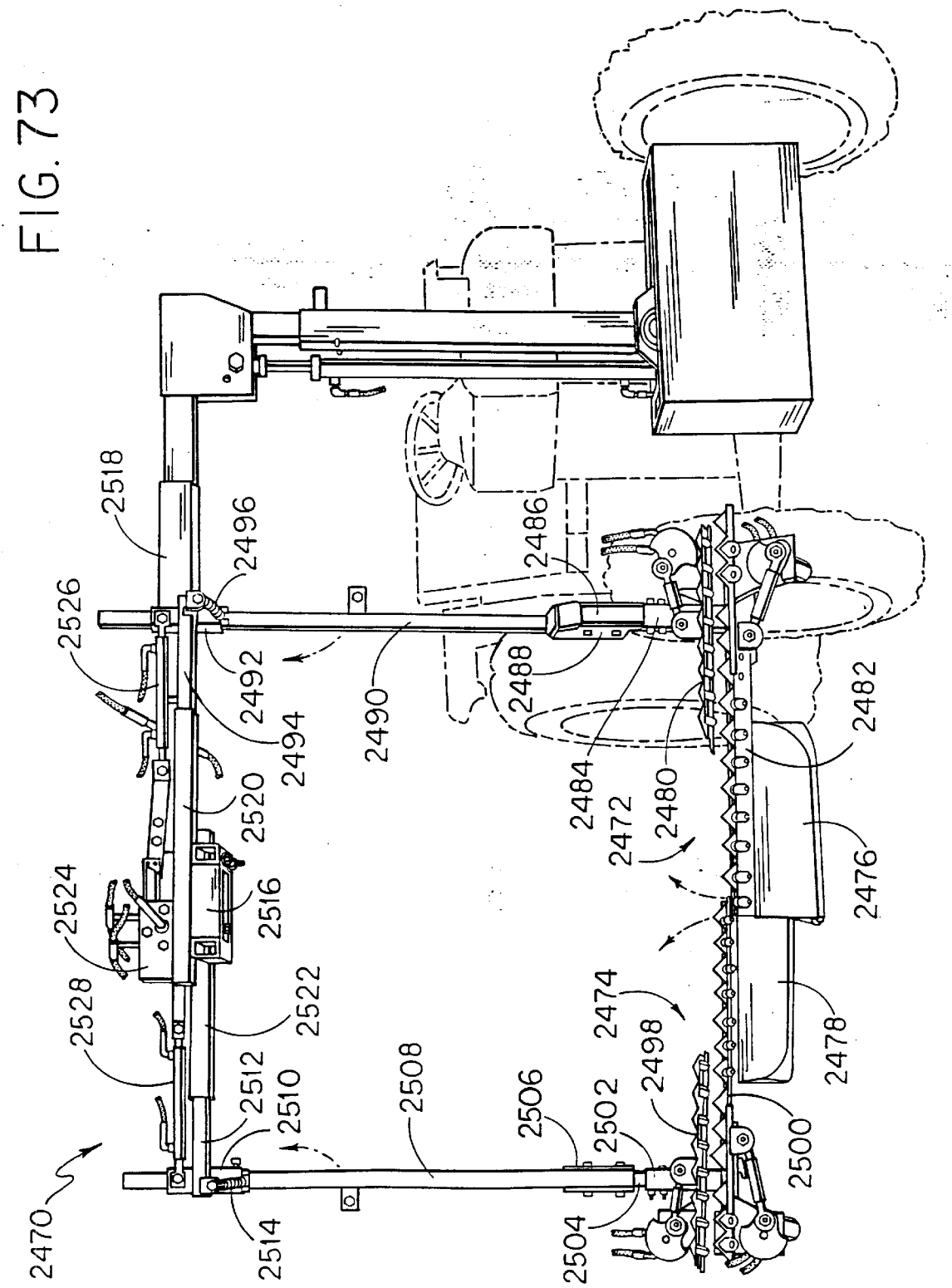
FIG. 73 is a front view illustration of a double or dual sickle horizontal cutter having a short length, upper sickle and an elongate lower sickle on each side and which both trip rearwardly. The protruding bumper guards in front of the lower sickles are designed to operate in vineyards where each plant is supported by metal or wood stakes. The metal bumper guard allows the unit to pass the post without damage.

With reference to FIG. 73 of the drawings, a double or dual unit full-row horizontal cutter is generally designated 2470 and shown to include inner and outer dual sickle horizontal cutter arrangements 2472 and 2474 which are similar in construction to the dual sickle horizontal cutter 2400 of FIG. 71 except that the outer dual sickle arrangement 2474 is a mirror image of the inner unit or arrangement 2472 and trails the inner unit 2472. Also, the disk or rollers 2442 and 2444 of lower horizontal sickle 2404 of unit 2400 of FIG. 71 have been replaced with forwardly and downwardly angling aprons or bumpers 2476 and 2478 adapted for vineyards where each plant is supported by, for example, metal or wooden stakes. The metal bumpers or guards 2476 and 2478 contact the stakes, posts, vine trunks, or the like and cause the elongate lower horizontal sickles to trip rearwardly without damaging the cutting teeth thereof. The double or dual unit horizontal cutter 2470 of FIG. 73 is particularly adapted for use with the Minimal pruned, high-wire, bilateral cordon, Smart-Dyson Ballerina (and other like trellising systems) can serve to trim or prune both sides of a row along a single pass down the row. In contrast, the horizontal cutters 2400 and 2460 of FIGS. 71 and 72 are adapted to trim or prune half of a row with each pass of the tractor down the row.

The support structure for each of the inner and outer dual sickle horizontal cutters 2472 and 2474 of dual unit cutter 2470 differ from the vertical support structure of units 2400 and 2460 of FIG. 71 and 72 in that they allow not only for vertical height adjustment, but also for automatic horizontal distance adjustment between the inner and outer units and allow the entire inner and outer cutters 2472 and 2474 to trip rearwardly. More particularly, inner cutter 2472 includes upper and lower horizontal sickles 2480 and 2482 operatively attached to a base 2484 on a vertical member 2486. Vertical member 2486 is attached to a support assembly 2488 at the lower end of a vertical support member 2490. The upper end of vertical support member 2490 is adjustably received in a collar or bracket 2492 which is pivotally attached to a horizontal member 2494. A spring 2496 has one end attached to collar or bracket 2492 and the other end attached to a member extending forwardly from horizontal member 2494. Hence, spring 2496 allows the collar or bracket 2492, vertical member 2490, and entire inner cutter 2472 to trip rearwardly and upwardly should the inner cutter 2472 contact an immovable or uncuttable object. Also, lower horizontal sickle 2482 of inner cutter 2472 can trip rearwardly about a vertical axis should bumper or guard 2476 contact an immovable or uncuttable object.

Likewise, outer cutter 2474 includes an upper horizontal sickle 2498 and a lower horizontal sickle 2500 operatively attached to a base 2502 on the lower end of a support member 2504. The member 2504 is attached to a support assembly 2506 which is attached to the lower end of a vertical support member 2508. The upper end of member 2508 is received in a bracket or collar 2510 pivotally attached to a horizontal member 2512. A spring 2514 has one end attached to bracket or collar 2510 and the other end attached to a member extending forwardly of horizontal member 2512. Spring 2514 allows support member 2508 and outer cutter 2474 to trip rearwardly and upwardly. Also, at least lower horizontal sickle 2500 trips rearwardly about a vertical axis should guard or bumper 2478 contact an immovable or uncuttable object.

Dual unit horizontal cutter 2470 includes a support platform 2516 releasably attached to a horizontal mast member 2518 and supporting first and second horizontal members 2520 and 2522, hydraulic control and valve structure 2524, and one end of first and second hydraulic cylinders 2526 and 2528. Support member 2494 of inner cutter 2472 is telescopically received in and supported by first member 2520 while support member 2512 of outer cutter 2474 is telescopically received in and supported by second member 2522. Valve structure 2524 includes control valves for selectively applying hydraulic fluid to each of the hydraulic cylinders 2526 and 2528 to selectively extend or retract the pistons and shafts thereof to achieve the desired distance between the support members 2490 and 2508 and inner and outer cutters 2472 and 2474. Hence, cylinders 2526 and 2528 can be used to spread the inner and outer cutters apart or bring them together as desired. For example, in order to start the dual unit horizontal cutter 2470 at the end of a row, one may extend the shafts of the cylinders 2526 and 2528 to space the inner and outer cutters 2472 and 2474 as far apart as possible to accommodate conventional catch and cordon wire anchoring posts, or the like. Once the cutter 2470 has moved beyond the anchoring posts, the operator can retract the shafts of the cylinders 2526 and 2528 to bring the inner and outer cutters 2472 and 2474 back to the position shown in FIG. 3 for trimming and pruning along the row.

Figure 87:
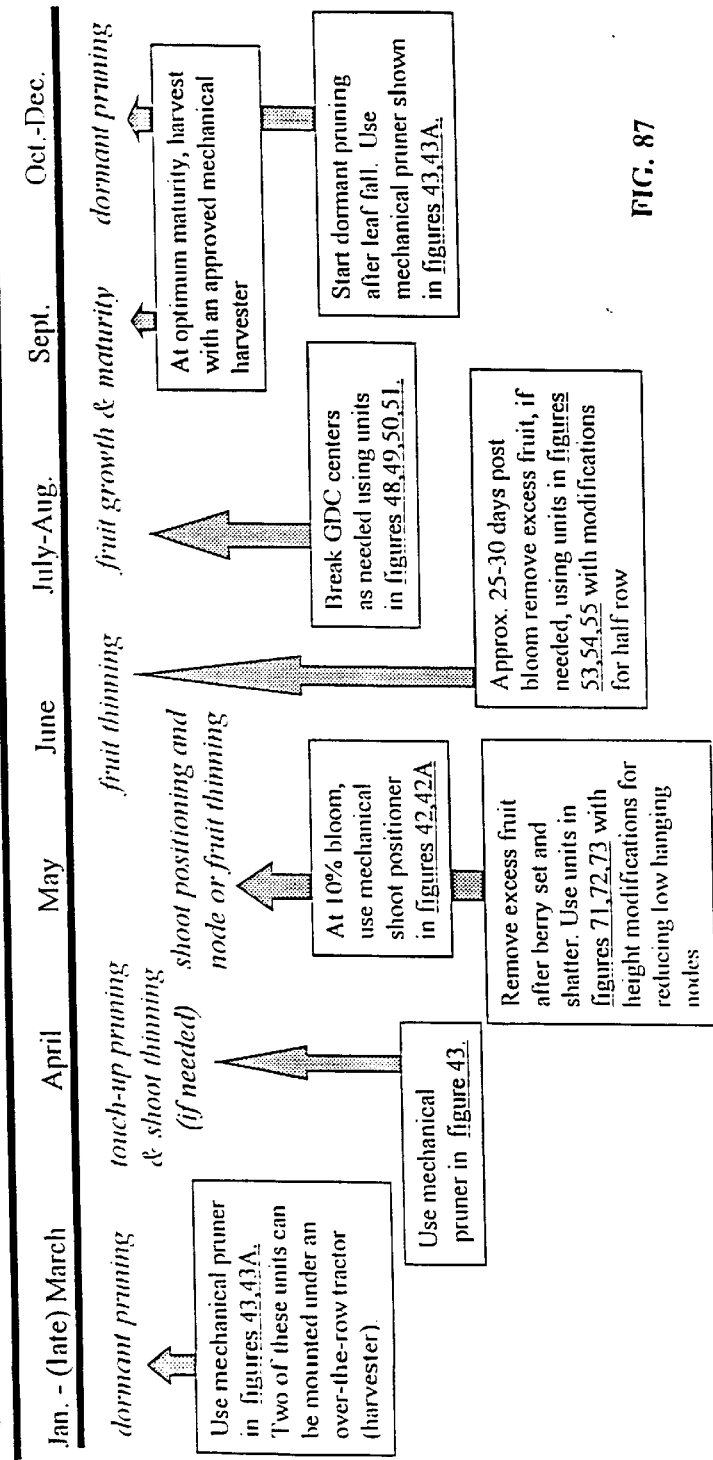
Figure 88:
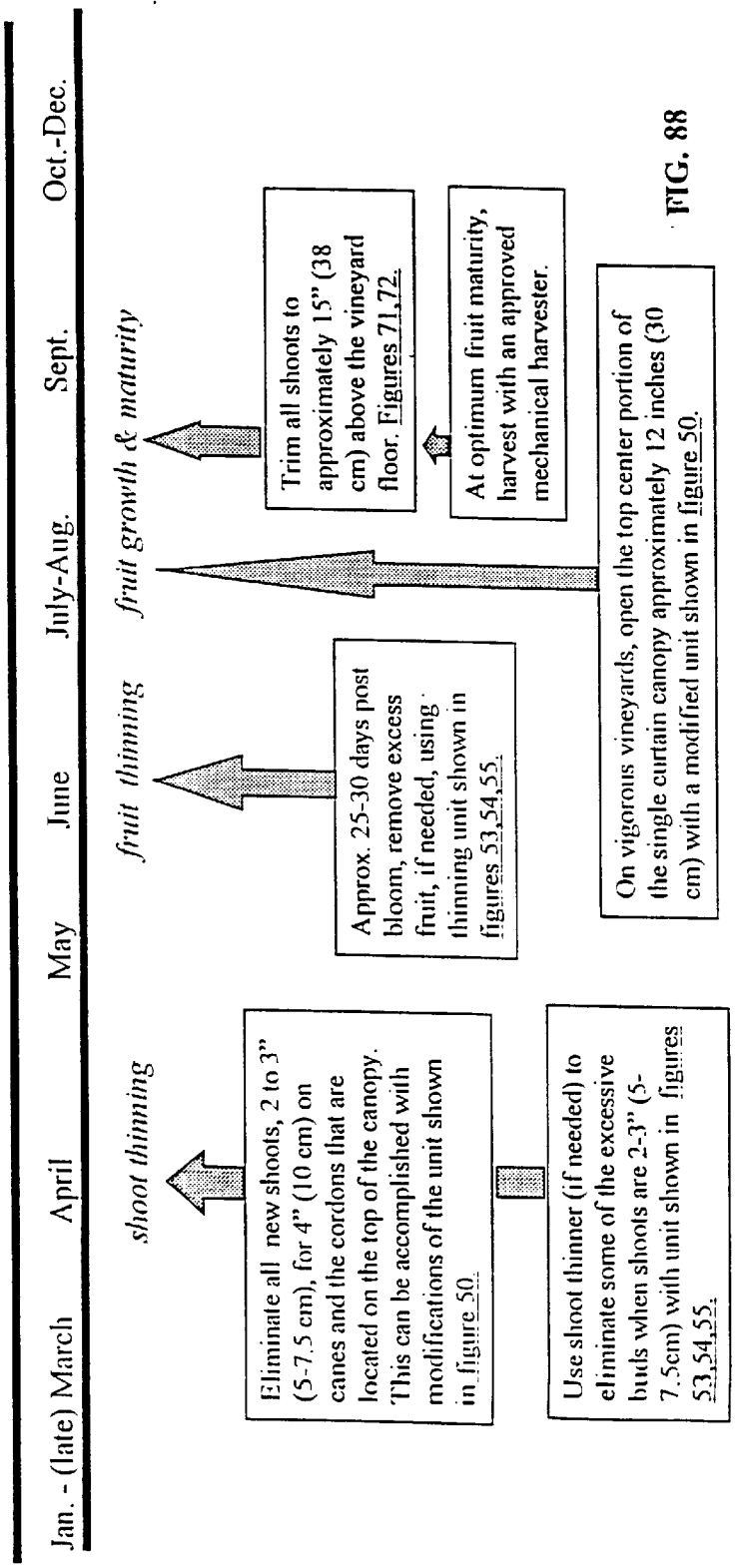
Figure 89:
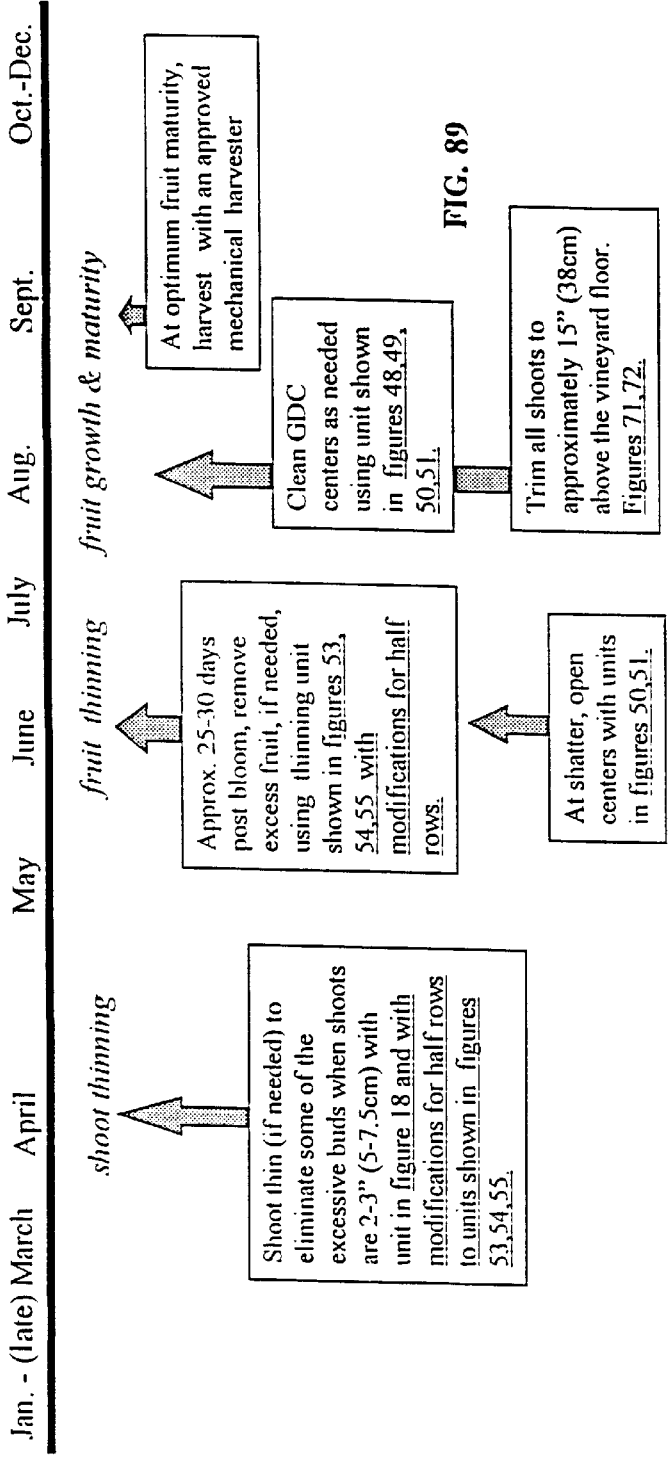
Figure 90:
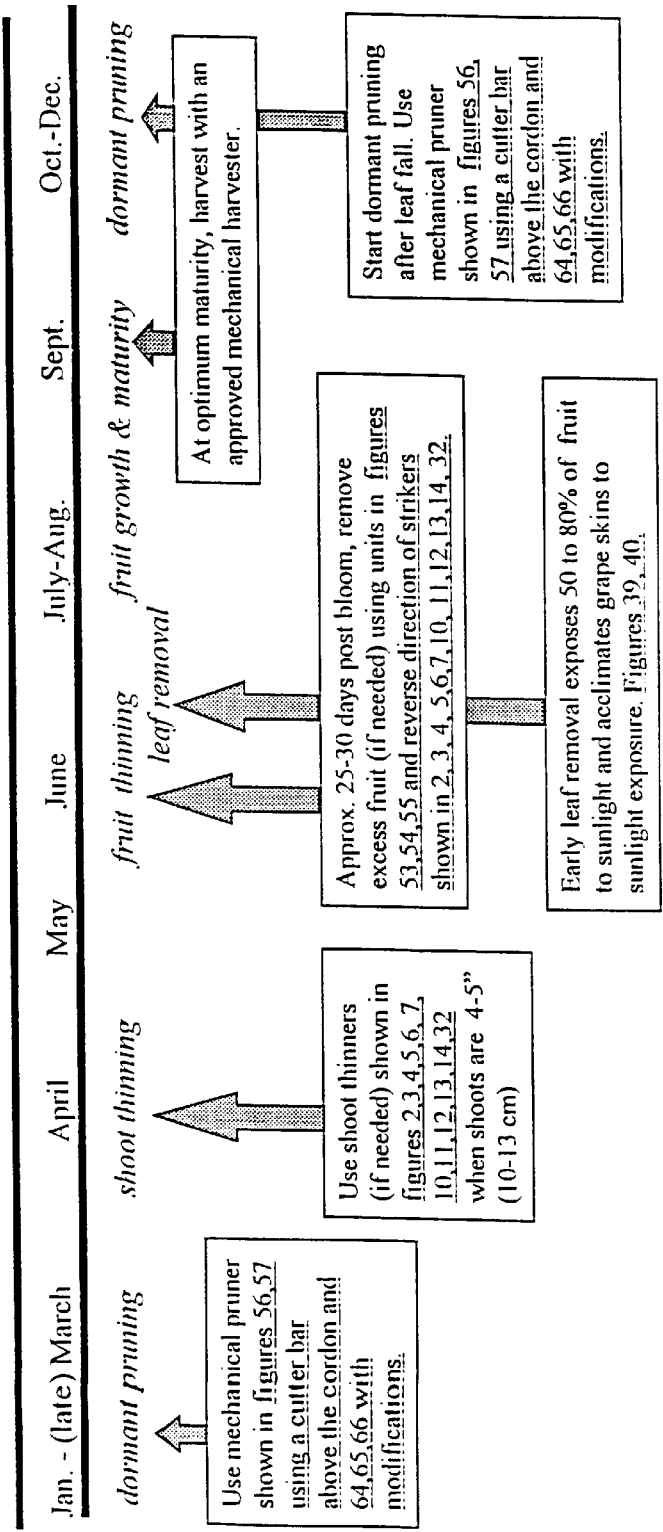
Figure 91:
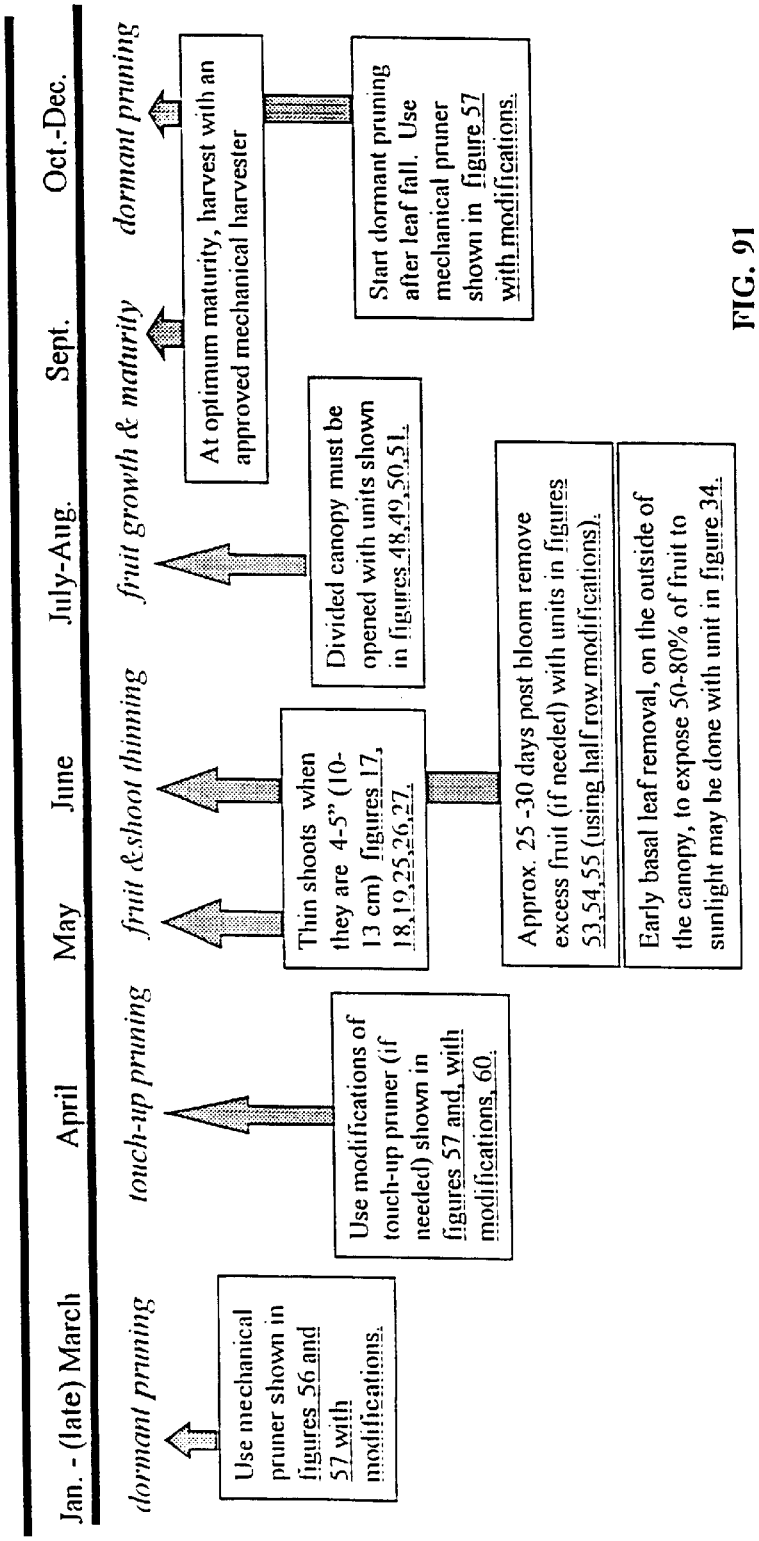
Figure 92:
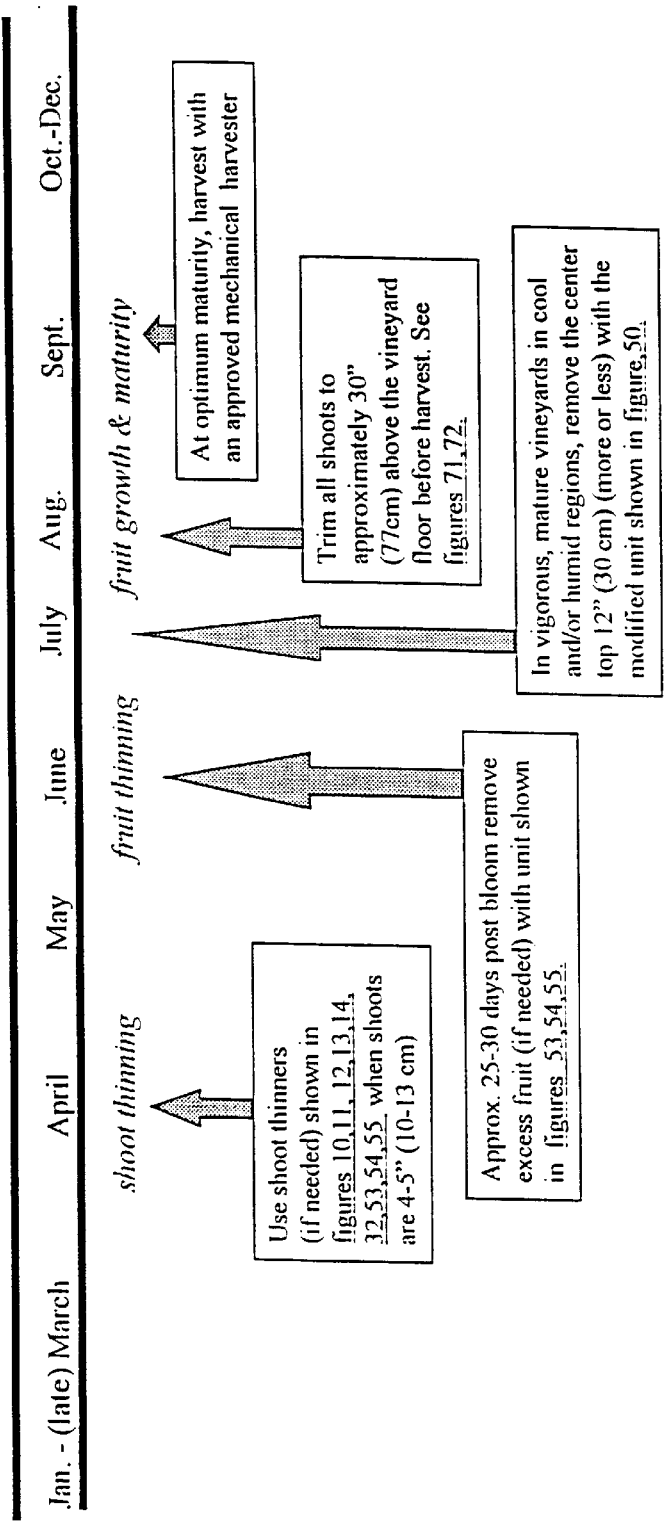
Figure 93:
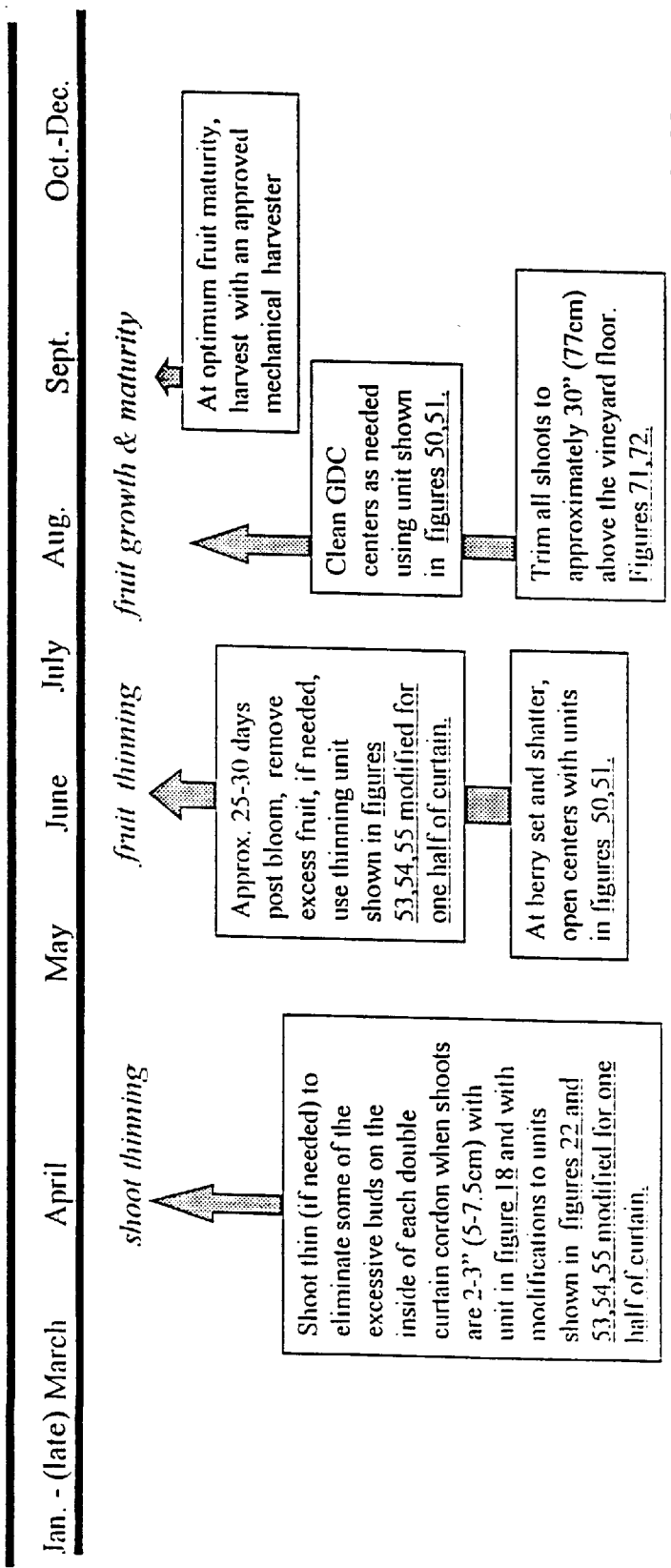
Figure 94:
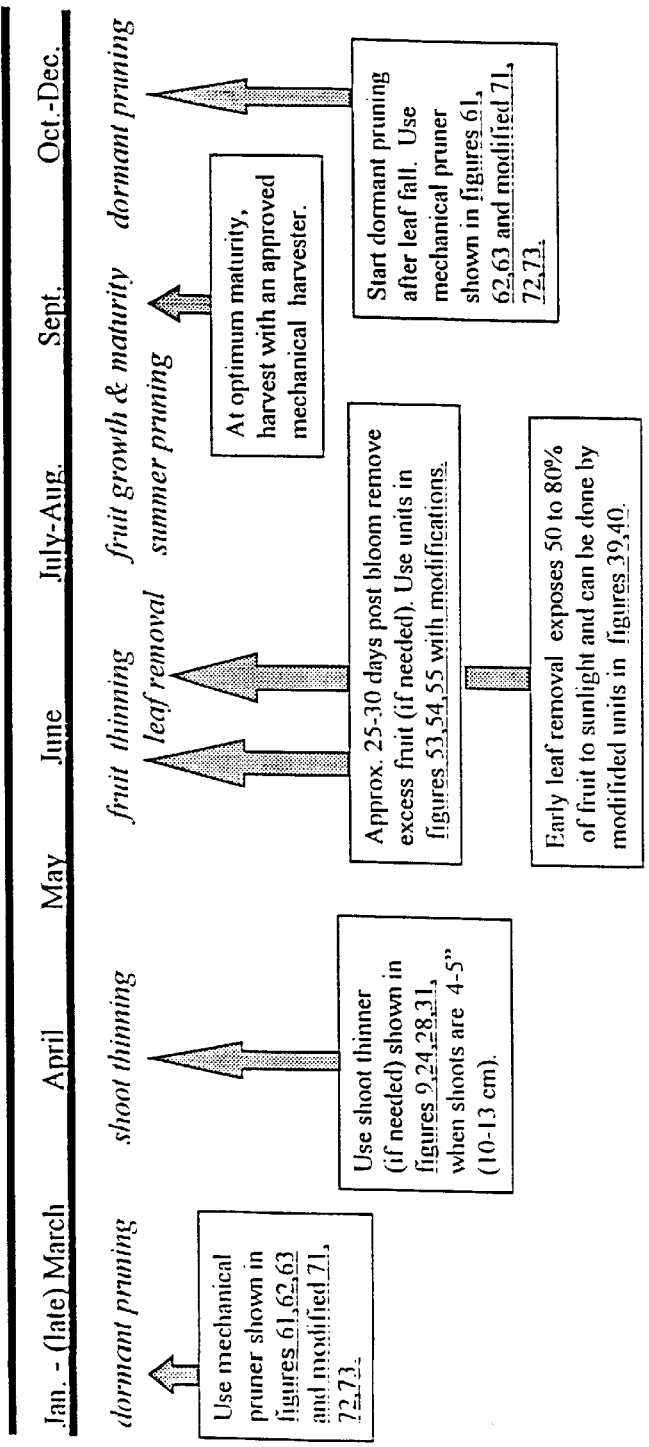
Figure 95:
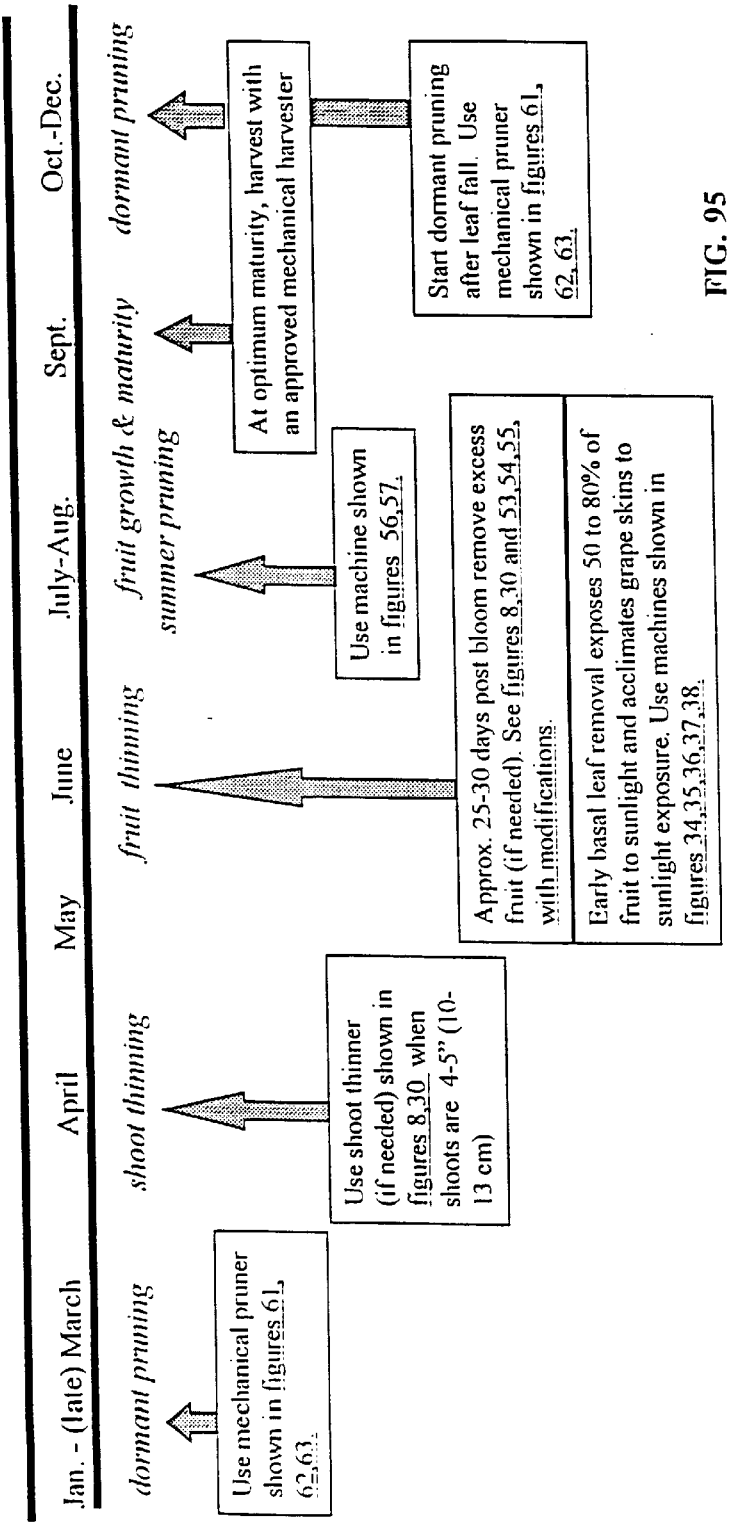
Figure 96:
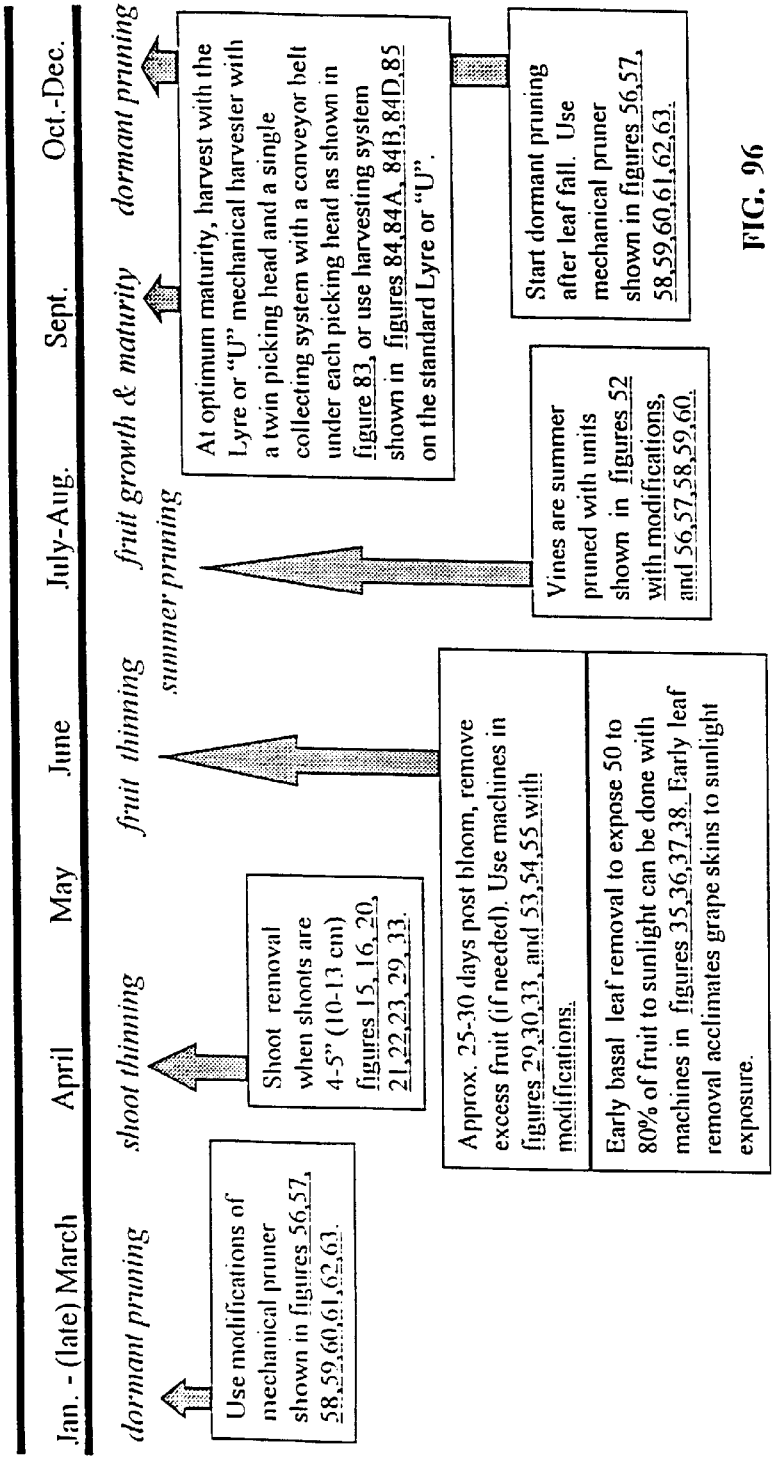

With reference again to FIGS. 71–73 of the drawings and reference to stage chart II of FIG. 87, although the trimmers and pruners 2400, 2460, and 2470 are usually used for trimming or pruning prior to harvest, they can also be used for dormant pruning and to remove excess buds or fruit to reduce fruit load after set and shatter. For example, for grapes having drooping growth habits, shoots or canes extending downwardly from a cross arm may be trimmed to a selected length to provide a particular fruit load by raising the trimmers or pruners to a height just a few inches underneath the cross arm.

Figure 74:
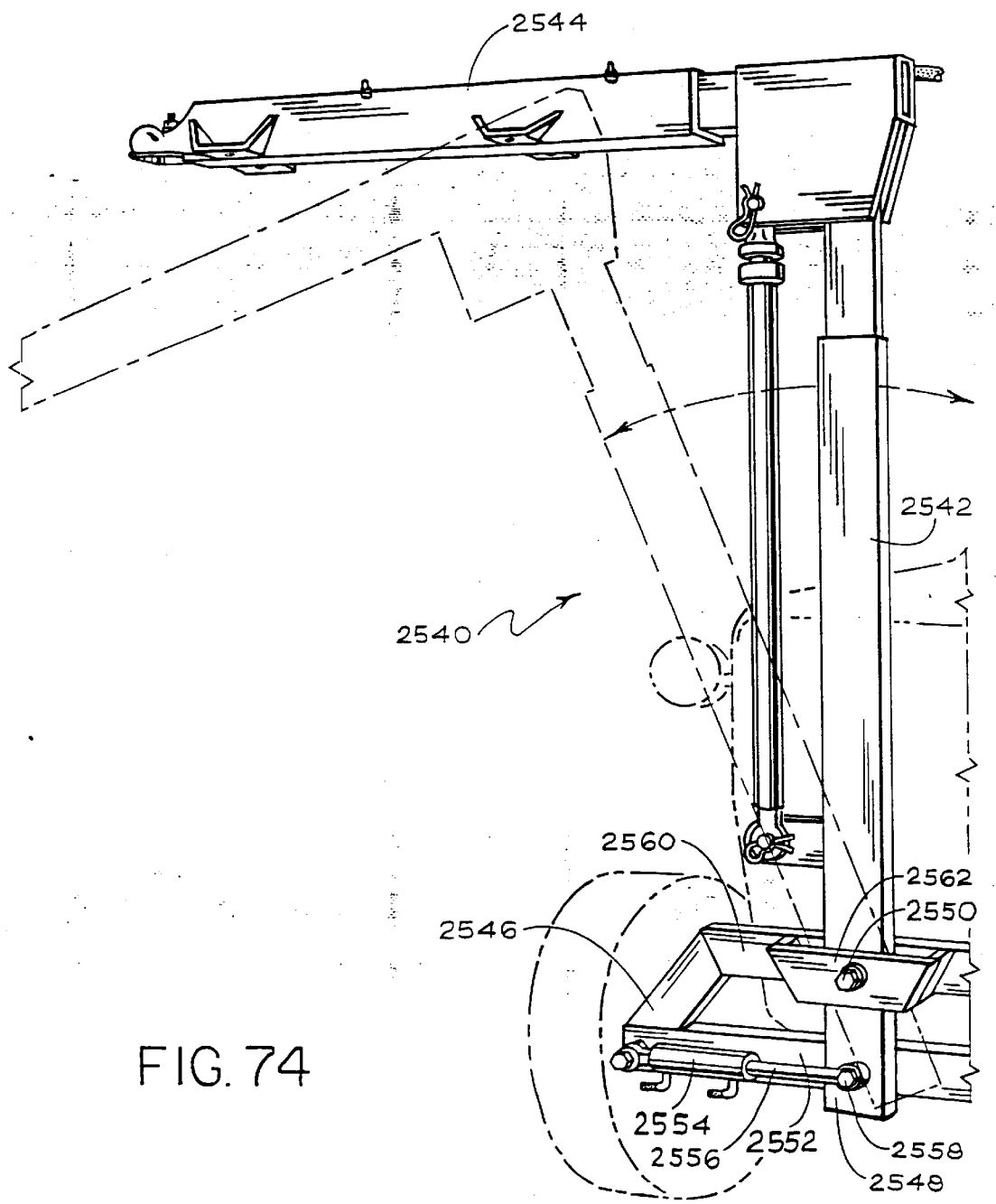
FIG. 74 is a front perspective view illustration of an angularly adjustable mast adapted for use on hillsides or sloping vineyards.

As shown in FIG. 74 of the drawings and in accordance with another embodiment of the present invention, a tilting mast 2540 is shown to include an expanding vertical section 2542 and an extending horizontal section 2544 substantially identical in construction to the masts shown, for example, in FIGS. 64–66, and 69 of the drawings. The tilting mast 2540 of FIG. 74 differs from the other masts in that the vertical section 2542 can tilt relative to the supporting tractor or vehicle. Tilting mast 2540 includes a lower support structure 2546 attached to the forward end of the tractor or vehicle and serving to pivotally support a lower end 2548 of vertical mast section 2542 about a horizontal axis of a bolt or pin 2550. Support structure 2546 includes a lower horizontal member 2552 which provides for attachment of one end of a cylinder 2554 thereto. A shaft 2556 extending from cylinder 2554 is attached by a bolt or pin 2558 to lower end 2548 of vertical section 2542. Support structure 2546 also includes an upper member 2560 which supports a yolk 2562 which limits tilting movement of vertical member 2542. As shown in phantom lines, the mast is tilted to the left by extension of the shaft 2556 from cylinder 2554. Likewise, the mast may be tilted to the right by retracting shaft 2556 in cylinder 2554. Although the mast 2540 may be tilted from 0 to 30 degrees in either direction, it is preferred to have mast only tilt through 0 to 12 degrees in either direction from vertical to ensure stability of the equipment and tractor or vehicle. Extension and retraction of shaft 2556 from cylinder 2554 and resultant tilting of mast 2540 is controlled by the vehicle operator by, for example, controlling hydraulic fluid to and from the cylinder 2554.

The angularly adjustable mast 2540 of FIG. 74 is adapted for use on hillsides or sloping vineyards and may also be used on a relatively flat vineyard to tilt equipment such as thinning, pruning, or trimming devices, units, or the like to accommodate particular trellising systems or growth habits. As an example, mast 2540 can be used to tilt equipment relative to the angled arms of a GDC or Y-trellis.

With reference to FIG. 75 of the drawings, a basic Geneva Double Curtain (GDC) training system is shown to include cordon wire supports A, cordon wires B, cordons C, pruning canes D, renewal spurs E, and posts F spaced at 24 feet.

Figures 76, 77:
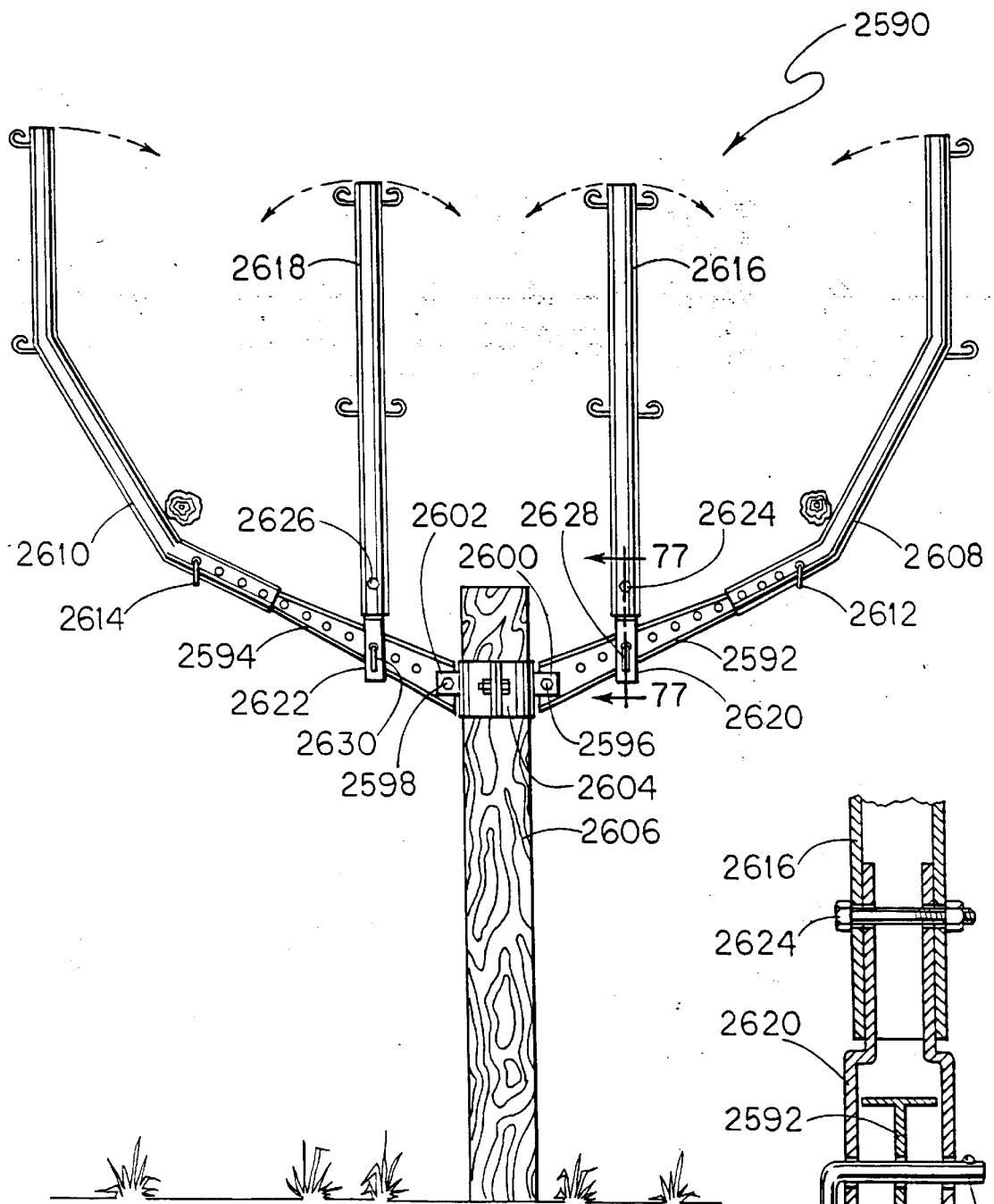
FIG. 76 is a schematic end view representation of a modified vertical catch wire trellis (modified Lyre or "U"). The cross arms are flexible to allow for harvest mechanization. Also, note the location of each cordon to allow for space for the mechanization equipment to operate. The inside movable stakes allow for rapid adjustment of catch wires following mechanical fruit thinning.
FIG. 77 is a partial cross-section illustration of the removable, adjustable pin attachment of the movable stakes of FIG. 76 taken along line 77—77.

As shown in FIGS. 76 and 77 of the drawings, and in accordance with another embodiment of the present invention, a modified vertical catch wire trellis or modified Lyre or "U" system adapted for complete or total mechanization of vineyard cultivation, especially in an established vineyard, is generally designated 2590 and shown to include first and second cross arms 2592 and 2594 which pivot respectively about bolts 2596 and 2598 extending through brackets 2600 and 2602 on a collar 2604 adjustably attached to a post 2606. The cross arms flex or pivot about bolts 2596 and 2598 to allow for harvest mechanization. Tubular cross arm extensions 2608 and 2610 are adjustably received on each of the cross arms 2592 and 2594 using respective pins 2612 and 2614 received in corresponding openings through the extensions and cross arms.

Further, each of the cross arms 2592 and 2594 support movable and pivoting tubular stakes 2616 and 2618 extending upwardly from U-members or yokes 2620 and 2622 and pivotally attached thereto by respective bolts 2624 and 2626. Each of the yokes 2620 and 2622 are releasably and pivotally attached to the respective cross arms 2592 and 2594 by pins 2628 and 2630 received in corresponding circular openings through the yokes and cross arms. The use of pins for releasably attaching the cross arm extensions 2608 and 2610 and movable stakes 2616 and 2618 to cross arms 2592 and 2594 increase the versatility and adjustability of the modified trellis 2590. As shown, each of the cross arms include a plurality of openings which allow for adjustment in the positioning of the cross arm extensions and movable stakes.

In accordance with a particular example of the present invention, it is preferred to form the tubular members including the cross arm extensions 2608 and 2610 and movable stakes 2616 and 2618 of metal pipe or conduit such as 1½ to 2½ inch outer diameter steel tubing and to form the other metal components of sturdy metal material such as steel or cast aluminum.

Figures 78, 79:
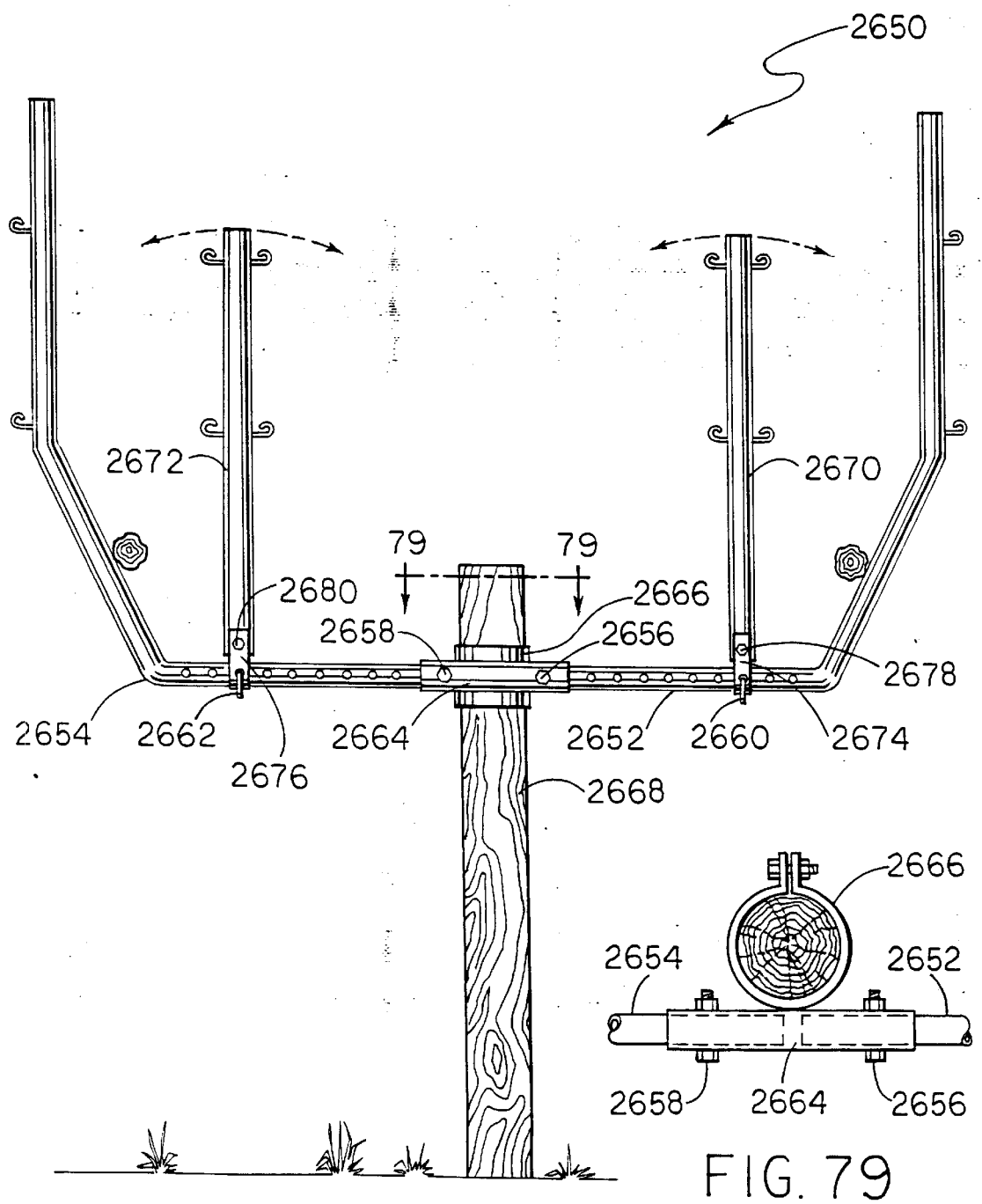
FIG. 78 is a schematic end view representation of an alternative embodiment of a modified vertical catch wire system or a modified Lyre or "U" trellis. This trellis as well as the traditional Lyre or "U" system is not flexible and requires a modified harvesting system such as an adaption of a harvester built by G. DeGolier (grape grower, Westfield, N.Y.) but with twin harvesting heads and a single catching system, to mechanically harvest both sides of the Lyre or "U" in one pass. Such a machine would contain two sets of beaters mounted side by side (FIG. 83).
FIG. 79 is a partial top view illustration of the adjustable post attachment elements of FIG. 78.

With reference to FIGS. 78 and 79 of the drawings and in accordance with another embodiment of the present invention, a modified vertical catch wire system or a modified Lyre or "U" trellis having fixed cross arms is generally designated 2650 and shown to include elongate tubular cross arms 2652 and 2654 each including horizontal sections, upwardly angling sections, and vertical sections. Each of the horizontal sections of the cross arms 2652 and 2654 include a plurality of circular openings adapted to receive respective bolts 2656 and 2658 and pins 2660 and 2662. One end of each of the cross arms 2652 and 2654 is supported in a tubular member 2664 attached to a collar releasably attached to a post 2668. The modified trellis 2650 includes tubular movable stakes 2670 and 2672 pivotally attached to respective yokes 2674 and 2676 by respective bolts 2678 and 2680. The movable stakes 2670 and 2672 allow for rapid adjustment of catch wires following mechanical fruit thinning and allow for the stakes to be laid down to facilitate mechanical harvesting.

The modified trellis 2650 of FIGS. 78 and 79 as well as the traditional Lyre or "U" system is not flexible and requires a modified harvesting system such as an adaptation of a harvester built by G. DeGolier with twin harvesting heads and a catching system to mechanically harvest both sides of the Lyre or "U" in one pass. Such a modified harvesting machine contains two sets of beaters mounted side by side as shown in FIG. 83.

With reference to FIG. 80 of the drawings and in accordance with another embodiment of the present invention, a modified Lyre or "U" trellis adapted for total or complete mechanization is generally designated 2700 and shown to include a modified U tubular member 2702 attached to the upper end of a vertical tubular member 2704 by a support bracket 2706. Cordons 2708 and 2710 are shown to be located approximately 10 inches above a cross bar 2712 of the U member 2702. This allows sufficient space for the operation of all mechanization equipment including shoot and fruit thinner, leaf remover, harvester, and the like. Vertically extending arms 2714 and 2716 of U member 2702 extend upwardly an additional 12 to 36 inches, preferably 24 inches, above a conventional Lyre or "U" trellis.

Figure 81:
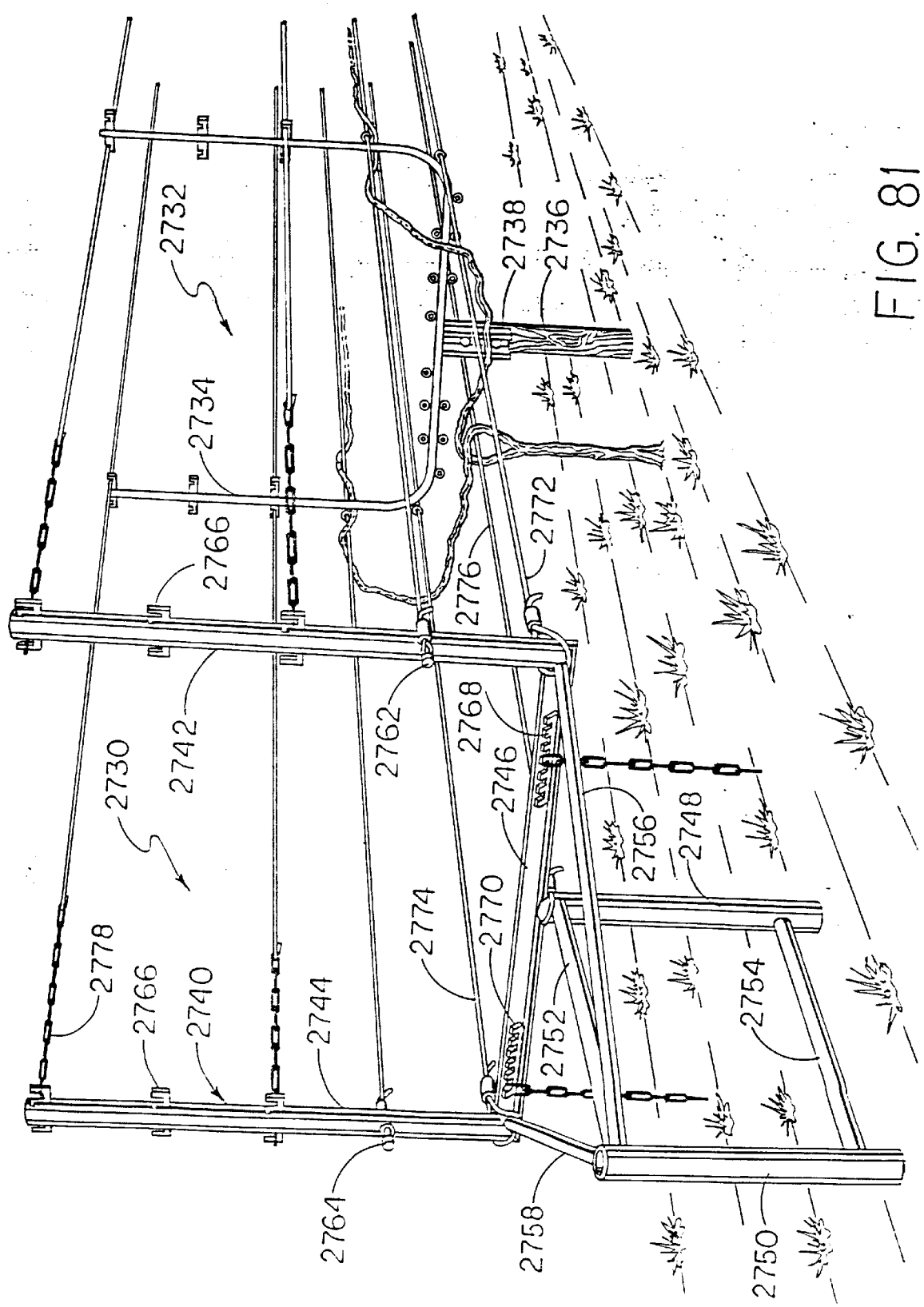
FIG. 81 is a perspective view representation of a guide wire anchoring support unit and trellis system that allows for the mechanized equipment to enter the Lyre or "U" trellis.
Figure 82:
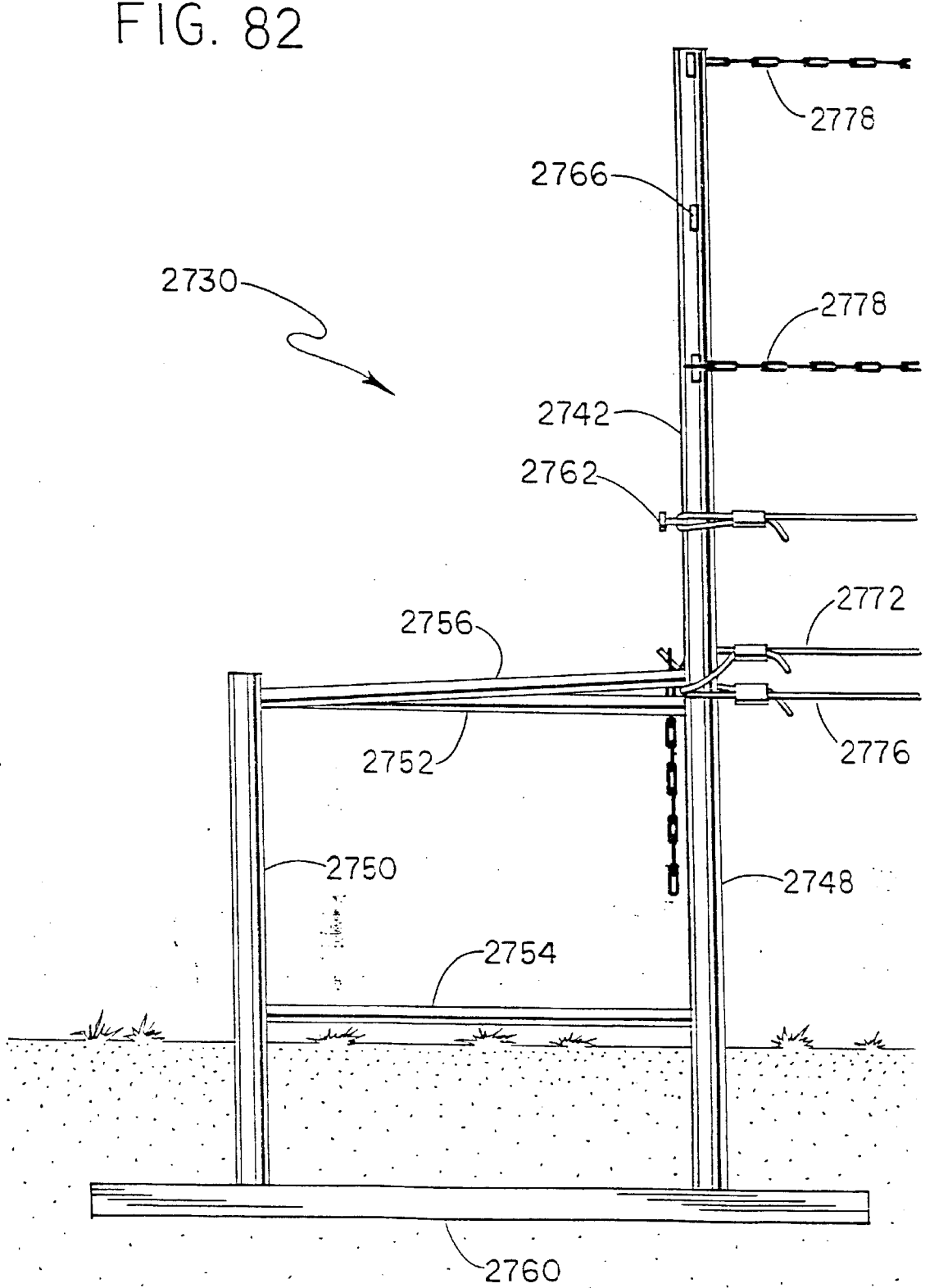
FIG. 82 is a side view illustration of the anchor unit of FIG. 81.

As shown in FIGS. 81 and 82 of the drawings, and in accordance with another embodiment of the present invention, a modified vertical catch wire anchoring and trellis system is shown to include a modified guide wire anchoring support unit 2730 adapted to be used at each end of a row having a plurality of modified vertical catch wire system or modified Lyre or "U" trellises 2732. The modified guide wire anchoring support unit 2730 and modified vertical catch wire trellises 2732 allow mechanization equipment to enter the end of the row and facilitate total or partial mechanization of the vineyard. The trellis 2732 is similar in construction to the trellis 2700 of FIG. 80 and includes a modified tubular U member attached to the upper end of a post 2736 by a bracket or support 2738.

The guide wire anchoring support unit 2730 includes a tubular U member having vertical members 2742 and 2744 extending upwardly from a horizontal cross member 2746. Cross member 2746 is attached to the top of a first vertical tubular member 2748 attached to a second vertical tubular member 2750 by upper and lower cross braces 2752 and 2754. The ends of cross bar 2746 are additionally supported by brace members 2756 and 2758, each having one end attached to the cross bar 2746 and the other end attached to vertical member 2750. An elongate U-shaped channel member 2760 is attached to the lower end of each of vertical members 2748 and 2750 and adapted to be buried 12–24 inches below the vineyard floor. Respective cordon wire attachment studs 2762 and 2764 extend from vertical members 2742 and 2744. Also, a plurality of chain hooks or catches 2766 extend outwardly from vertical members 2742 and 2744 in spaced pairs to serve as anchors for chains 2778 on the end of the respective catch wires. Also, chain racks 2768 and 2770 are attached to cross bar 2746 for storage of chains, cables, or the like. Ends of respective support wires 2772 and 2774 are tied around the corners of the U member 2740 and under respective cross braces 2756 and 2758 to prevent upward movement thereof. Similarly, central guide wire 2776 is tied around the upper end of vertical member 2748 just below cross bar 2746 and above cross member 2752.

By burying cross member 2760 below ground and forming the entire anchoring support unit of sturdy rigid materials such as 3 inch outer diameter, ¼ to ½ inch thick steel pipe and welding all connections, guide wire support unit 2730 provides sufficient support for anchoring the cordon, guide, and catch wires at each end of a row. The studs 2762 and chains 2778 allow the cordon wires and guide wires or catch wires to either be released or loosened prior to mechanical harvesting and thereby reduce possible damage to the wires, trellises, anchors, harvesting equipment, and the like.

With reference again to FIGS. 76–81 of the drawings, and in accordance with a particular example of the present invention, it is contemplated that the trellises developed for a total or complete or improved mechanization of the vineyard have a cross bar at approximately 42 inches from the vineyard floor, a cordon located about 10 inches above the cross bar, a first guide or support wire catch located about 14 inches above the cordon, and a second higher support or guide wire catch located 14 inches above the first catch. Thus, each of the trellises 2590, 2650, 2700, and 2732 has an overall height of at least about 80 inches or more. Note that the trellises 2700 and 2732 of FIGS. 80 and 81 have a third support or guide wire catch located an additional 14 inches above the second support or guide wire catch and thus have an overall height of at least about 94 inches.

In accordance with another example of the present invention, the trellis 2700 of FIG. 80 is made from 1½ inch outer diameter by ³⁄₁₆ inch circular metal tubing, has an overall height of about 84 inches, an overall width of about 60 inches, a lower central post extending about 32 inches above the vineyard floor, about 14 inches from the top of the post to the cordon, about another 10 inches from the cordon to the first catch wire clip, about 12 additional inches from the first catch wire clip to the second catch wire clip, and about 14 inches from the second catch wire clip to the third or top wire clip. This system provides at least 32 inches of clearance between the vineyard floor and the cross bar, about 14 inches of fruit zone below the cordon, and about 38 inches from the cordon up to the top wire.

With reference to FIG. 83 of the drawings, a modified full-row grape harvesting machine or harvester adapted for use with the modified Lyre or "U" trellis of FIGS. 80 and 81 is generally designated 2800 and shown to include two picking heads 2802 and 2804, a conveyor belt 2806 and 2808 under each picking head, and cross conveyors 2810 and 2812 in back of the harvester which receive the grapes from conveyors 2806 and 2808. Each of the picking heads or harvester units 2802 and 2804 are supported from a harvester chassis or over-the-row tractor 2814.

The harvester 2800 is adapted for over-the-row or full row harvesting and further includes respective aprons 2816 and 2818 and fish scales or pivoting catch plates 2820 and 2822 which run the length of the conveyors 2806 and 2808 and facilitate the movement of grapes and grape bunches from the picking heads to the conveyors. Although the aprons 2816 and 2818 are fixed, the fish scales 2820 and 2822 are spring-biased and pivot rearwardly to allow the harvester 2800 to pass by a trellis 2700.

The picking heads may be similar to the harvesting heads of the G. DeGolier harvester or similar in construction to the thinning heads of FIGS. 53 and 54 of the drawings. Further, each of the picking heads includes opposing sets of beaters, strikers, bow heads, rods, or the like 2824 which are shown angled downwardly and offset relative one to the other. Also, the beaters, strikers, bow heads, rods, or the like adjacent the cordon may be eliminated or shortened to prevent damage to the cordon.

In accordance with the present invention, it is contemplated that the picking heads 2802 and 2804 of the harvester 2800 may be tilted with respect to the vertical and as such accommodate a Y or GDC system. Also in accordance with another aspect of the present invention, it is contemplated that the picking heads 2802 and 2804 of harvester 2800 in FIG. 83 and picking heads 3002 and 3004 of harvester 3000 in FIG. 85 may be supported in a fashion allowing for hydraulic head adjustment to raise, lower, and/or tilt the picking heads to accommodate, for example, angled uprights, or a wide range of trellising systems.

Also, in accordance with the present invention it is to be understood that the harvester 2800 may include forward and rearward sets of picking heads on each side thereof for harvesting grape varieties which are difficult to harvest. Also, the harvester 2800 may include differing types of picking heads (FIG. 85) and may have the inner beaters, strikers, and the like removed to accommodate the harvesting of grapes on particular training or trellising systems.

With reference to FIGS. 84, 84A, and 84B of the drawings and in accordance with another embodiment of the present invention, a modified half-row, floating, at least vertically shaking, rotating head picker mechanical harvester 2840 is adapted for use with a Lyre or "U" trellis 2842 modified to include movable cordon wire support, roller, or slide assemblies 2844 for each cordon wire. The harvester 2840 includes a harvesting unit 2846 mounted on one side of a tractor 2848 and is a modified version of the early Cornell concept for harvesting a modified GDC trellis with a single, reciprocating, vertical spiked-wheel. The Geneva Double Curtain (GDC) was a trellising system designed specifically for mechanical harvest employing over-the-row machines fitted with vertical-shaking head pickers as described, for example, in Shaulis, N., E. S. Shepardson, and J. C. Moyer. Grape Harvesting Research at Cornell, N.Y. State Hortic. Soc. Proc., Proc. 105th Meeting, January (1960) and Shaulis, N., E. S. Shepardson, and T. D. Kordan. The Geneva Double Curtain. Bull. 811 N.Y. State Agric. Exp. Sta., Geneva, Cornell Univ. (1967). An early over-the-row harvester equipped with vertical-shaking heads was manufactured in the U.S. by Chisholm-Ryder, and an Italian version was built and extensively tested. One difficulty with the Cornell/Chisholm-Ryder system was keeping the spike-wheel picking heads concurrently aligned along the cordons. The end result was that the early Cornell and Chisholm-Ryder machines never saw extensive commercial production.

The half-row harvester 2840 of FIGS. 84, 84A, and 84B is shown in use with a modified trellis 2842 which incorporates the movable cordon wire support assemblies 2844 which address the problem of picking head alignment along the cordons. The harvester 2840 and, more particularly, the harvester unit 2846 includes a rigid support structure 2850 which is attached to the tractor 2848, at least one spiked-wheel picking head 2852 including a center tumbler 2854, and a plurality of radially extending spikes 2856 attached thereto. The head 2852 floats or rests upon a vertical shaft and idles or rotates should the spikes contact an object, vine, trellis, or the like. The picking head 2852 is supported and driven from underneath by a member 2858 extending upwardly from a support structure 2860. The harvester unit 2846 includes a collecting conveyor 2862, a cross conveyor 2864, aprons 2866 and 2868, and fish scales or pivoting catch plates 2870 supported from a frame 2872.

Still further, the harvester unit 2846 includes an upper awning and a vertically-depending flexible curtain 2876 which directs any grapes or grape bunches downwardly toward collecting conveyor 2862 along with fish scales 2870 and aprons 2866 and 2868. The vertically-shaking picking head 2852 shakes the cordon 2878 and cordon wire 2880 at least vertically and thereby causes grapes or grape bunches to fall from the vine and onto the conveyor 2862 where they are fed to cross conveyor 2864 into a single collection system. The fish scales 2870 pivot at least rearwardly and the curtain 2876 is flexible, for example, having elongate vertical cuts or slits therein allowing portions to flex up and over the vine or trellis and allow the harvester to travel along the row while directing as many of the grapes as possible toward the collection conveyor 2862.

By incorporating the movable cordon wire support assemblies 2844 and by relaxing the catch wires, loosening the cordon wires, and taking tension out of the cordons and trunks before harvesting, the spikes 2856 of the picking head 2852 remain in proper position underneath the cordon and the cordon wire stays in position to shake the cordon and harvest the grapes while preventing damage to the catch wires, cordon wire, cordon, and trunk of the vine. In accordance with the preferred embodiment, the trunk leading to the cordon has a bend and flexibility of at least 10 inches.

With particular reference to FIGS. 84A and 84B of the drawings, the movable cordon wire support, roller, or slide assembly 2844 is attached to the interior or exterior of each vertical member 2882 extending upwardly from a cross bar 2884 of the trellis 2842. Typically, conventional Lyre or "U" trellis systems have the cordon wire located inside the trellis, and as such the movable cordon wire support assembly 2844 is mounted as shown in solid lines in FIG. 84A. In new vineyards, it would be preferred to add the movable cordon wire support assembly 2844 on the exterior of the trellis to facilitate mechanization of the vineyard.

Each movable cordon wire support assembly 2844 includes upper and lower horizontal plates 2886 and 2888 attached to the ends of a vertical channel member 2890 and having respective circular openings near their free end for receiving an elongate bolt 2892 having a head 2894 and a threaded lower end 2896 adapted to receive a nut 2898. The shaft of the bolt 2892 and one edge of the channel member 2890 form an elongate channel adapted to receive a grooved roller, wheel, slide, or the like 2900 having a central circular through hole 2902 adapted to receive the cordon wire 2880 therethrough. The roller or wheel 2900 may also include an elongate radial slot 2904 which extends to opening 2902 to allow an existing cordon wire to be inserted through the slot and into the opening 2902. The slot 2904 is thereafter filled with a plug 2906 which is welded in place to prevent the cordon wire 2880 from coming out of opening 2902 in roller 2900.

It is preferred that the plates, channel member, and bolt be formed of sturdy rigid metal materials while the roller or wheel 2900 be formed of a synthetic resin or plastic material which can be either self-lubricating or lubricated to easily slide up and down along channel member 2890 and bolt 2892. Additionally, end stops 2908 and 2910 can be added to the interior of plates 2886 and 2888 to limit movement of roller or wheel 2900. It is preferred that the channel member 2890 be attached to vertical trellis member 2882 by welding, but it is understood that other means of attachment such as screws or rivets may be used. If roller 2900 becomes overly worn or broken, it may be replaced by removing bolt 2892 and inserting a new roller.

With respect to FIG. 84C of the drawings, and in accordance with another embodiment of the present invention, a modified guide wire anchoring support unit 2920 and modified trellis 2922 including movable cordon wire support assemblies 2940 has substantial structural similarity to that of guide wire anchoring support unit 2730 and trellis 2732 of FIG. 81 except that the trellis 2922 and anchoring unit 2920 are adapted to easily relax, loosen, or release tension on the guide wires and cordon wires to facilitate mechanical harvesting using, for example, the mechanical harvester of FIGS. 84 or 85. More particularly, a vertical support member 2924 has been extended and includes a chain catch or hook 2926 and chain catch or hooks 2928 and 2930 have been added to the back side of each of vertical trellis members 2932 and 2934 to provide for the use of chains on the end of respective cordon wires 2936 and guide wires 2938.

Trellis 2922 has been modified to include a more rectangular U member, movable cordon wire support assemblies 2940, and a guide wire bracket 2942 atop a post 2944. The guide wire anchoring support unit 2920 facilitates the use of mechanization equipment while the chain hooks or catches thereon facilitate the loosening, relaxing, and releasing the tension from the catch wires, cordon wire, trunk, and cordons to provide, for example, at least 10 inches of flexibility in the bend of the trunk as it leads to the cordon.

Although the vine and cordons shown in FIGS. 84B and 84C are shown in a Y-type of cordon configuration, it is to be understood that a cordon which runs in only a single direction along a cordon wire may be used in combination with the movable cordon wire support assembly 2844.

Figure 84D:
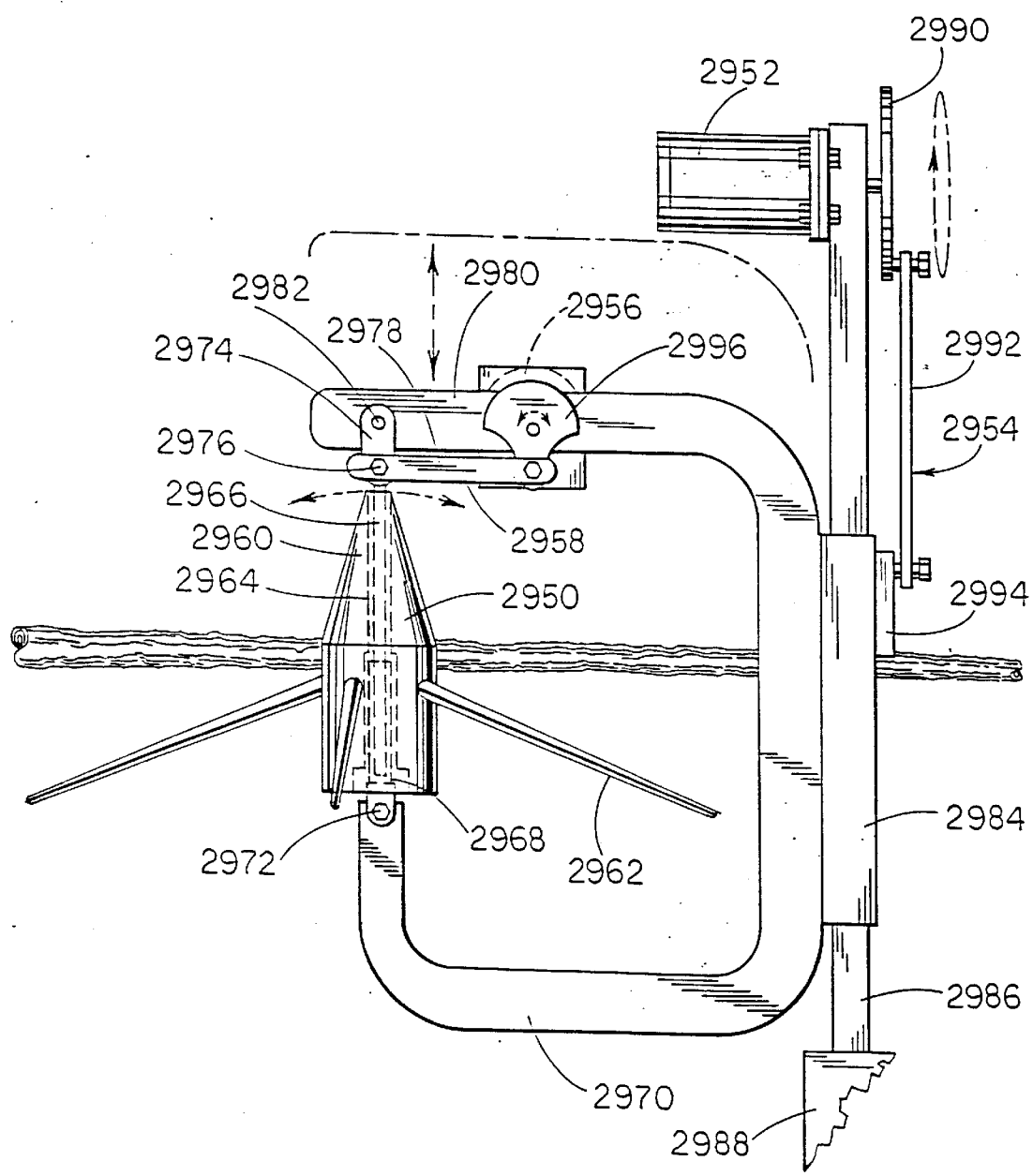
FIG. 84D is an enlarged side view representation of a vertically and horizontally shaking, floating, rotating picking head adapted for use in the harvesters of FIGS. 84 and 85.

With reference to FIG. 84D of the drawings and in accordance with another embodiment of the present invention, the half-row harvester 2840 of FIG. 84 or the full-row harvester of FIG. 85 may include one or more floating, shaking, rotating picking heads 2950 which not only shake vertically under the influence of a motor 2952 and drive arrangement 2954, but also shake or articulate in a horizontal direction under the influence of a motor 2956 and drive arrangement 2958. Picking head 2950 includes a central tumbler 2960 which supports a plurality of spikes 2962 and has a central opening 2964 which accommodates a small diameter upper support shaft 2966 and a large diameter lower support shaft 2968 which telescopically receives the lower end of upper shaft 2966. Picking head 2950 is free to rotate about shafts 2966 and 2968 under the influence of spikes 2962 contacting objects as the picking head is moved along the cordon.

Lower shaft 2968 is pivotally connected to a support yoke 2970 by a bolt or pin 2972. The upper end of shaft 2966 is attached to a pivoting link 2974 by a bolt 2976 which passes through link 2978, link 2974, and shaft 2966. Link 2974 is pivotally attached to an upper arm 2980 of yoke 2970 by a pin 2982. Yoke 2970 is attached to a sleeve 2984 which rides up and down on a fixed vertical member 2986 attached to the support structure 2988. Motor 2952 is attached to upper end of vertical member 2986 and has a projecting drive shaft to which is attached a drive disk 2990 having attached thereto a drive link 2992. The other end of the drive link 2992 is attached to a plate 2994 on sleeve 2984. Activation of the motor 2952 and rotation of its drive shaft causes resulted rotation of disk 2990, reciprocation of link 2992, reciprocation of sleeve 2984, reciprocation of yoke 2970, and vertical reciprocation of pick head 2950.

Similarly, motor 2956 has a drive shaft to which is attached a drive disk or member 2996. Rotation or activation of the motor 2956 causes rotation of disk 2996, reciprocation of link 2978, reciprocation of link 2974, and resultant translational movement of at least the upper end of pick head 2950. Hence, pick head 2950 not only shakes vertically but also horizontally and, as such, increases the amount of grapes removed from the vine during harvesting or facilitates grape removal, thereby allowing the harvester to operate at a greater land speed. Also, it is contemplated that a plurality of such picking heads may be used for harvesting grape varieties which are difficult to harvest.

With reference again to FIG. 85 of the drawings, and in accordance with another embodiment of the present invention, an over-the-row, full-row modified spike-wheel picking head harvester 3000 is shown to include at least first and second picking heads 3002 and 3004 supported within a harvester chassis, over-the-row tractor or modified high clearance-type four-wheel tractor 3006. The harvester 3000 is adapted for harvesting a modified Lyre or "U" trellis 3008 having movable cordon wire support assemblies 3010 and 3012 which allow the cordons and cordon wires to move vertically under the influence of the shaking picking heads 3002 and 3004.

Further, the harvester 3000 includes respective catch conveyors 3014 and 3016, aprons 3018 and 3020, fish scales or catch plates 3022 and 3024, and cross conveyors 3026 and 3028. Fish scales 3022 and 3024 are spring-biased and, as such, pivot backwardly and out of the way of the trellis 3008 as the harvester runs down along the row. The fish scales and aprons tend to direct all the grapes or grape bunches that are removed to the catch conveyors 3014 and 3016. As described above with respect to FIG. 84, the picking heads 3002 and 3004 are free-floating or idling, at least vertically shaking, rotating picking heads having a plurality of spikes emanating from a central tumbler.

It is contemplated that the picking heads 3002 and 3004 of harvester 3000 may be the picking heads 2950 of FIG. 84D which shake not only vertically but also horizontally. Also, the harvester 3000 may include four or more picking heads, front and rear sets, for harvesting difficult varieties. Also, prior to harvest, the catch wires should be relaxed, the vertical wires should be loosened, and if necessary the tension should be slightly relaxed out of the cordon wires to allow the trunk bend to flex at least about 10 inches during harvest. Movable cordon wire support assemblies 3010 and 3012 are identical in construction to that of the movable cordon wire support assembly 2844.

With respect to FIGS. 86–97 of the drawings and seasonal charts I–XII which provide exemplary embodiments of vineyard mechanization systems or methods, it is to be understood that when reference is made to a particular figure number in the charts, it is to be understood that reference is being made to an exemplary machine, device, implement, harvester, thinner, pruner, trimmer, comber, unit, or the like, and that other devices which provide a similar result may be used. Also, it is contemplated that partial mechanization system and methods can be gleaned from the charts I–XII and Examples I–XII to follow by merely eliminating one or more steps from the system or method.

TABLE 1

WORLD GRAPE PRODUCTION, BY COUNTRY, AVERAGES OF 1989–91 (FAO PRODUCTION YEARBOOK, UN. VOL. 45).

| COUNTRY | AREA (1000 HA) | PRODUCTION (1000 MT) | PRODUCTION (MT Per Hectar) |
| --- | --- | --- | --- |
| Afghanistan | 52 | 365 | 7.0 |
| Argentina | 268 | 2523 | 9.0 |
| Australia | 57 | 896 | 15.7 |
| Austria | 54 | 398 | 7.4 |
| Brazil | 58 | 707 | 12.2 |
| Chili | 115 | 1113 | 9.7 |
| Czechoslovakia | 35 | 195 | 5.6 |
| France | 943 | 7476 | 7.9 |
| Germany | 96 | 1365 | 14.2 |
| Greece | 155 | 1304 | 8.4 |
| Hungary | 139 | 769 | 5.5 |
| Iran | 220 | 1391 | 6.3 |
| Italy | 999 | 9039 | 9.0 |
| Japan | 27 | 283 | 10.5 |
| Mexico | 44 | 462 | 10.2 |
| Morocco | 48 | 218 | 4.5 |
| Purtugal | 375 | 1397 | 3.7 |
| Romania | 221 | 893 | 4.0 |
| South Africa | 150 | 1463 | 9.7 |
| Spain | 1460 | 5531 | 3.8 |
| Syria | 114 | 435 | 3.8 |
| Turkey | 592 | 3510 | 5.9 |
| USA | 300 | 51S3 | 17.2 |
| USSR | 885 | 5328 | 6.0 |
| Yugoslavia | 225 | 1077 | 4.8 |

Metric Tons (MT) per hectar divided by 2.72=Tons per Acre. Other countries that are notable producers of grapes are: Cyprus, India, China, Tunisia, Lebanon., Uruguay, Switzerland, Israel, Canada, Korea (Rep). Albania, Yemen, Saudia Arabia, and Peru.

TABLE 2

EFFECT OF TRAINING SYSTEM AND MECHANICAL PRUNING TREATMENTS AFTER SIX CONSECUTIVE YEARS ON YIELD AND QUALITY OF CONCORD GRAPES.

| Treatment | Yield (MT/ha) | Soluble solids (%) | Green fruit (%) | pH | Acidity as tartaric (%) | Color (abs. at 520 nm) |
| --- | --- | --- | --- | --- | --- | --- |
| GDC | | | | | | |
| 30 + 10 | 15.7a | 15.2a | 3.0ab$^z$ | 3.79d | 0.72d | 0.343ab |
| Mech./adj. best 60 nodes | 15.9a | 15.1 | 2.3a | 3.68cd | 0.78bcd | 0.291bc |
| Mech./adj. best 90 nodes | 8.1b | 13.8b | 9.1abc | 3.61cd | 0.82abcd | 0.281cd |
| Mech./no touch-up | 8.6b | 13.3bc | 12.6b | 3.45abc | 0.86abc | 0.199ef |
| SC | | | | | | |
| 30 + 10 | 10.1ab | 15.0a | 4.0ab | 3.60bcd | 0.80abcd | 0.320abc |
| Mech./adj. best 69 nodes | 12.4a | 15.7a | 4.1ab | 3.48abc | 0.76cd | 0.364a |
| Mech./adj. best 90 nodes | 9.9ab | 13.6b | 8.8abc | 3.41ab | 0.90a | 0.230de |
| Mech./no touch-up | 6.5b | 12.0c | 11.4bc | 3.35a | 0.88ab | 0.167f |

Source: Morris and Cawthon (1981).
$^z$Means within columns followed by the same letter or letters are not significantly different at the 5% level, by Duncan's multiple-range test.

TABLE 3

EFFECT OF TRAINING SYSTEM AND MECHANICAL PRUNING TREATMENTS ON SENSORY QUALITY OF CONCORD JUICE ON THE SIXTH AND FINAL YEAR OF THE STUDY.

|  | Color[z] | | |
| --- | --- | --- | --- |
|  | Intensity | Acceptability | Flavor |
| GDC | | | |
| 30 + 10 | 7.8a | 6.0ab | 5.6cd |
| Mech./adj. best 60 nodes | 7.1ab | 7.0a | 6.6bc |
| Mech./adj. best 90 nodes | 6.9ab | 6.3ab | 4.8de |
| Mech./no touch-up | 4.4c | 4.9b | 4.0e |
| SC | | | |
| 30 + 10 | 7.7a | 7.9a | 7.6ab |
| Mech./adj. best 60 nodes | 7.3ab | 6.9ab | 8.3a |
| Mech./adj. best 90 nodes | 5.7bc | 5.9ab | 5.8cd |
| Mech./no touch-up | 2.7d | 2.8c | 4.0e |

Source: Morris and Cawthon (1981).
[z]Means within columns followed by the same letter or letters are not significantly different at the 5% level, by Duncan's multiple-range test. The higher the score the better the quality attribute.

TABLE 4

THE MAIN EFFECTS OF SHOOT POSITIONING AND PRUNING TREATMENTS ON THE FIFTH YEAR (A COOL WET YEAR[w]) YIELD AND QUALITY OF 'CONCORD' GRAPES (1986).

| Main Effects | Yield (MT/ha) | Soluble solids % | pH | Tartaric acid % | Absorbance 520 nm |
| --- | --- | --- | --- | --- | --- |
| Shoot Positioning | | | | | |
| Hand | 42.1a[x] | 16.1a | 3.64c | 0.83a | 0.28ab |
| Machine | 43.7a | 16.1a | 3.65c | 0.85a | 0.333ab |
| Centers broken only | 37.7b | 16.4a | 3.72b | 0.83a | 0.350a |
| None | 33.3c | 16.1a | 3.78a | 0.81a | 0.319ab |
| Pruning Treatment | | | | | |
| 30 + 10 | 35.0d | 16.6ab | 3.78a | 0.81a | 0.333ab |
| 50 + 10 | 40.0c | 16.5ab | 3.68b | 0.83a | 0.337ab |
| Mech./adj. best 60 nodes | 30.6d | 17.1a | 3.77a | 0.84a | 0.391a |
| Mech./adj. best 80 nodes | 34.7d | 16.3ab | 3.76a | 0.84a | 0.332ab |
| Mech./+fruit removal[y] | 41.7bc | 15.9b | 3.64bc | 0.82a | 0.305bc |
| Mech./30 + 20 alt. years[z] | 45/1ab | 16.0b | 3.70ab | 0.81a | 0.302bc |
| Mech./no touch-up | 47.3a | 15.0c | 3.60c | 0.83a | 0.256c |

[w]No days over 36.7° C.; 21.41 cm of rainfall in July and August.
[x]Means of main effects separated by Duncan's multiple range test at the 5% level. Means within main effect and column with the same letter(s) are not significantly different.
[y]Mechanically pruned with fruit removed by mechanical beating at a green pea size to a level approximating the fruit load of a 30 + 10 pruning severity.
[z]Mechanically pruned with no touch-up in even-numbered years and hand pruned to 30 + 10 (6 node canes) in odd-numbered years.

TABLE 5

EFFECTS OF SHOOT POSITIONING AND PRUNING TREATMENTS ON THE TENTH YEAR (A HOT DRY YEAR[w]) OF THE STUDY ON QUALITY OF CONCORD GRAPES (1991).

| Main Effects | Yield (MT/ha) | Soluble solids % | pH | Acidity (% tartaric) | Color 520 nm |
|---|---|---|---|---|---|
| Shoot Positioning | | | | | |
| Hand | 38.6ab[x] | 14.0bc | 3.34b | 0.85a | 0.106b |
| Machine | 39.8a | 13.6c | 3.38ab | 0.85a | 0.101b |
| Centers broken only | 36.3bc | 14.5ab | 3.43a | 0.84a | 0.135a |
| None | 34.9c | 14.6a | 3.39ab | 0.84a | 0.139a |
| Pruning Treatment | | | | | |
| 30 + 10 | 36.2ab | 14.4a | 3.34b | 0.85a | 0.112ab |
| 50 + 10 | 37.7ab | 14.2a | 3.34b | 0.84a | 0.117ab |
| Mech./adj. best 60 nodes | 34.3d | 14.2a | 3.40ab | 0.84a | 0.128a |
| Mech./adj. best 80 nodes | 35.9ab | 14.6a | 3.46a | 0.82a | 0.146a |
| Mech./+fruit removal[y] | 37.6ab | 14.4a | 3.39ab | 0.86a | 0.127a |
| Mech./30 + 10 alt. years[z] | 39.9a | 14.0ab | 3.34b | 0.85a | 0.121ab |
| Mech./no touch-up | 40.0a | 13.4b | 3.37b | 0.83a | 0.090b |

[w]29 days over 37.4° C. and 8 days over 40.6° C.; 2.56 cm of rainfall in July and August.
[x]Means of main effects separated by Duncan's multiple range test at the 5% level. Means within main effect and column with the same letter(s) are not significantly different.
[y]Mechanically pruned with fruit removed by mechanical beating at a green pea size to a level approximating the fruit load of a 30 + 10 pruning severity.
[z]Mechanically pruned with no touch-up in even-numbered years and hand pruned to 30 + 10 (6 node canes) in odd-numbered years.

MECHANICAL SHOOT THINNING TEST (STRIKER UNIT)

Place: Agricultural Experiment Station, University of Arkansas. Fayetteville Ark. 72703.

TABLE 6

Shoot removal data from three cultivars*

| Cultivar Vine # | Shoots Removed | Shoots Left | Percent Removed |
|---|---|---|---|
| Cayuga White | | | |
| 1 | 17 | 62 | 21 |
| 2 | 24 | 37 | 39 |
| 3 | 23 | 29 | 44 |
| 4 | 8 | 44 | 15 |
| 5 | 8 | 27 | 23 |
| 6 | 20 | 65 | 24 |
| Seyval blanc | | | |
| 1 | 24 | 51 | 32 |
| 2 | 31 | 44 | 41 |
| 3 | 36 | 62 | 37 |
| 4 | 25 | 71 | 26 |
| 5 | 22 | 48 | 31 |
| Vignoles | | | |
| 1 | 57 | 78 | 42 |
| 2 | 63 | 61 | 51 |
| 3 | 70 | 58 | 55 |

*Acknowledgement is given to Dr. Gary Main, Research Associate, University of Arkansas, for his assistance in collecting and assembling these data.

TABLE 7

Machine calibration data for Table 6.

| Cultivar | Plate Speed Revolutions/ | | Ground Speed | | Brush* Strokes/ | |
|---|---|---|---|---|---|---|
| | Sec | Min | MPH | RPM | Ft. | M |
| Cuyuga White | 0.57 | 34.2 | 1.4 | 2.25 | 2.2 | 7.2 |
| Seyval blanc | 0.71 | 42.6 | 1.4 | 2.25 | 2.8 | 9.2 |
| Vignoies | 1.85 | 111.0 | 1.4 | 2.25 | 8.0 | 26.2 |

*Includes both plates at four strikers (fingers) per plate.
(Acknowledgement is given to Dr. Gary Main, Research Associate, University of Arkansas, for his assistance in collecting and assembling these data.)

LITERATURE CITED

1. Cargnello, G. and L. Lisa. 1980. Mechanical winter pruning of GDC training vineyards. In:#UCS Grape and Wine Centennial Symposium. Proc. Univ Calif, Davis. P. 270–73.
2. Cawthon, D. L. and J. R. Morris. 1977. Yield and quality of 'Concord' grapes as affected by pruning severity, nodes per bearing unit, training system, shoot positioning, and sampling date in Arkansas. J. Amer. Soc. Hortic. Sci. 102:760–67.
3. Christensen, L. P., A. N. Kasimatis, J. J. Kissler, F. Jensen, and D. A. Luisi. 1973. Mechanical harvesting of grapes for the winery. Calif. Agr. Ext. Bul. AXT-403.
4. Clingeleffer, P. R. 1989. Update: Minimal pruning of cordon trained vines (MCPT. Aust. Grapegrower and Winemaker. 304:78–83.
5. Clingeleffer, P. R. and J. V. Possingham. 1988. The role of minimal pruning of cordon-trained vines (MPCT) in canopy management and its adoption in Australian viticulture. Aust. Grapegrower and Winemaker. 280:7–11.
6. Davidson, D. 1991. Pride and tradition in hand pruning, but mechanization here to stay. Aust. Grapegrower and Winemaker. 330:32–34.

7. Di Collalto, G. and P. L. Pisani. 1983. The present situation and prospects for the integral mechanization of espalier grapevines. Vignevini. 10:0, 19–24.
8. Elia, P. 1986. Mechanization in vineyards. Part 3.3. Winter pruning and the handling of prunings. Quaderni della Scuola di Specializzazione in Viticoltura ed Enologia. 10:41–54.
9. Elia, P. 1986. Mechanization in vineyards. Part 3.4. Mechanical treatment of vines during the growing season. Quaderni della Scuola di Specializzazione in Viticoltura ed Enologia. 10:55–66.
10. Elia, P., R. Meinardi. 1989. The study and design of an automatic non-straddling shoot positioner. Informatore Agrario. 45(14):97–104.
11. Freeman, B. M. 1980. Experiments on vine hedging for mechanical pruning, p. 261–263. In: UCD Grape and Wine Centennial Symposium Proc., Univ. Calif., Davis.
12. Freeman, B. M. and B. R. Cullis. 1981. Effect of hedge shape for mechanical pruning of vinifera vines. Amer. J. Enol. Vitic. 32:21–25.
13. Gil Sierra, J. and J. Ortiz-Canavate. 1988. Mechanization experience with pruning and harvesting in trained vineyards. Zangosa, Spain; Asociacion Nacional de Ingnenieros Agronomos. P. 293–298.
14. Hollick, R. R. 1980. Mechanical pruning of vines in Australia, p. 264–265. In: UCD Grape and Wine Centennial Symposium Proc., Univ. Calif., Davis.
15. Intrieri, C. and B. Marangoni. 1980. The alternate "up-down" mechanical pruning system: Experiments on vines GDC trained (V. vinifera cv. Montuni), P. 266–269. In: UCD Grape and Wine Centennial Symposium Proc., Univ, Calif., Davis.
16. Intrieri, C., O. Silvestroni, S. Poni, and I. Filipetti. 1990. Productivity and profitability in vineyards with various levels of mechanization and at different planting densities. Vignevini. 17:10, 53–58.
17. Jordan, T. D., R. M. Pool, T. J. Zabadal, and J. P. Tomkins. 1981. Cultural practices for commercial vineyards. New York State College of Agr. and Life Sci., Cornell Univ., Ithaca, Misc. Bul. 111 .
18. Lakso, A. N. 1993. Viticultural and physiological parameters limiting yield. Proc. 2nd N.J. Shaulis Grape Symposium. Fredonia State University, Fredonia, N.Y. P. 9–14.
19. Ludvigsen, R. K. 1990. Vine training a key to future economic success of a vineyard. Aust. Grapegrower and Winemaker. 318:15–24.
20. Luvisi, D. A. and P. R. Clingeleffer. 1988. Australian test of mechanical pruning. Wines and Vines. Feb: 30–31.
21. Magriso, Yu. and A. Pavlov. 1988. Possibilities of mechanical pruning of ripe grapevine wood. Rasteniev "dni Nauki. 25(7):81–85.
22. Morris, J. R. 1985. Approaches to more efficient vineyard management. Hort. Sci. 20(6):1008–13.
23. Morris, J. R. and D. L. Cawthon. 1980. Mechanical trimming and node adjustment of cordon-trained 'Concord' grapevines. J. Amer. Soc. Hort. Sci. 105(3) :310–313.
24. Morris, J. R. and D. L. Cawthon. 1980. Yield and quality response of 'Concord' grapes to training systems and pruning severity in Arkansas. J. Amer. Soc. Hort. Sci. 105(3):307–310.
25. Morris, J. R. and D. L. Cawthon. 1981. Yield and quality response of 'Concord' grapes (*Vitis labrusca* L.) to mechanized vine pruning. Amer. J. Enol. Vitic. 32:28–282.
26. Morris, J. R., D. L. Cawthon, and J. W. Fleming. 1975. Effect of mechanical pruning on yield and quality of 'Concord' grapes. Ark. Farm Res. 24(3):12.
27. Morris, J. R., D. L. Cawthon, and C. A. Sims. 1984. Long-term effects of pruning severity, nodes per bearing unit, training system and shoot positioning on yield and quality of 'Concord' grapes. J. Amer. Soc. of Hort. Sci. 109(5): 676–683.
28. Nikiforova, L. T., N. L. SemelyanskiI., F. T. PavoloiI, and I. I., Gridasov. 1990. Mechanized pruning and the productivity of high-stem grapevines. Sadovodstvo i Vinogradarstvo. 2:37–39.
29. Pavlov, A. 1987. Mechanized pruning of mature wood in grapevines. Rasteniev "dni Nauki. 24(12):103–06.
30. Peikov, V., D. Karapetkov, and A. Georgiev. 1987. Mechanized pruning of the green parts of the grapevines. Selskostopanska Tehnika. 24(2):21–29.
31. Petrucci, V. E., C. D. Clary, and M. O'Brien. 1983. Grape harvesting systems, p. 525–574. In: M. O'Brien, B. F. Cargill, and R. B. Fridley (eds.). Principles and practices for harvesting and handling fruits and nuts. AVI Pub., Westport, Conn.
32. Pollock, J. G., E. S. Shepardson, N. J. Shaulis, and D. E. Crowe. 1977. Mechanical pruning of American hybrid grapevines. Trans. Amer. Soc. Agr. Eng. 20:817–821.
33. Poni, S. and P. Argnani. 19881. Mechanical pruners for vineyards. Vignevini. 15(10):33–40.
34. Pool, R. M. 1987. Thin grapes mechanically. Amer. Fruitgrower. 107(10):17–19.
35. Pool, R. M., D. Crowe, and R. Dunst. 1988. The use of combined mechanical and minimal pruning and mechanical thinning in New York production systems. Presented at 2nd Int. Seminar on Mechanical Pruning of Vineyards. Treviso, Italy. Feb. 1988.
36. Pool, R. M., R. E. Dunst, D. C. Crowe, H. Hubbard, G. E. Howard, and G. DeGolier. 1993. Predicting and controlling crop on machine or minimal pruned grapevines. Proceedings of the 2nd N. J. Shaulis Grape Symposium. Fredonia State University. Fredonia, N.Y. Jul. 13–14, 1993.
37. Sevila, F. 1985. Vine growing: From mechanization to automation. Bulletin d-Information du CEMAGREF. 329:67–77.
38. Shaulis, N. J., H. Amberg, and D. Crowe. 1966. Response of 'Concord' grapes to light, exposure and Geneva Double Curtain training. Proc. Amer. Soc. Hort. Sci. 89:268–280.
39. Shaulis, N. J., J. Pollock, D. Crowe, and E. S. Shephardson. 1973. Mechanical pruning of grapevines; progress 1968–1972. Proc. New York State Hort Sci. 118:61–69.
40. Smart, R. E. 1991. Shoot positioning—the way of the future. Aust. Grapegrower and Winemaker. 331:30–32.
41. Spezia, G. 1989. Automatic secatuers for winter pruning in vineyard. Vignevini. 16:27–29.
42. Tasssie, L. 1989. Canopy management and development in NZ-Part II Developments in NZ. Aust. Grapegrower and Winemaker. 309:13–16.
43. Vannucci, D. 1983. Viticulture: Mechanization in 1983. Vignevini. 10:7, 8, 15–23.
44. Vormandt, G. 1989. Pruning is no game. Viti. 128:54–62.
45. Winkler, A. J., J. A. Cook, W. M. Kliewer, and L. A. Lider. 1974. General Viticulture. Univ. Calif. Press. Berkeley, 710 pp.

The following are examples of the Morris-Oldridge vineyard mechanization systems or processes in accordance with the present invention.

EXAMPLE I

Mechanization activities of *Vitis labruscana* grapes (and other grapes with drooping growth habits) trained on single curtain trellis systems:

Step 1. Dormant Pruning

Mechanical prune during the dormant season using the mechanical pruner shown in FIGS. 44–47.

Step 2. Shoot Adjustment Use modified mechanical pruner (remove brushes) shown in FIGS. 42–47 for touch up pruning and shoot thinner shown in FIGS. 53–55, if needed, to thin shoots when they are 2 to 3" (5–7.5 cm).

Step 3. Shoot Positioning and Fruit Adjustment

At 10% bloom, use mechanical shoot positioner shown in FIG. 41. In accordance with the research conducted by Dr. Robert Pool of Cornell University, approximately 25–30 days post bloom, excess fruit may be removed with the thinning unit shown in FIGS. 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE II

Mechanization activities of *Vitis labruscana* grapes (and other grapes with drooping growth habits) trained on GDC trellis and GDC-like canopy systems.

Step 1. Dormant Pruning

Use mechanical pruner in FIG. 43. Two of these units can be mounted under an over-the-row tractor (harvester) (FIG. 43A)

Step 2. Shoot Positioning

At 10% bloom, use mechanical shoot positioner in FIG. 42 to position shoots. Two of these units can be mounted under an over-the-row harvester, FIG. 42A.

Step 3. Fruit Adjustment

After berry set, remove excess fruit using units in FIGS. 71 and 72 (with modifications for half rows). In accordance with the research conducted by Dr. Robert Pool of Cornell University, approximately 25–30 days post bloom, excess fruit may be removed using modifications to thinning unit shown in FIGS. 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Breaking centers

Break GDC centers as needed to allow air flow and sunlight into canopy centers using units in FIGS. 48–51.

Step 5. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE III

Mechanization of minimal pruned *Vitis labruscana* grapes (and other grapes with drooping growth habits) trained on single curtain trellis systems:

Step 1. Shoot Thinning-1

Eliminate all new shoots, 2 to 3" (5–7.5 cm), on canes and the cordons that are located on the top of the canopy. This can be accomplished with modification of the unit shown in FIG. 50.

Step 2. Shoot Thinning-2

Use shoot thinners (if needed) to eliminate some of the excessive buds when shoots are 2–3" (5–7.5 cm) with units shown in FIGS. 53–55.

Step 3. Fruit Thinning

In accordance with the research conducted by Dr. Robert Pool of Cornell University, approximately 25–30 days post bloom, excess fruit may be removed using thinning unit shown in FIGS. 53–55, (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration in determining fruit load.

Step 4. Canopy Removal

In vigorous, older vineyards, remove the center top 12" (30 cm) more or less, of the canopy foliage to allow for movement of air and light into the center portion of the canopy.

Step 5. Minimal Pruning

Before harvest, trim all shoots to approximately 15" (38 cm) above the vineyard floor using units shown in FIGS. 71 and 72.

Step 6. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE IV

Mechanization activities of minimal pruned *Vitis labruscana* grapes (and other grapes with drooping growth habits) trained on GDC trellis systems Step 1. Shoot Thinning Use shoot thinners (if needed) to eliminate some of the excessive buds when shoots are 2–3" (5–7.5 cm) with units shown in FIG. 18, and with modifications to units shown in FIGS. 53–55.

Step 2. Fruit Adjustment

In accordance with the research conducted by Dr. Robert Pool of Cornell University, approximately 25–30 days post bloom, excess fruit may be removed using modifications for half rows on the thinning unit shown in FIGS. 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost becomes a consideration for determining fruit load.

Step 3. Minimal Pruning

At shatter, open centers with units in FIGS. 50 and 51. Before harvest, keep centers clean as needed with above units and including units shown in FIGS. 48 and 49 and trim all shoots to approximately 15" (38 cm) above the vineyard floor using units shown in FIGS. 71 and 72.

Step 4. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE V

Mechanization of *Vitis vinifera* and French-American Hybrid grapes produced on high wire bilateral cordon (single cordon)

Step 1. Dormant Pruning

Mechanical prune during the dormant season using the mechanical pruner shown in FIGS. 64–66 with modifications and the unit in FIGS. 56 and 57, using a cutter bar above the cordon.

Step 2. Shoot Thinning

Use shoot thinners shown in FIGS. 2–7, 10–14, and 32 to thin shoots if needed when shoots are 4" to 5" (10–13 cm).

Step 3. Fruit Adjustment

Approximately 25–30 days post bloom, excess fruit may be removed with machines shown in FIGS. 2–7, 10–14, 32, and 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Leaf Removal

Approximately 25–30 days post bloom, use machines shown in FIGS. 39 and 40 to remove excessive leaves in fruiting zone to expose 50 to 80% of fruit to sunlight. This will improve fruit quality and aid in disease control through increasing light and air flow in the fruiting zone.

Step 5. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE VI

Mechanization of *Vitis vinifera* and French-American Hybrid grapes produced on GDC and other divided canopy trellises Step 1. Dormant Pruning Mechanical prune during the dormant season using the mechanical pruner shown in FIGS. 56 and 57.

Step 2. Touch-up Pruning and Shoot Thinning

Use mechanical pruner shown in FIG. 57 with modifications including the removal of the inside cutter bar and in FIG. 60 to touch-up prune the vines. To thin shoots, if needed, use shoot thinner in FIGS. 17, 18, 19, 25, 26, and 27 when shoots are 4" to 5" (10–13 cm).

Step 3. Fruit Adjustment

Approximately 25–30 days post bloom, excess fruit may be removed with units in FIGS. 53–55 using one half row unit modified for Thinning GDC (etc.) (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Leaf Removal

Approximately 25–30 days post bloom, use machine shown in FIG. 34 to remove excessive basal leaves in fruiting zone on the outside of the canopy to expose 50 to 80% of fruit to sunlight. This will improve fruit quality and aid in disease control through increasing light and air flow in the fruiting zone.

Step 5. Break Centers

Open centers with the units shown in FIGS. 48–51.

Step 6. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE VII

Mechanization of minimal pruned *Vitis vinifera* and French-American hybrid grapes trained to a high wire single cordon trellising system Step 1. Shoot Thinning.

Use shoot thinners shown in FIGS. 10–14, 30, 32, and 53–55 to thin shoots when they are 4–5" (10–13 cm).

Step 2. Fruit Adjustment

Approximately 25–30 days post bloom, excess fruit may be removed with machines shown in FIGS. 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost becomes a consideration for determining fruit load.

Step 3. Canopy Removal

In vigorous, mature vineyards in cool and/or humid regions, remove the center top 12" (30 cm) more or less with modified unit shown in FIG. 50.

Step 4. Minimal Pruning

Before harvest, trim all shoots to approximately 15" (38 cm) above the vineyard floor using units shown in FIGS. 71 and 72.

Step 5. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE VIII

Mechanization activities of minimal pruned *Vitis vinifera* and French-American hybrid grapes trained on GDC trellis systems Step 1. Shoot Thinning.

Use shoot thinners (if needed) to eliminate some of the excessive buds on the inside of each double curtain cordon when shoots are 2–3" (5–7.5 cm) with units shown in FIG. 18, and with modifications to units shown in FIGS. 22 and 53–55 for half row.

Step 2. Fruit Adjustment

Approximately 25–30 days post bloom, excess fruit may be removed using modifications of half row unit shown in FIGS. 53–55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost becomes a consideration in determining fruit load.

Step 3. Minimal Pruning

At shatter, open centers with units in FIGS. 50 and 51. Before harvest, keep centers clean as needed with above units and trim all shoots to approximately 15" (38 cm) above the vineyard floor using units shown in FIGS. 71 and 72.

Step 4. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE IX

Mechanization of *Vitis vinifera* and French-American hybrid grapes produced on standard California T-trellis Step 1. Dormant Pruning Mechanical prune during the dormant season using the mechanical pruner shown in FIGS. 61–63 and modified 71, 72 and 73.

Step 2. Shoot Thinning

If needed, use shoot thinner shown in FIG. 9, 24, 28 and 31 to thin shoots when they are 4" to 5" (10–13 cm).

Step 3. Fruit Adjustment

Approximately 25–30 days post bloom, excess fruit may be removed with modifications to machines shown in FIGS. 53, 54 and 55 (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Leaf Removal

Early leaf removal should expose 50–80% of fruit to sunlight and acclimate grape skins to sunlight exposure. Use machines shown in FIGS. 39 and 40 with modifications.

Step 5. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE X

Mechanization of *Vitis vinifera* and French-American hybrid grapes produced on vertical moveable catch wires Step 1. Dormant Pruning Mechanical prune during the dormant season using the mechanical pruner shown in FIGS. 61–63.

Step 2. Shoot Thinning

Use shoot thinner shown in FIGS. 8 and 30 to thin shoots, if needed, when shoots are 4" to 5" (10–13 cm.)

Step 3. Fruit Adjustment

Approximately 25–30 days post bloom, excess fruit may be removed with machines shown in FIGS. 30 and 53–55 with modification (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Leaf Removal

Approximately 25–30 days post bloom, use machines shown in FIGS. 34–38 to remove excessive basal leaves in fruiting zone to expose 50 to 80% of fruit to sunlight. This will improve fruit quality and aid in disease control through increasing light and air flow in the fruiting zone.

Step 5. Summer Pruning

Pruning in the summer time can be accomplished with the unit in FIGS. 56 and 57.

Step 6. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

EXAMPLE XI

Mechanization of *Vitis vinifera* and French-American hybrid grapes produced on Lyre or "U" and other divided canopy trellises Step 1. Dormant Pruning Mechanical prune during the dormant season using modifications of the mechanical pruner shown in FIGS. 56–63.

Step 2. Fruit Adjustment and Shoot Thinning

When shoots are 4" to 5" (10–13 cm), they may be removed with machines shown in FIGS. 15, 16, 20–23, 29, and 33. Approximately 25–30 days post bloom, excess fruit may be removed with machines shown in FIGS. 29, 30, 33, 53, 54, and 55, modified for one half of curtain (amount and timing is dependent on cultivar, fruit set, crop load, vine size and vigor). To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 3. Leaf Removal

Approximately 25–30 days post bloom, use machines shown in FIGS. 35–38 to remove excessive leaves in fruiting zone to expose 50 to 80% of fruit to sunlight. This will improve fruit quality and aid in disease control through increasing light and air flow in the fruiting zone. Leaf removal is only recommended for reducing rot problems in susceptible cultivars and under high vigor conditions.

Step 4. Summer Pruning

Use machine in FIGS. 56–60 to cut sides and tops for summer pruning. These vines must have their centers broken open. Using modifications with long slappers on the machine unit shown in FIG. 52.

Step 5. Harvesting

Use the harvester shown in FIG. 83 that has been adapted to harvest a modified Lyre or "U" trellis system. The standard Lyre or "U" trellis system can be modified with the movable cordon wire assembly shown in FIGS. 84A, 84B, and 84D then harvested with the single or half-row harvester shown in FIG. 84 or the over-the-row harvester shown in FIG. 85.

EXAMPLE XII

Mechanization of *Vitis vinifera* and French-American hybrid grapes produced on Smart-Dyson Ballerina (and similar) trellising system Step 1. Dormant Pruning Mechanical prune during the dormant season using the mechanical pruner shown in FIGS. 61–63 (with modifications) on the upper part of the ballerina and the units in FIGS. 64–66 and that of FIG. 70 (with modifications) on the lower part of the ballerina.

Step 2. Shoot Thinning

When shoots are 4–5" (10–13 cm) use shoot thinners shown in FIGS. 8 and 30, and those in FIGS. 53–55, with modifications, on the upper part of the ballerina. Use shoot thinners shown in FIGS. 53–55 (modified) on the lower part of the ballerina if needed.

Step 3. Fruit Adjustment

Approximately 25–30 days post bloom, excess fruit may be removed from the upper part of the ballerina with machines shown in FIGS. 53–55 (amount and timing is dependent on cultivar, fruit set, crop load, vine size and vigor). Excess fruit on the lower part of the ballerina may be removed with units shown in FIGS. 53–55. The top and bottom obviously need different settings or adjustments to accomplish fruit thinning. To determine the amount of fruit load to retain, it is critical to maintain adequate soil moisture, to optimize fertilization, to control pests and to optimize other critical production factors. Also, in regions with short growing seasons, the number of days after harvest and before frost become a consideration for determining fruit load.

Step 4. Leaf Removal

Approximately 25–30 days post bloom, use machines shown in FIGS. 34–38 (with modifications) on the upper part of the ballerina trellis and use units shown in FIGS. 39 and 40 on the lower portion of the trellis to remove basal leaves. This may be needed to improve light and air flow in the fruiting zone.

Step 5. Summer Pruning

Summer prune upper part of ballerina with unit in FIGS. 56 and 57. Trim all shoots on lower part of ballerina to approximately 15" (38 cm) above the vineyard floor before harvest with units shown on FIGS. 71 and 72.

Step 6. Harvesting

Use an approved commercial harvester such as a harvester equipped with Quad-rods or bow-rods to remove difficult-to-harvest fruit. This harvesting approach allows for excellent fruit removal and does minimal damage to foliage. A harvester should allow for vines to maintain maximum foliage that is capable of carrying out needed photosynthesis and storage of carbohydrates in the vines until frost and/or leaf drop.

Thus, it will be appreciated that as a result of the present invention, a highly effective, improved vineyard apparatus, system, and/or method for vineyard mechanization is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A mechanization system for mechanizing a vineyard and which at least substantially maintains fruit quality, comprising the steps of
    using mechanical equipment to complete tasks selected from the group including dormant pruning, shoot adjustment, shoot positioning, fruit adjustment, breaking centers, canopy removal, shoot thinning, fruit thinning, top canopy adjustment, minimal pruning, leaf removal, touch-up pruning, summer pruning, and harvesting; and,
    wherein said tasks include at least minimal pruning and said minimal pruning includes at shatter, opening centers with breaker units before harvest, keeping centers clean with slapper units and trimming all shoots to approximately 15 inches (38 cm) above the vineyard floor using pruner units.

2. The mechanization system according to claim 1 wherein said tasks further include dormant pruning and said dormant pruning consists of mechanical pruning during the dormant season using a mechanical pruner.

3. The mechanization system according to claim 1 wherein said tasks further include fruit adjustment and said fruit adjustment includes removing any excess fruit with at least one machine approximately 25–30 days post bloom.

4. The mechanization system according to claim 1 wherein said tasks further include shoot thinning and said shoot thinning includes the use of at least one shoot thinner to eliminate at least some of the excessive buds when shoots are 2–3 inches (5–7.5 cm) with units.

5. The mechanization system according to claim 1 wherein said tasks further include shoot thinning and said shoot thinning includes the use of at least one shoot thinner to thin shoots when shoots are 4 to 5 inches (10–13 cm).

6. The mechanization system according to claim 1 wherein said tasks further include leaf removal and said leaf removal includes using a machine to remove excessive leaves in fruiting zone to expose 50 to 80% of fruit to sunlight approximately 25–30 days post bloom.

7. The mechanization system according to claim 1 wherein said at least three tasks includes minimal pruning and said minimal pruning includes at shatter, opening centers with breaker units before harvest, keeping centers clean with slapper units and trimming all shoots to approximately 15 inches (38 cm) above the vineyard floor using pruner units.

8. The mechanization system according to claim 1 wherein said tasks further include harvesting and said harvesting includes use of a harvesting system equipped with at least one of Quad-rods and bow-rods to remove difficult-to-harvest fruit.

9. A mechanization method for *Vitis labruscana* grapes and other grapes with drooping growth habits trained on single curtain trellis systems, comprising the steps of:
    dormant pruning using a mechanical pruner;
    shoot adjustment using a mechanical pruner adapted to touch-up prune and a shoot thinner to thin shoots when they are 2 to 3 inches (5–7.5 cm);
    shoot positioning and fruit adjustment at 10% bloom using a mechanical shoot positioner, and removing any excess fruit with a bow-rod thinner approximately 25–30 days post bloom; and harvesting using a mechanical harvester.

10. A mechanization method for *Vitis labruscana* grapes and other grapes with drooping growth habits trained on GDC trellis and GDC-like canopy systems, the steps of:

dormant pruning using a mechanical pruner;

shoot positioning at 10% bloom, using a mechanical shoot positioner to position shoots;

fruit adjustment after berry set by removing any excess fruit using either a pruning unit or a thinning unit;

breaking GDC centers to allow air flow and sunlight into canopy centers using a center breaker unit; and harvesting using mechanical harvester.

11. A mechanization method for minimal pruned *Vitis labruscana* grapes and other grapes with drooping growth habits trained on single curtain trellis systems, comprising the steps of:

canopy removal by eliminating the 2–3 inch shoots that develop on the top section of the cordon including shoots on canes on the top in an area approximately 4 inches (10 cm) using a slapper unit adapted to improve air movement and light penetration into the canopy;

shoot thinning using a thinning unit;

fruiting thinning using a thinning unit;

top canopy adjustment in vigorous older vineyards by removing the center top about 12 inches (30 cm) of the canopy foliage to allow for movement of air and light into the center portion of the canopy;

minimal pruning using a pruning unit; and harvesting using a mechanical harvester.

12. A mechanization method for minimal pruned *Vitis labruscana* grapes and other grapes with drooping growth habits trained on GDC trellis systems, comprising the steps of:

shoot thinning with a shoot thinner;

removing any excess fruit using a bow-rod thinner modified for half rows;

minimal pruning by opening centers with a slapper unit, keeping centers clean using a breaker unit and trimming shoots using a pruning unit; and harvesting using a mechanical harvester.

13. A mechanization method for *Vitis vinifera* and French-American hybrid grapes produced on high wire bilateral cordon or single cordon, comprising the steps of:

mechanical pruning during the dormant season using a mechanical pruner with modifications and a pruner unit using a cutter bar above the cordon;

shoot thinning using a shoot thinner;

removing any excess fruit with at least one of a shoot thinner or bow-rod machine;

leaf removal using a leaf removal machine; and harvesting using a mechanical harvester.

14. A mechanization method for *Vitis vinifera* and French-American hybrid grapes produced on GDC and other divided canopy trellises, comprising the steps of:

dormant pruning using a mechanical pruner;

touch-up pruning and shoot thinning using a mechanical pruner with modifications including the removal of an inside cutter bar and a mechanical pruner to touch-up prune the vines, and to thin shoots using a shoot thinner when shoots are 4" to 5 " (10–13 cm);

removing any excess fruit with a bow-rod unit having a one half row unit modified for thinning GDC;

leaf removal using a leaf removing machine to remove excessive basal leaves in fruiting zone on the outside of the canopy;

breaking centers with a slapper or breaker unit; and harvesting using a mechanical harvester.

15. A mechanization method of minimal pruned *Vitis vinifera* and French-American hybrid grapes trained to a high wire single cordon trellising system, comprising the steps of:

shoot thinning using a shoot thinner;

removing any excess fruit with a bow-rod machine;

canopy removal in vigorous, mature vineyards in cool and/or humid regions, by removing the center top about 12 inches (30 cm) with a slapper unit adapted to remove said top;

minimal pruning using a pruning unit; and harvesting using a mechanical harvester.

16. A mechanization method for minimal pruned *Vitis vinifera* and French-American hybrid grapes trained on GDC trellis systems, comprising the steps of:

eliminating some of the excessive buds on the inside of each double curtain cordon when shoots are 2–3 inches (5–7.5 cm) with a shoot thinner and with a modified half row bow-rod unit for half row;

fruit adjustment using a modified thinning bow-rod unit;

opening centers and keeping centers clean with a slapper unit and trimming all shoots using a pruner unit; and harvesting with a mechanical harvester.

17. A mechanization method for *Vitis vinifera* and French-American hybrid grapes produced on standard California T-trellis, comprising the steps of:

dormant pruning using a mechanical pruner;

shoot thinning using a shoot thinner;

removing any excess fruit with a modified bow-rod machine;

early leaf removal to expose 50–80% of fruit to sunlight and acclimate grape skins to sunlight exposure using a leaf remover machine adapted to remove leaves; and harvesting using a mechanical harvester.

18. A mechanization method for *Vitis vinifera* and French-American hybrid grapes produced on vertical moveable catch wires, comprising the steps of:

dormant pruning using a mechanical pruner;

shoot thinning using a shoot thinner;

removing any excess fruit with a bow-rod machine adapted to remove excess fruit;

leaf removal using machine to remove excessive basal leaves;

pruning in the summertime with a pruner unit; and harvesting using a mechanical harvester.

19. A mechanization method for *Vitis vinifera* and French-American hybrid grapes produced on Lyre or "U" and other divided canopy trellises, comprising the steps of:

dormant pruning using a mechanical pruner adapted to prune said trellises;

fruit adjustment and shoot thinning when shoots are 4 to 5 inches (10–13 cm) with a shoot thinner, removing any excess fruit with a bow-rod machine modified for one half of curtain;

leaf removal using a leaf removal machine;

summer pruning using a pruning machine to cut sides and tops for summer pruning, and breaking the centers open using a long slapper adapted to break centers open; and harvesting using a mechanical harvester.

20. A mechanization method for *Vitis vinifera* and French-American hybrid grapes produced on Smart-Dyson Ballerina trellising systems, comprising the steps of:

dormant pruning using a mechanical pruner adapted to prune on the upper part of the ballerina and a pruning unit adapted to prune on the lower part of the ballerina;

shoot thinning when shoots are 4–5 inches (10–13 cm) using a shoot thinner adapted to shoot thin on the upper part of the ballerina, and using a bow-rod machine adapted to shoot thin on the lower part of the ballerina if needed;

removing any excess fruit from the upper part of the ballerina with a bow-rod machine, any excess fruit on the lower part of the ballerina with a bow-rod unit with different top and bottom settings;

leaf removal using a leaf removal machine adapted to remove leaves on the upper part of the ballerina trellis and using a leaf removal unit on the lower portion to remove basal leaves;

summer pruning the upper part of the ballerina with a pruner unit, trimming all shoots on the lower part of the ballerina to approximately 15 inches (38 cm) above the vineyard floor before harvest with a pruner unit; and harvesting with a mechanical harvester.

\* \* \* \* \*